US012488709B2

(12) United States Patent
Pyo

(10) Patent No.: US 12,488,709 B2
(45) Date of Patent: Dec. 2, 2025

(54) DISPLAY DEVICE WITH FLEXIBLE DISPLAY PANEL

(71) Applicant: LG ELECTRONICS INC., Seoul (KR)

(72) Inventor: Jonggil Pyo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 735 days.

(21) Appl. No.: 17/758,249

(22) PCT Filed: Dec. 31, 2019

(86) PCT No.: PCT/KR2019/018793
§ 371 (c)(1),
(2) Date: Jun. 30, 2022

(87) PCT Pub. No.: WO2021/137323
PCT Pub. Date: Jul. 8, 2021

(65) Prior Publication Data
US 2023/0028199 A1 Jan. 26, 2023

(51) Int. Cl.
*G09F 9/30* (2006.01)
*G01D 5/10* (2006.01)

(52) U.S. Cl.
CPC ............... *G09F 9/301* (2013.01); *G01D 5/10* (2013.01)

(58) Field of Classification Search
CPC .. G09F 9/301; G91D 5/10; G06F 1/16; B65H 75/44
See application file for complete search history.

(56) References Cited

U.S. PATENT DOCUMENTS 10,444,613 B2 * 10/2019 Seo ......................... G09F 9/301
2017/0318693 A1 11/2017 Kim et al.

FOREIGN PATENT DOCUMENTS

KR 1020160123201 10/2016
KR 1020170095636 8/2017
KR 1020170126061 11/2017
KR 1020190018592 2/2019

OTHER PUBLICATIONS

PCT International Application No. PCT/KR2019/018793, International Search Report dated Sep. 21, 2020, 2 pages.

* cited by examiner

*Primary Examiner* — Emily P Pham
(74) *Attorney, Agent, or Firm* — LEE, HONG, DEGERMAN, KANG & WAIMEY

(57) ABSTRACT

A display device is disclosed. The display device according to the present disclosure may include: a flexible display panel; a module cover which is disposed at a rear of the display panel; a roller on or from which the display panel and the module cover are wound or unwound; a sensor which is disposed adjacent to the display panel and the module cover so as to sense movements of the display panel and the module cover; and a controller which controls a degree of winding or unwinding of the display panel and the module cover on or from the roller based on information on the movements acquired by the sensor.

14 Claims, 92 Drawing Sheets

【FIG. 1】
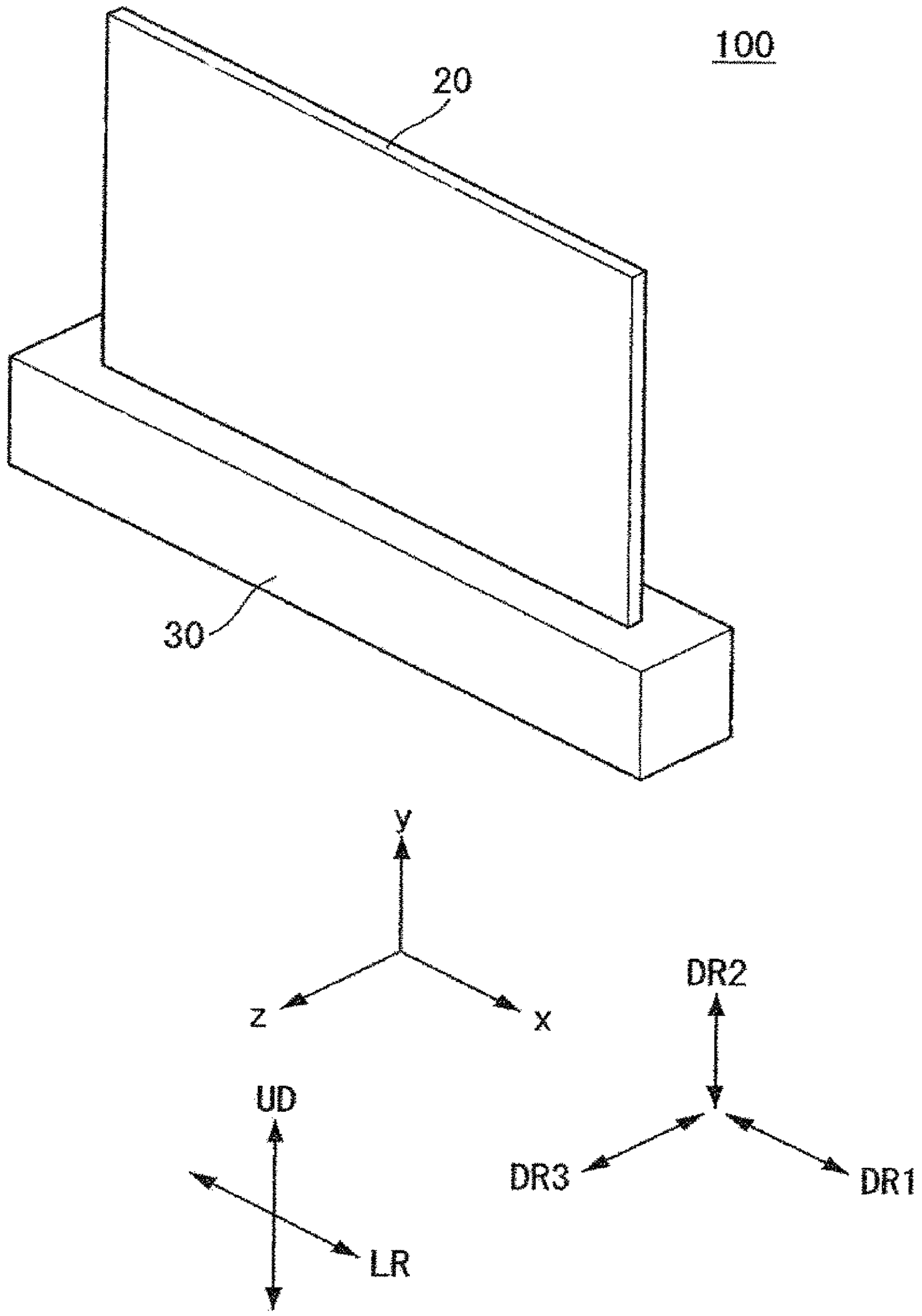

【FIG. 2】
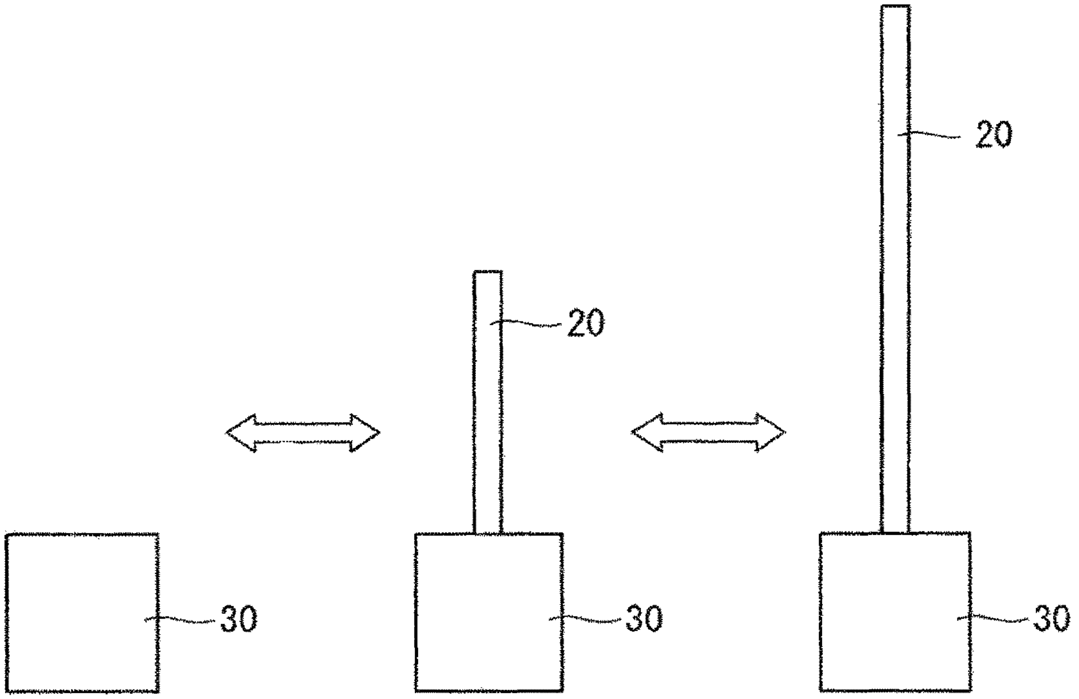

【FIG. 3】
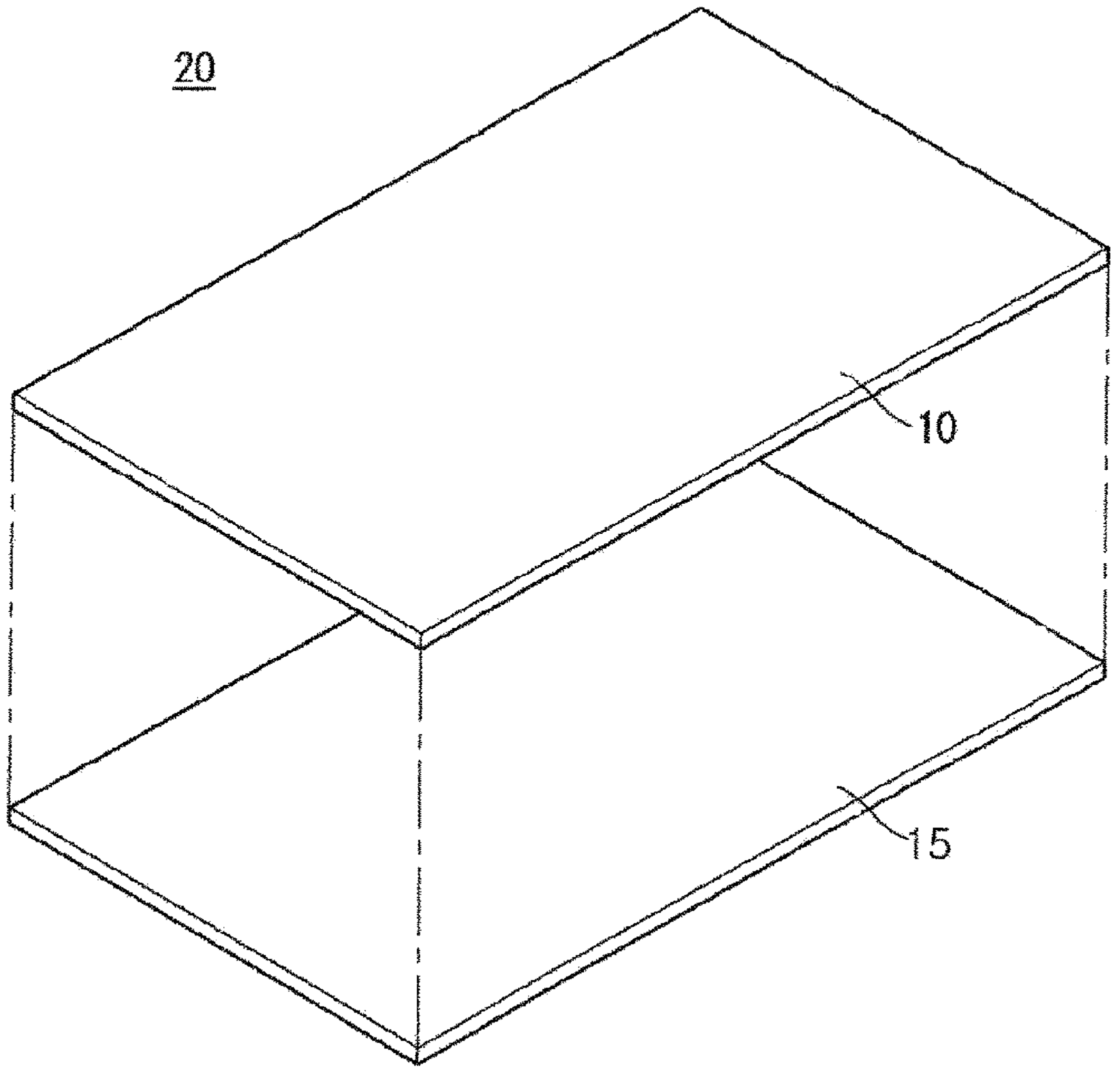

【FIG. 4】
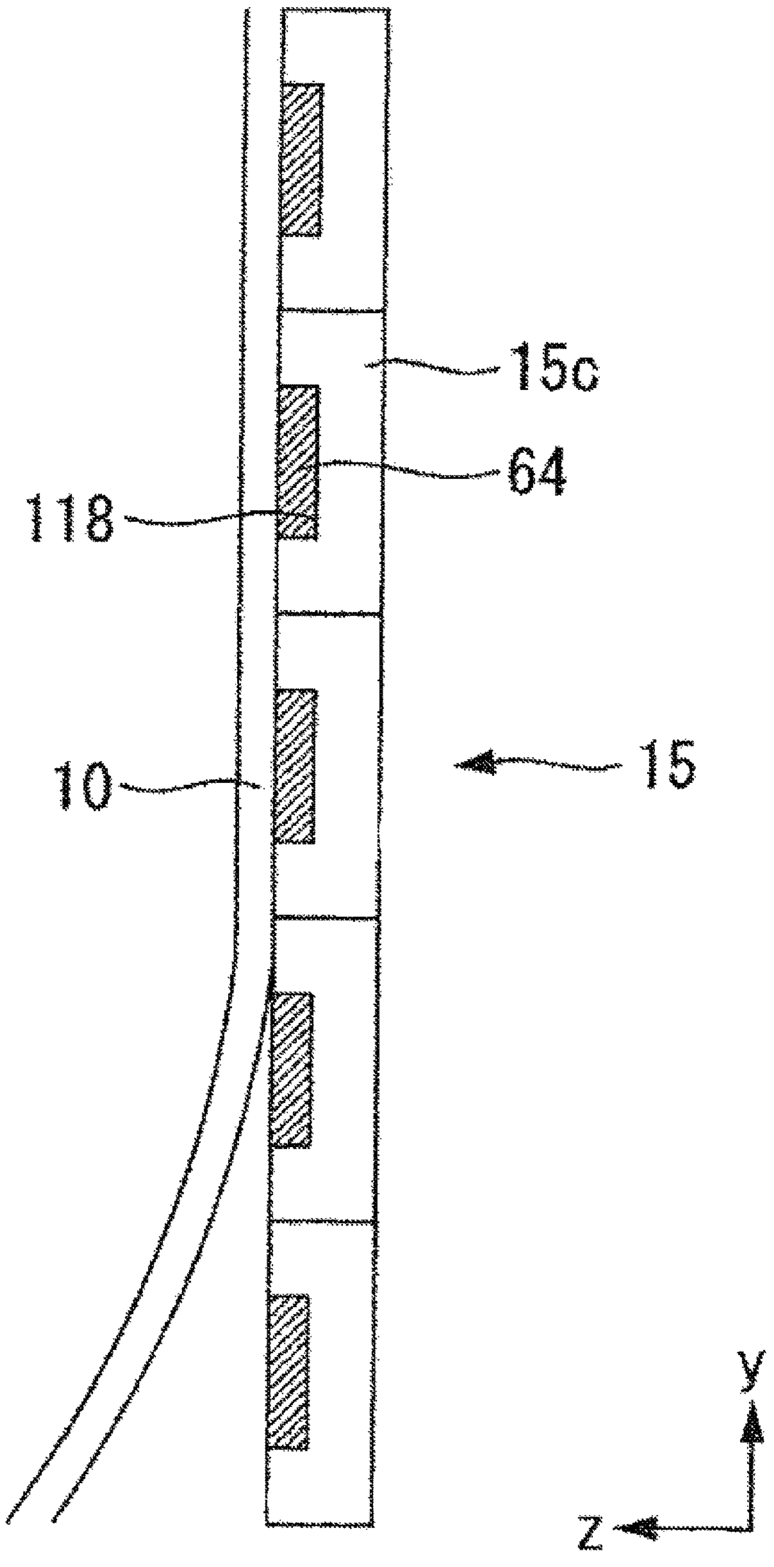

【FIG. 5】
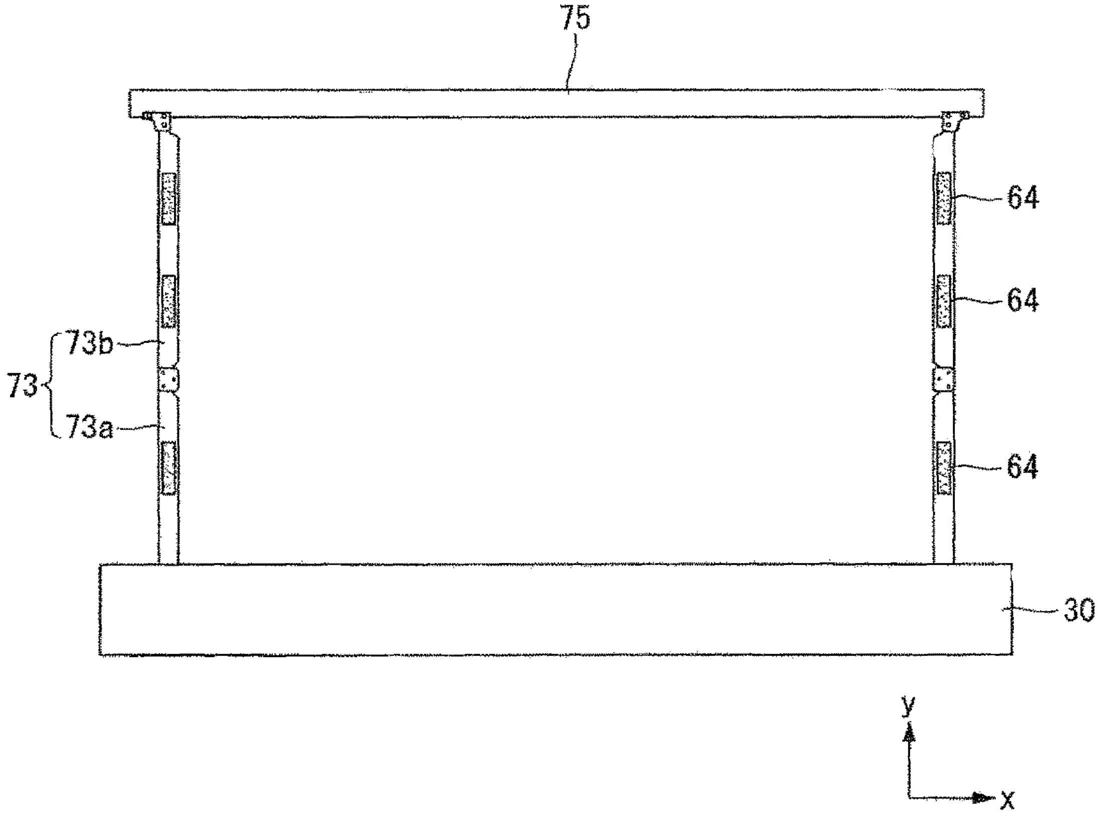

【FIG. 6】
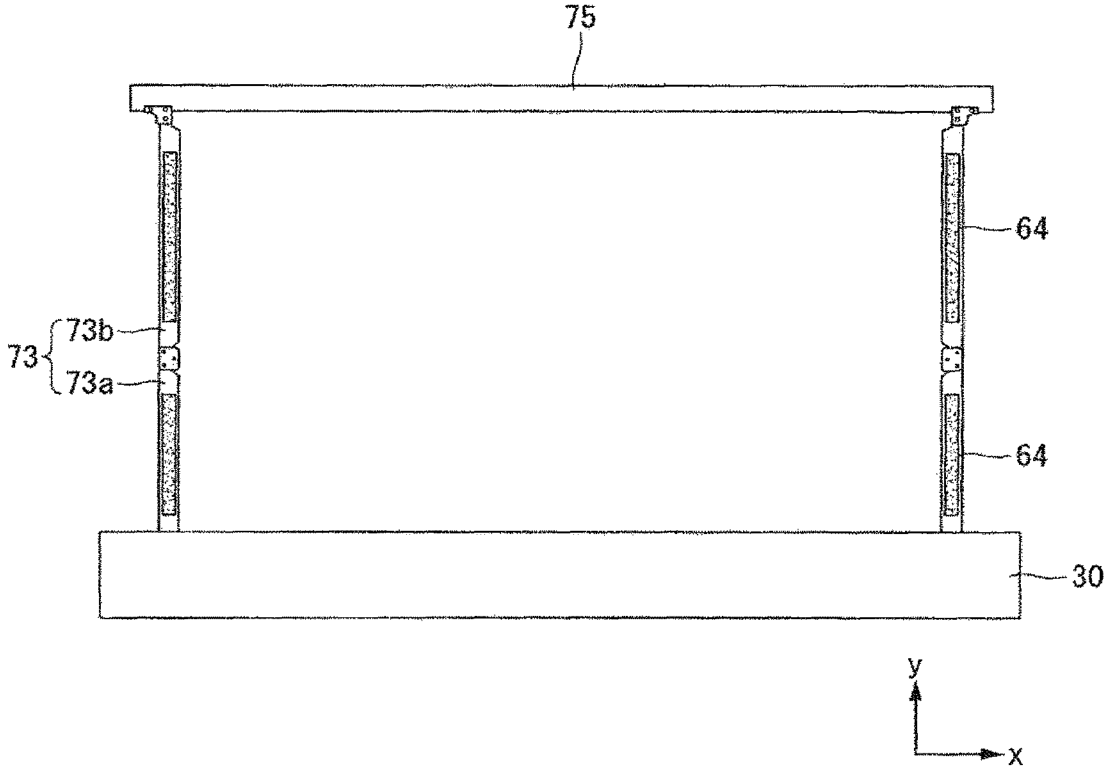

【FIG. 7】
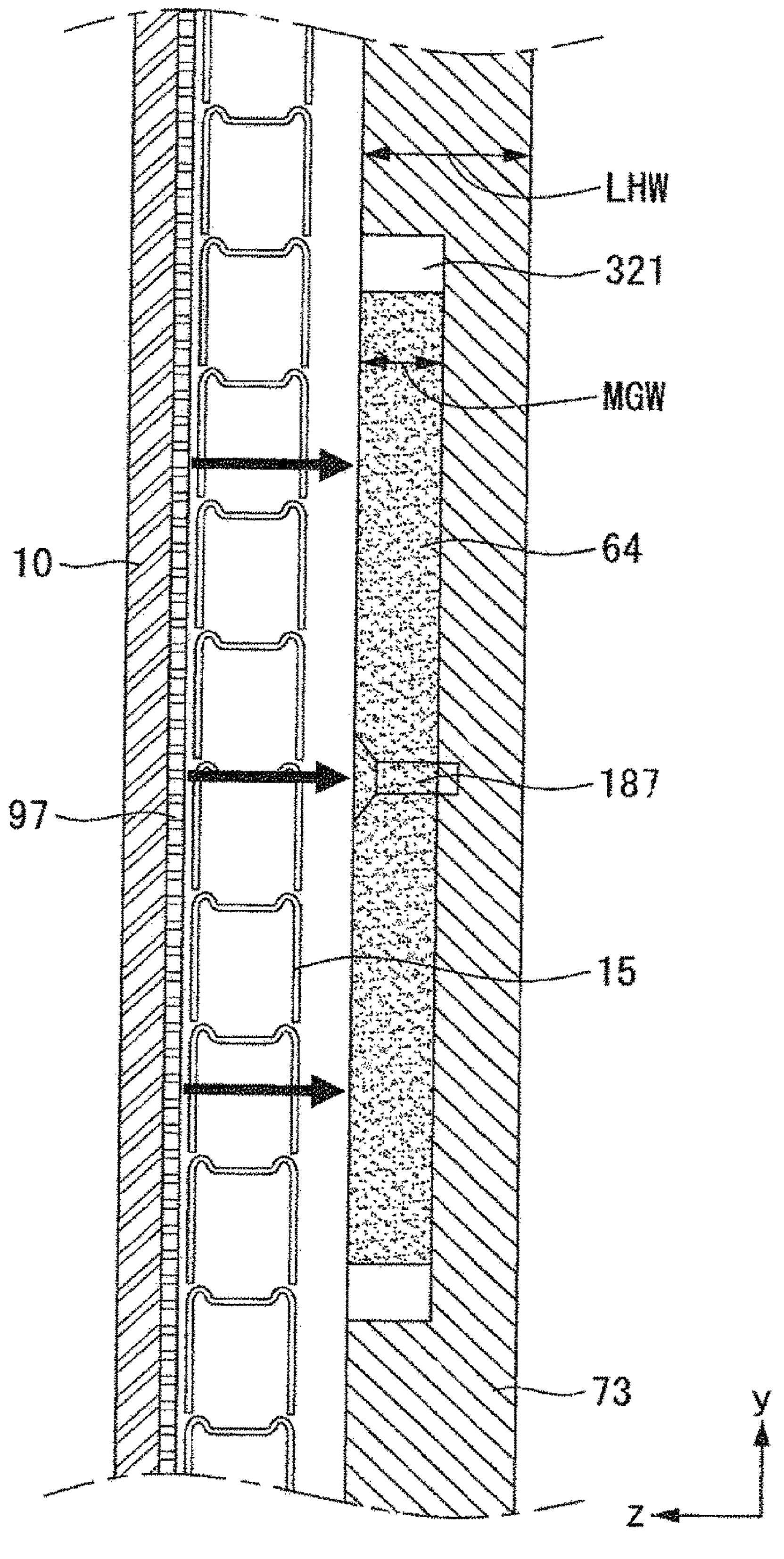

【FIG. 8】
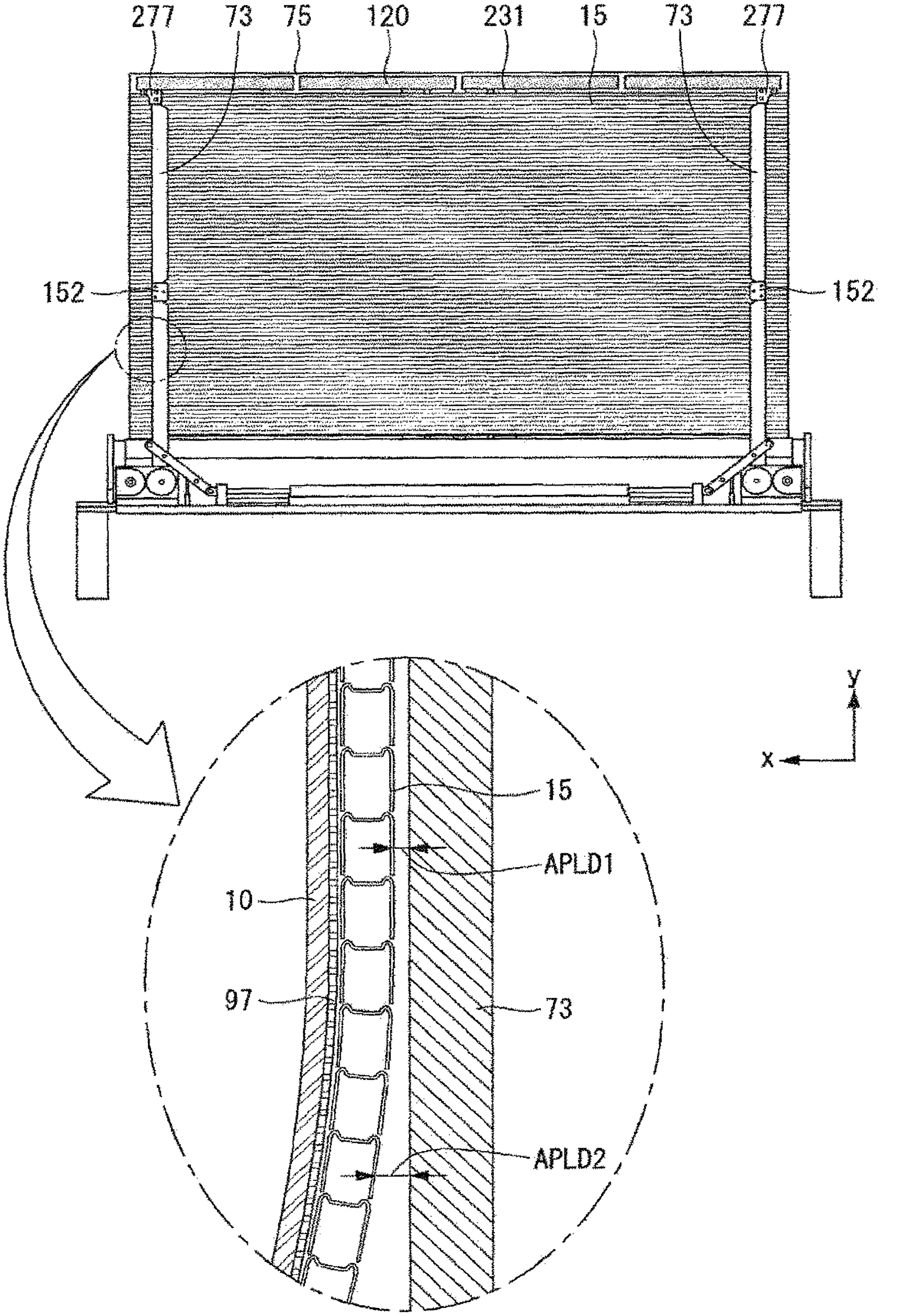

【FIG. 9】
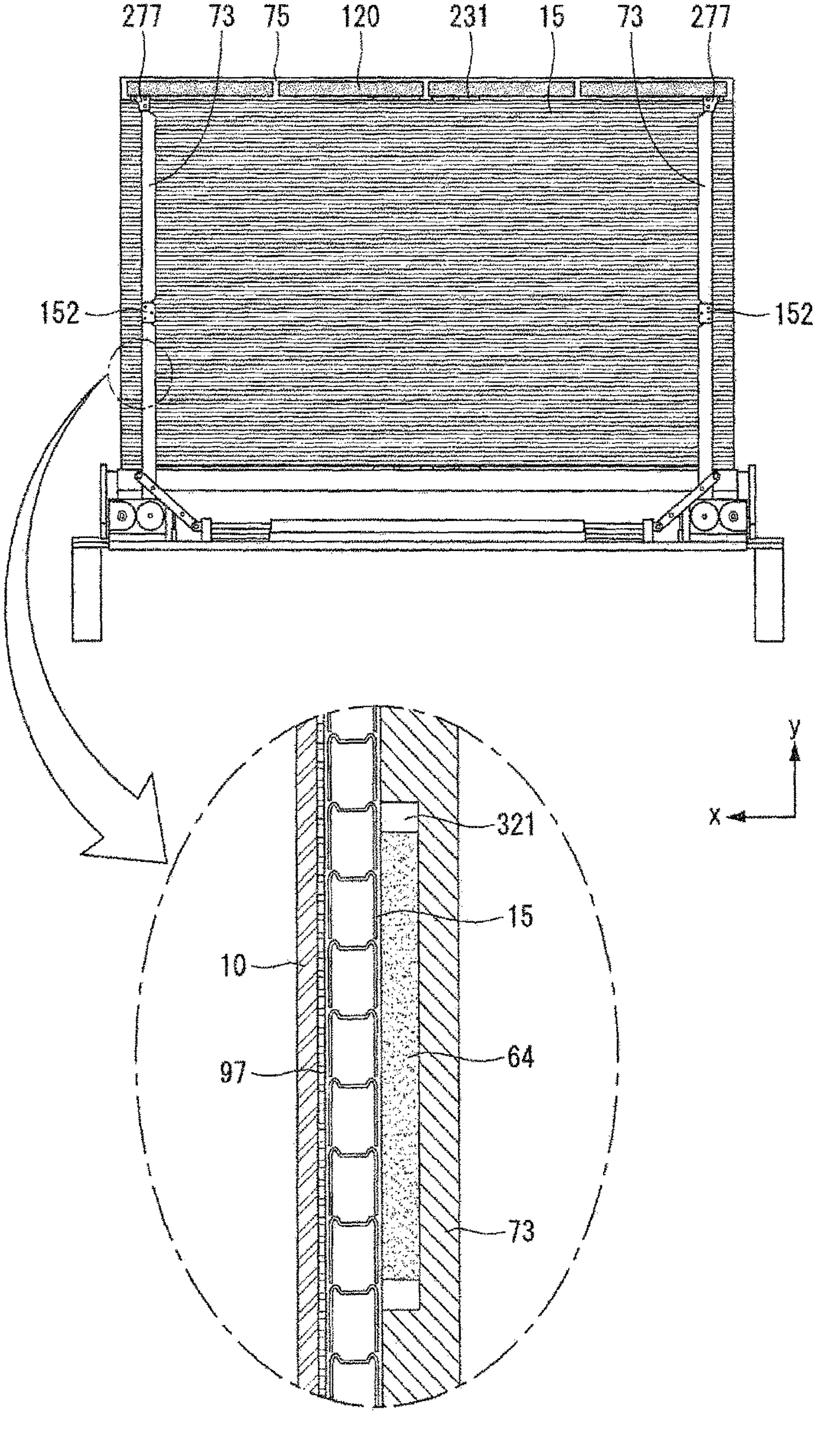

【FIG. 10】
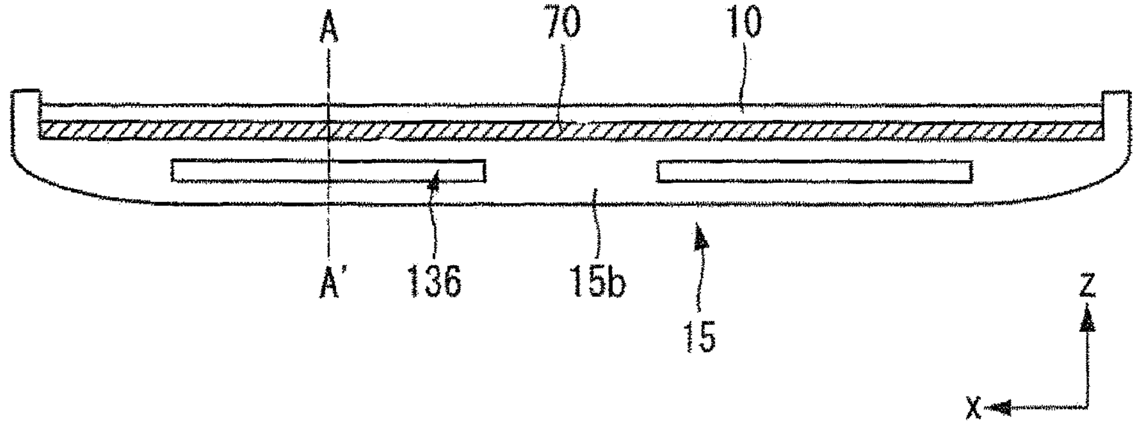
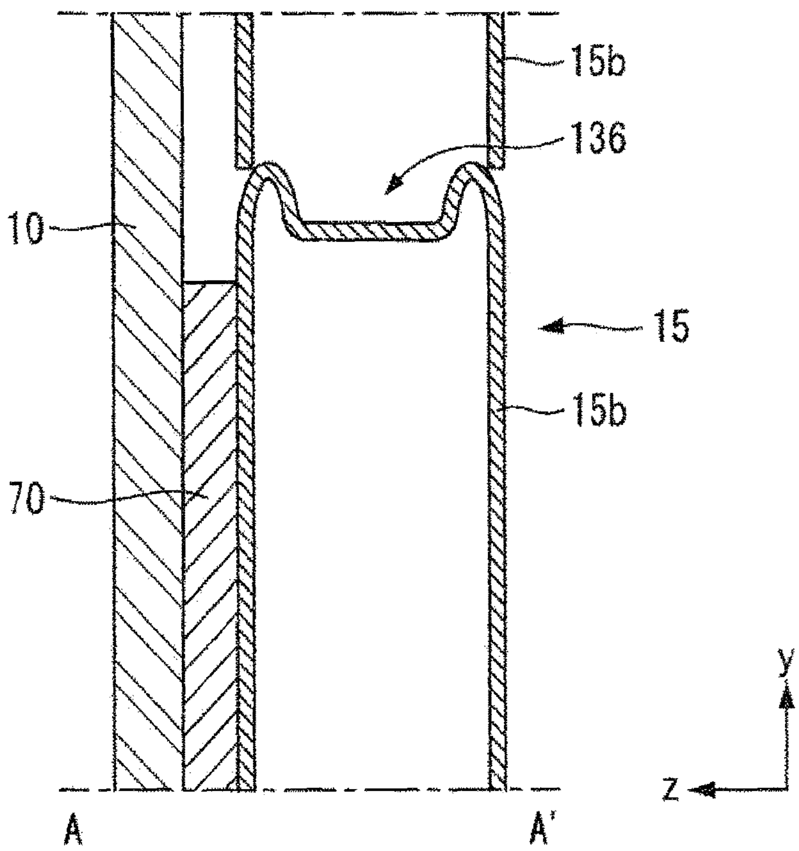

【FIG. 11】
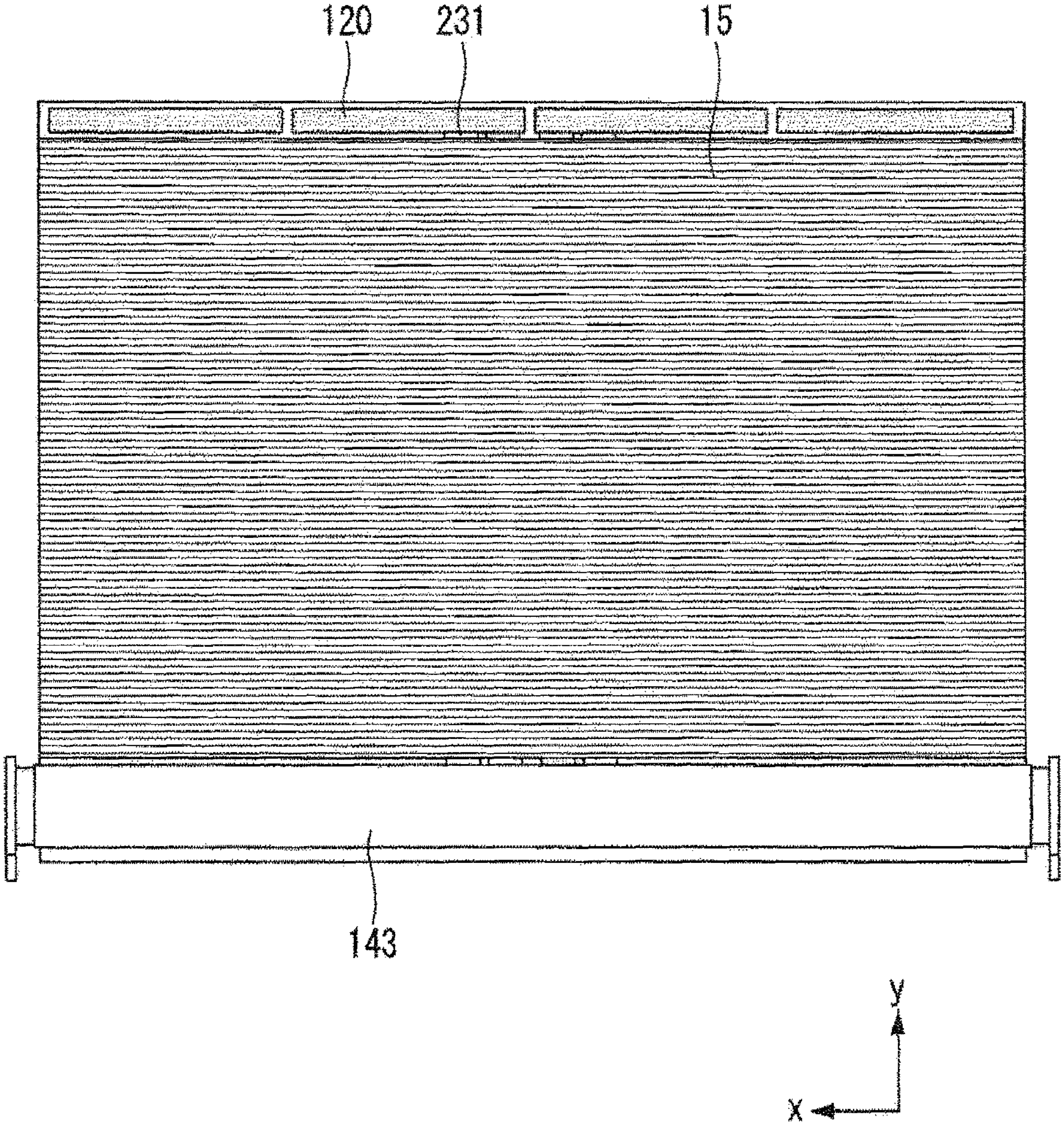

【FIG. 12】
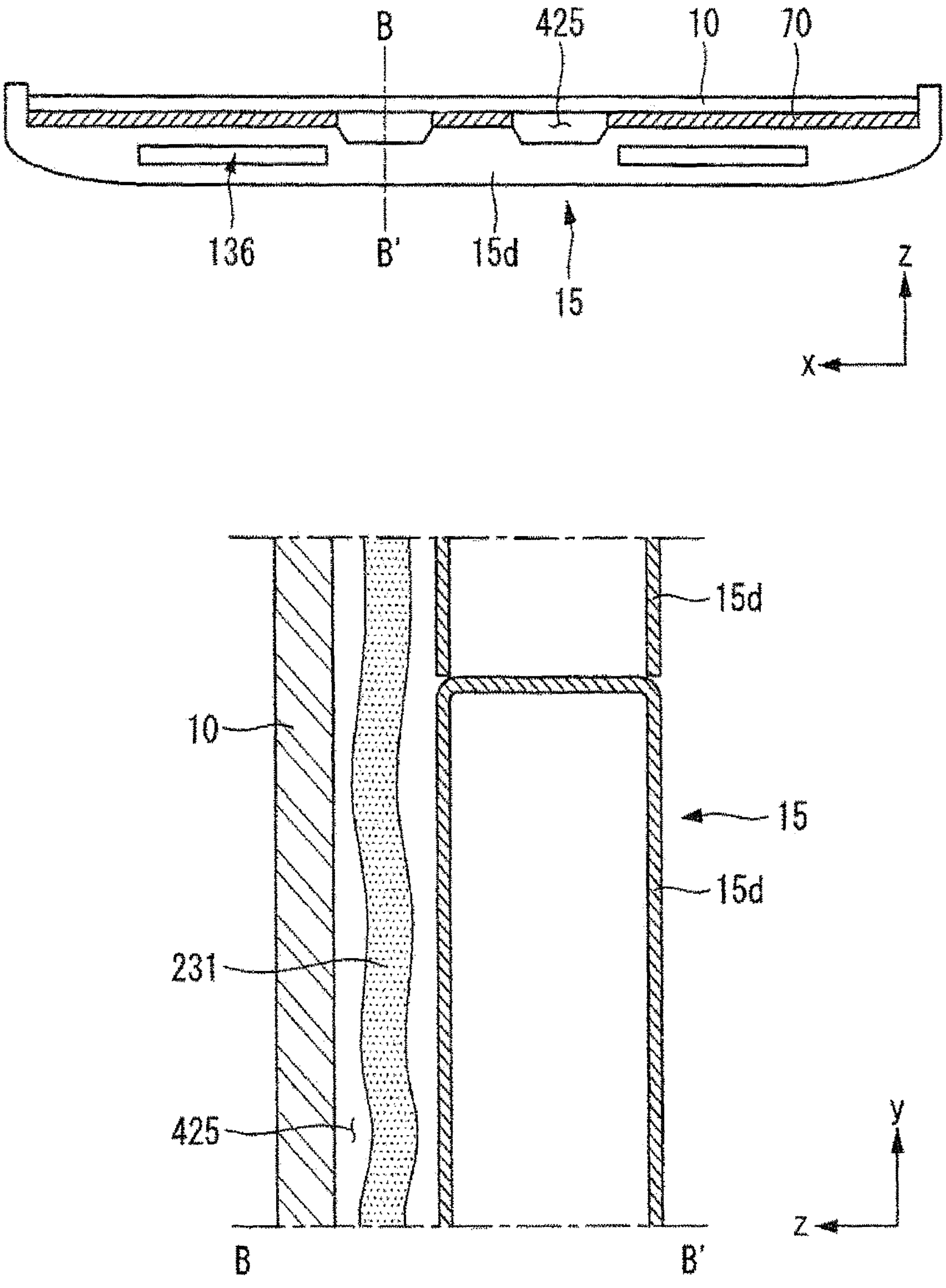

【FIG. 13】
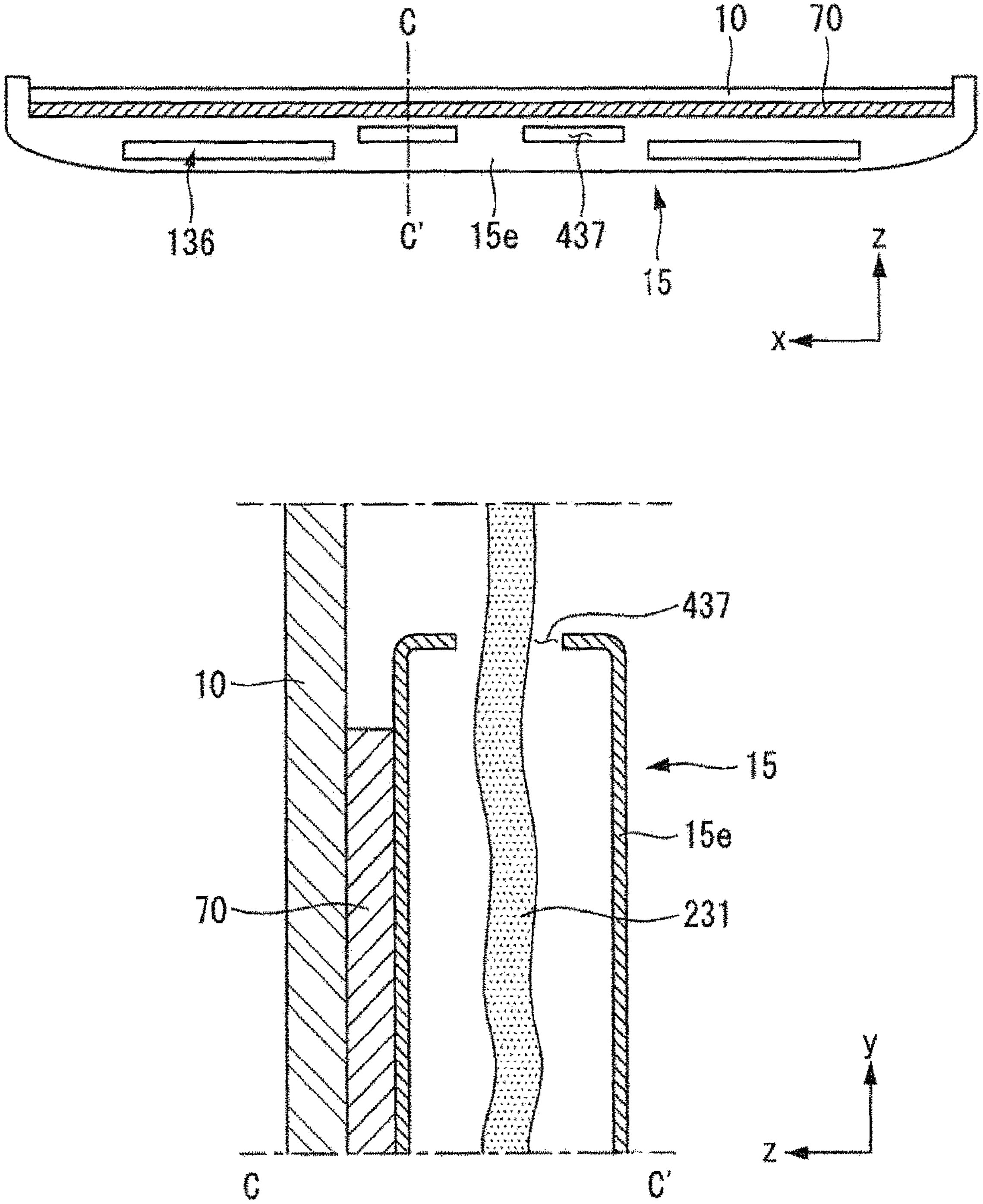

【FIG. 14】
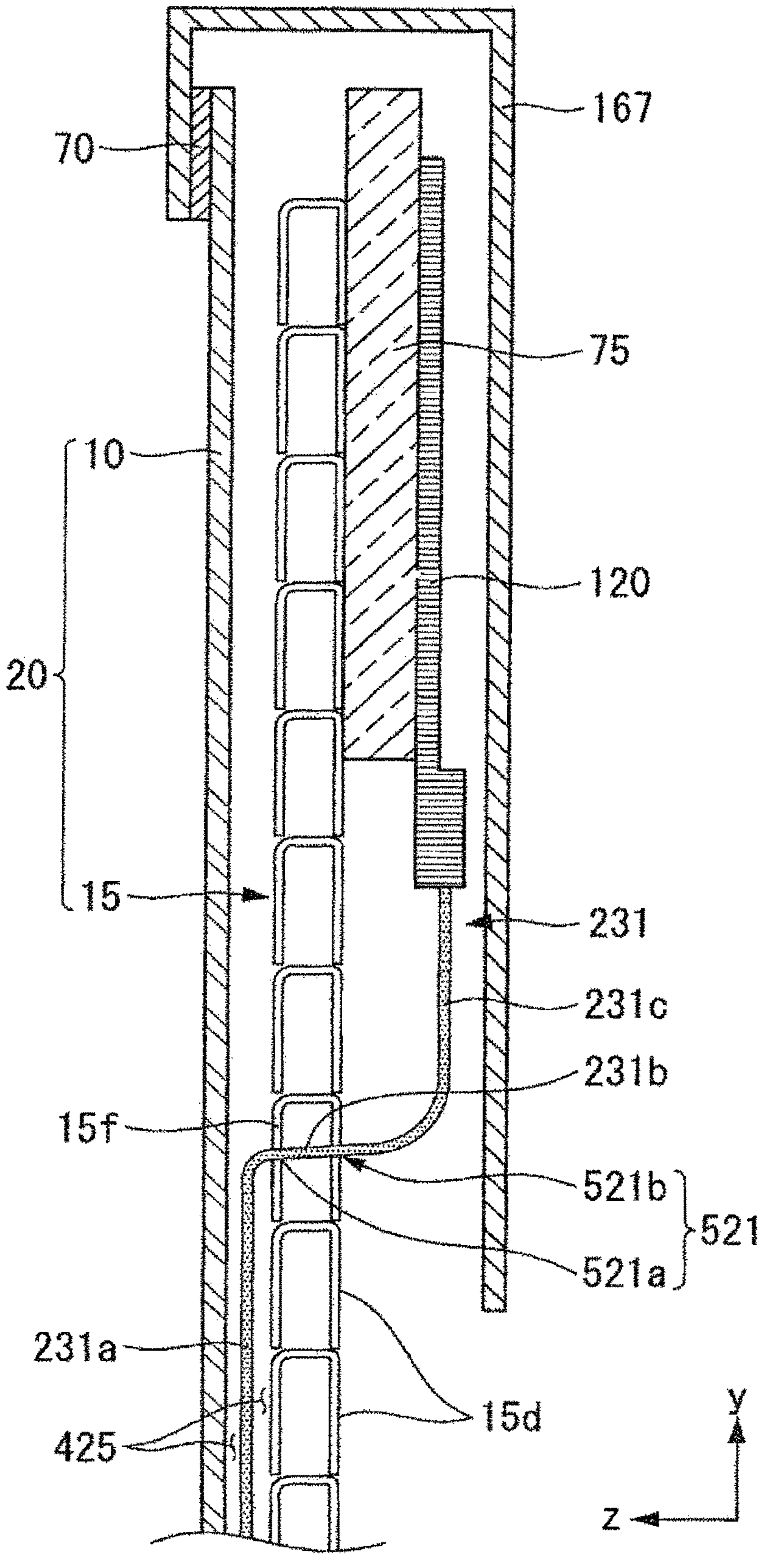

【FIG. 15】
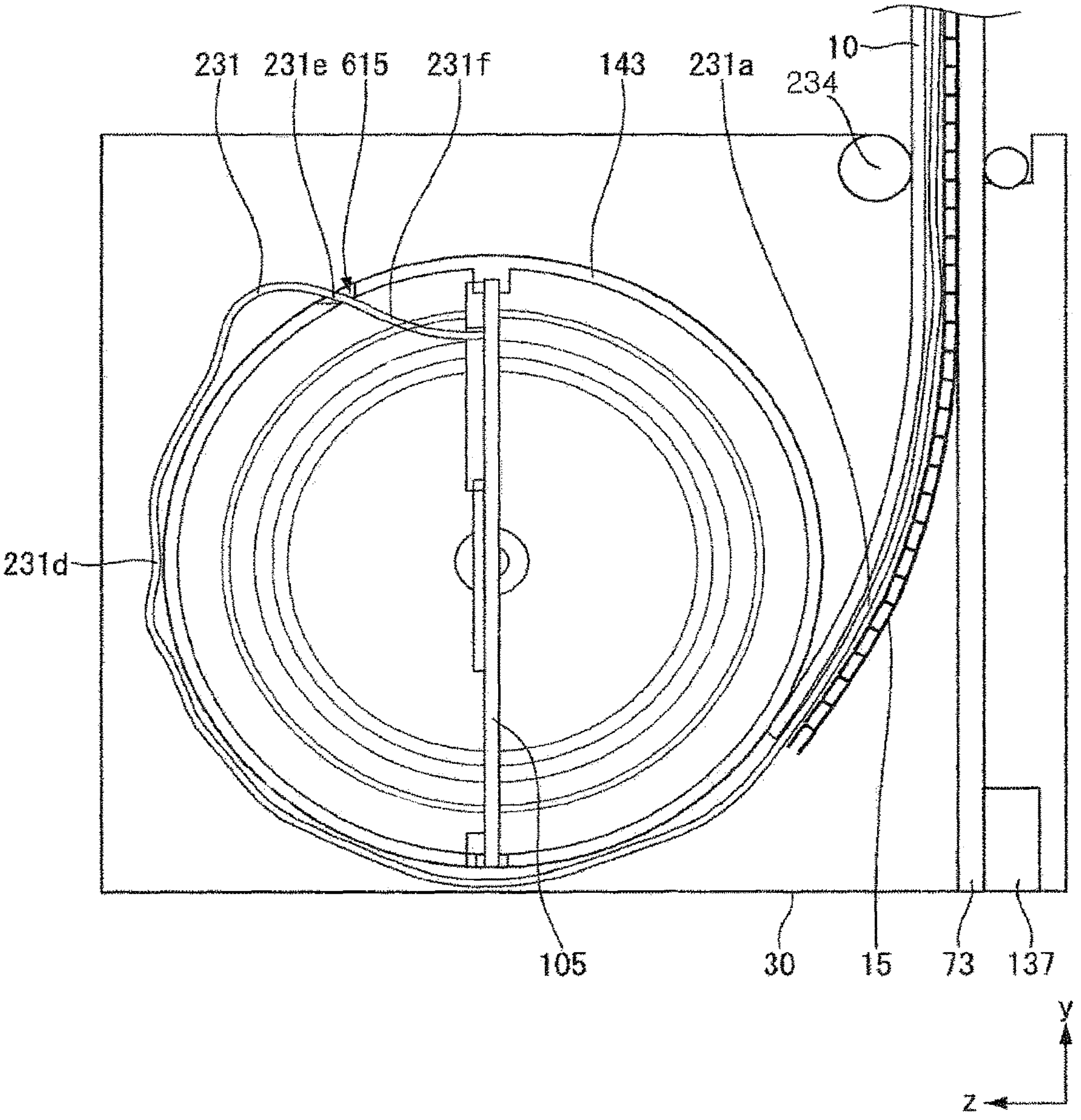

【FIG. 16】
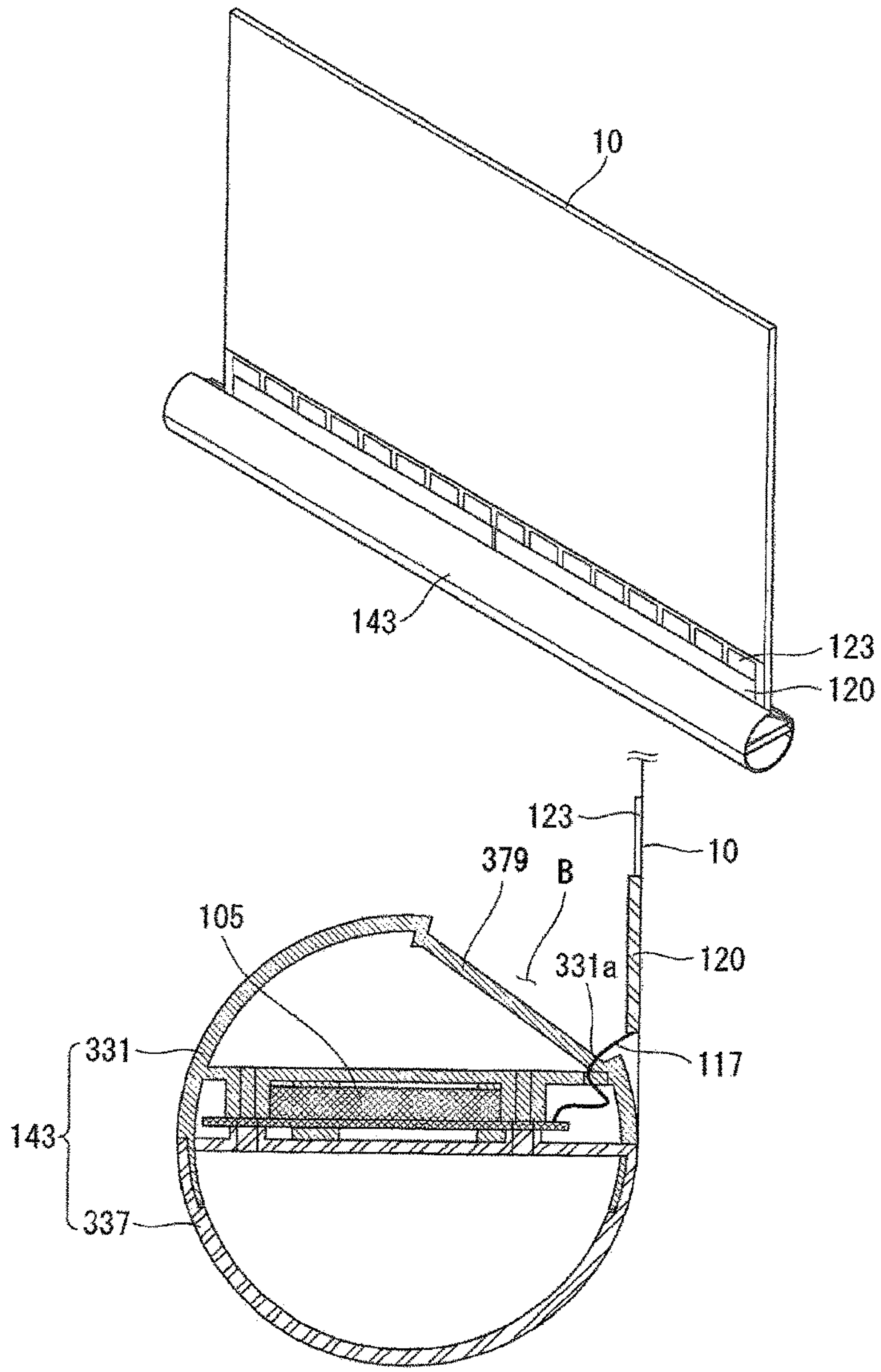

【FIG. 17】
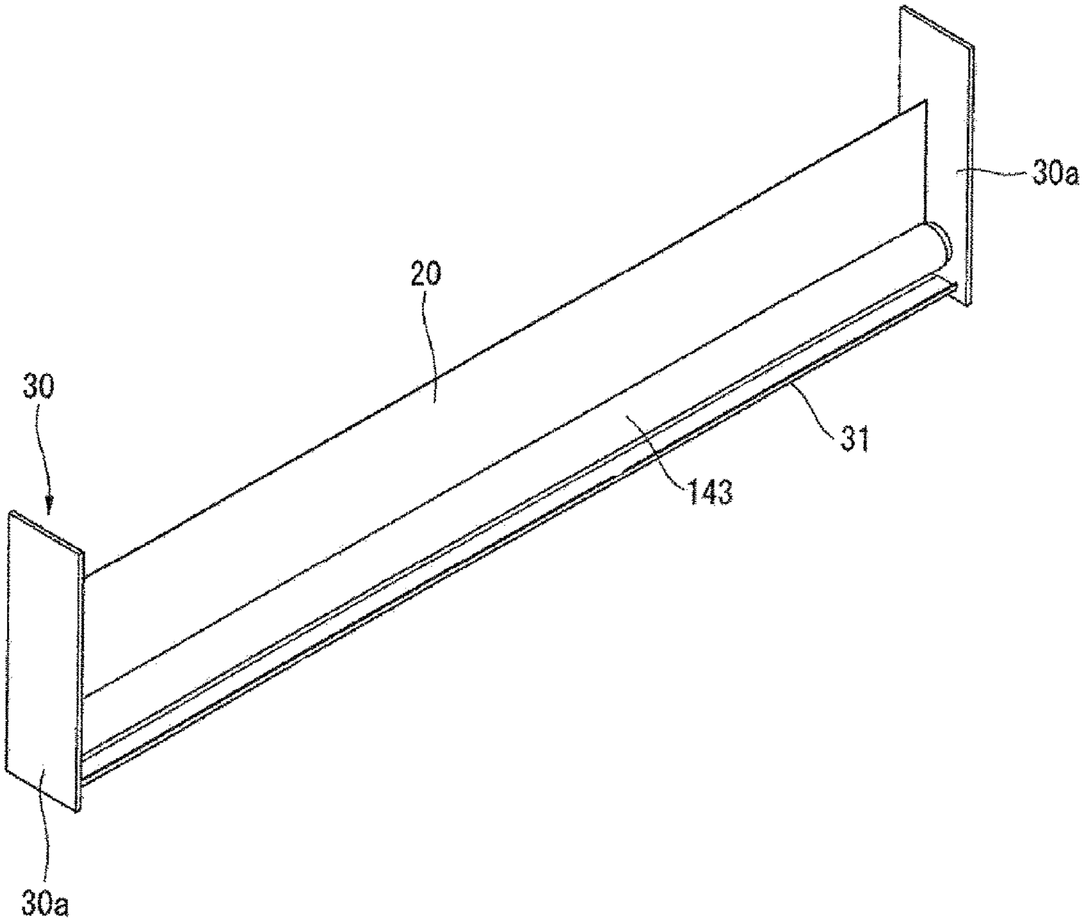

【FIG. 18】
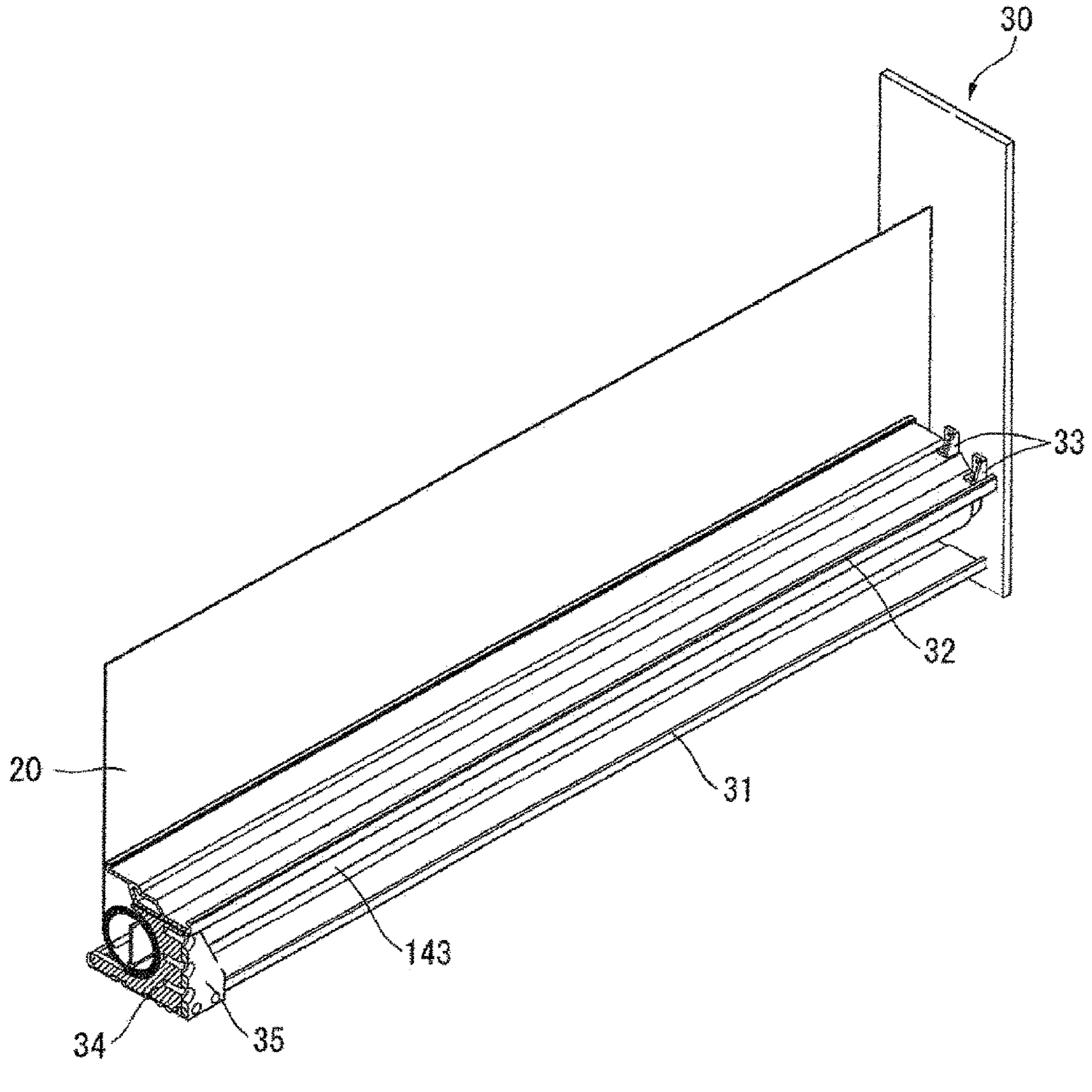

【FIG. 19】
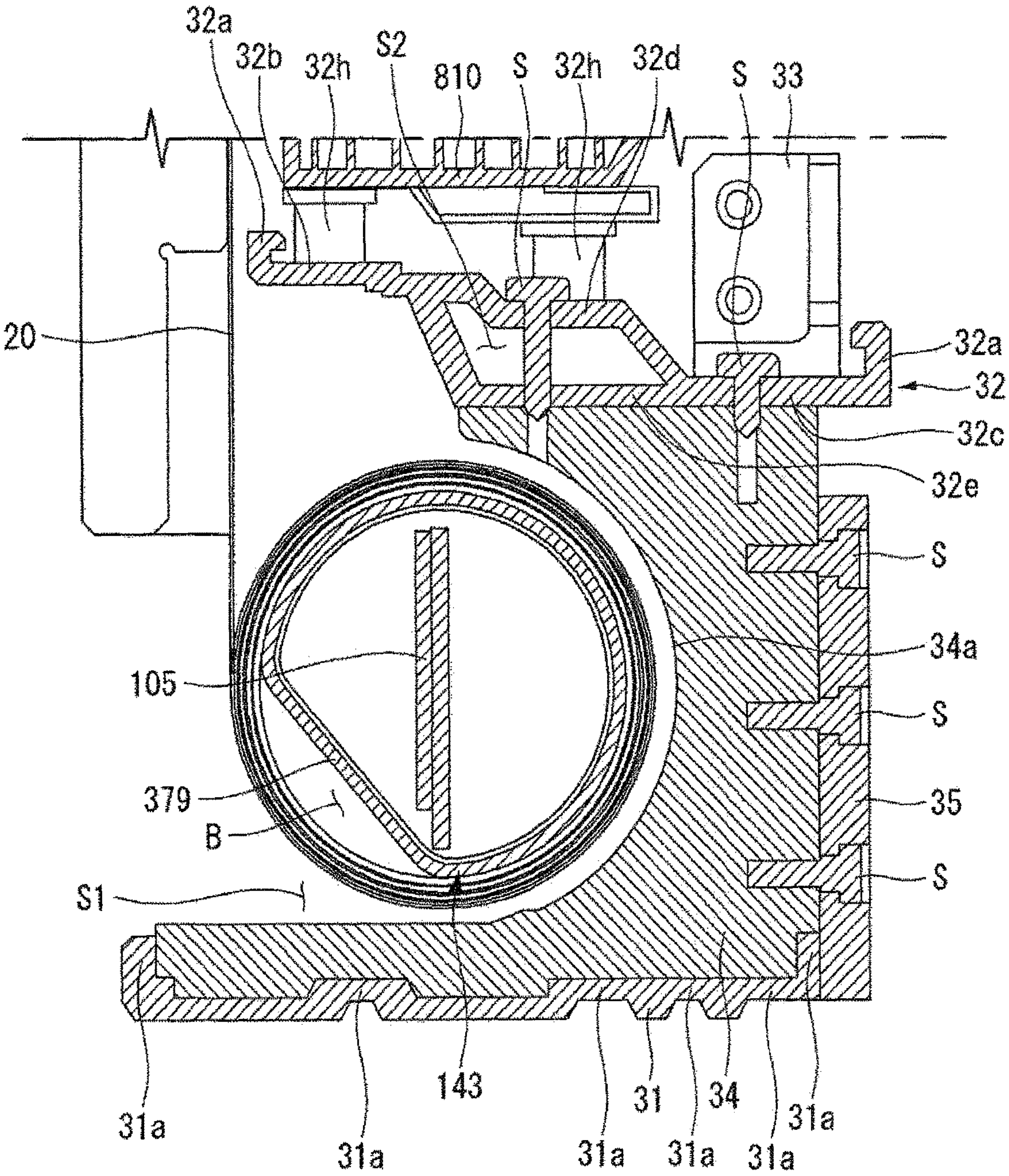

【FIG. 20】
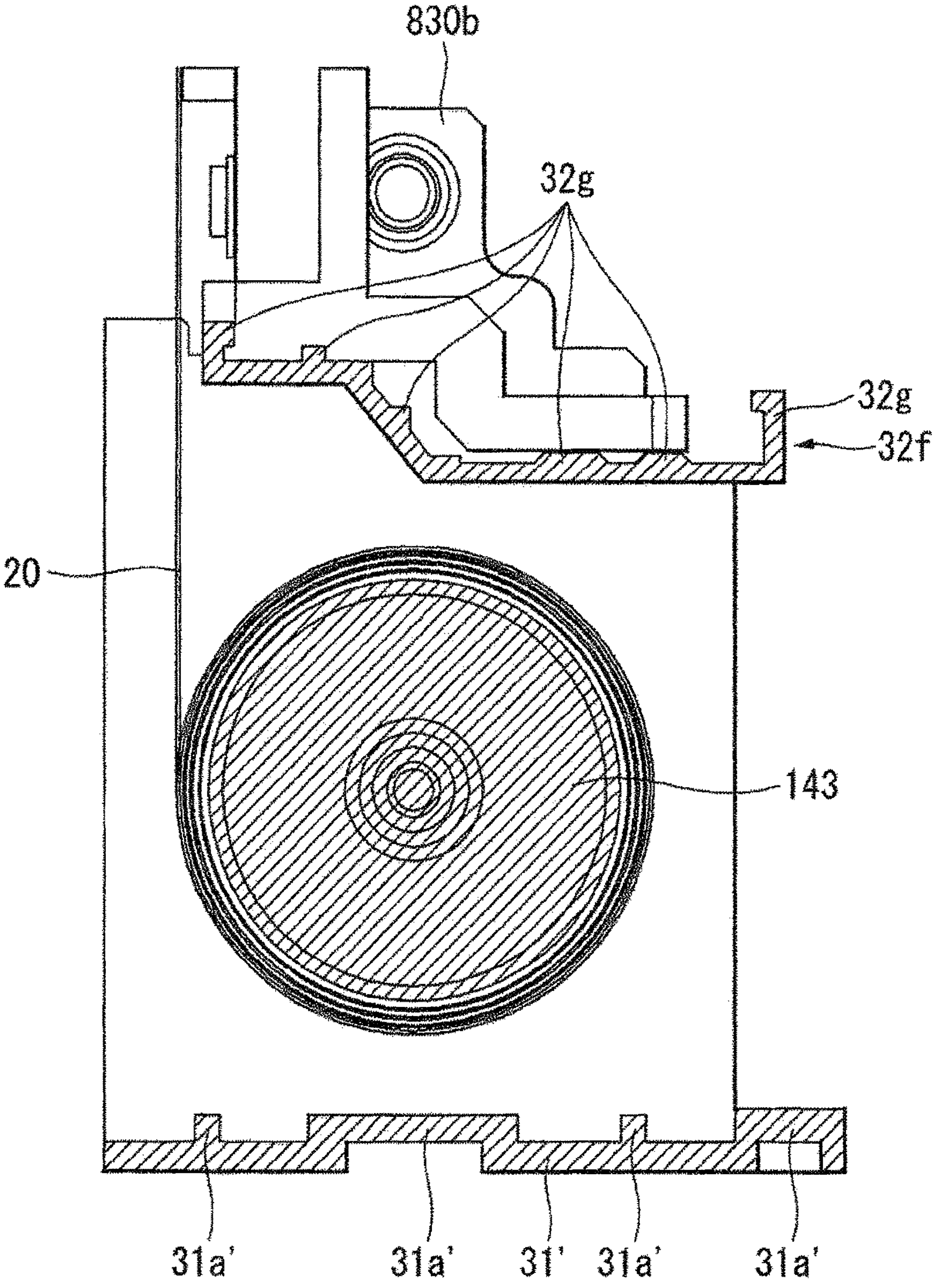

【FIG. 21】
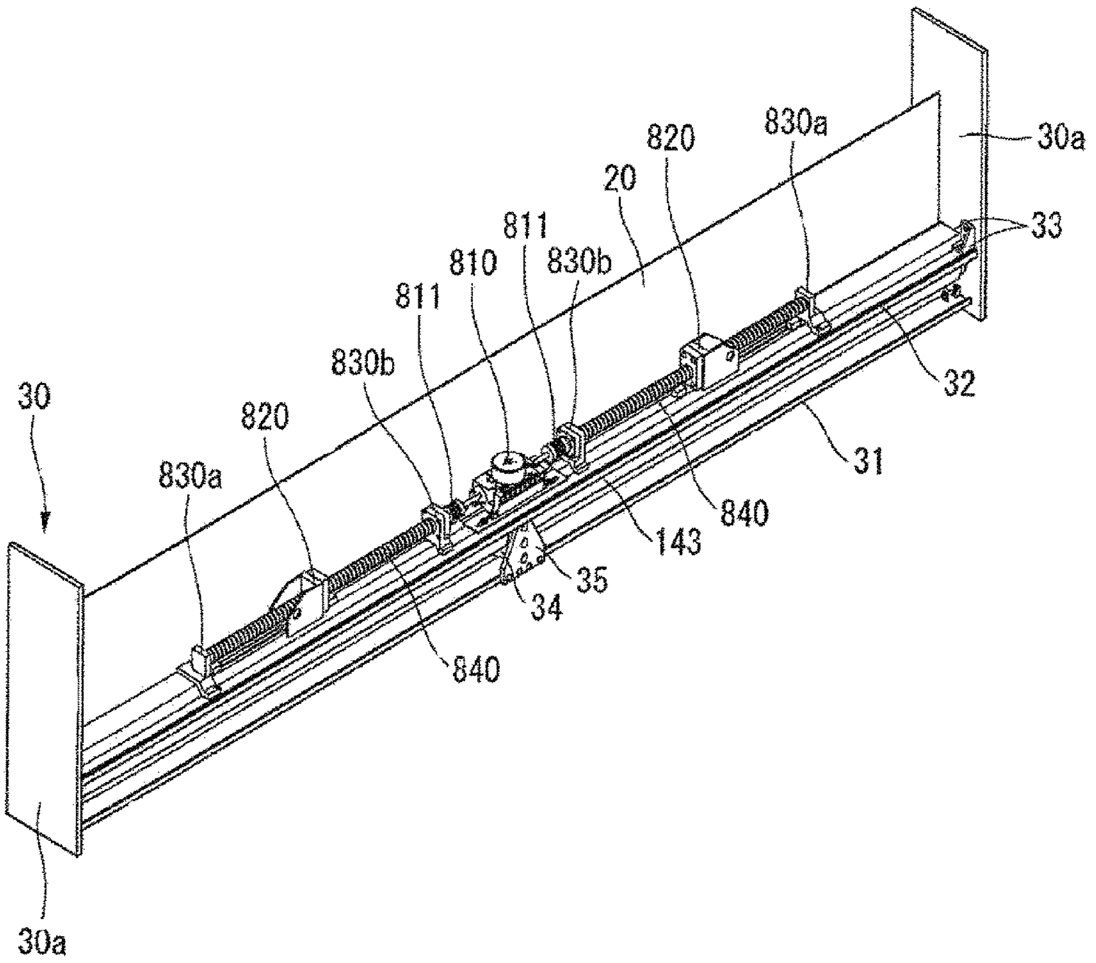

【FIG. 22】
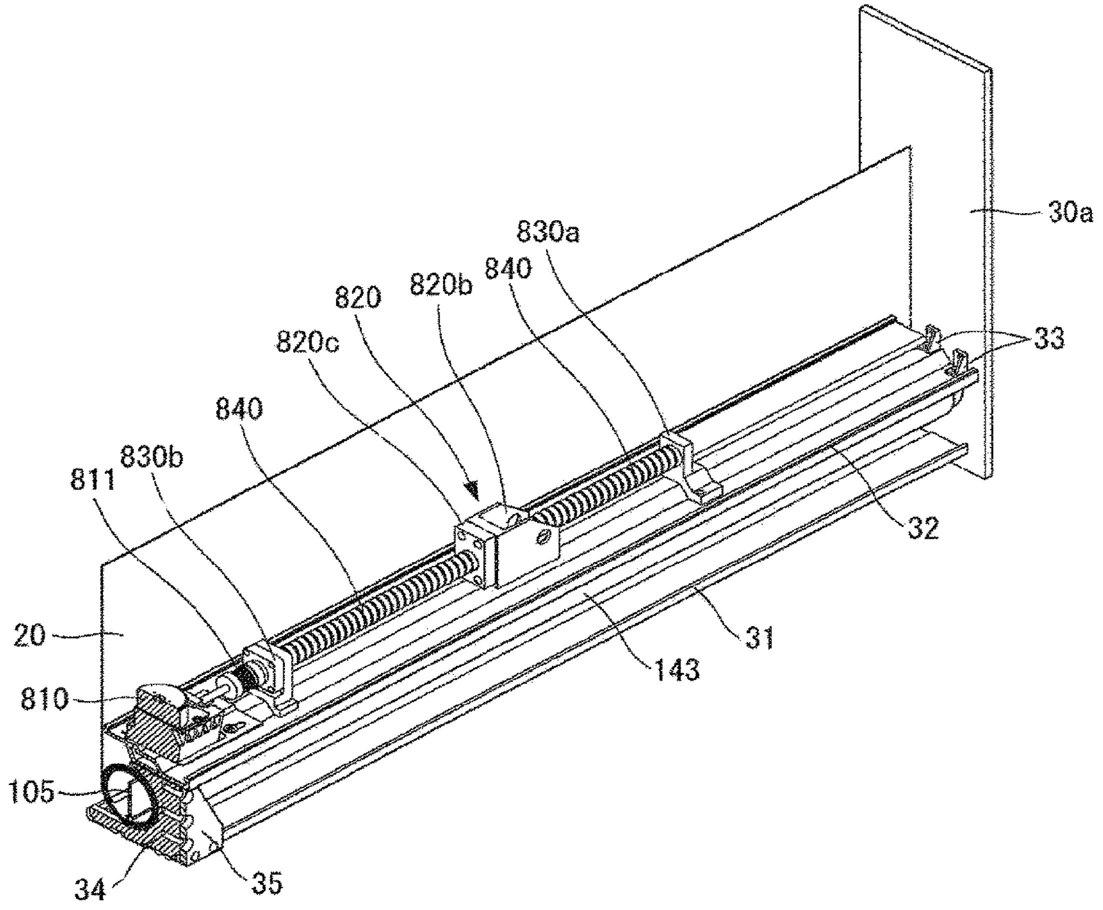

【FIG. 23】
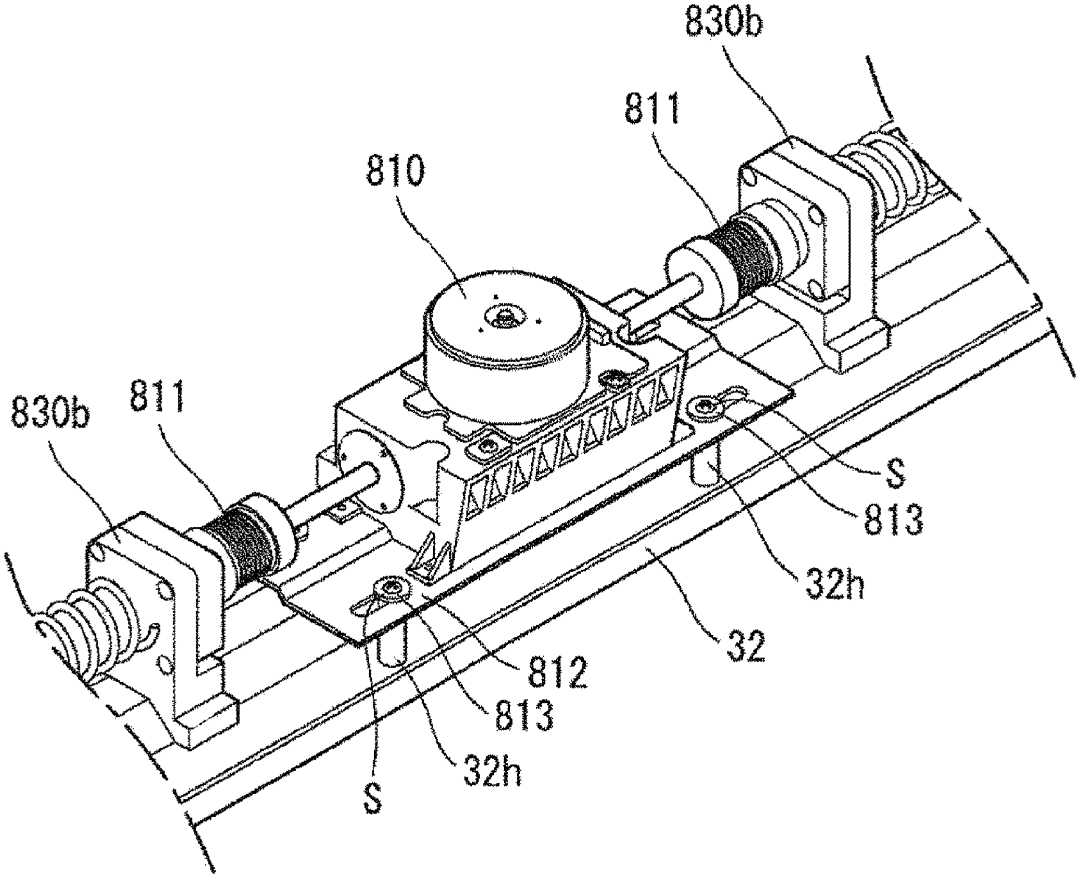

【FIG. 24】
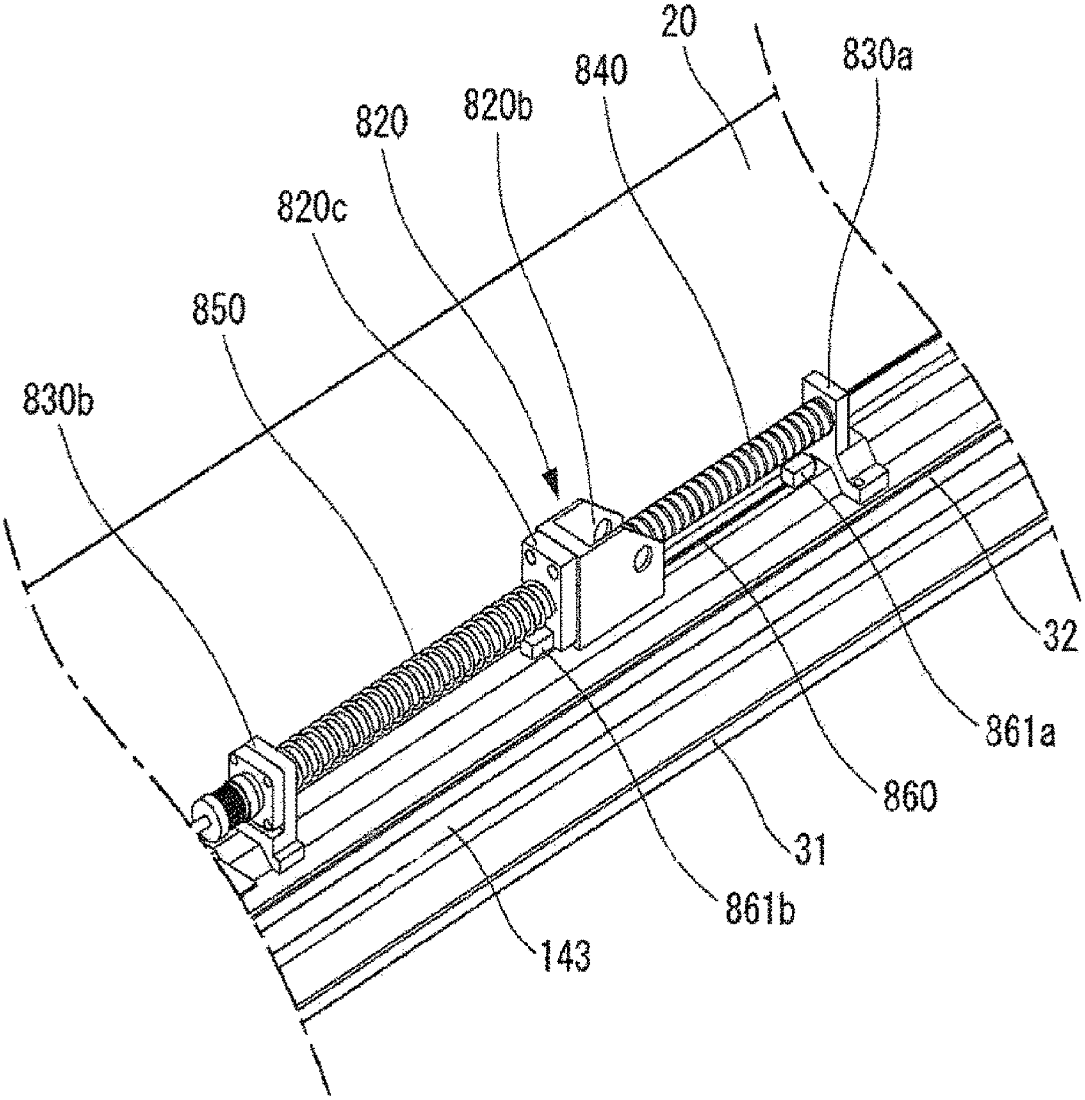

【FIG. 25】
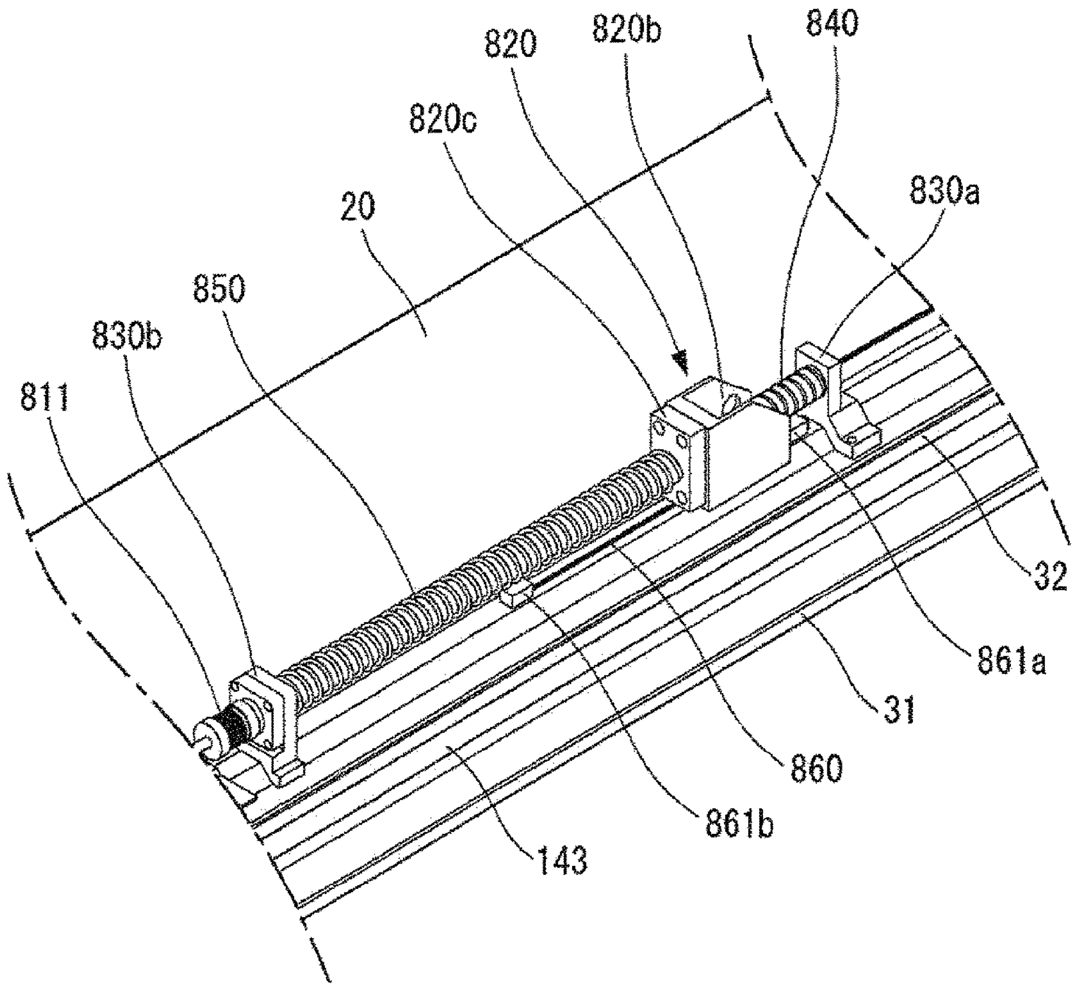

【FIG. 26】
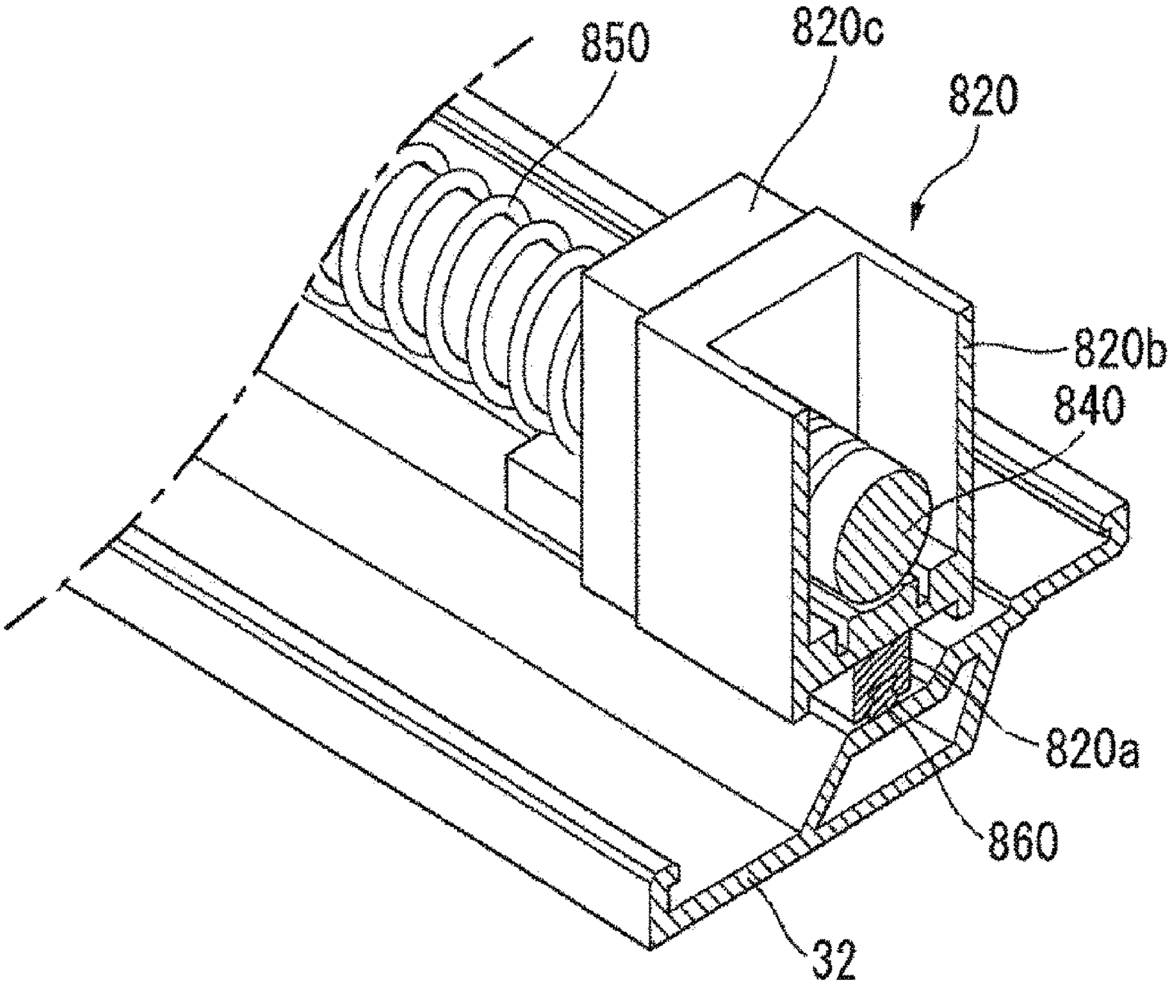

【FIG. 27】
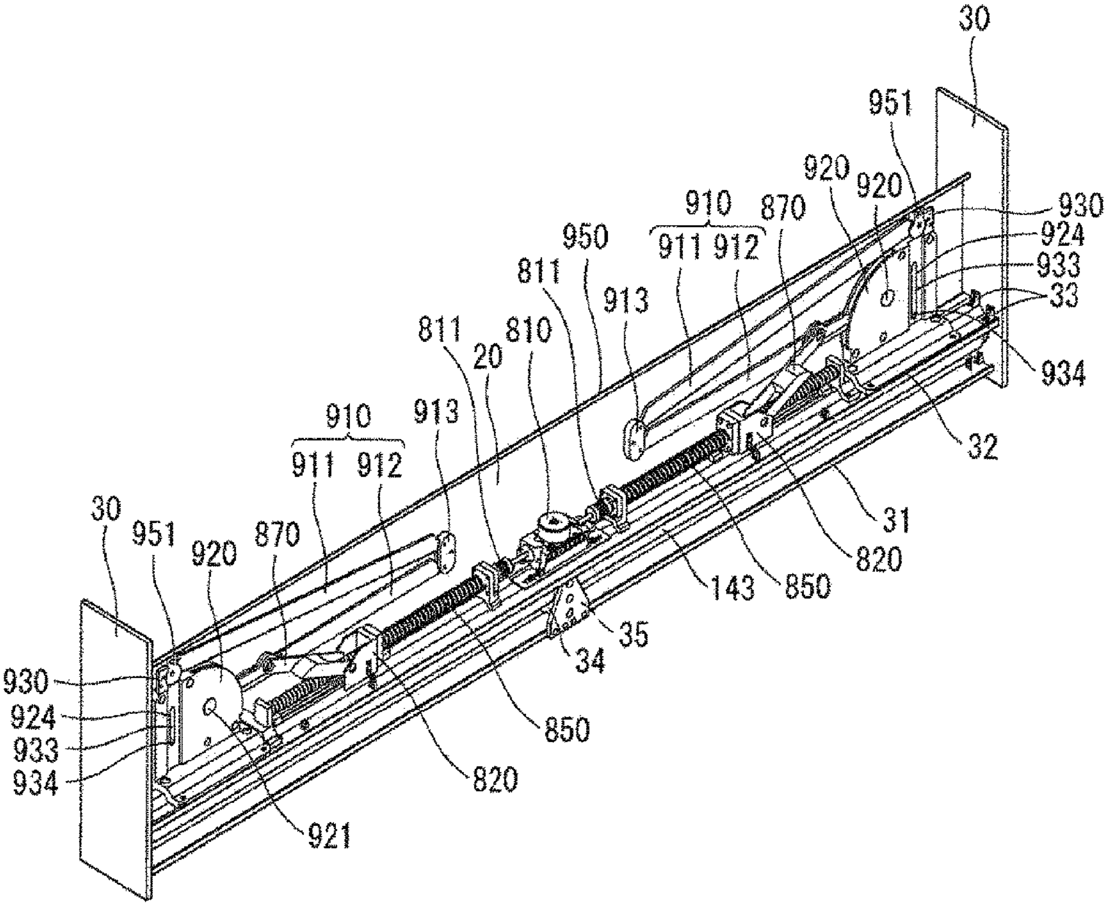

【FIG. 28】
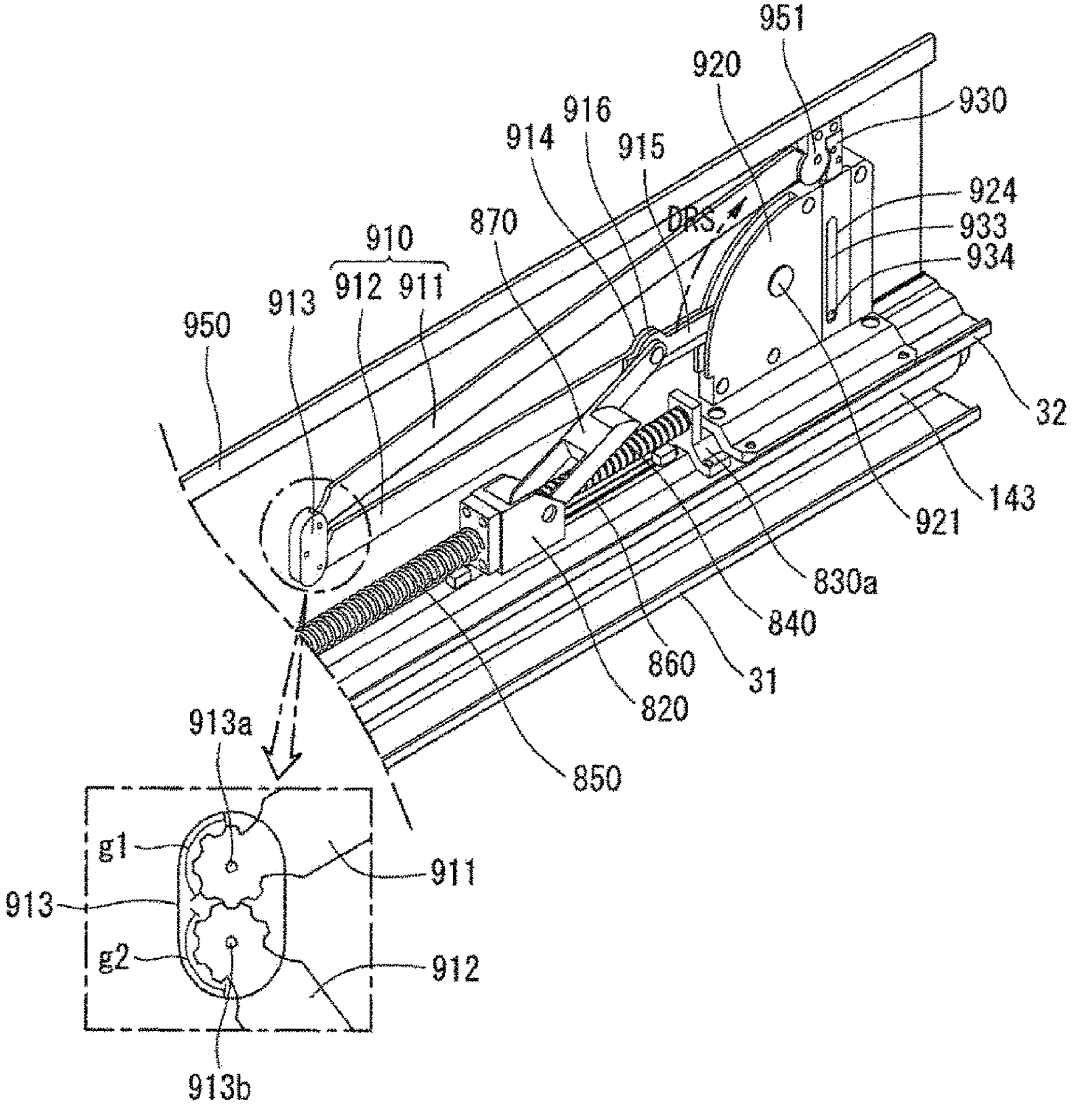

【FIG. 29】
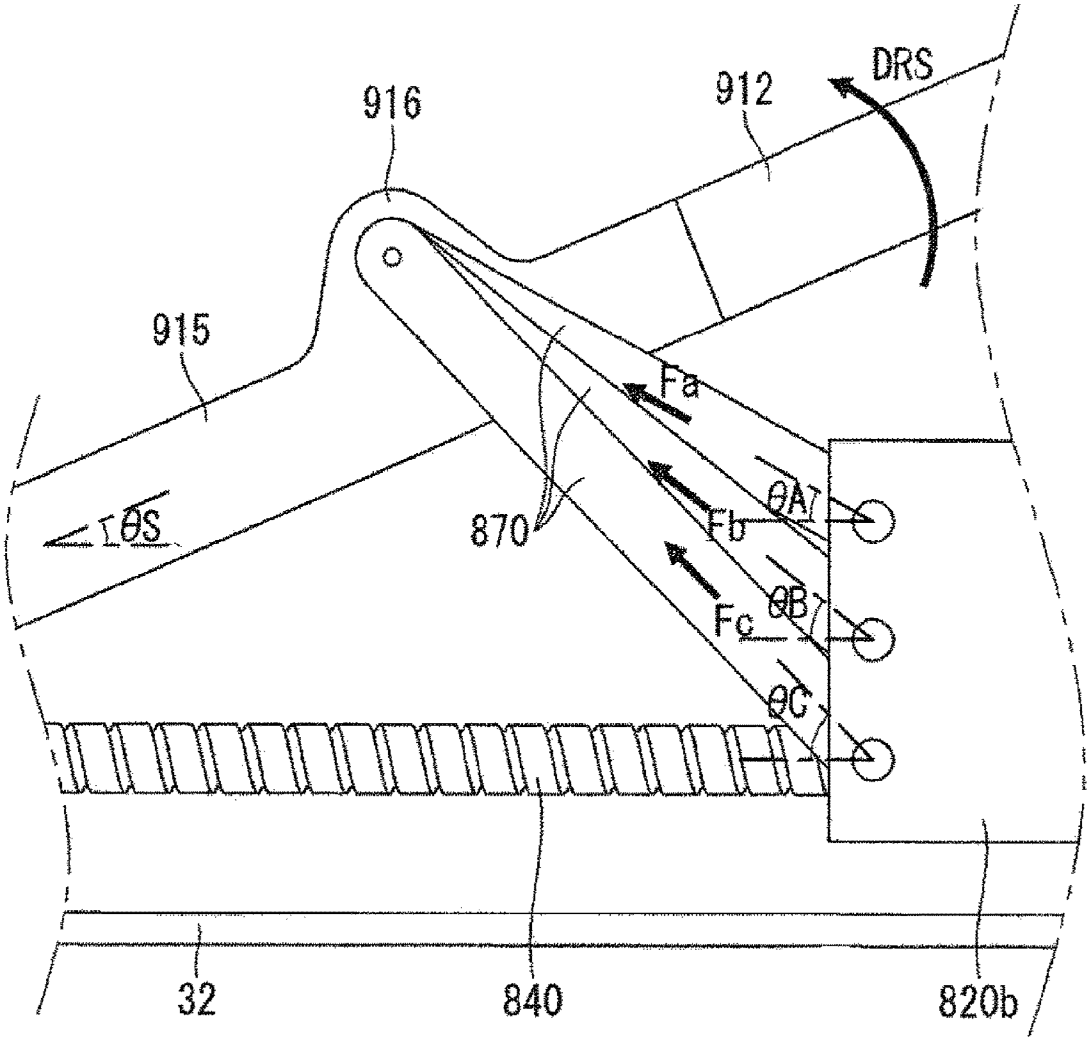

【FIG. 30】
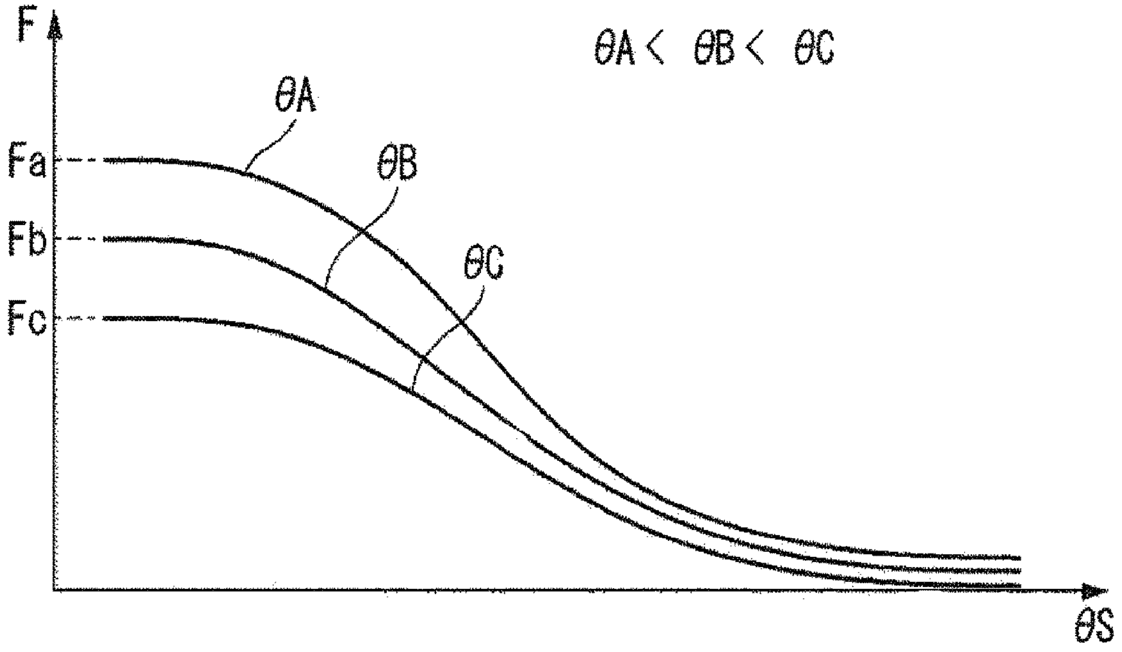

【FIG. 31】
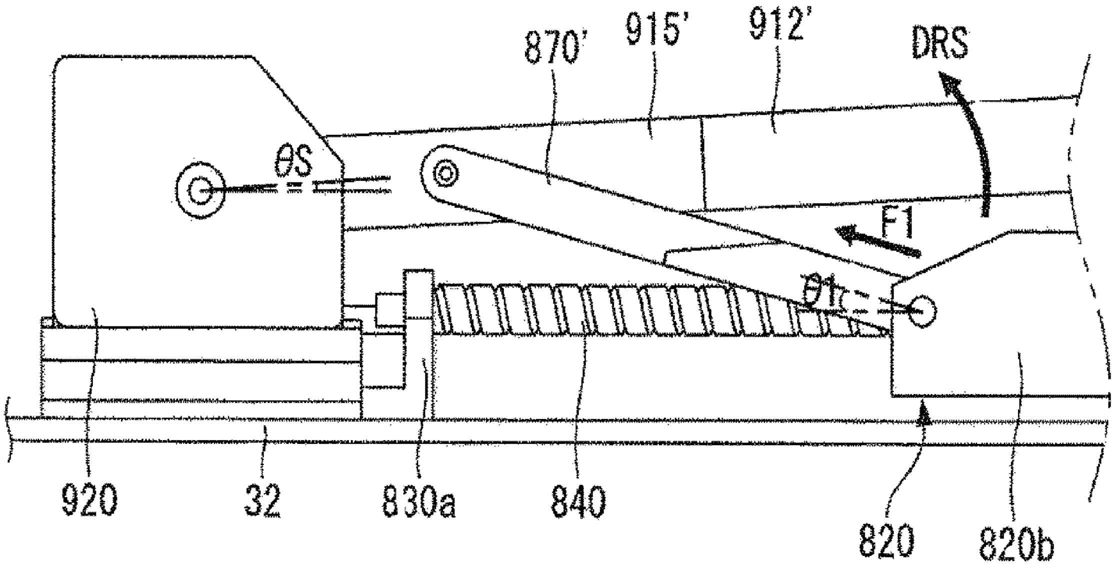

【FIG. 32】
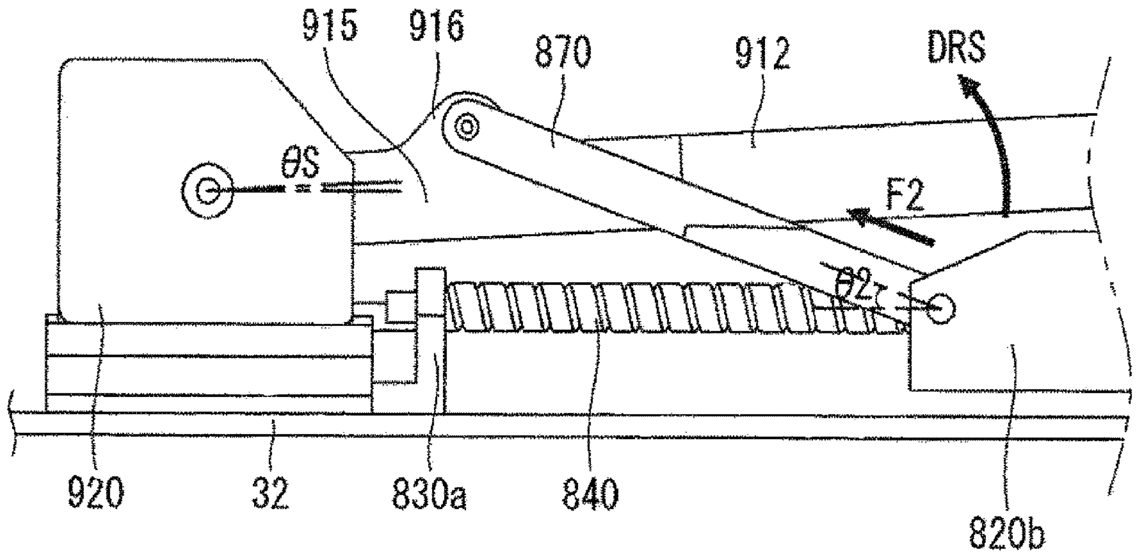

【FIG. 33】
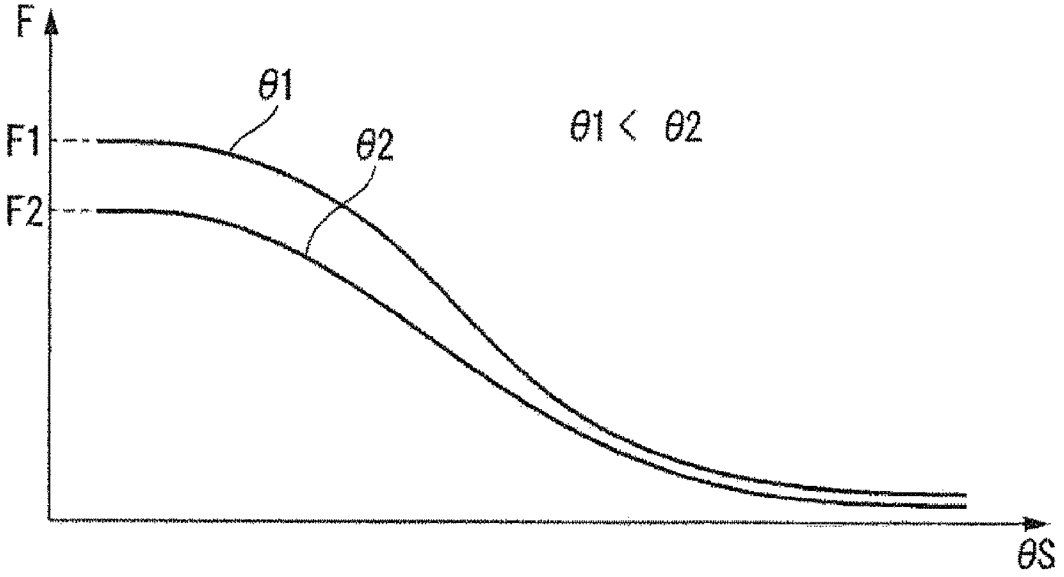

【FIG. 34】
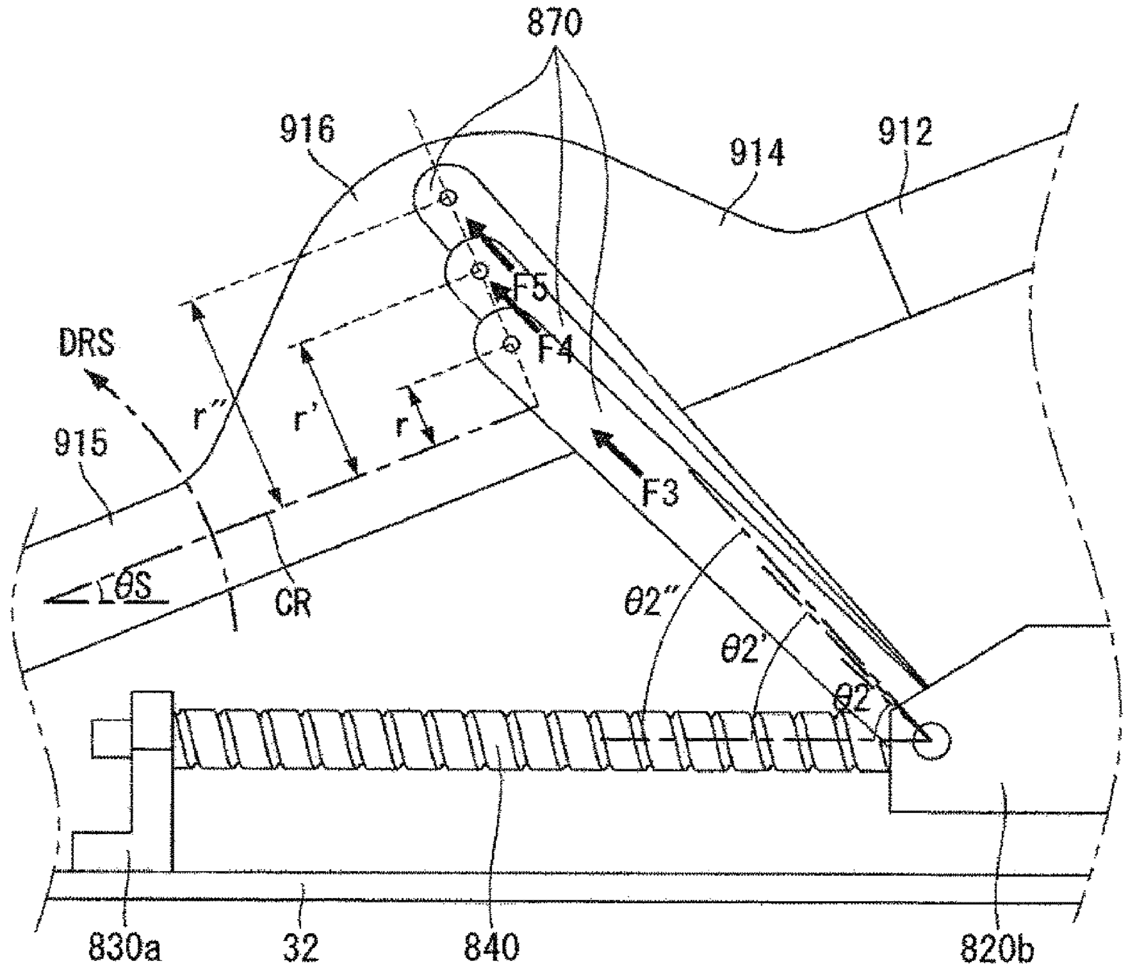

【FIG. 35】
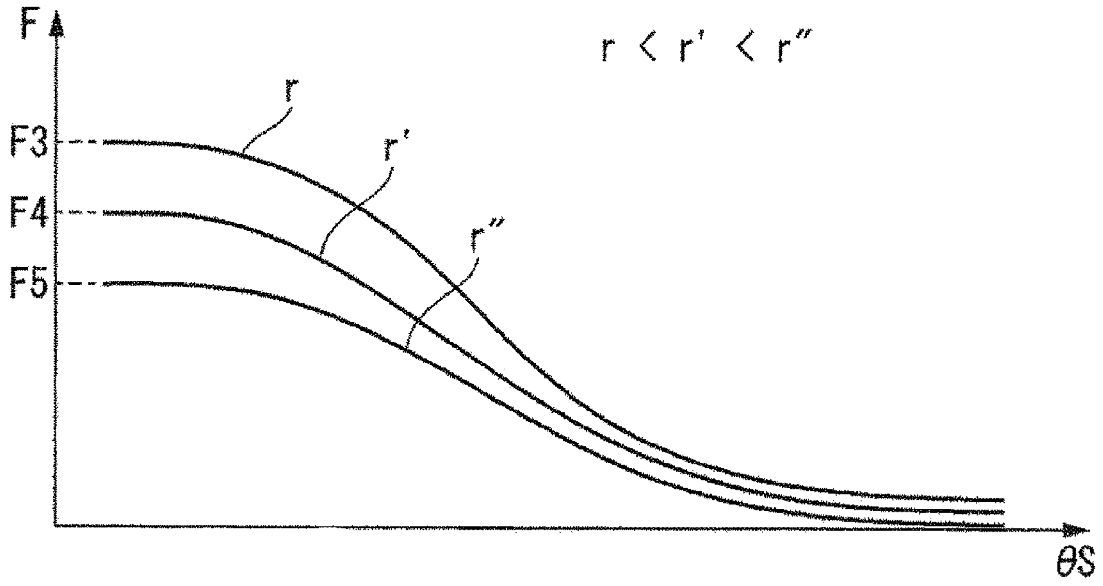

【FIG. 36】
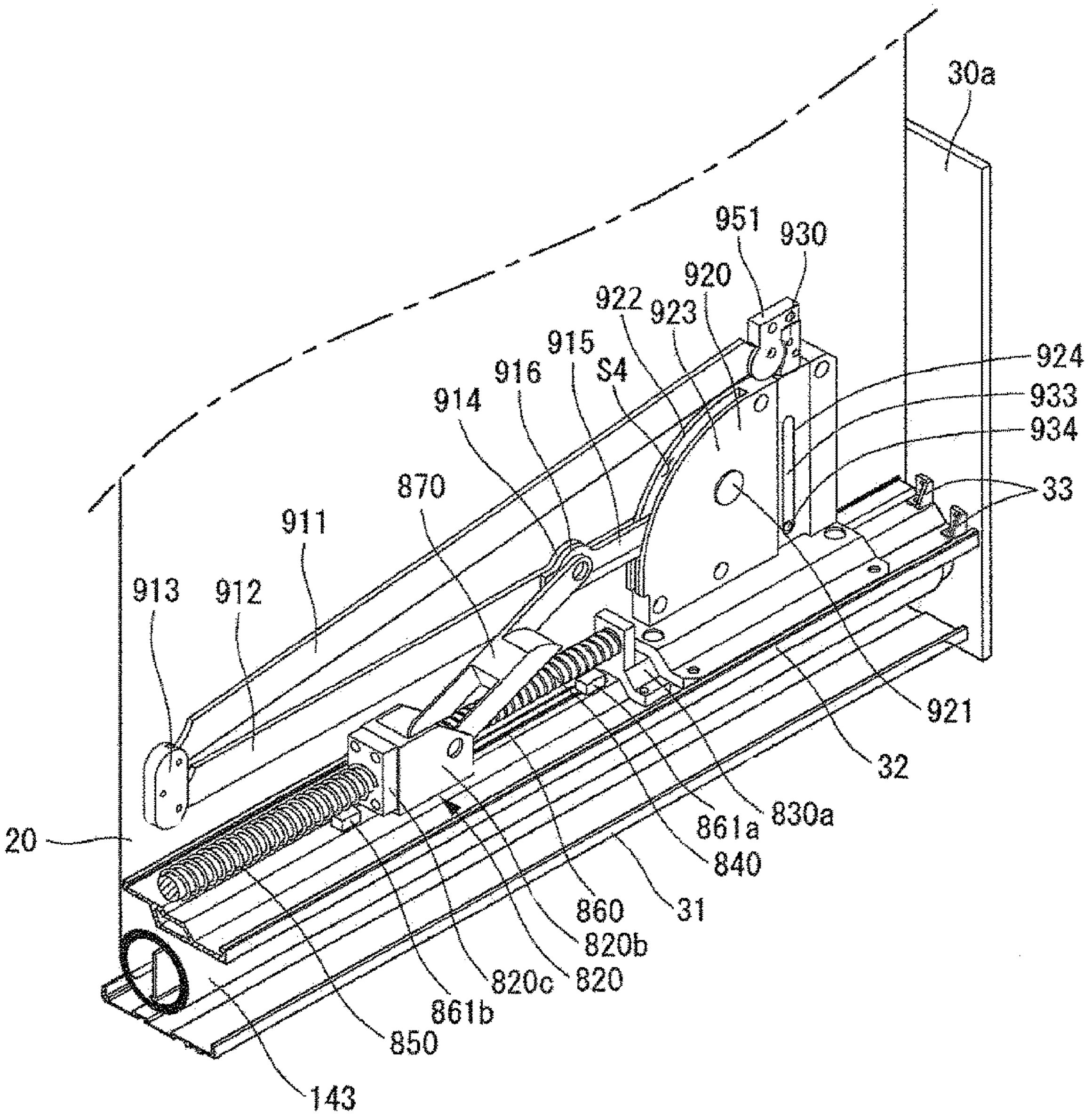

【FIG. 37】
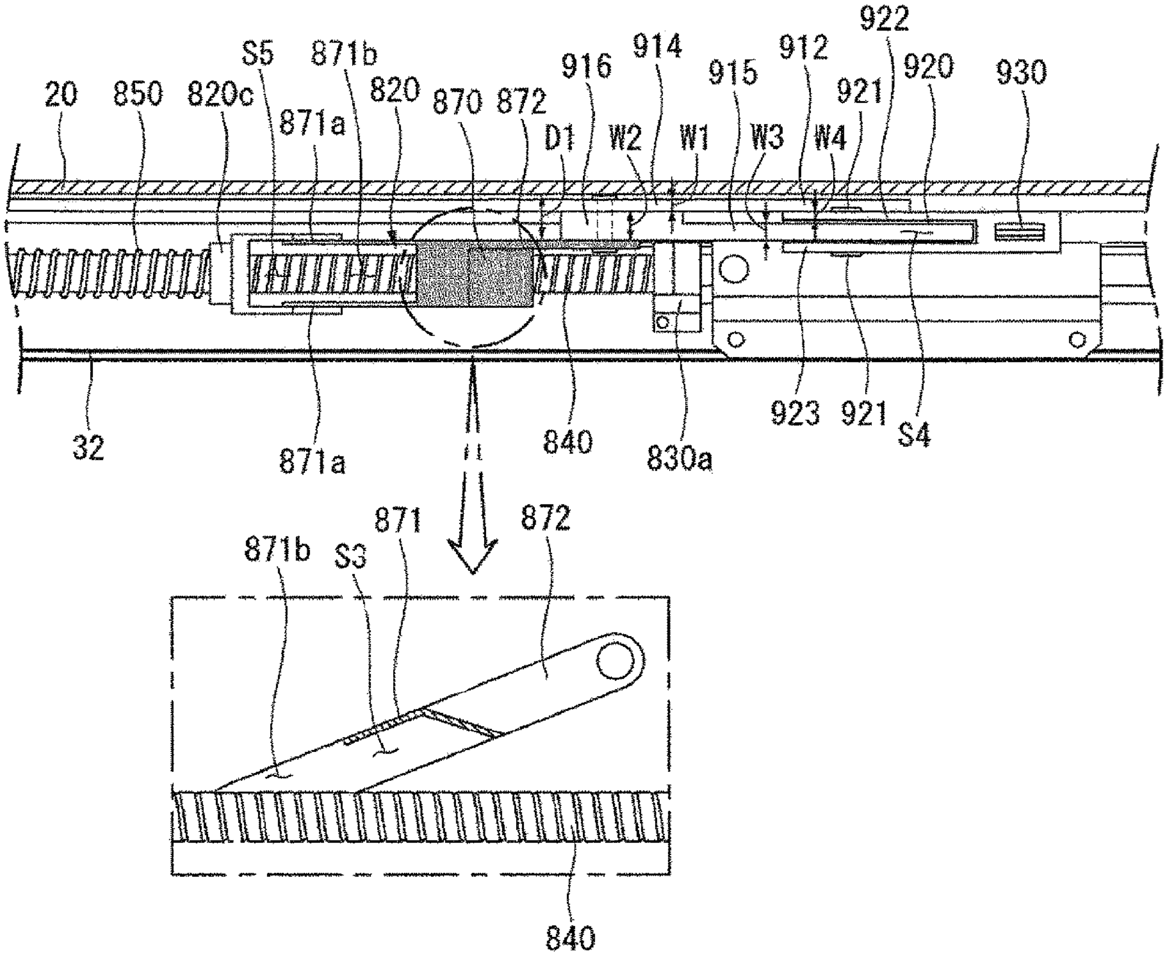

【FIG. 38】
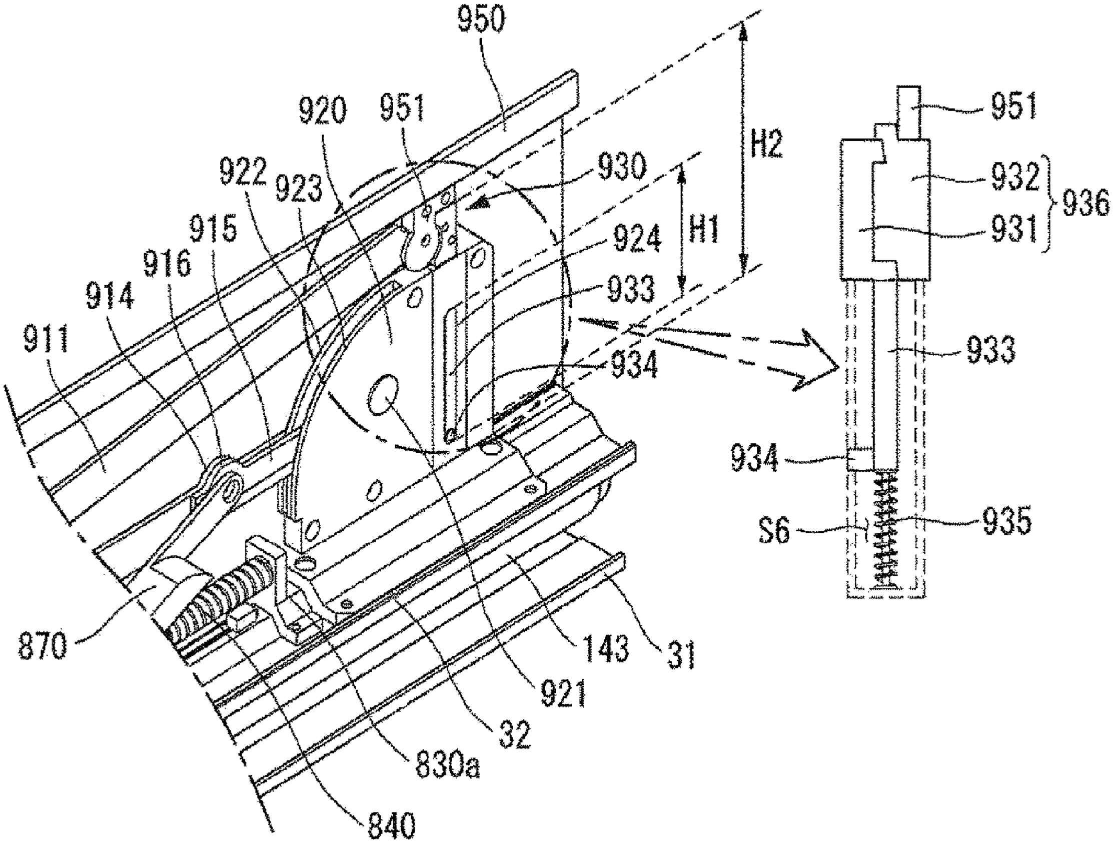

【FIG. 39】
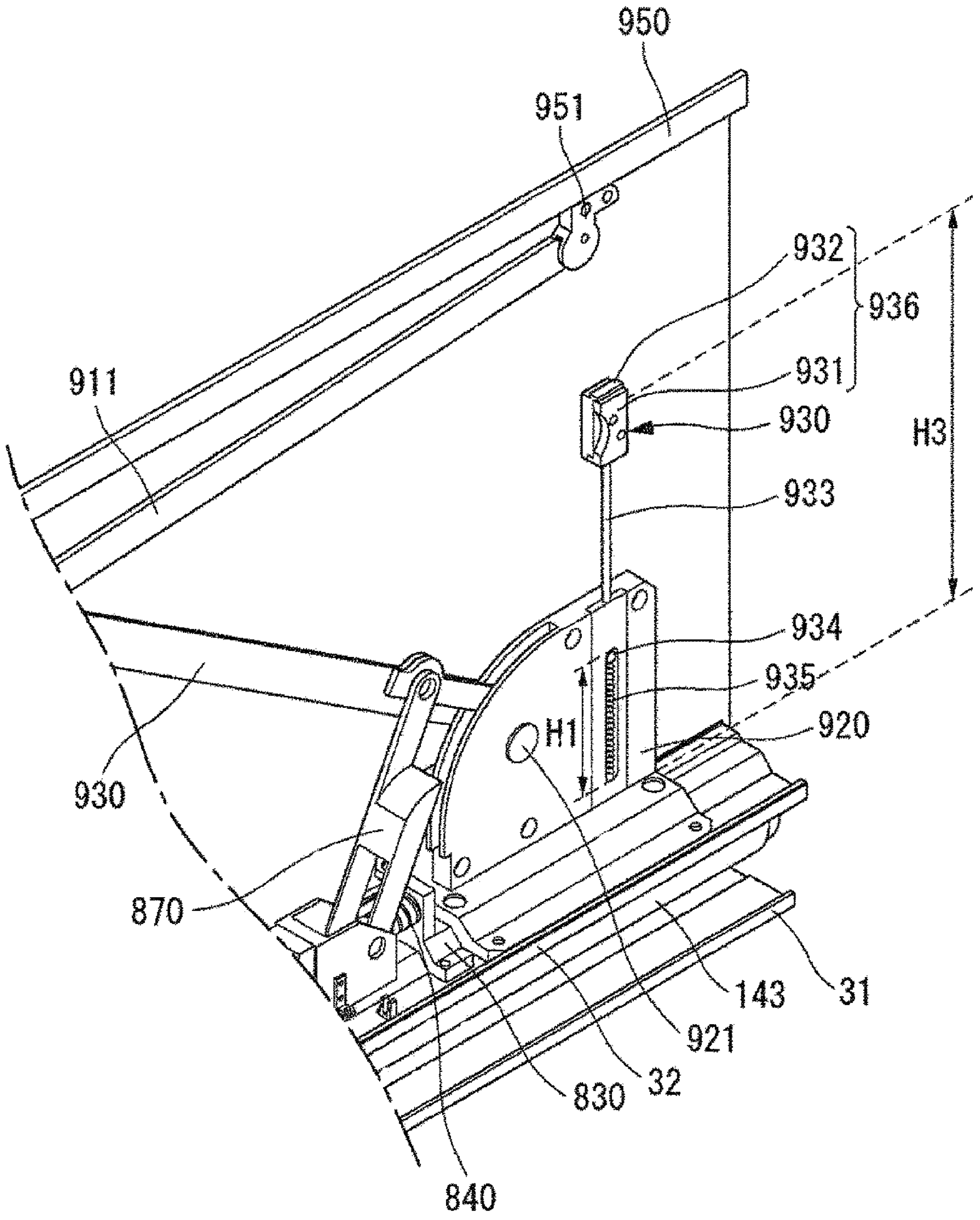

【FIG. 40】
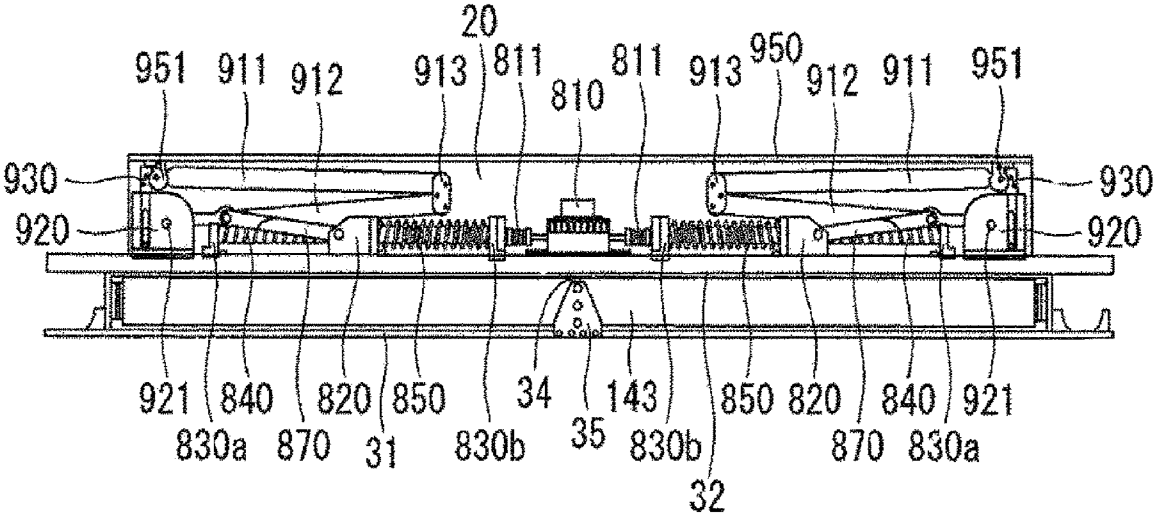

【FIG. 41】
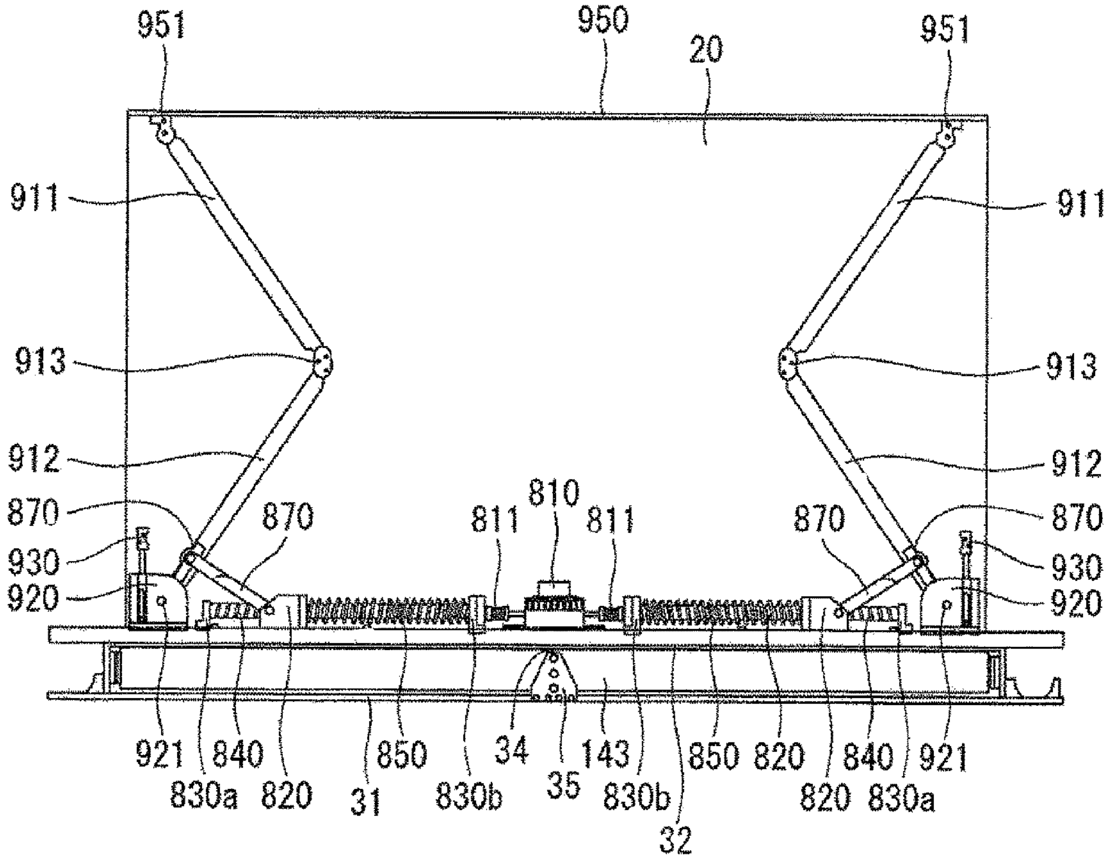

【FIG. 42】
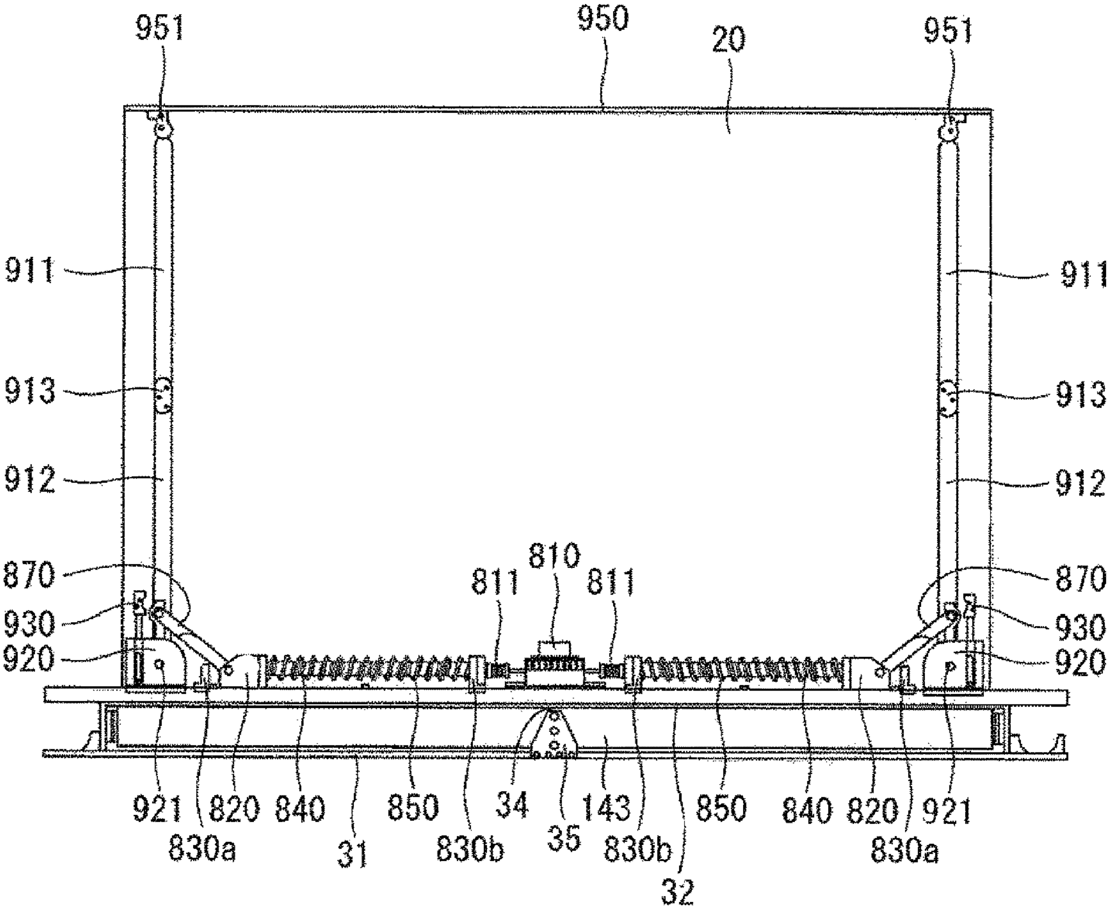

【FIG. 43】
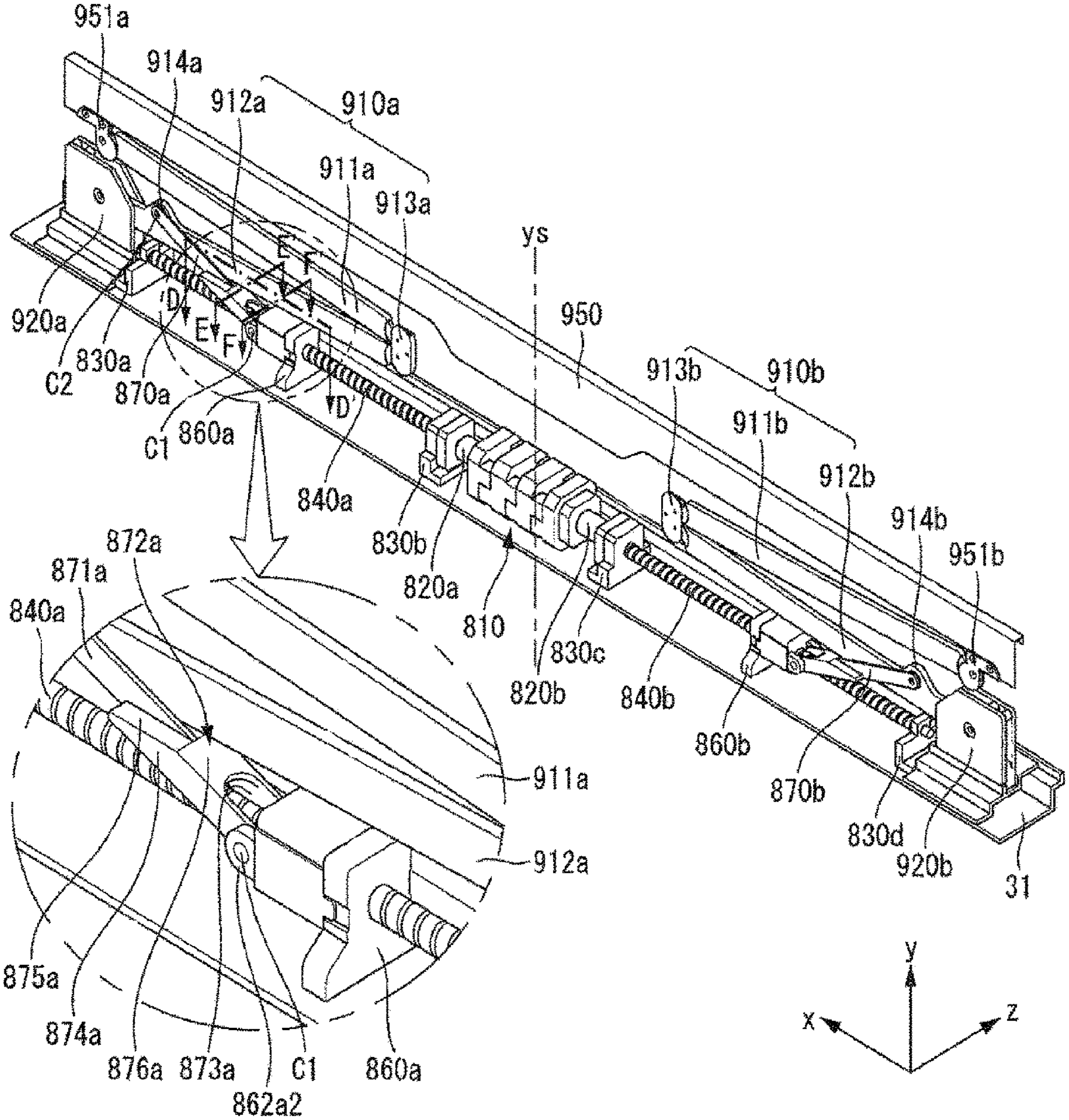

【FIG. 44】
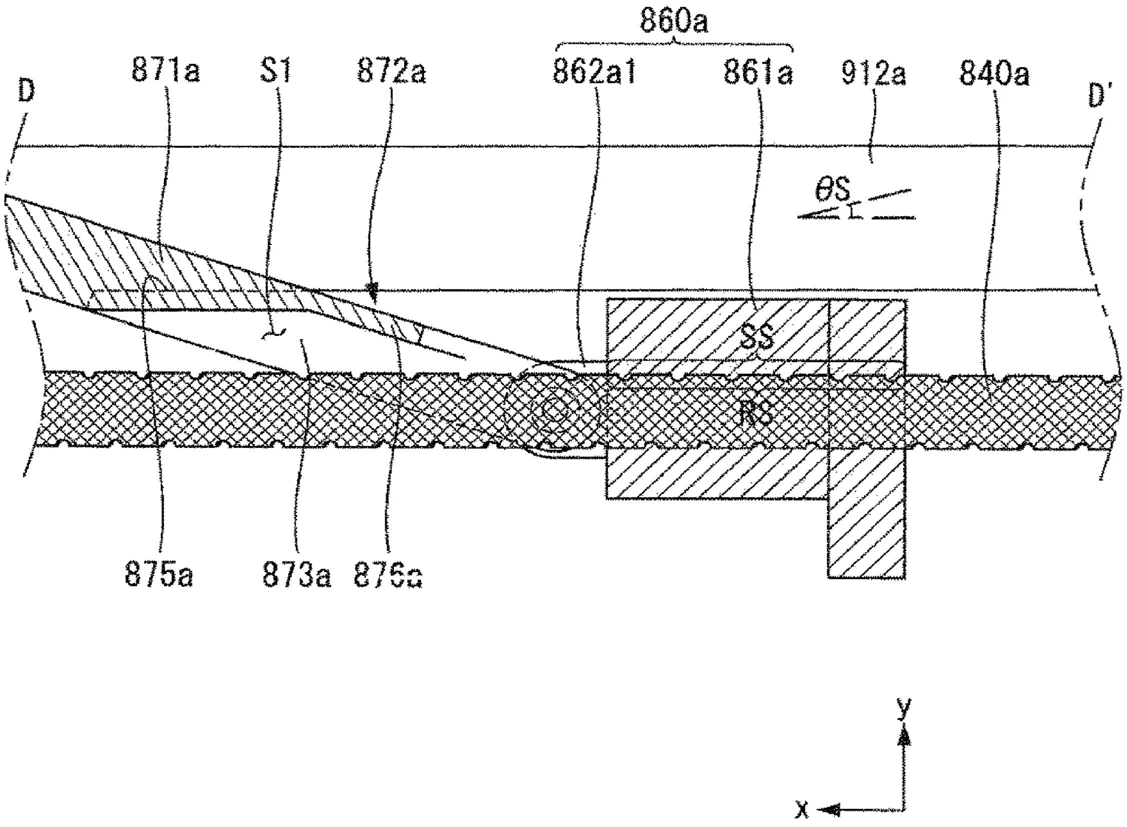

【FIG. 45】
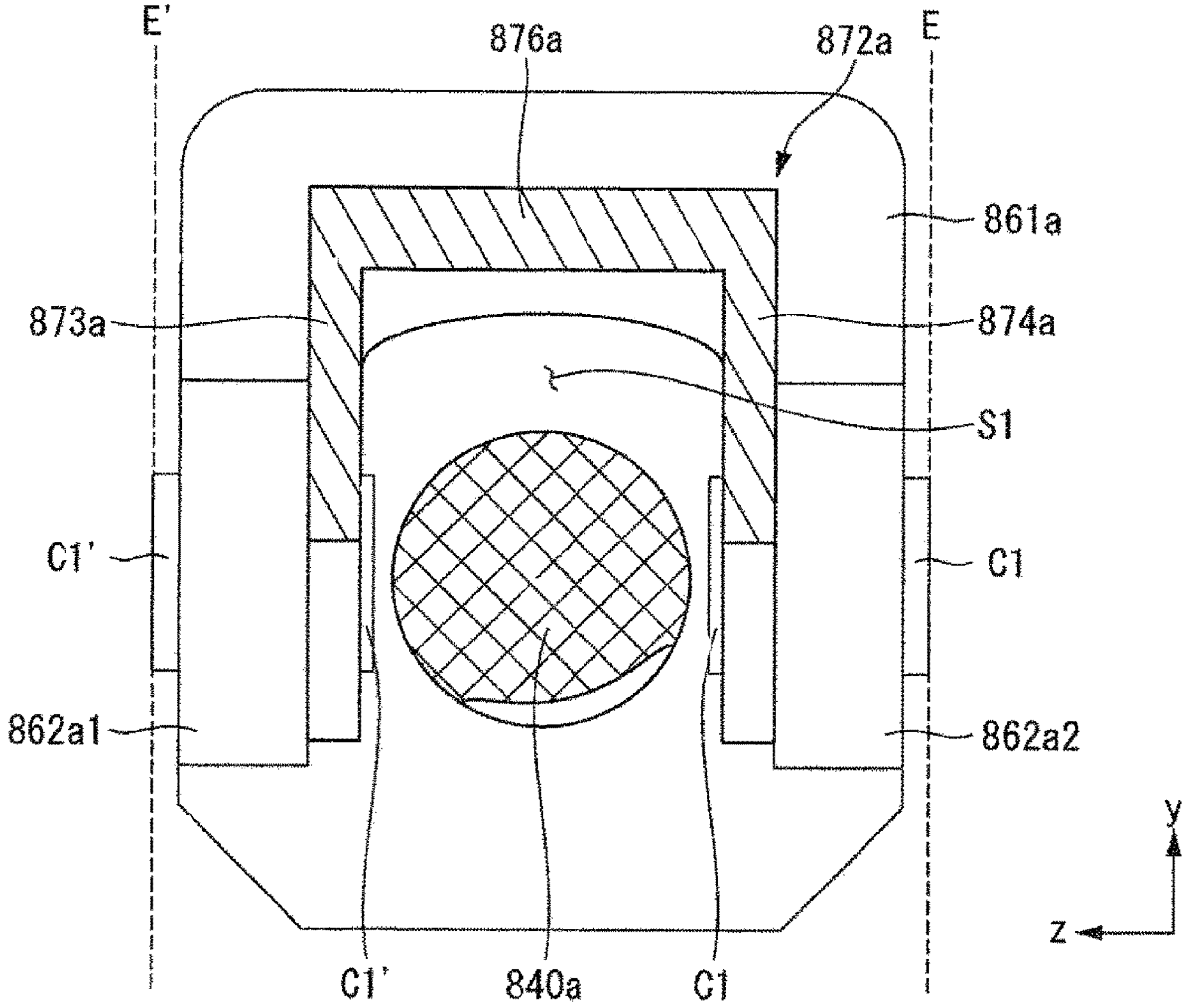

【FIG. 46】
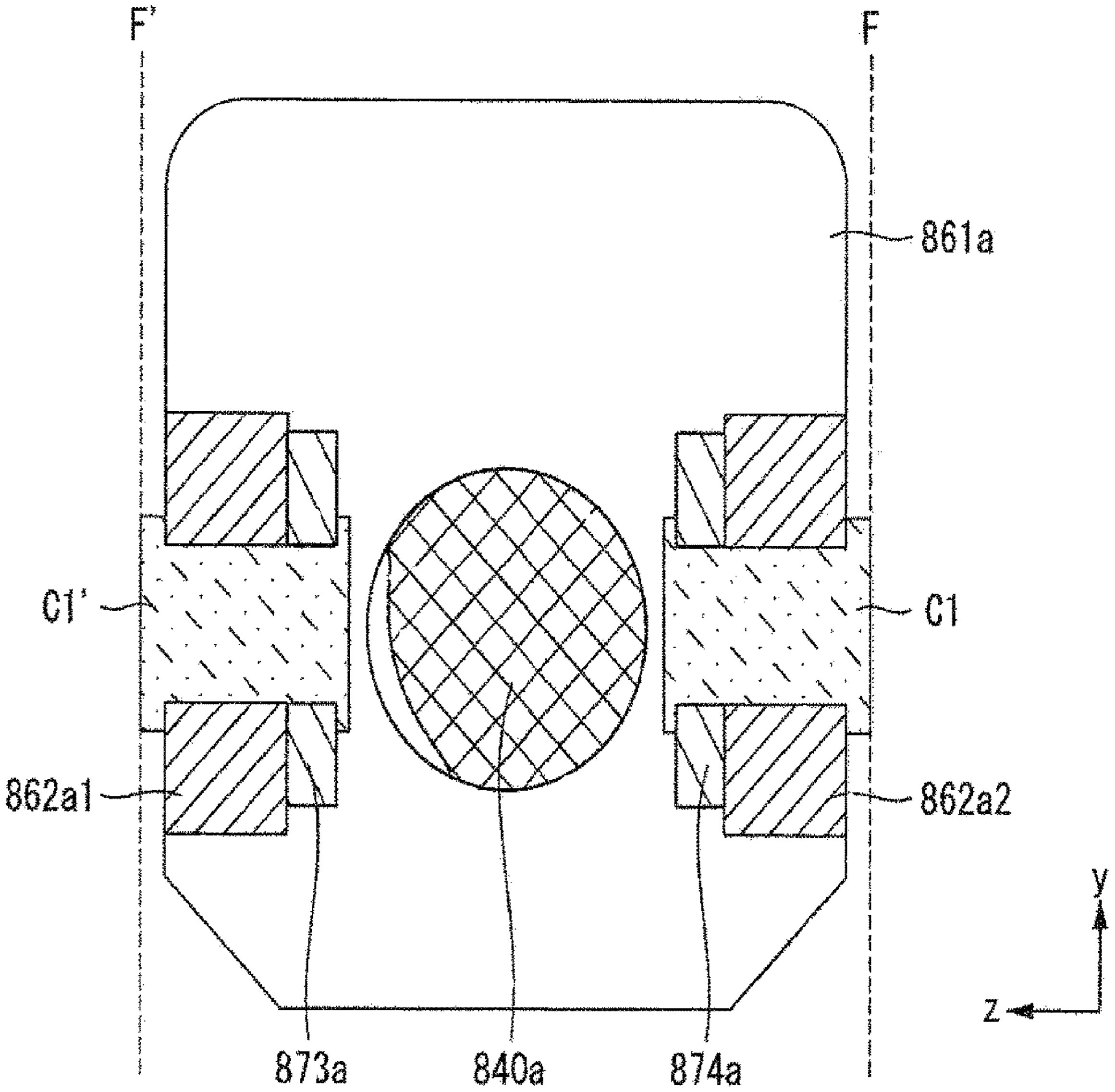

【FIG. 47】
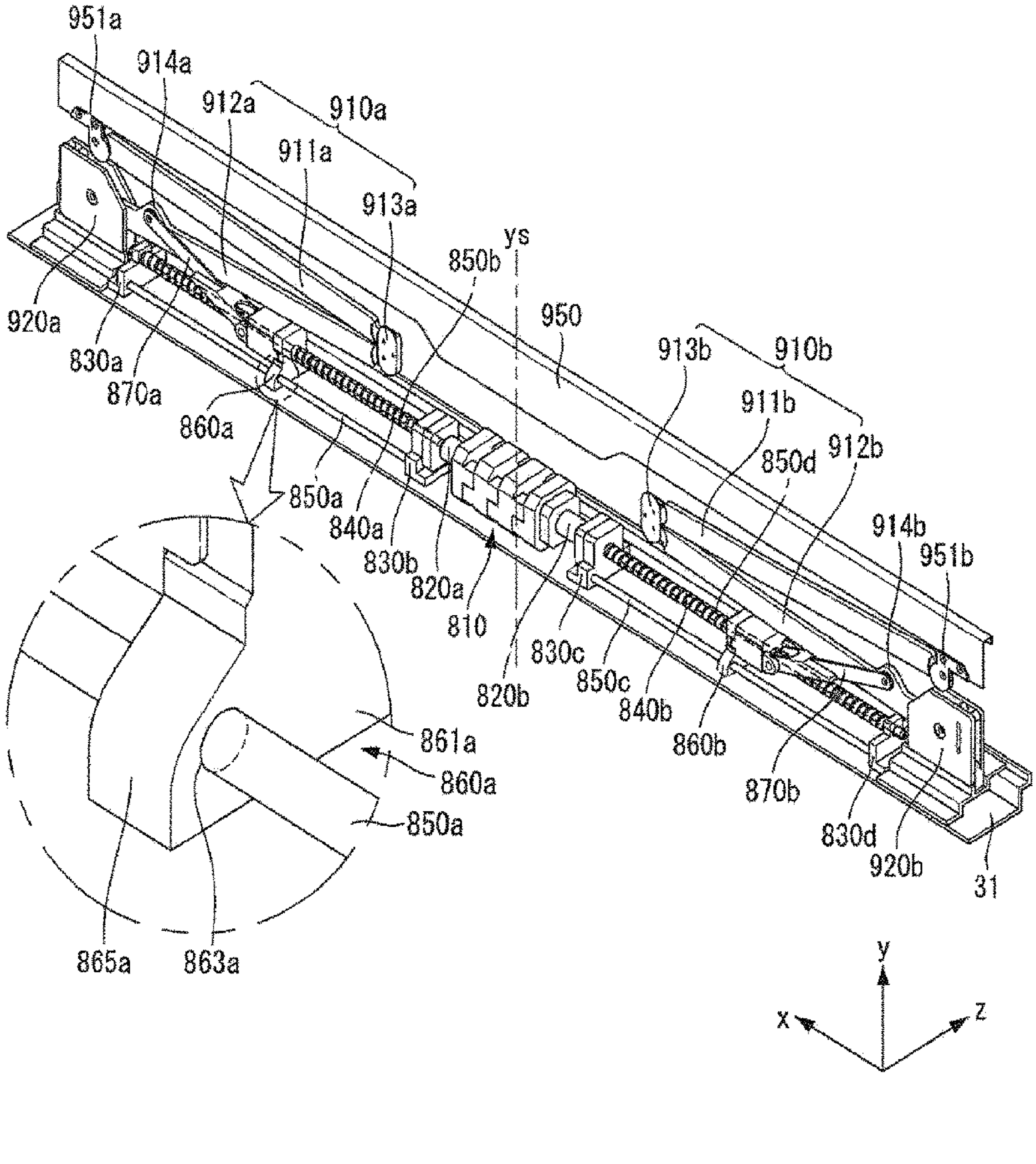

【FIG. 48】
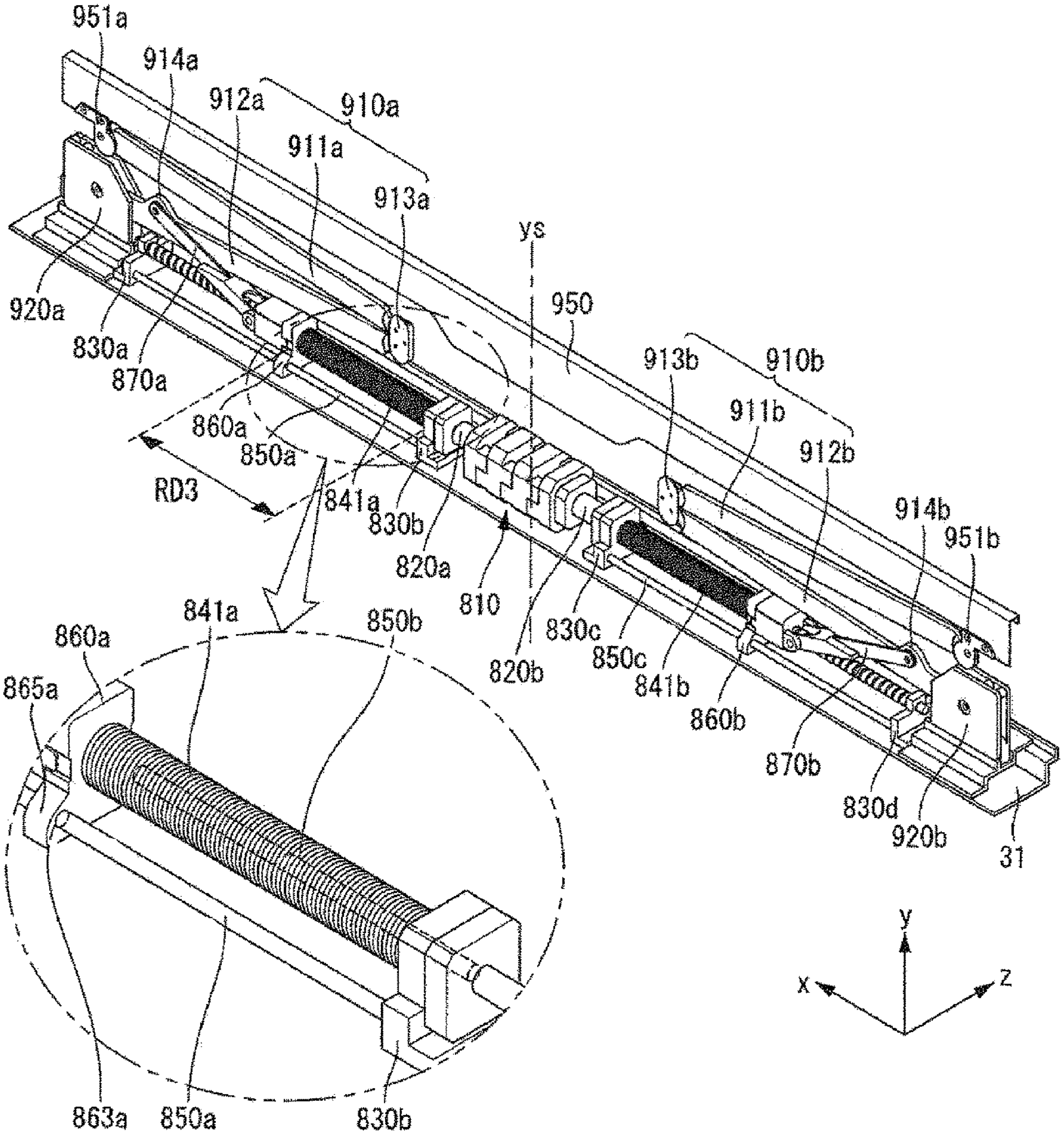

【FIG. 49】
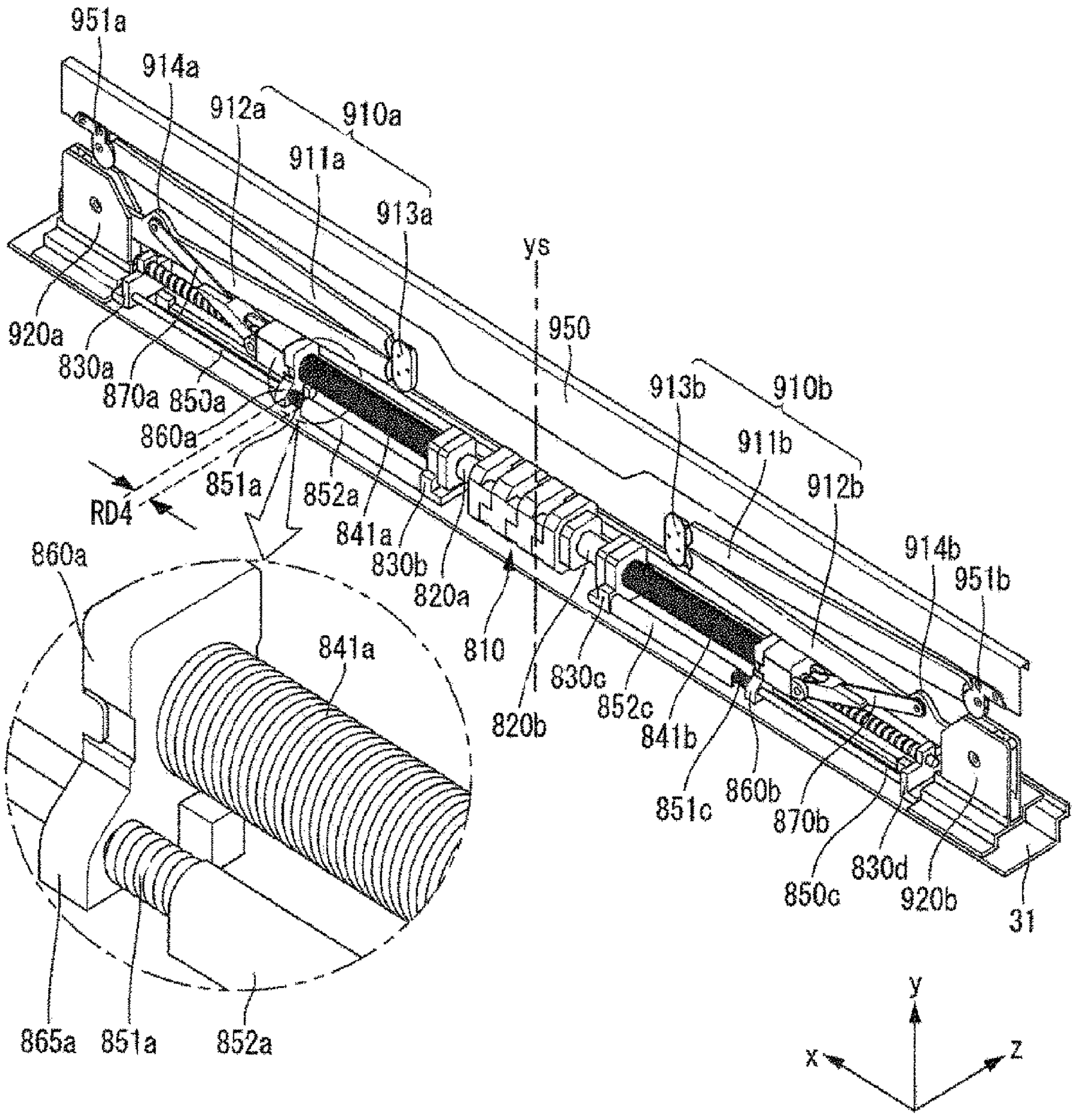

【FIG. 50】
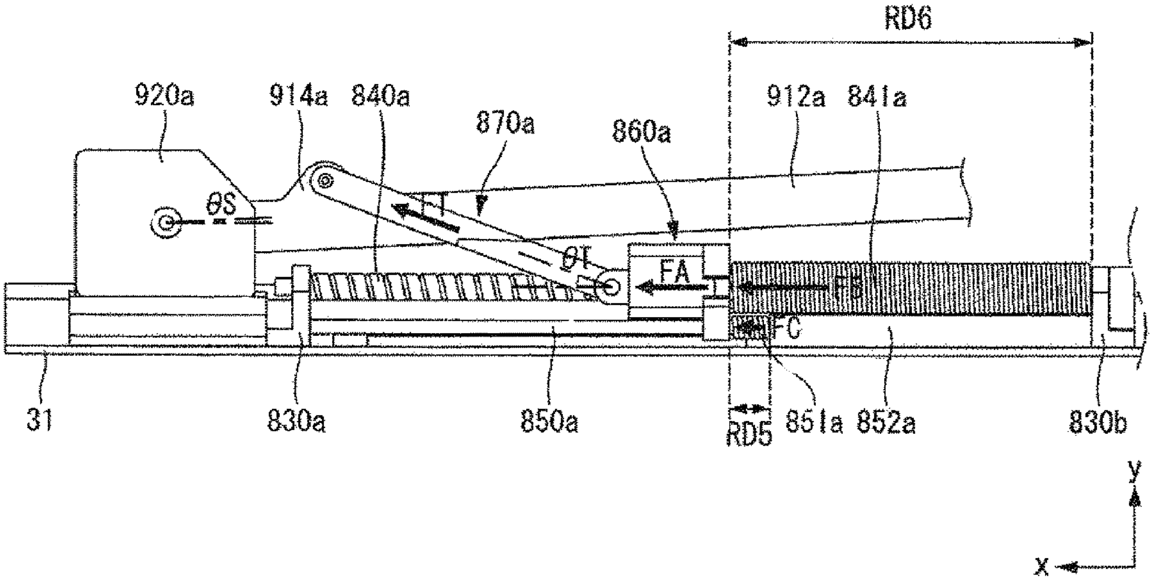

【FIG. 51】
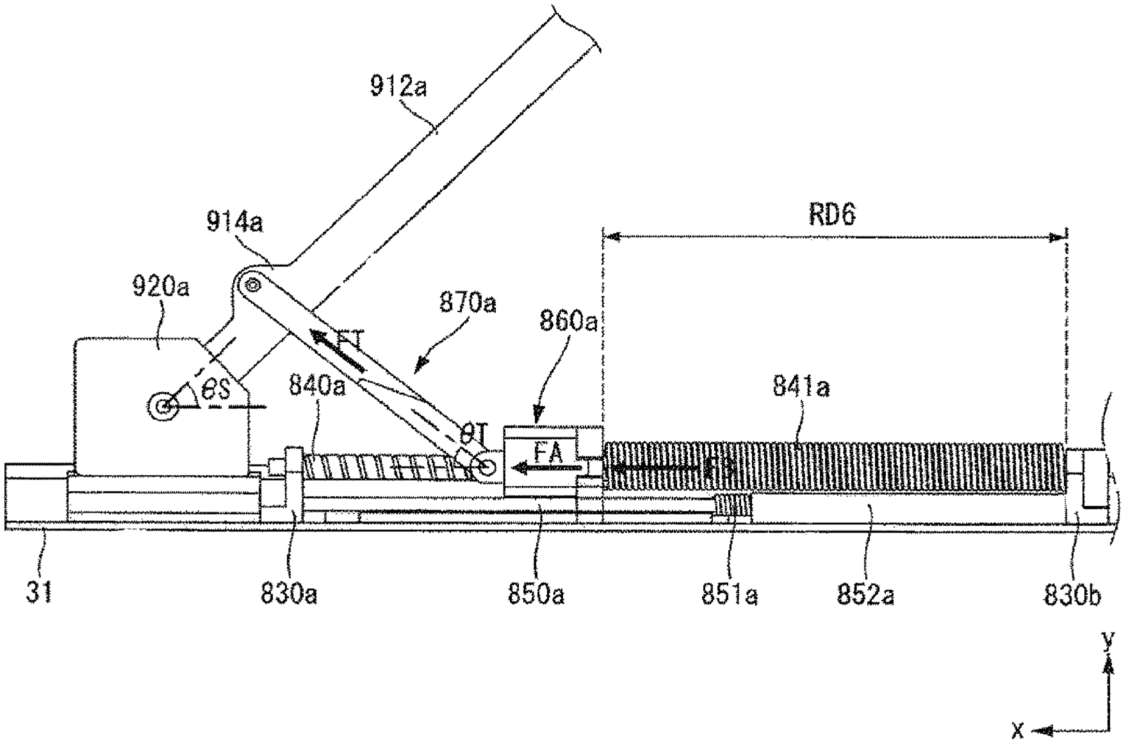

【FIG. 52】
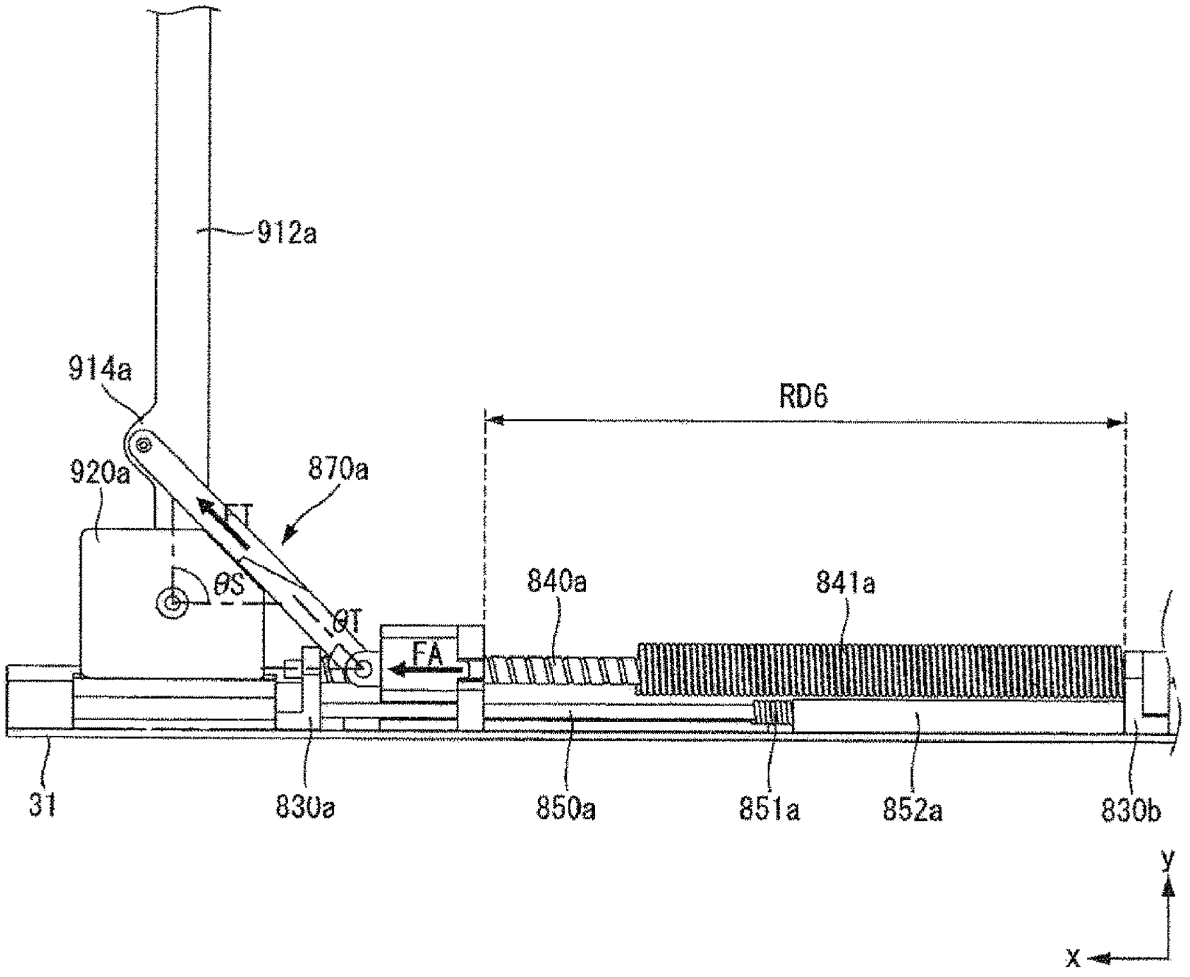

【FIG. 53】
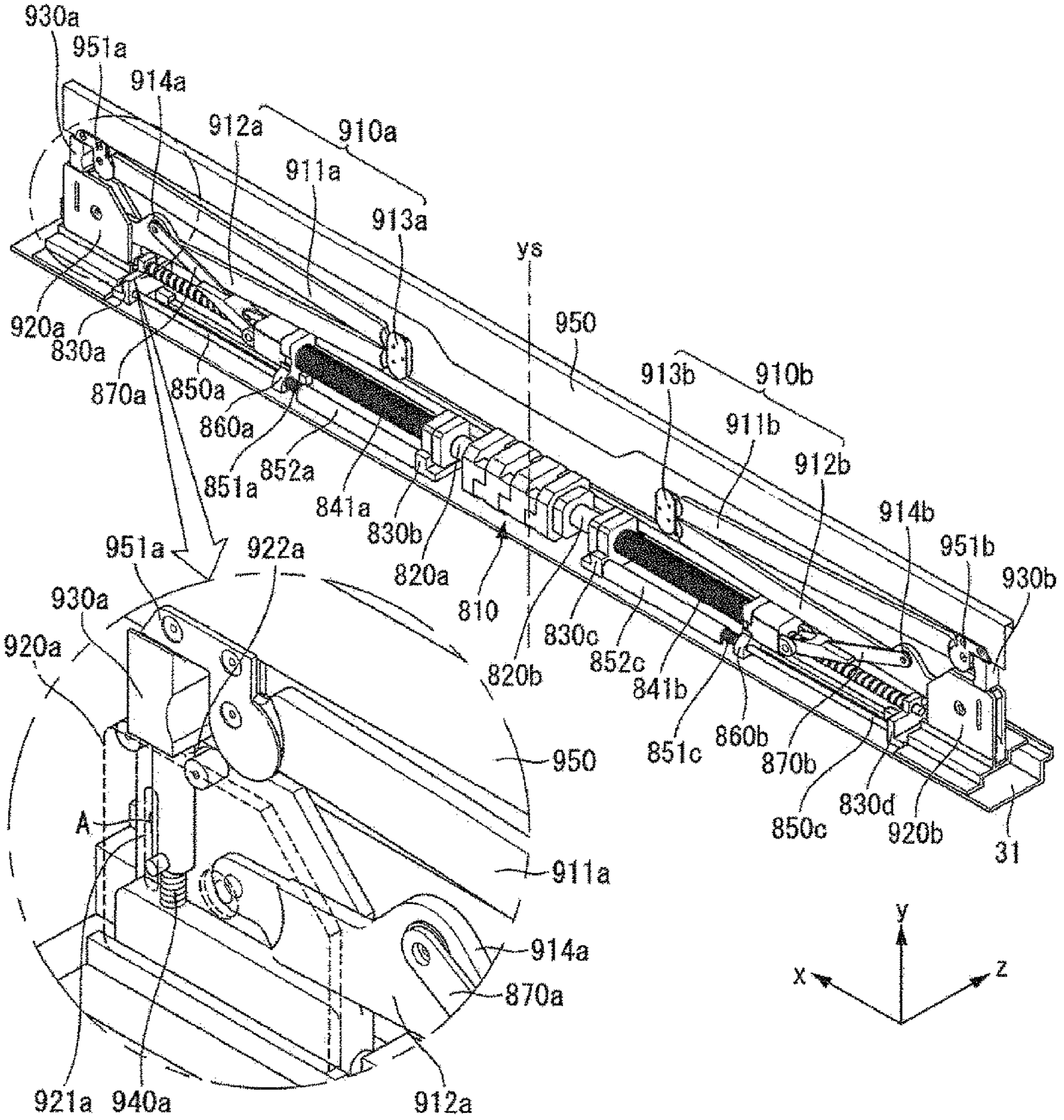

【FIG. 54】
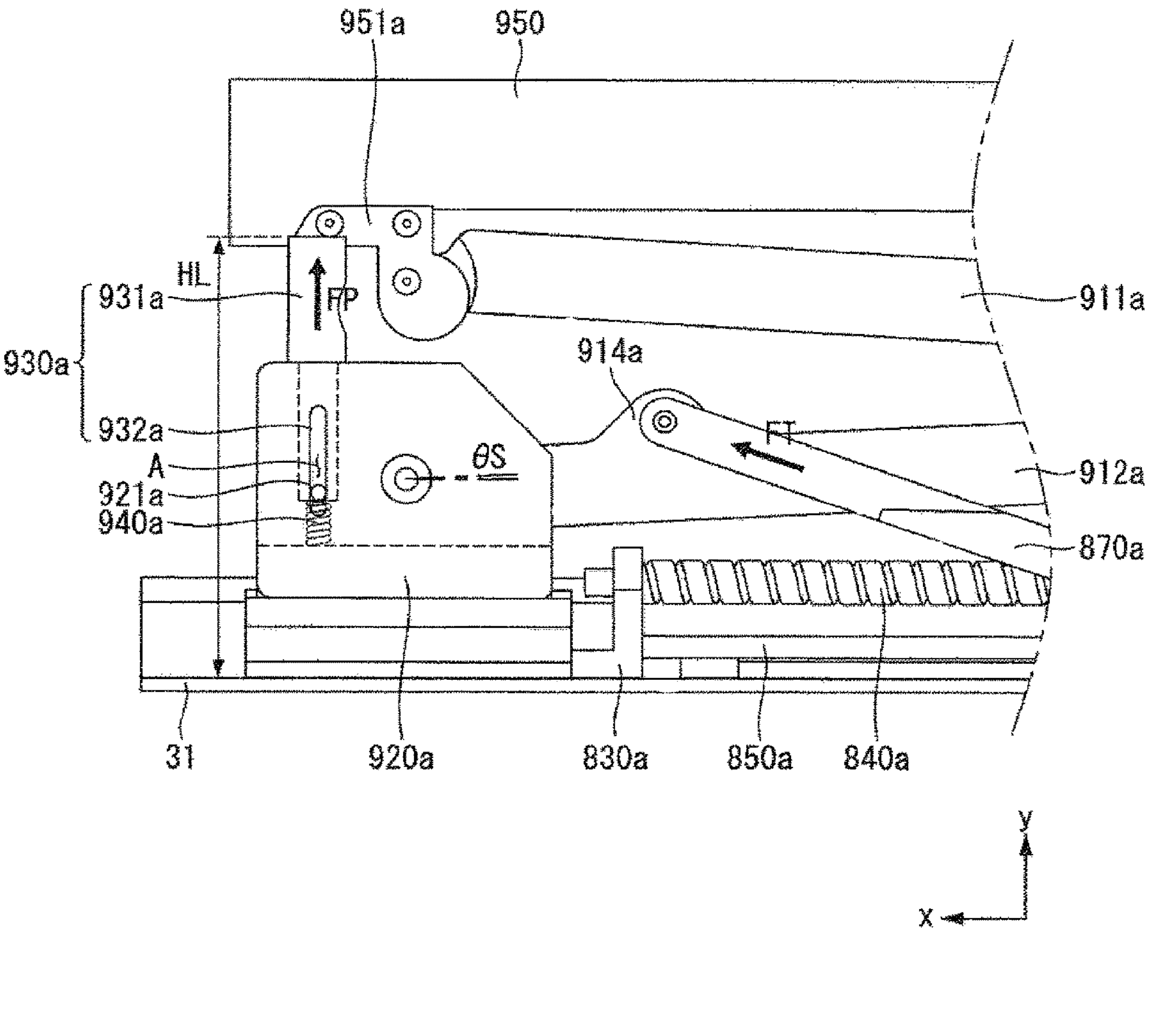

【FIG. 55】
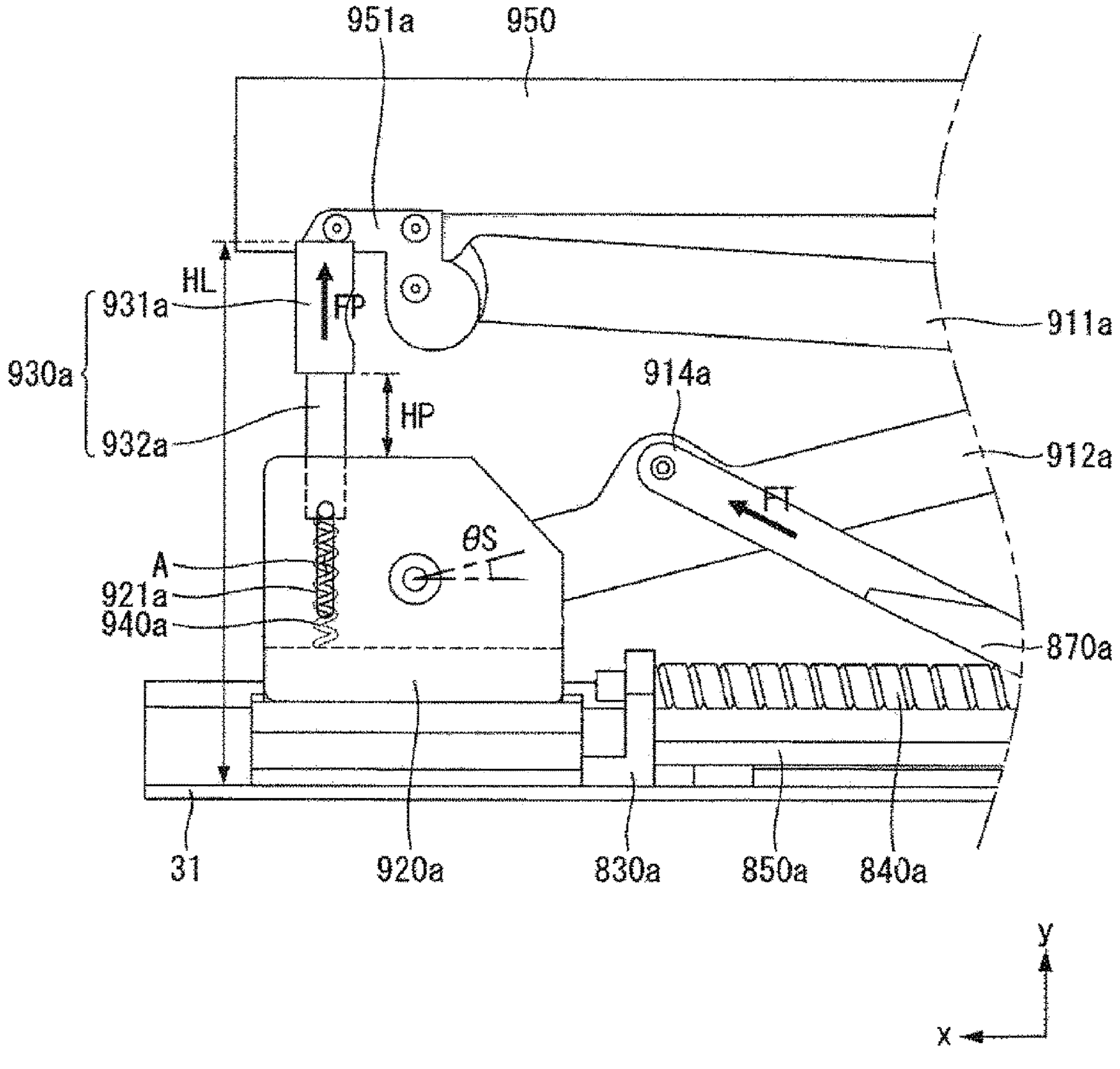

【FIG. 56】
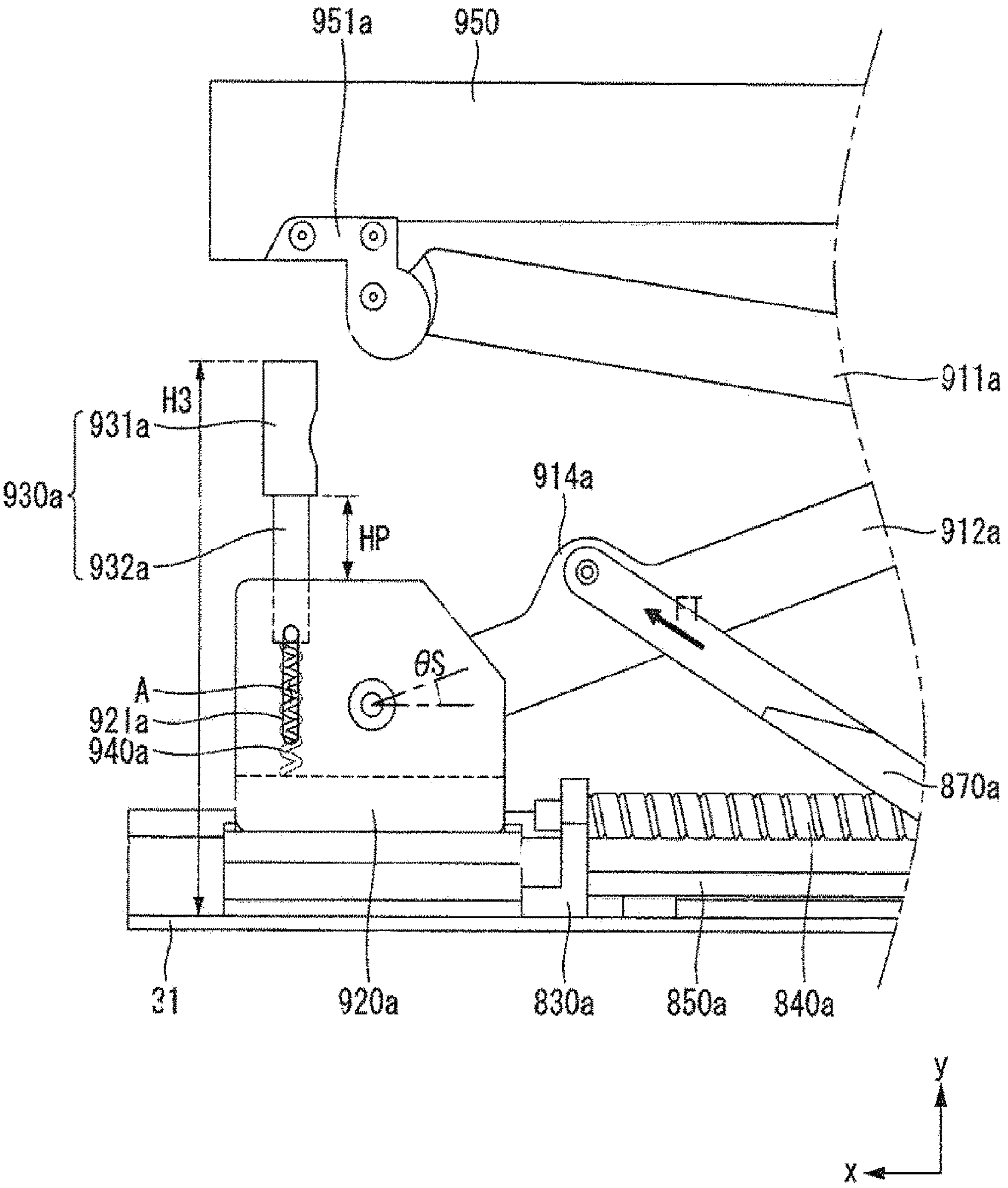

【FIG. 57】
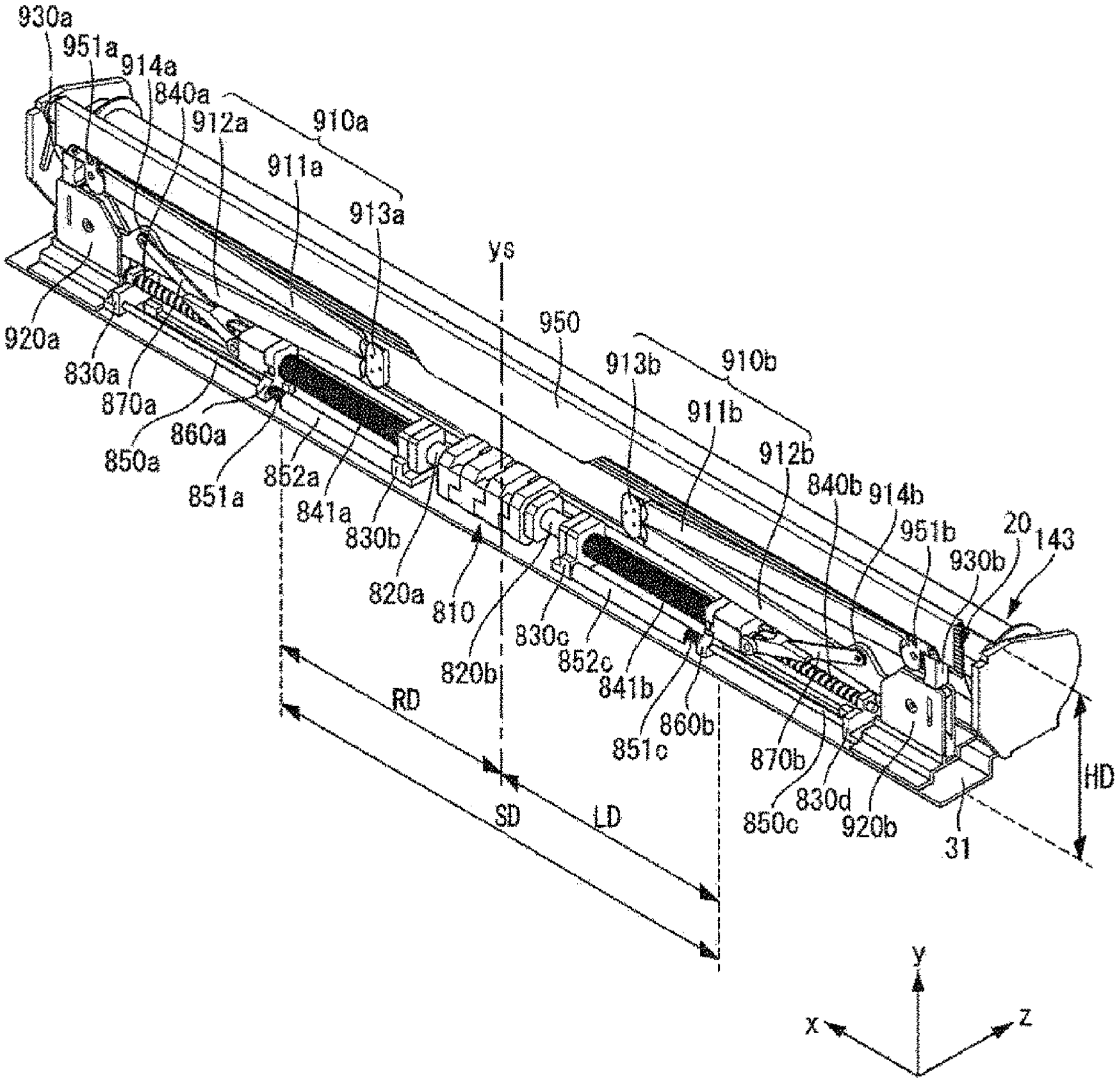

【FIG. 58】
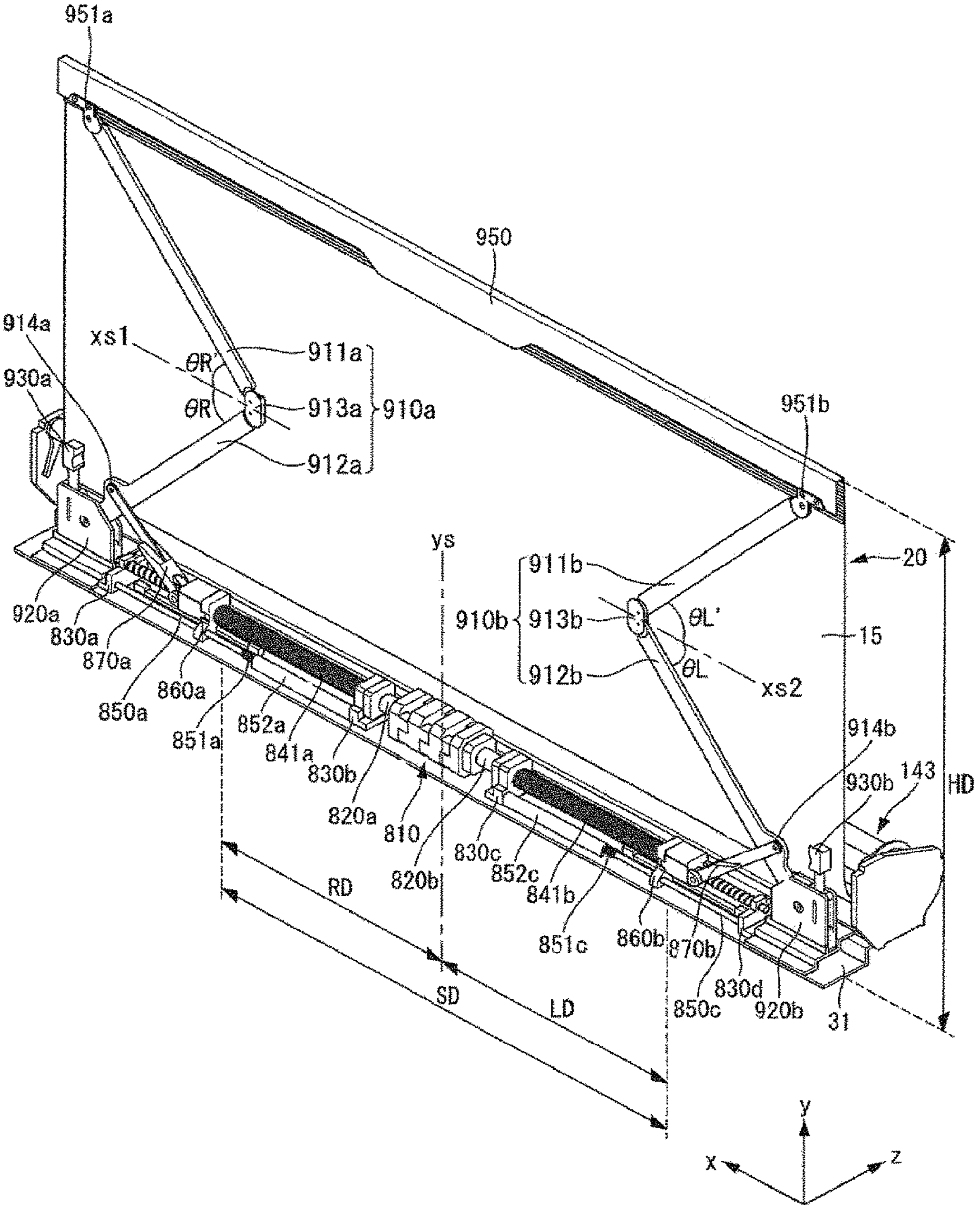

【FIG. 59】
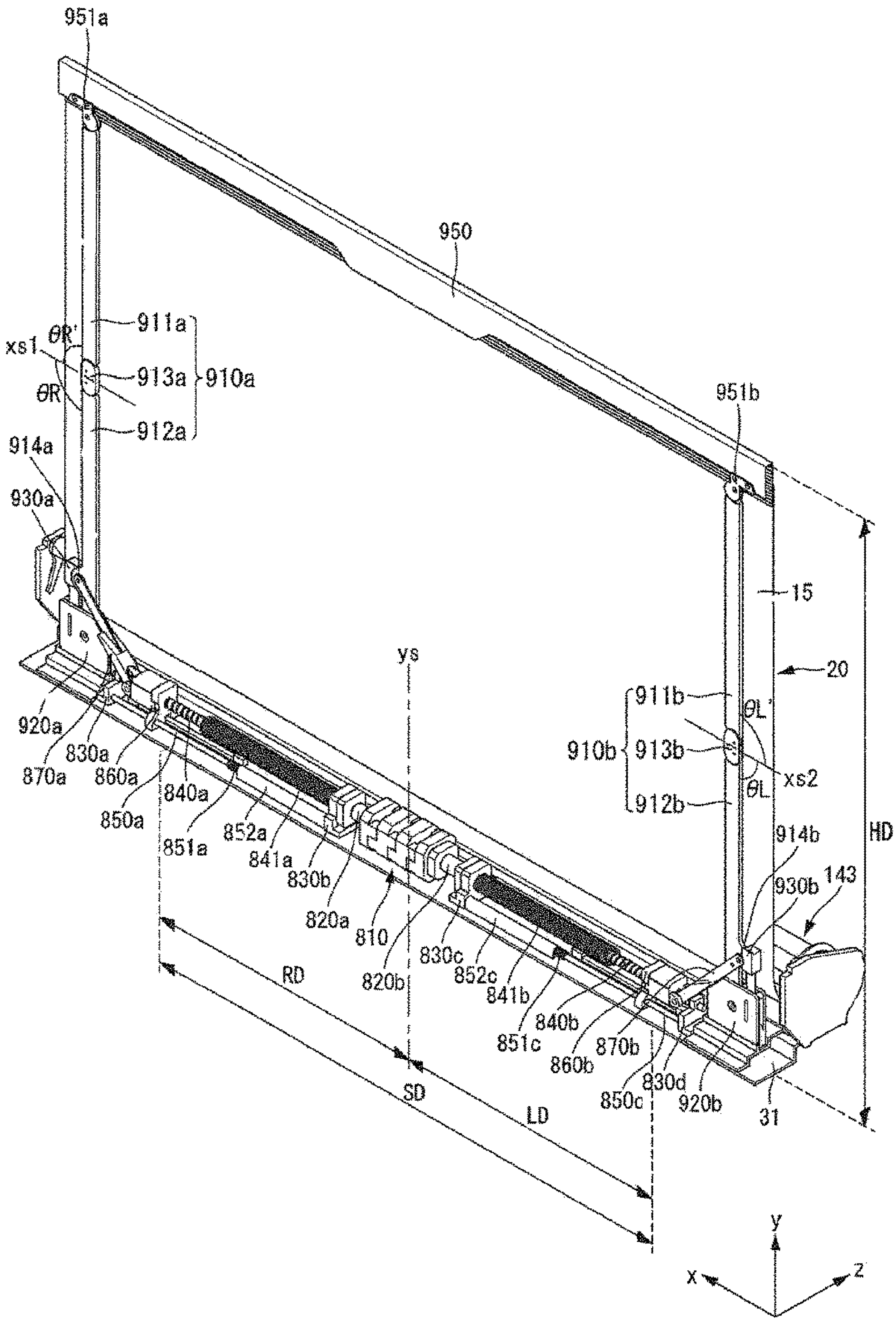

【FIG. 60】
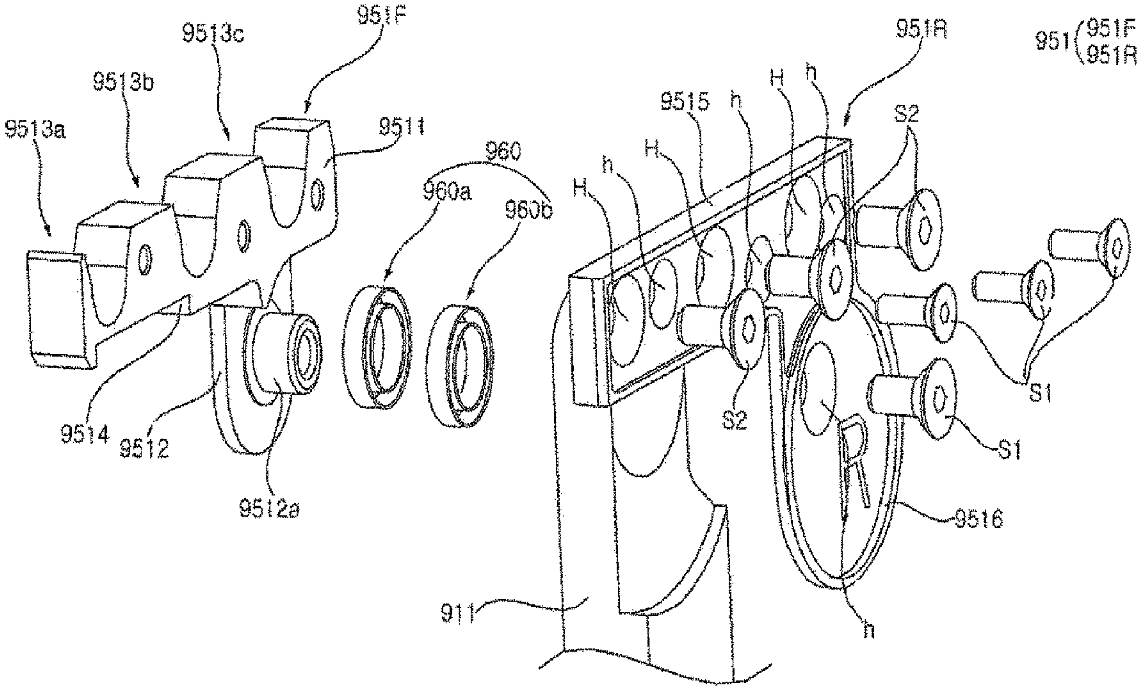

【FIG. 61】
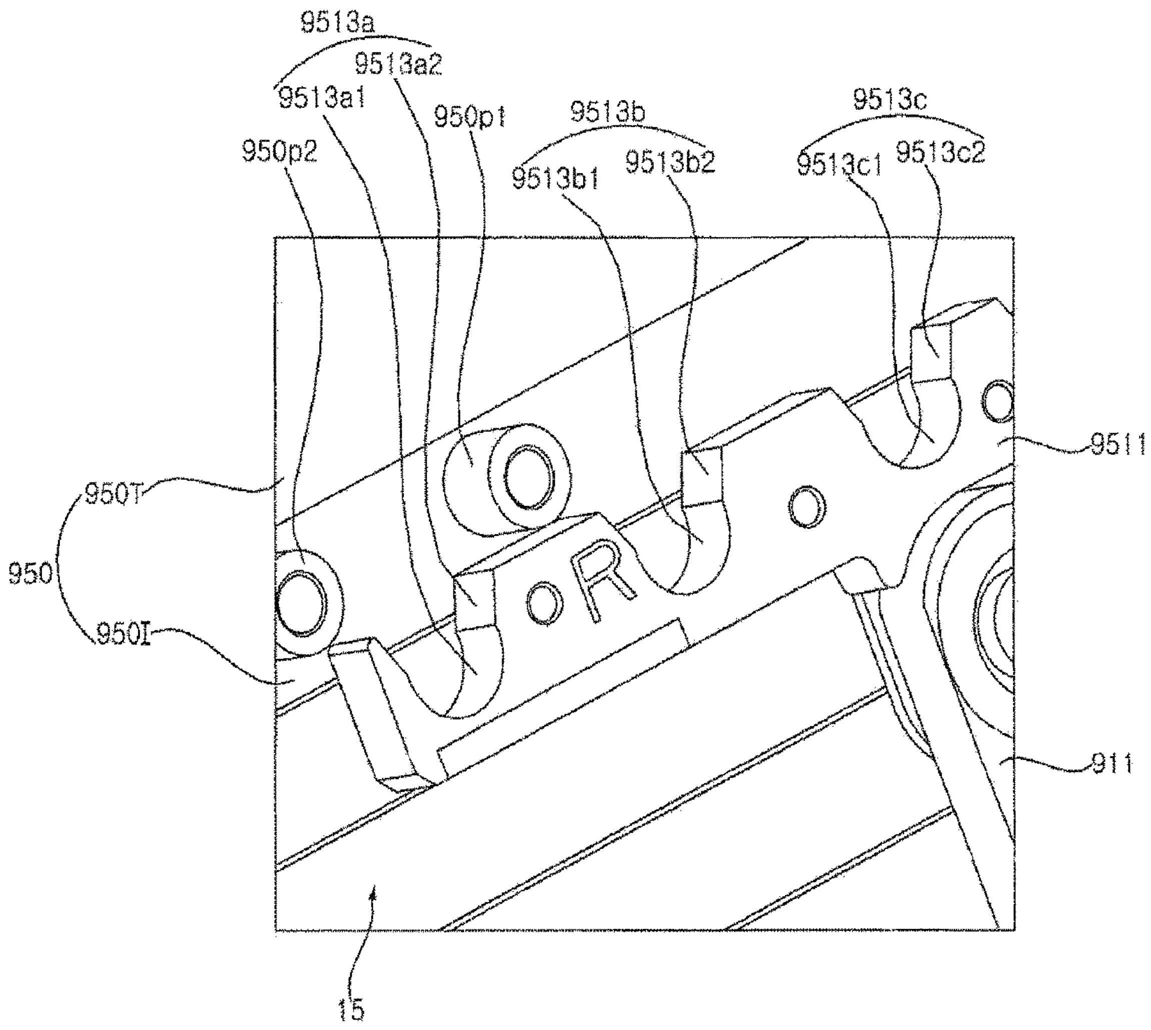

【FIG. 62】
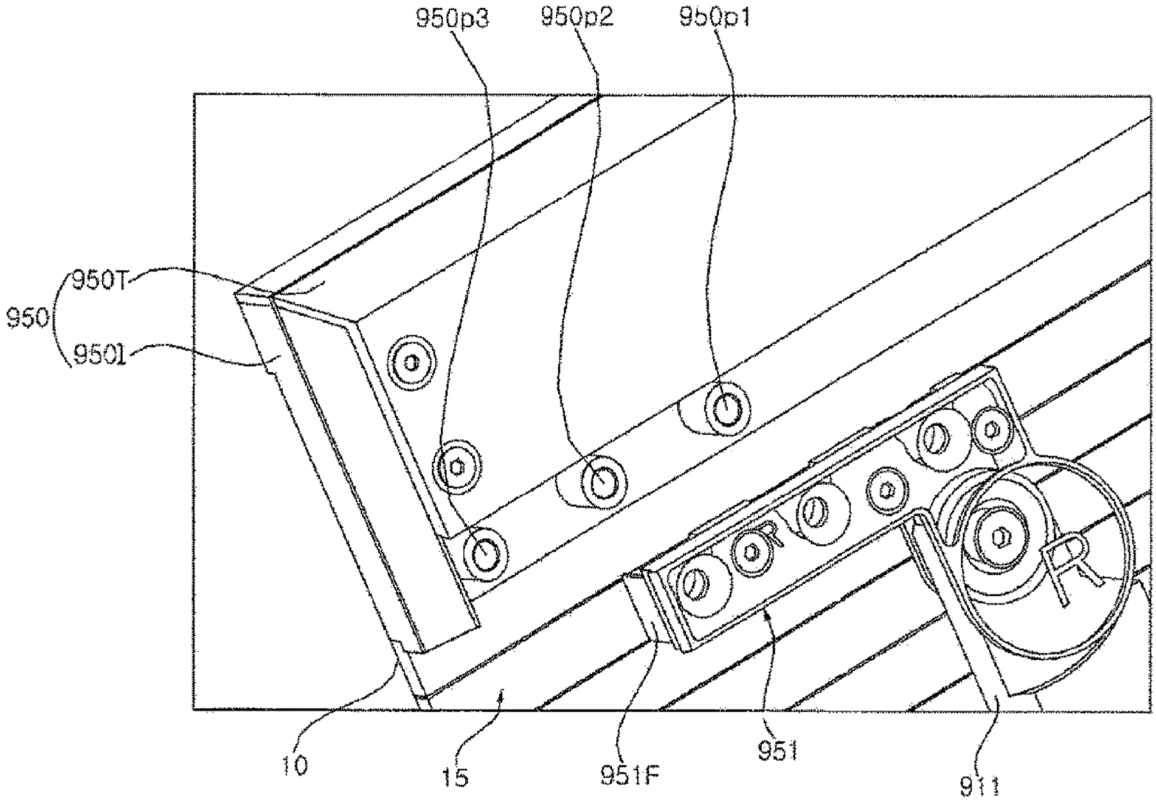

【FIG. 63】
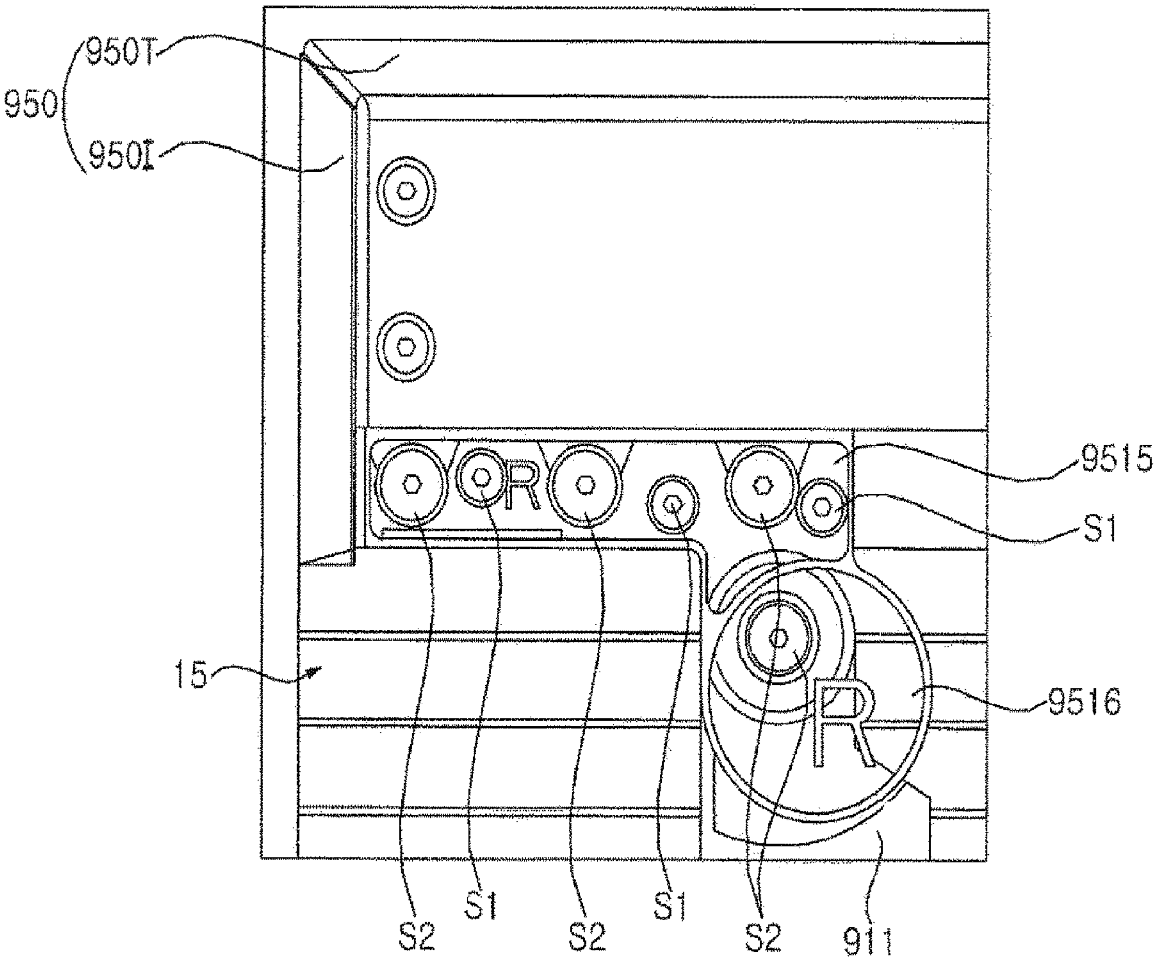

【FIG. 64】
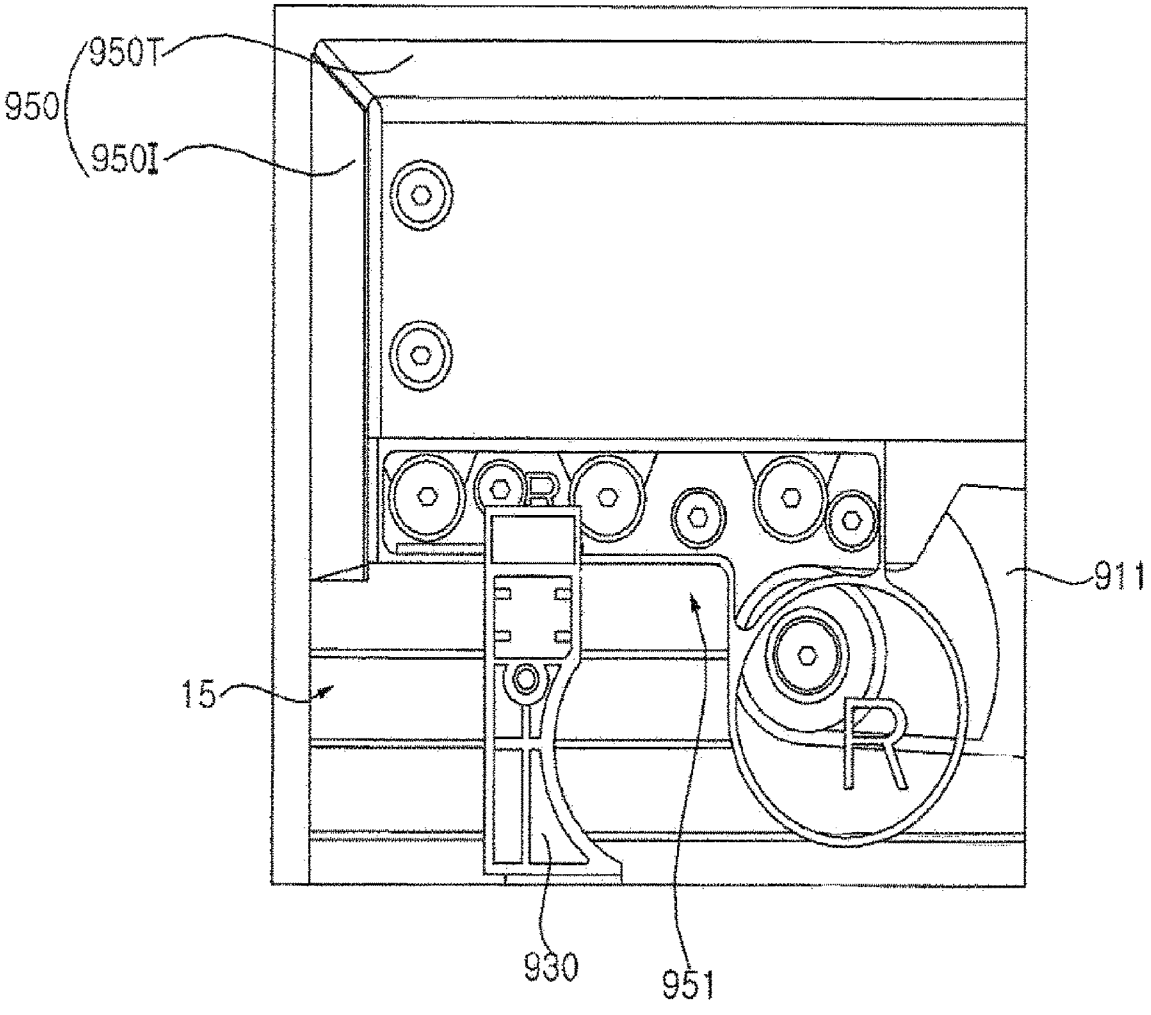

【FIG. 65】
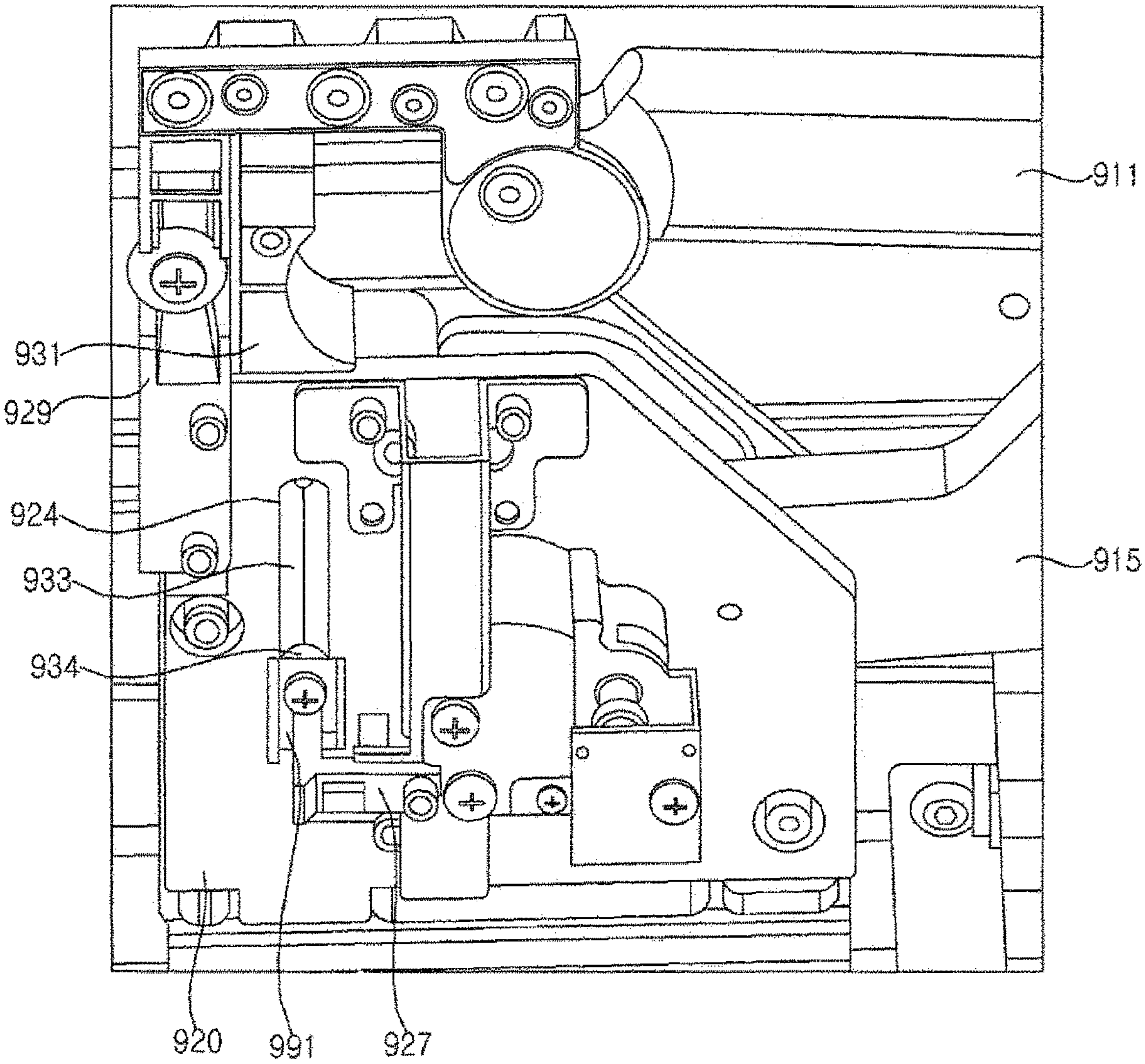

【FIG. 66】
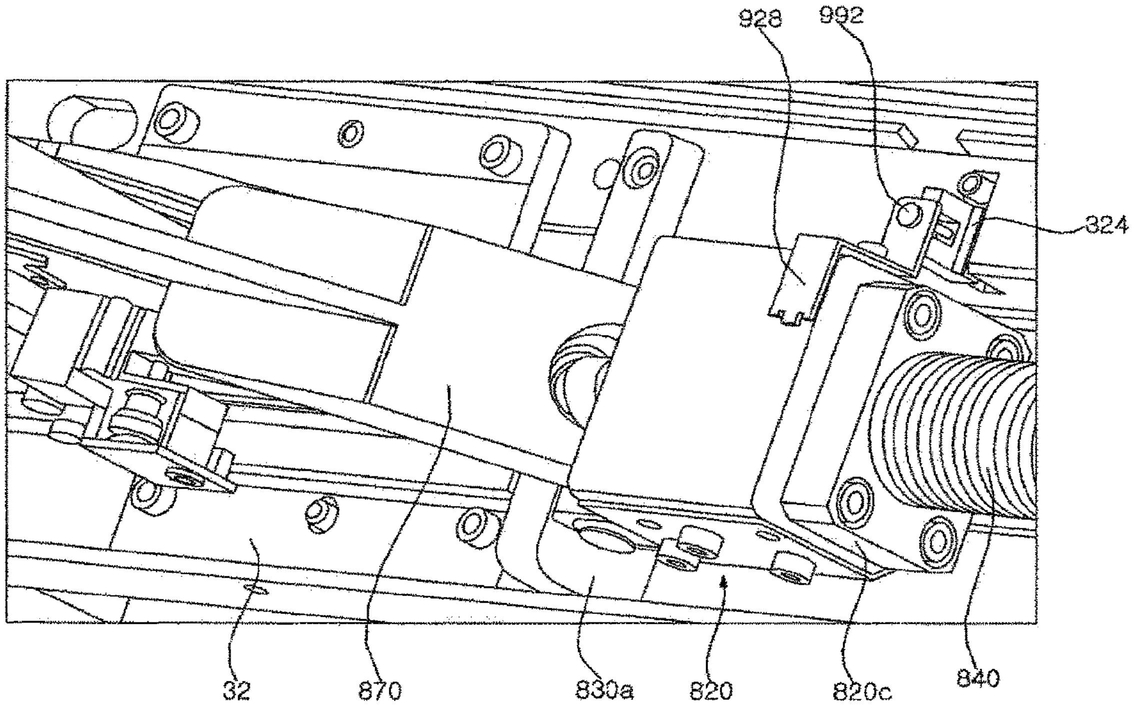

【FIG. 67】
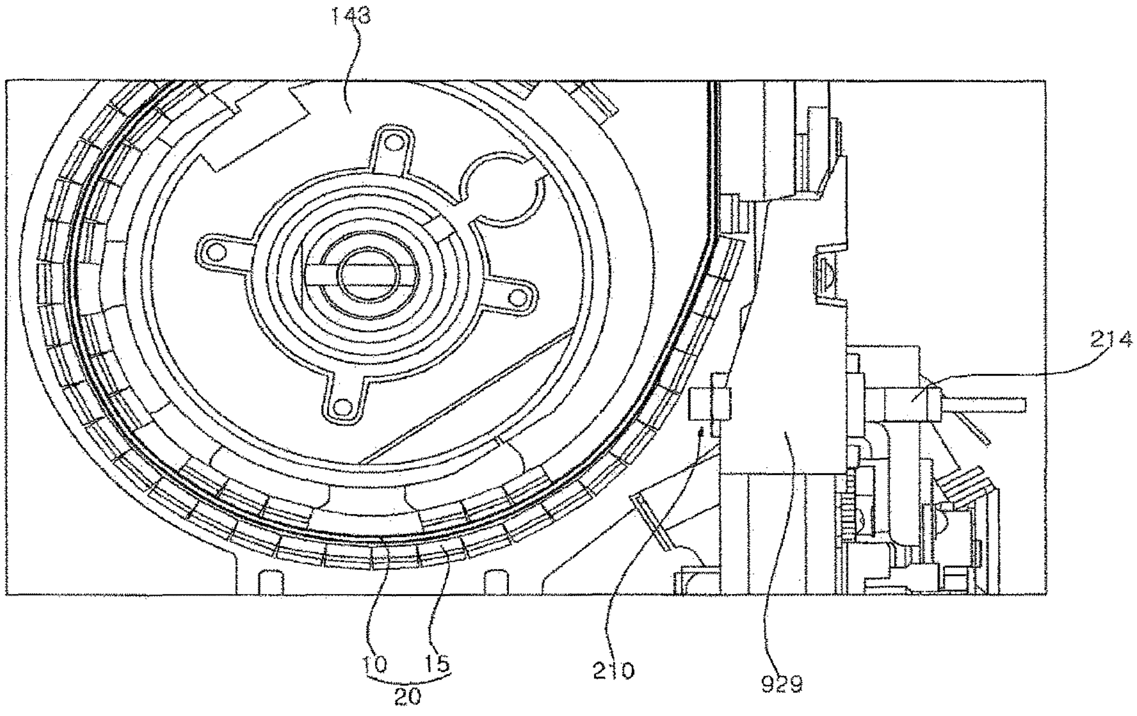

【FIG. 68】
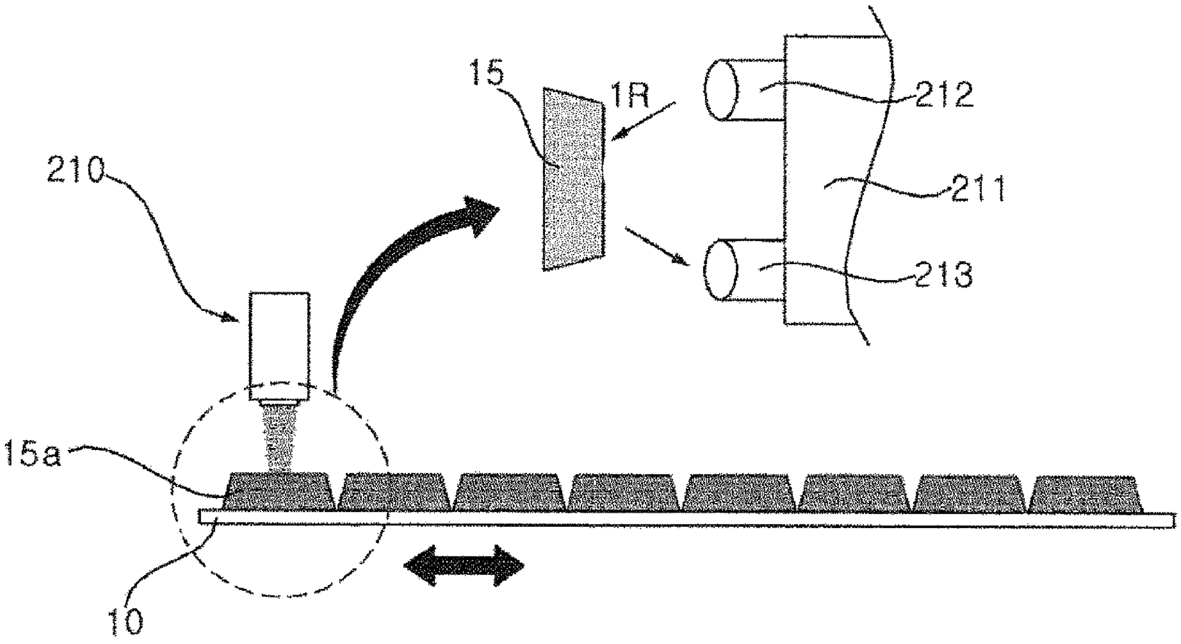

【FIG. 69】
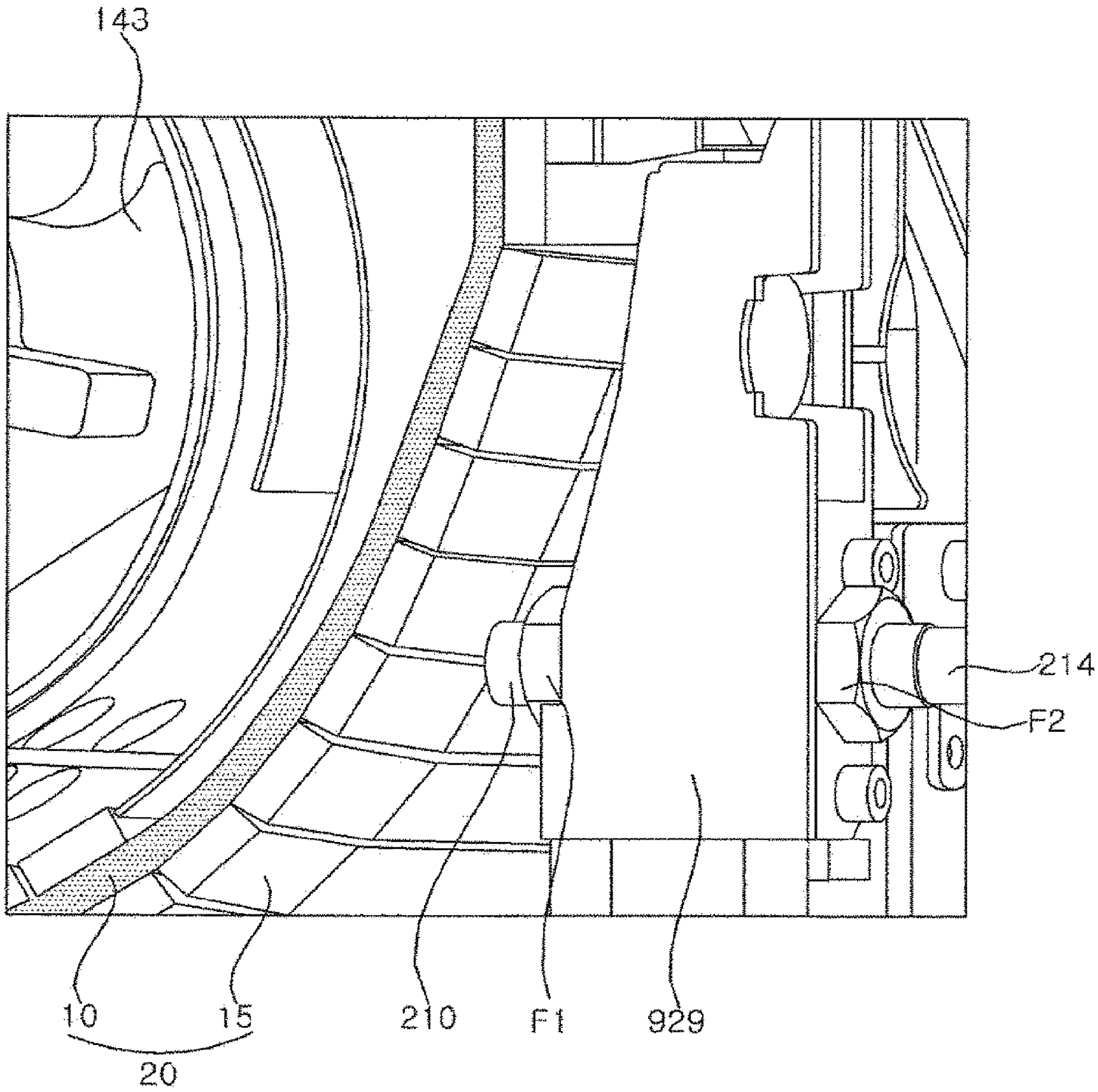

【FIG. 70】
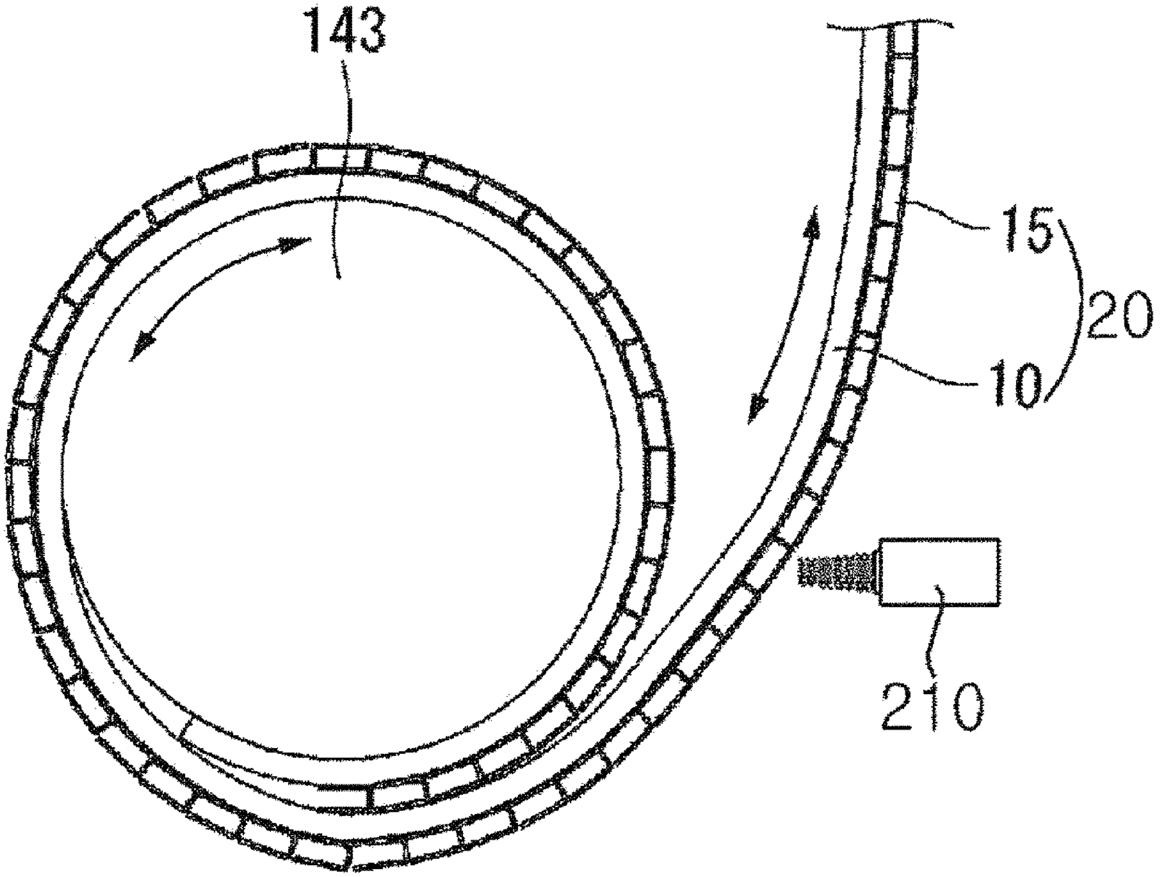

【FIG. 71】
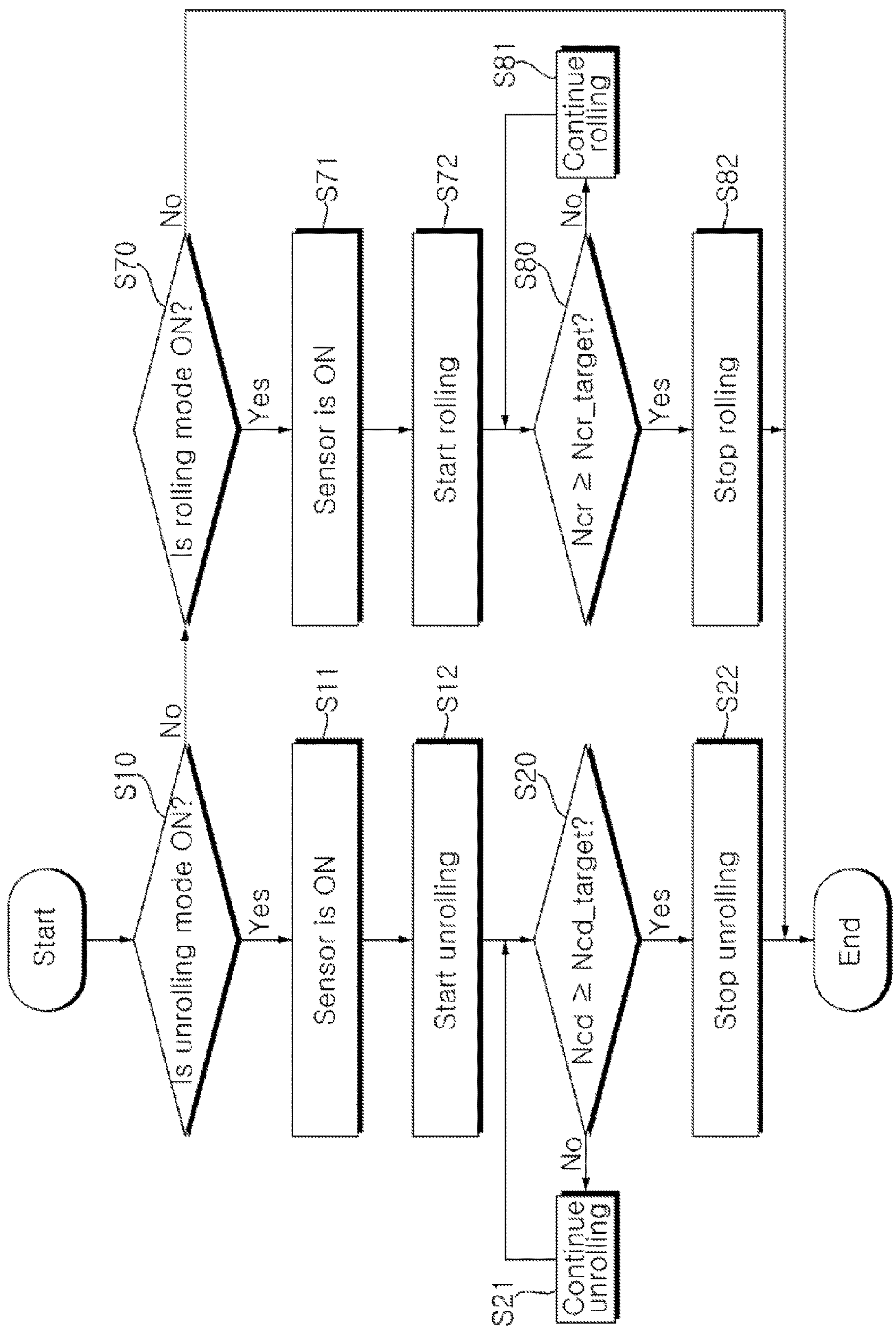

【FIG. 72】
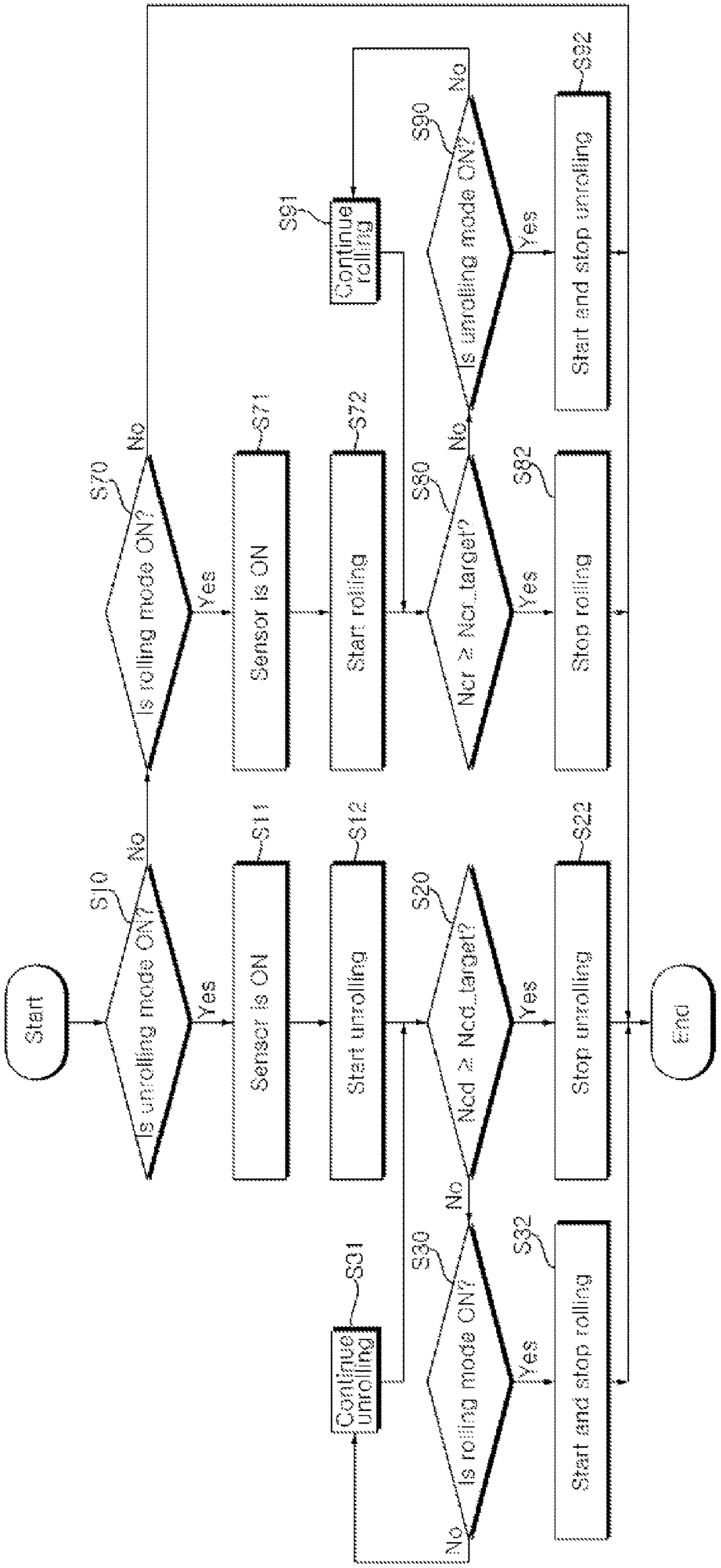

【FIG. 73】
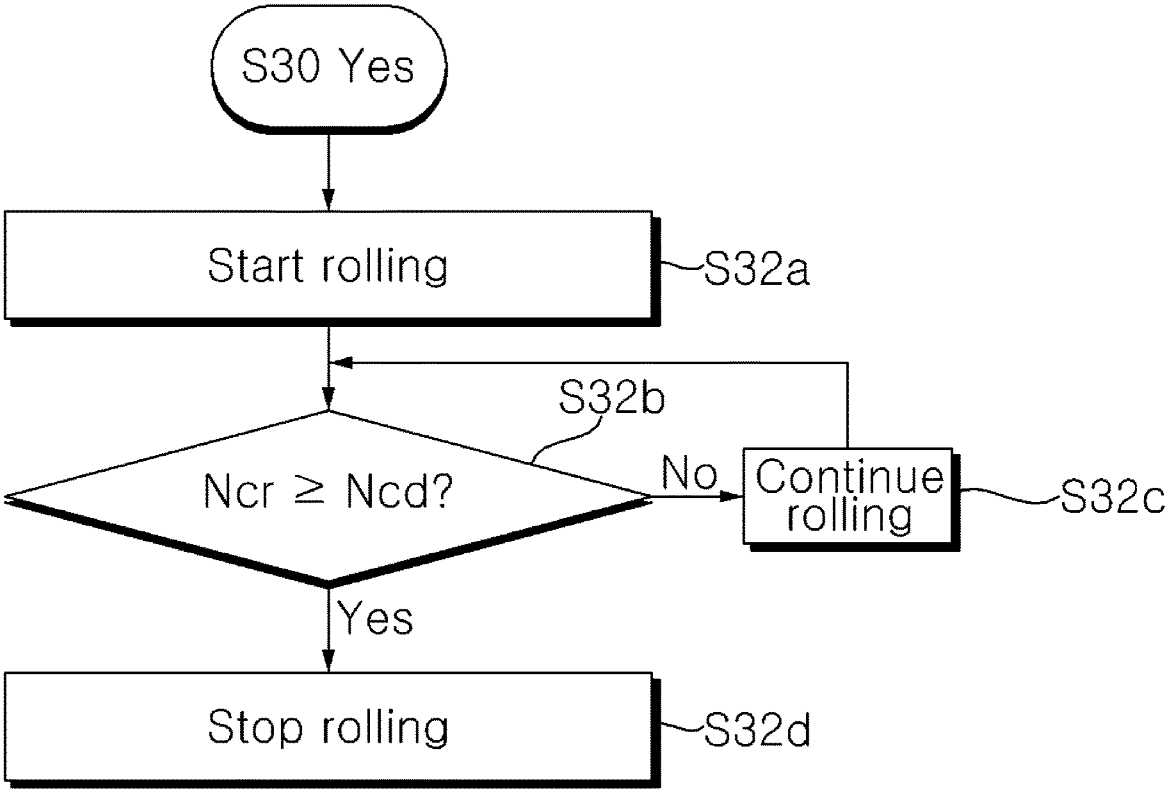

【FIG. 74】
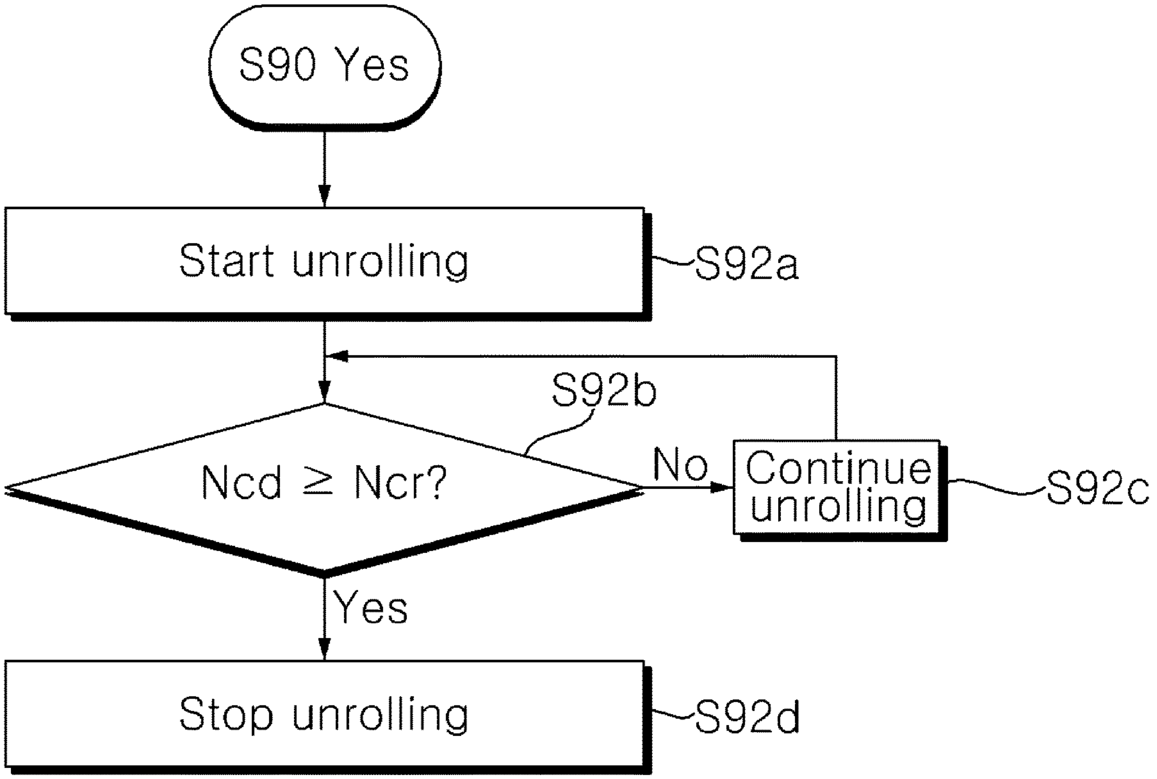

【FIG. 75】
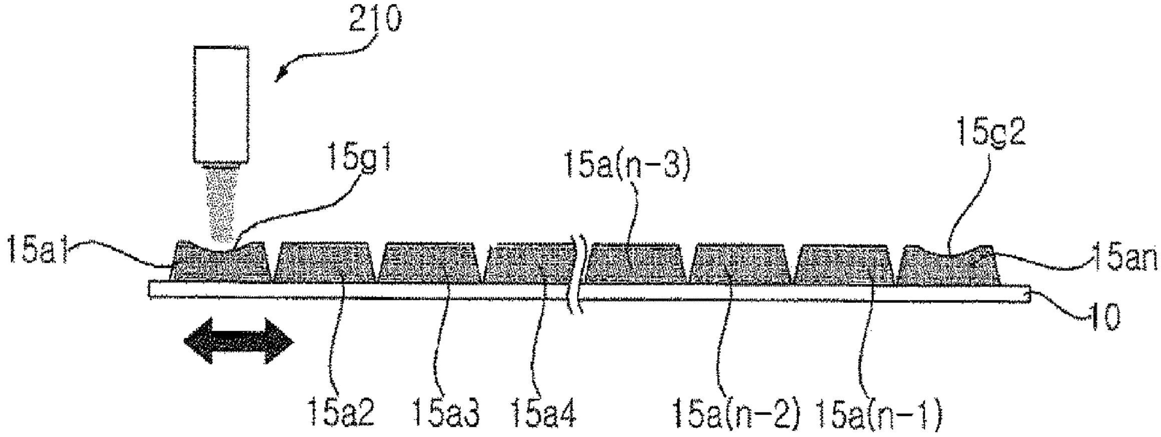

【FIG. 76】
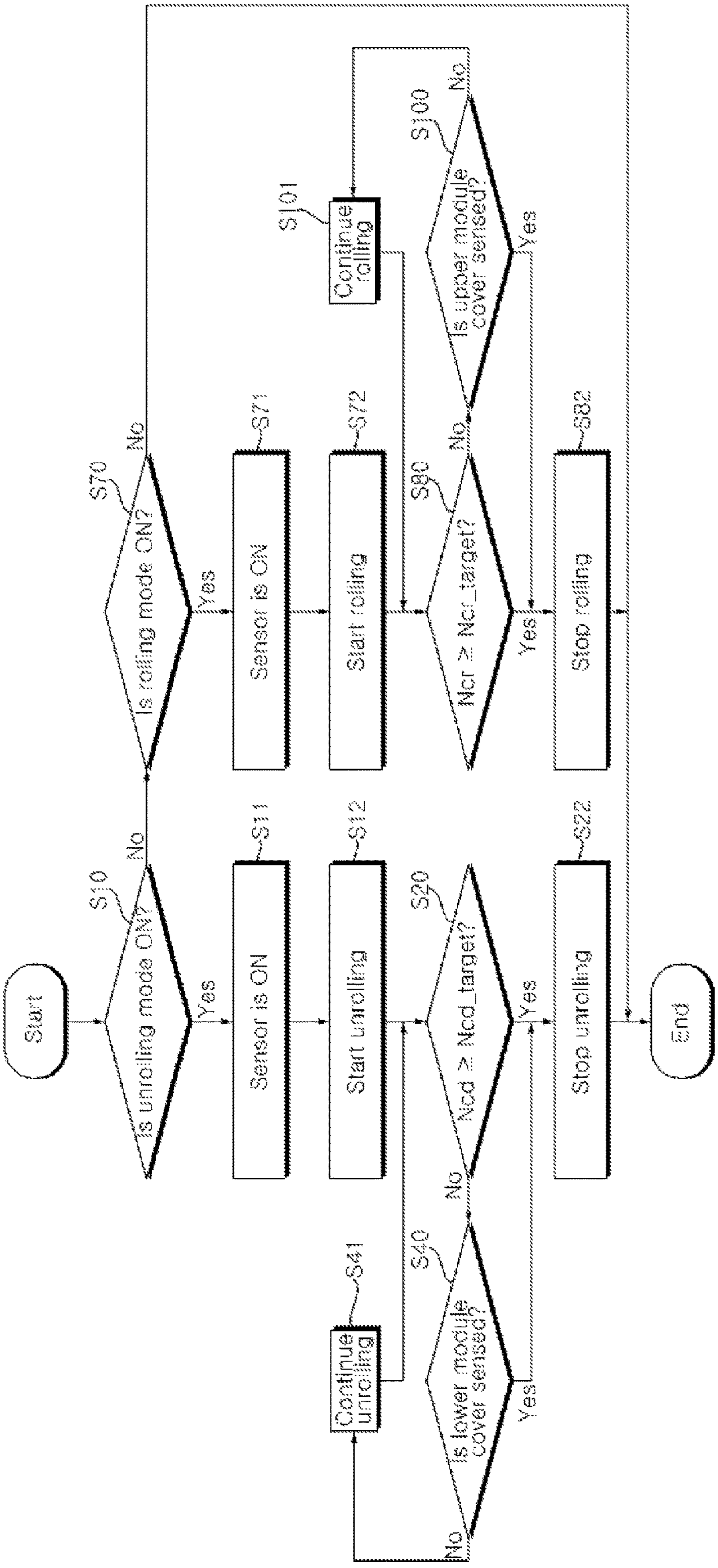

【FIG. 77】
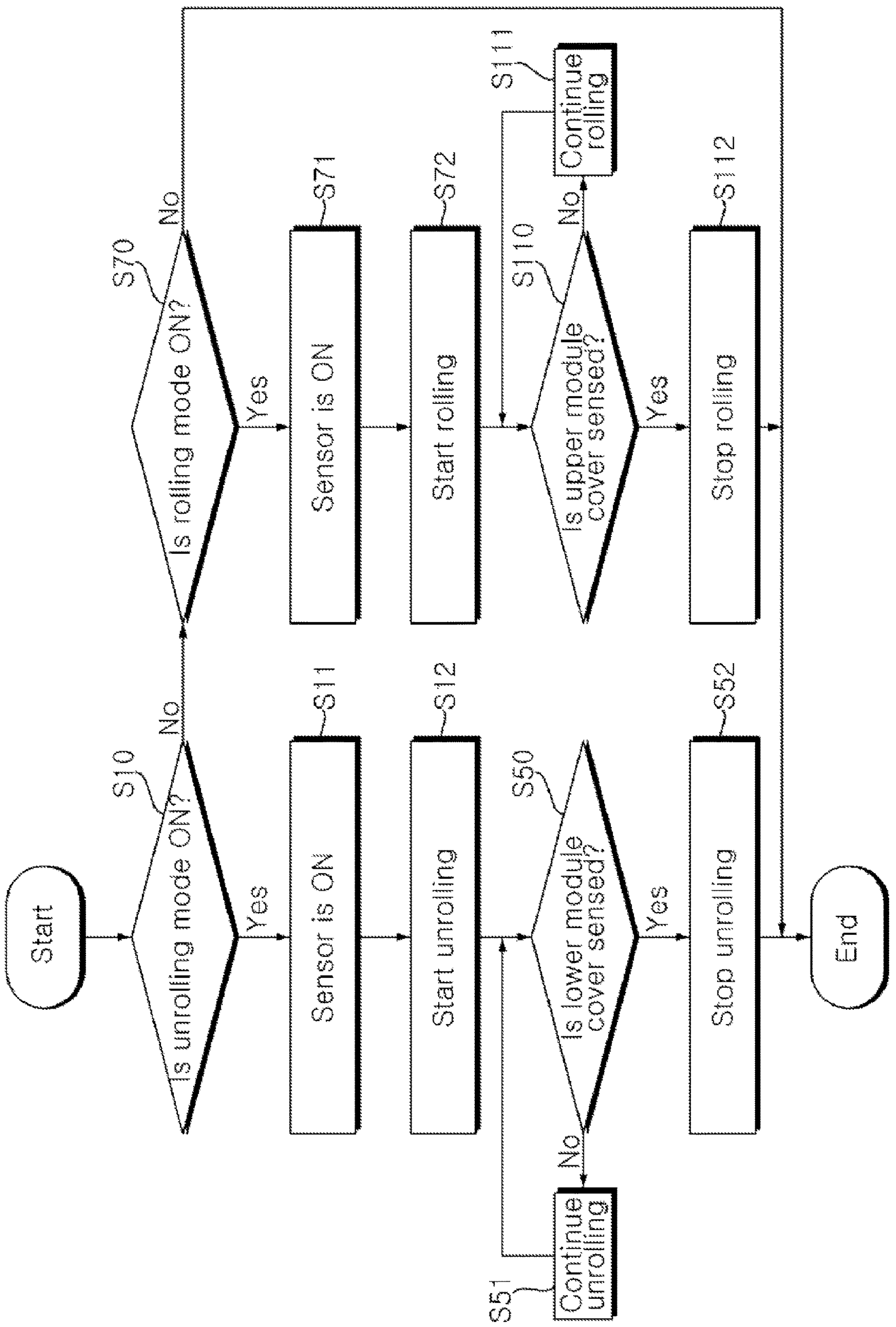

【FIG. 78】
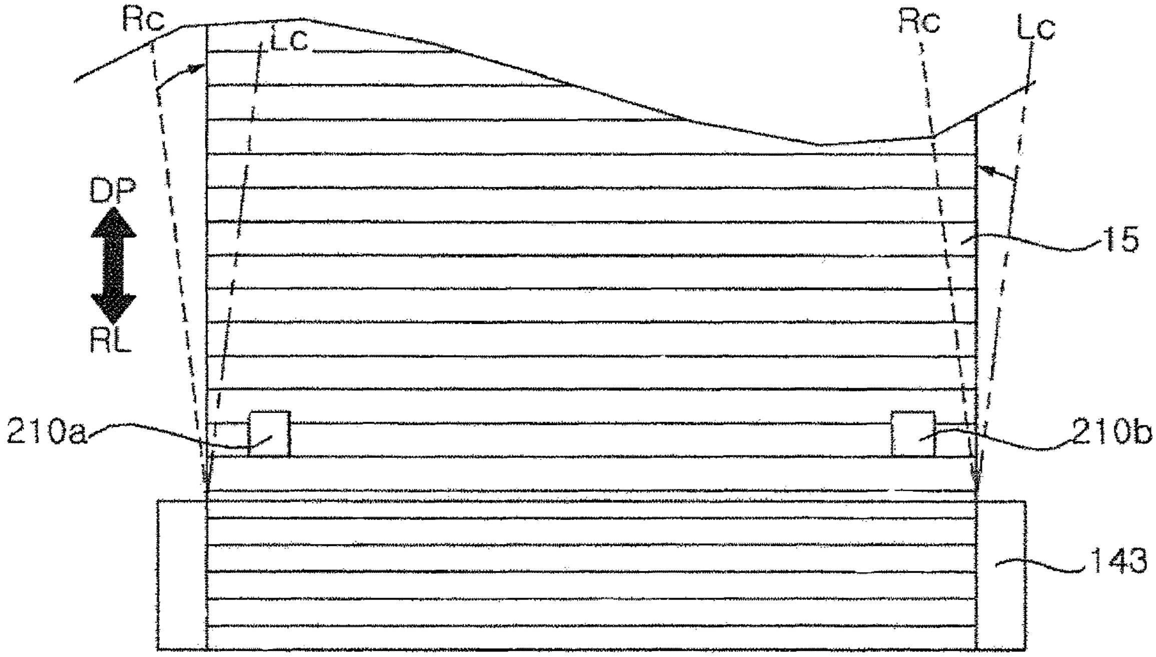

【FIG. 79】
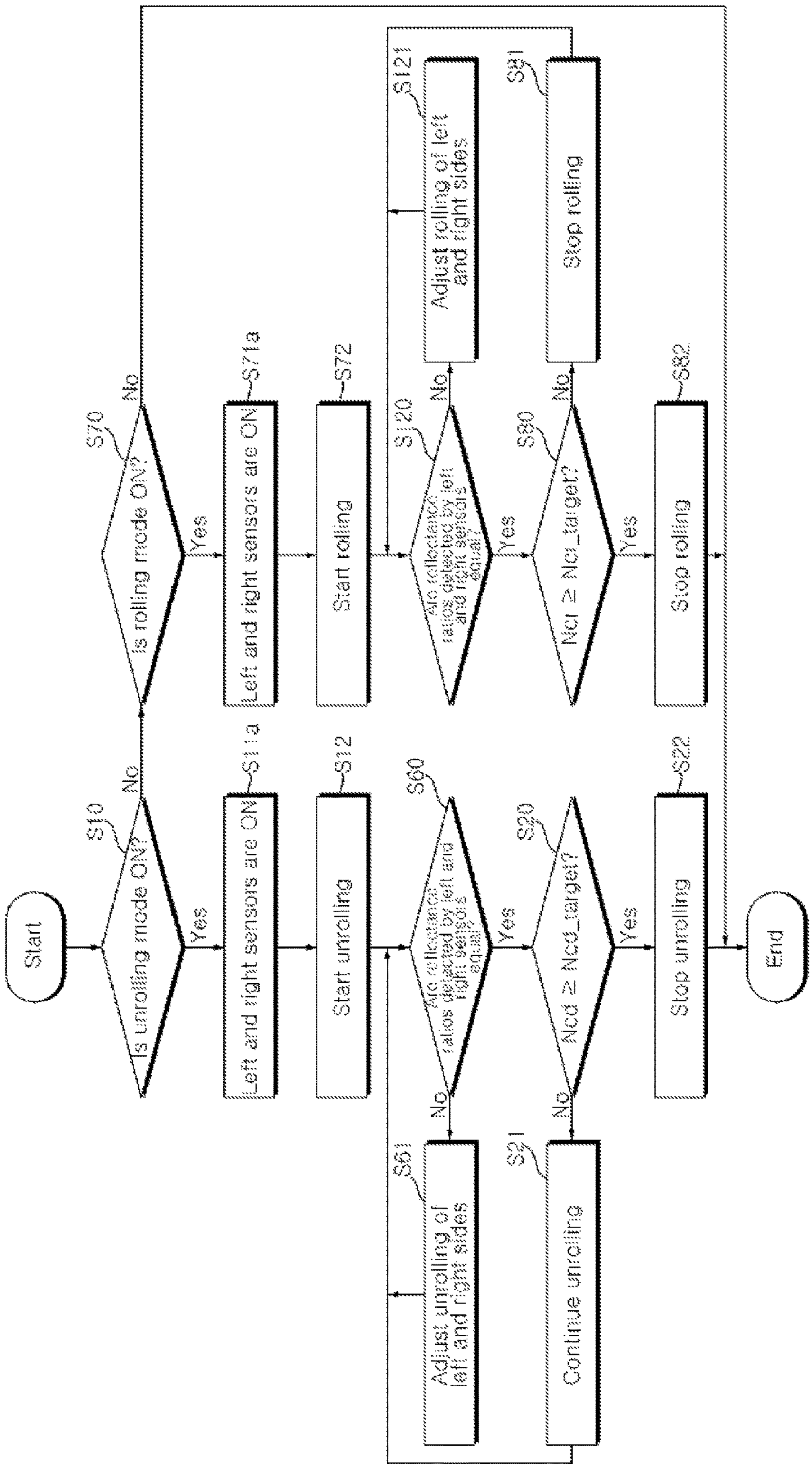

【FIG. 80】
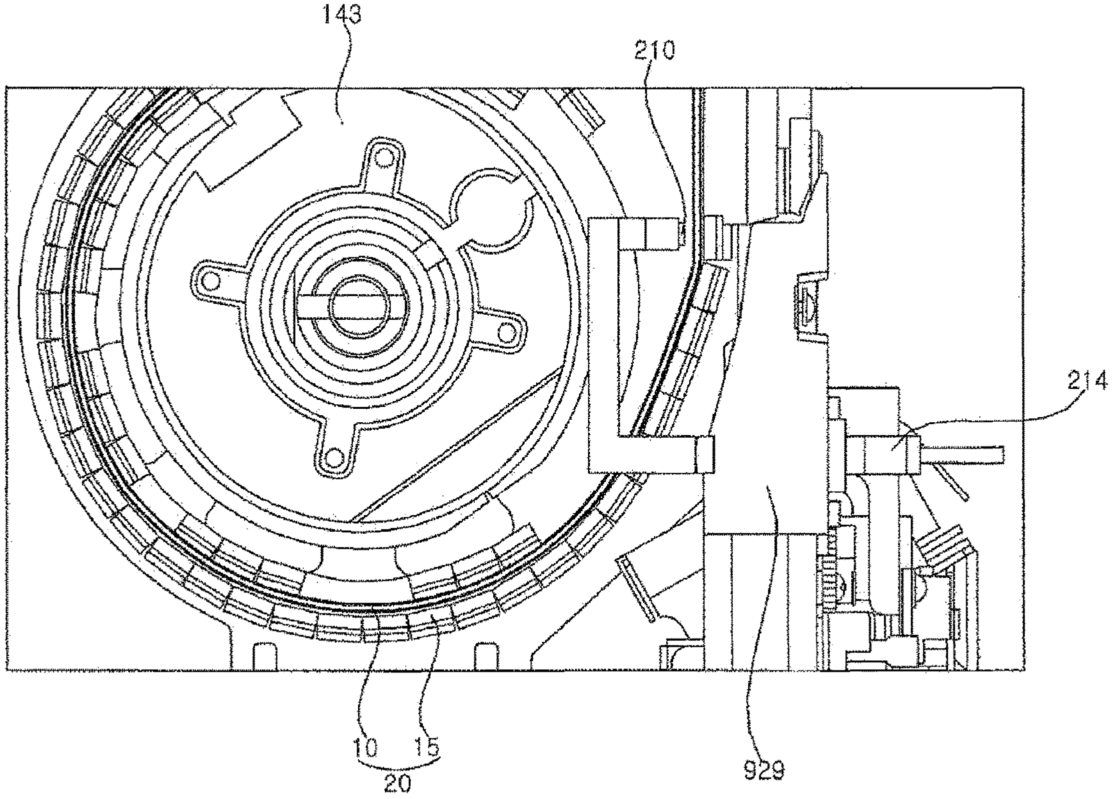

【FIG. 81】
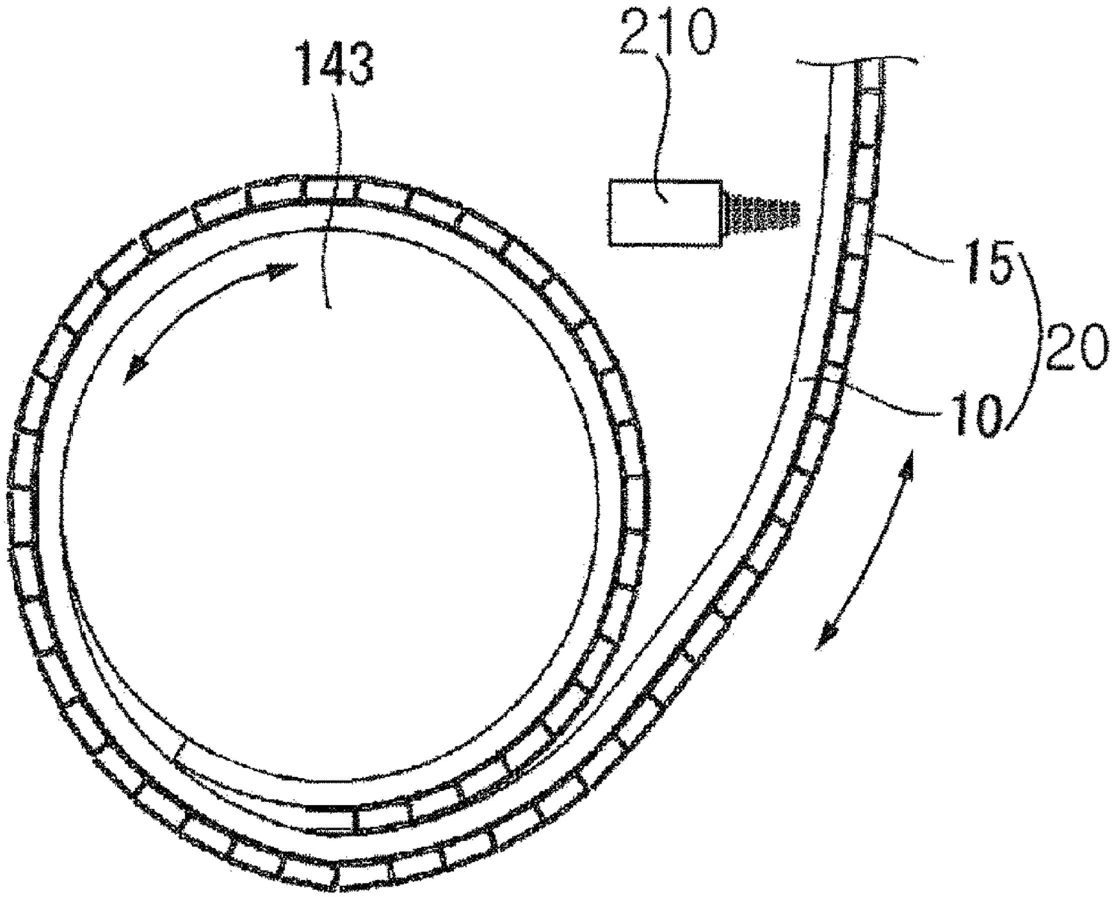

【FIG. 82】
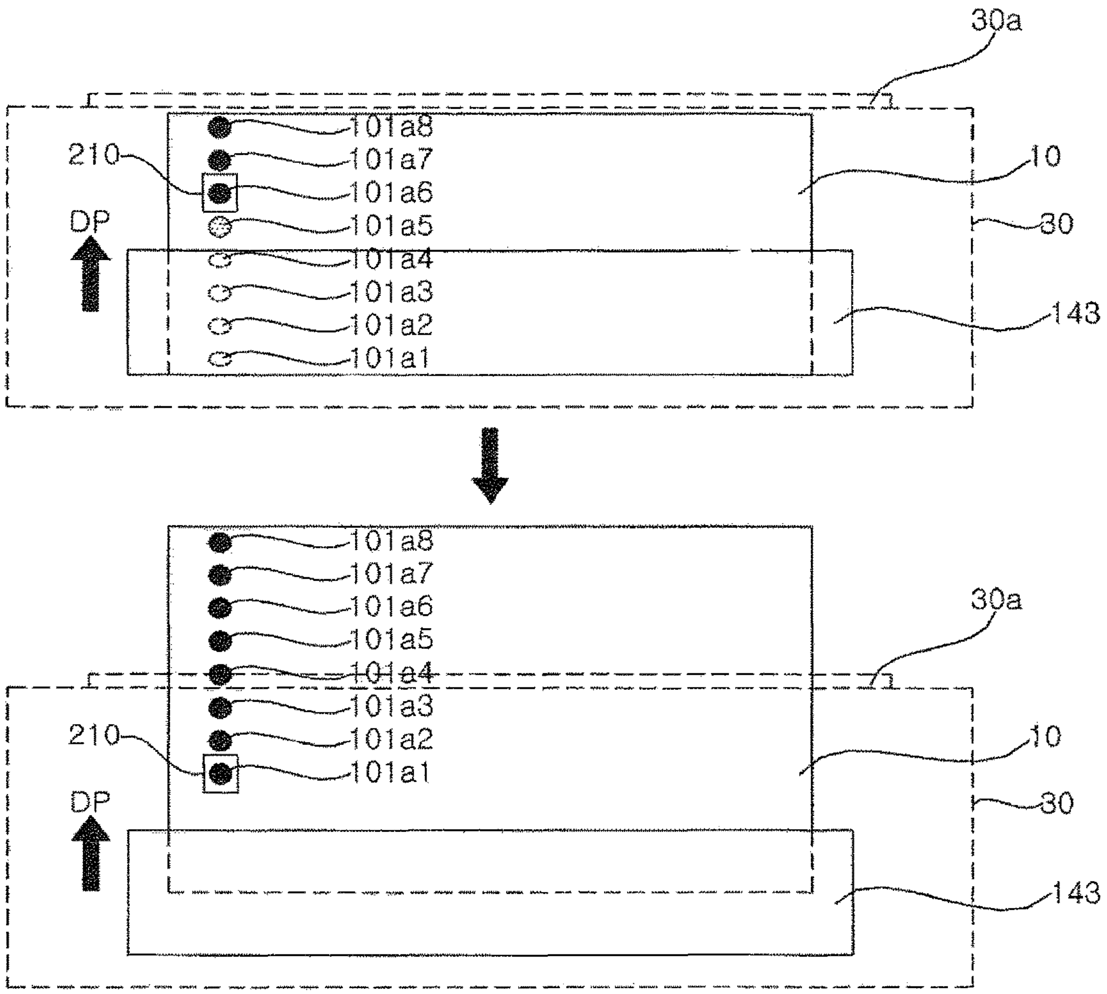

【FIG. 83】
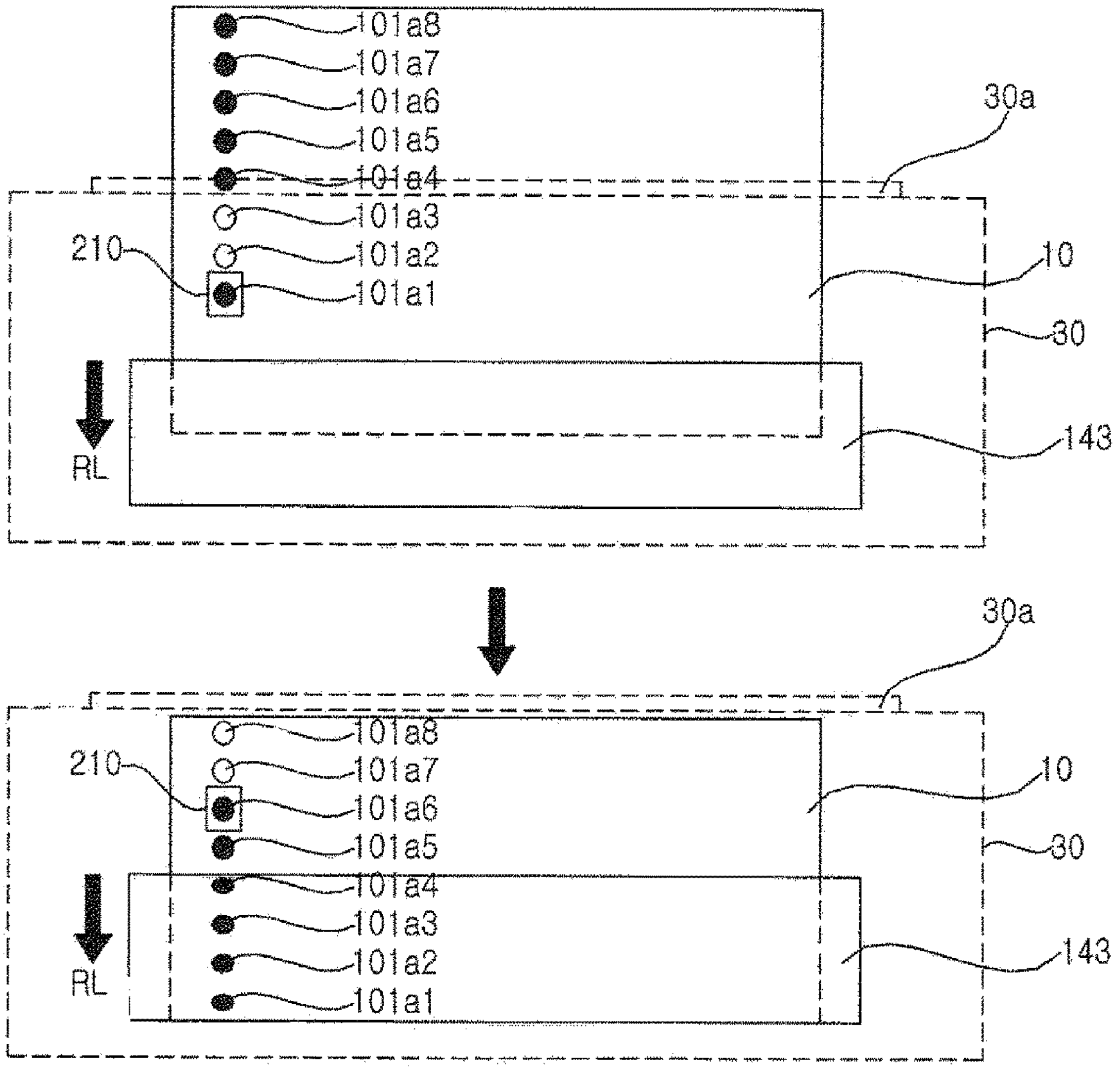

【FIG. 84】
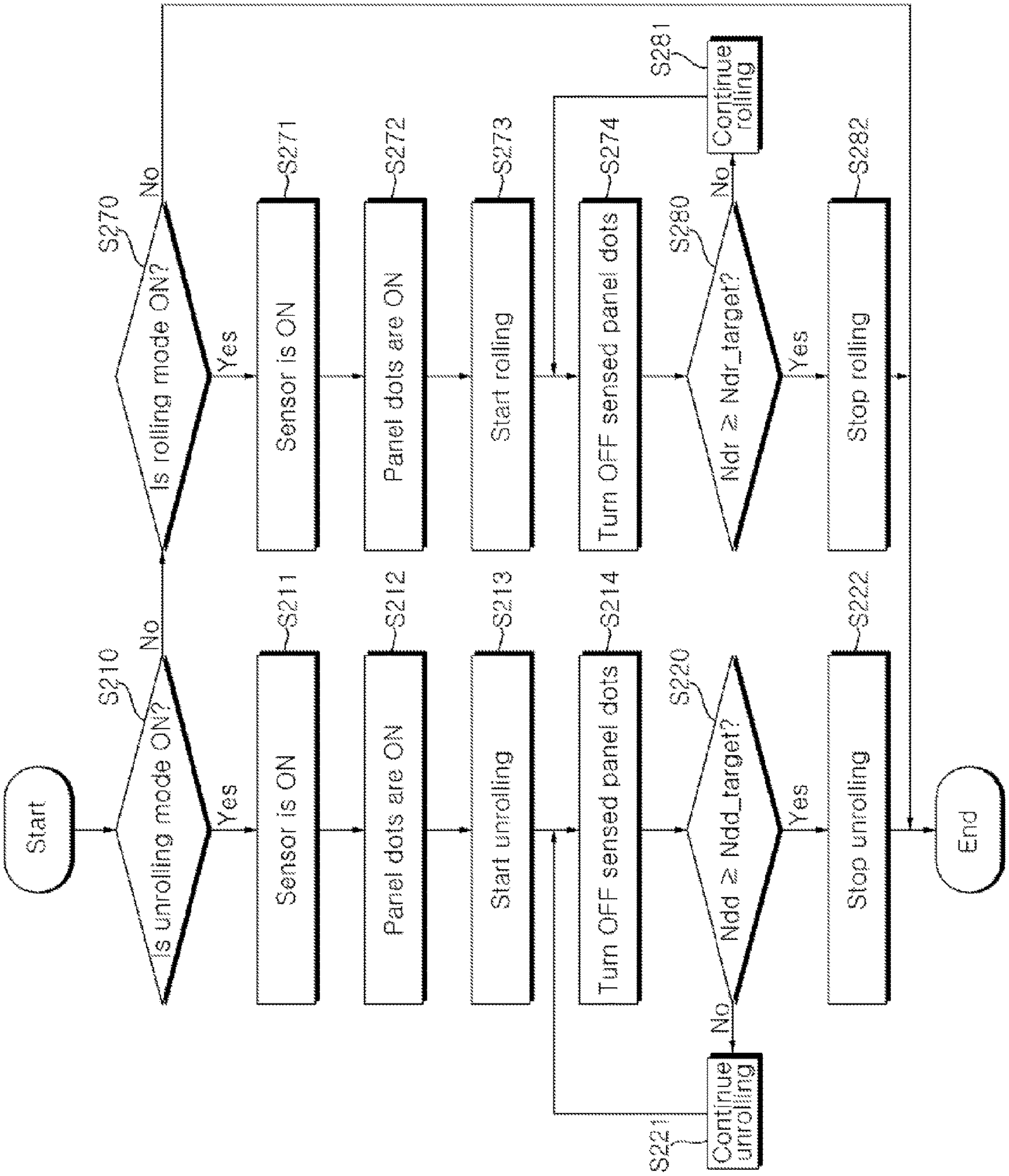

【FIG. 85】
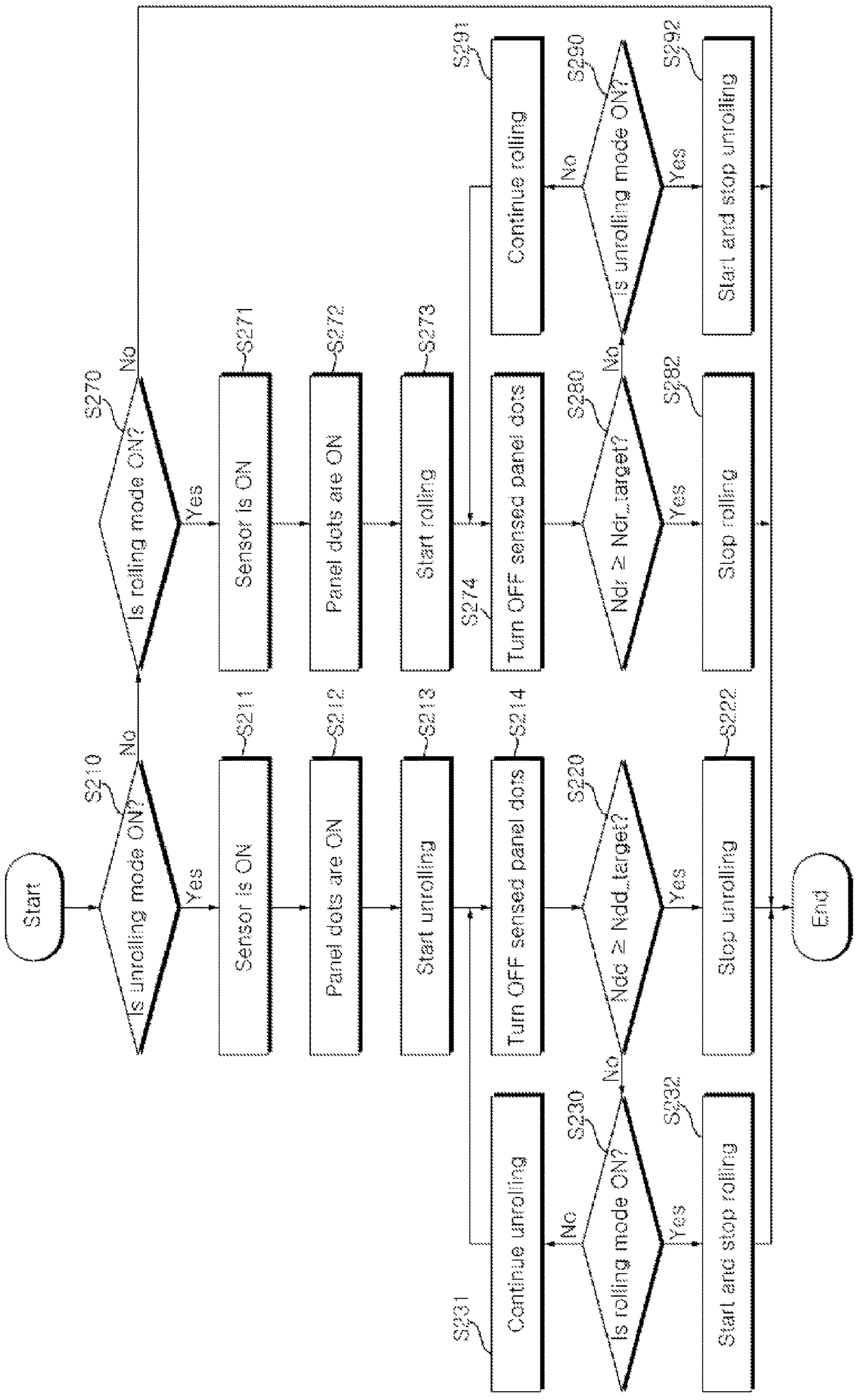

【FIG. 86】
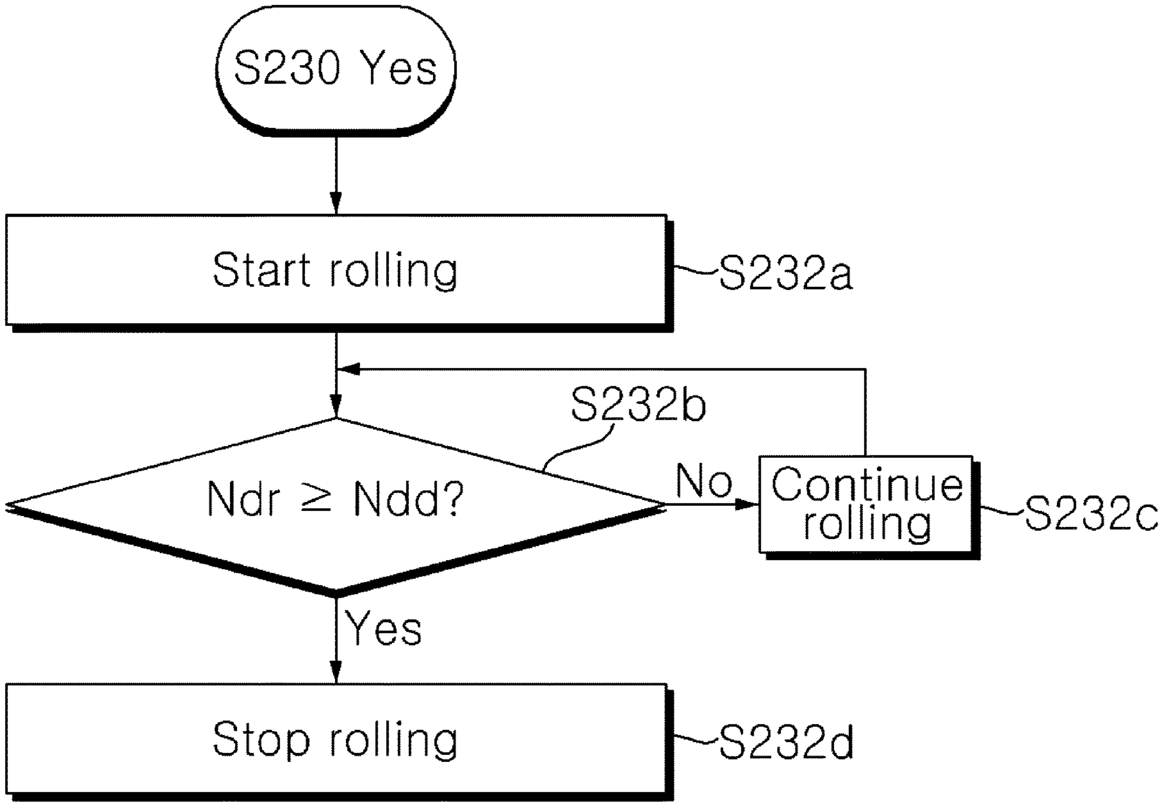

【FIG. 87】
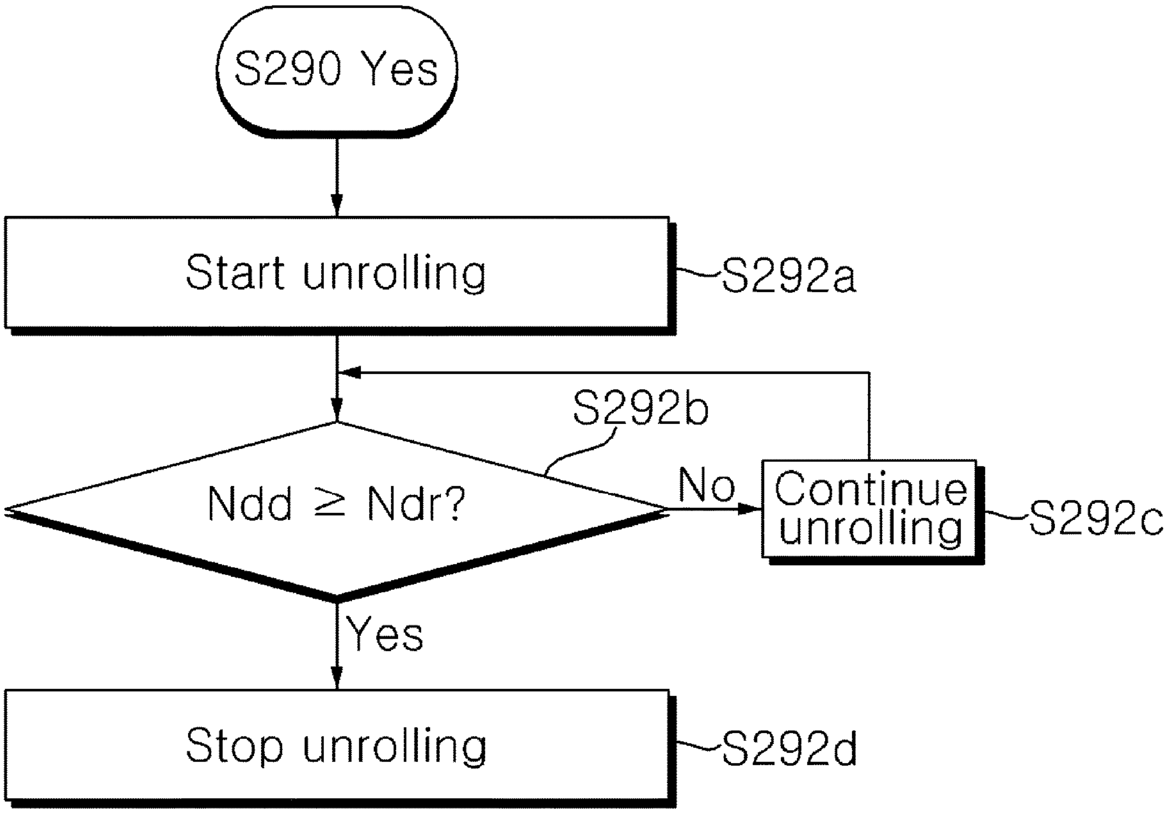

【FIG. 88】
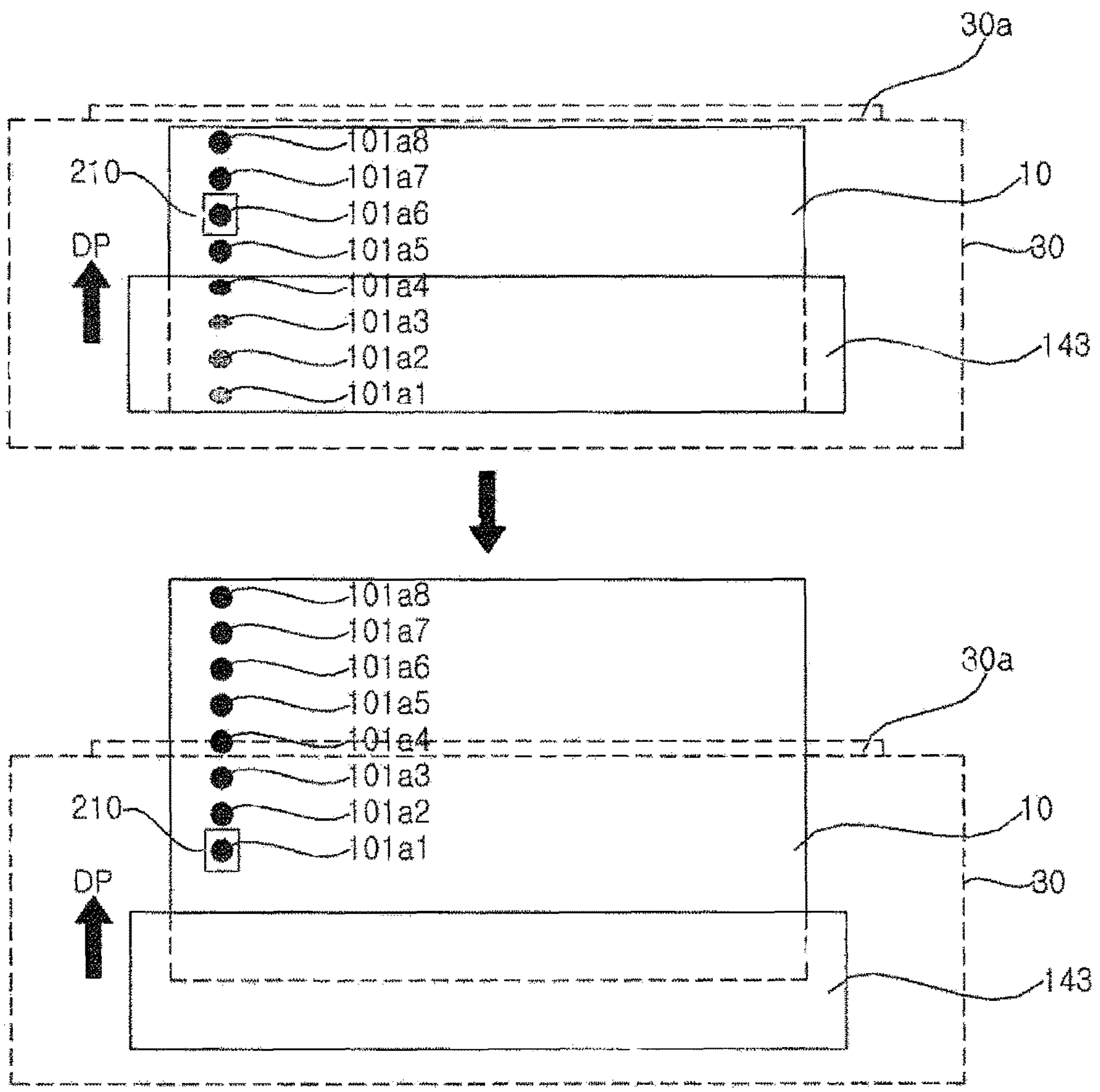

【FIG. 89】
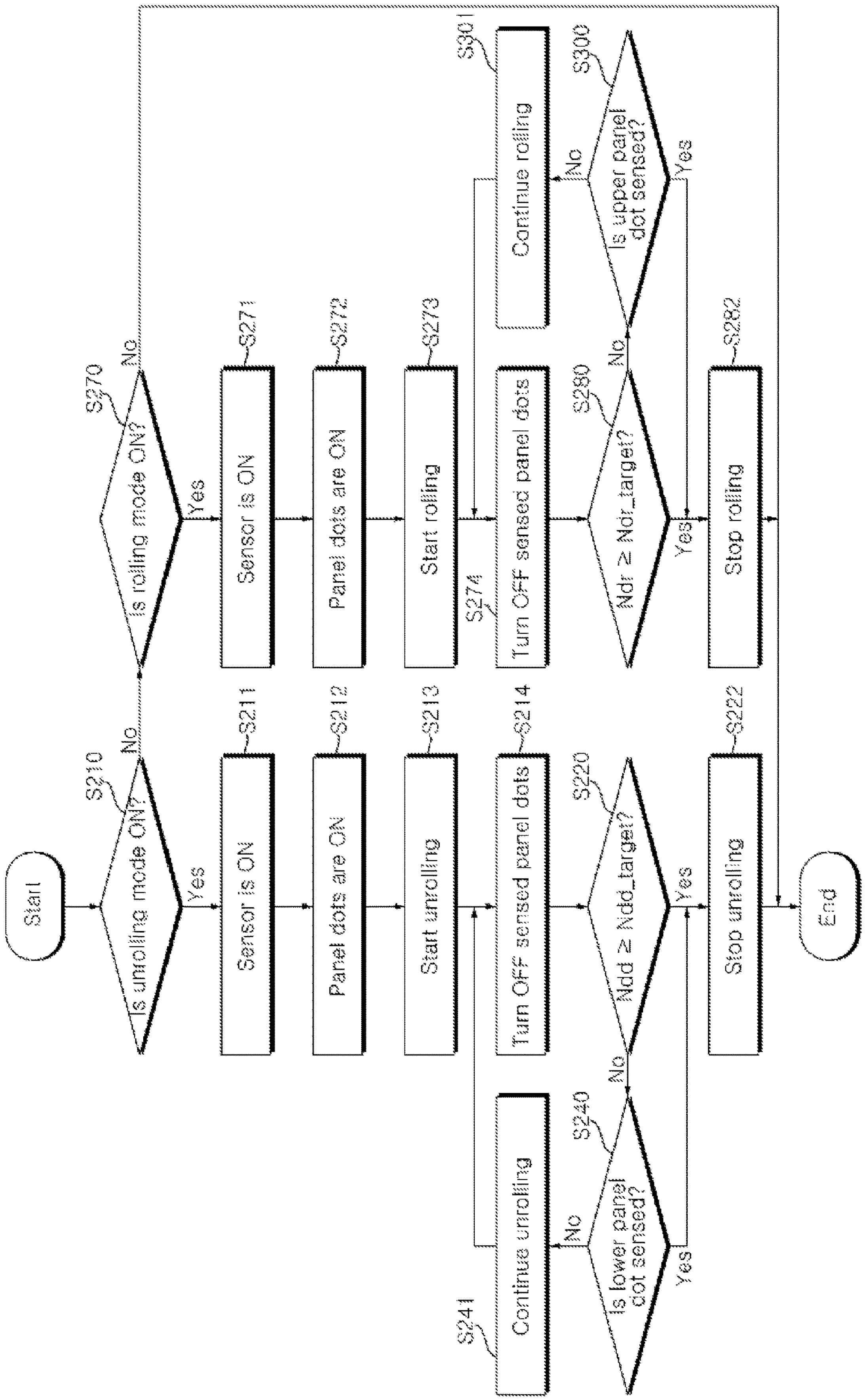

【FIG. 90】
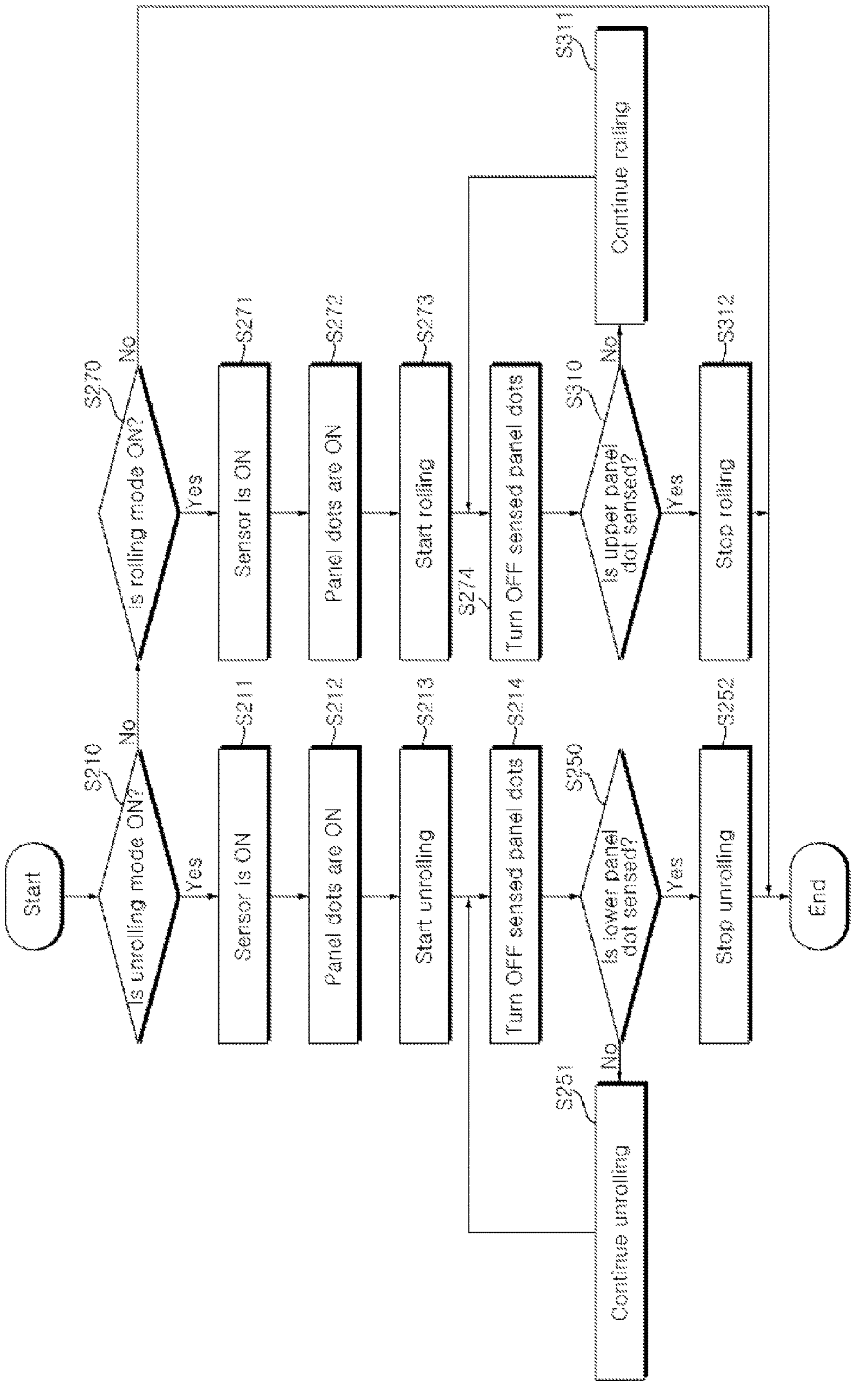

【FIG. 91】
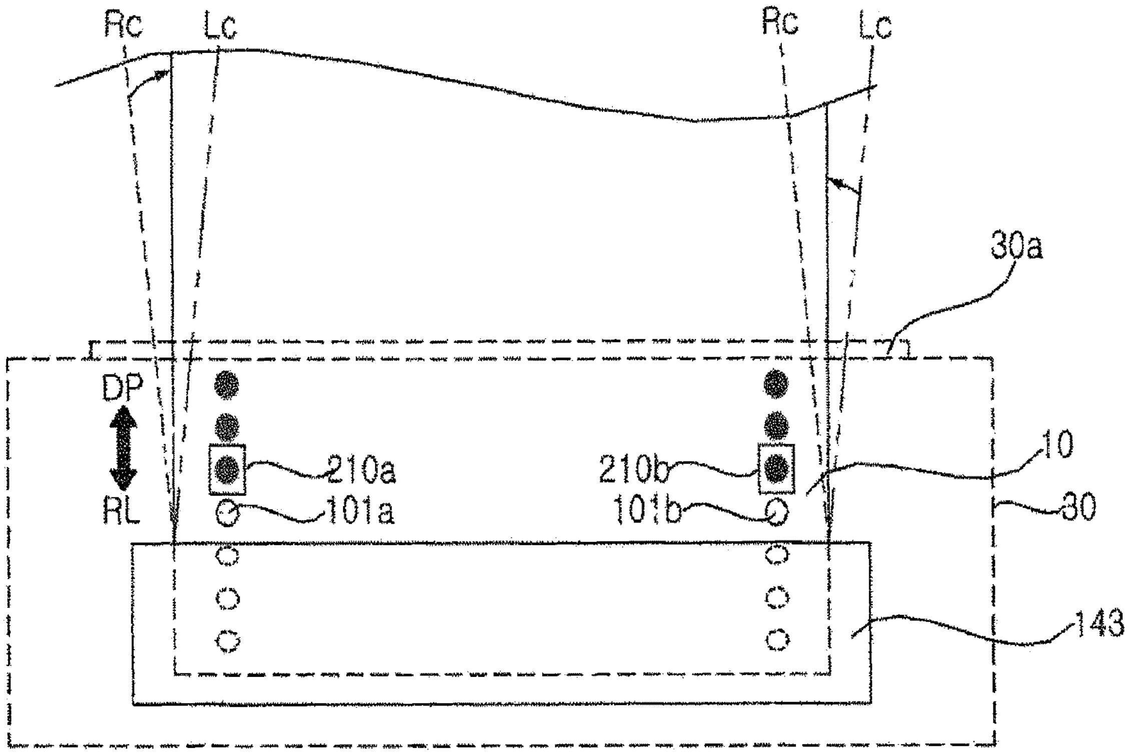

【FIG. 92】
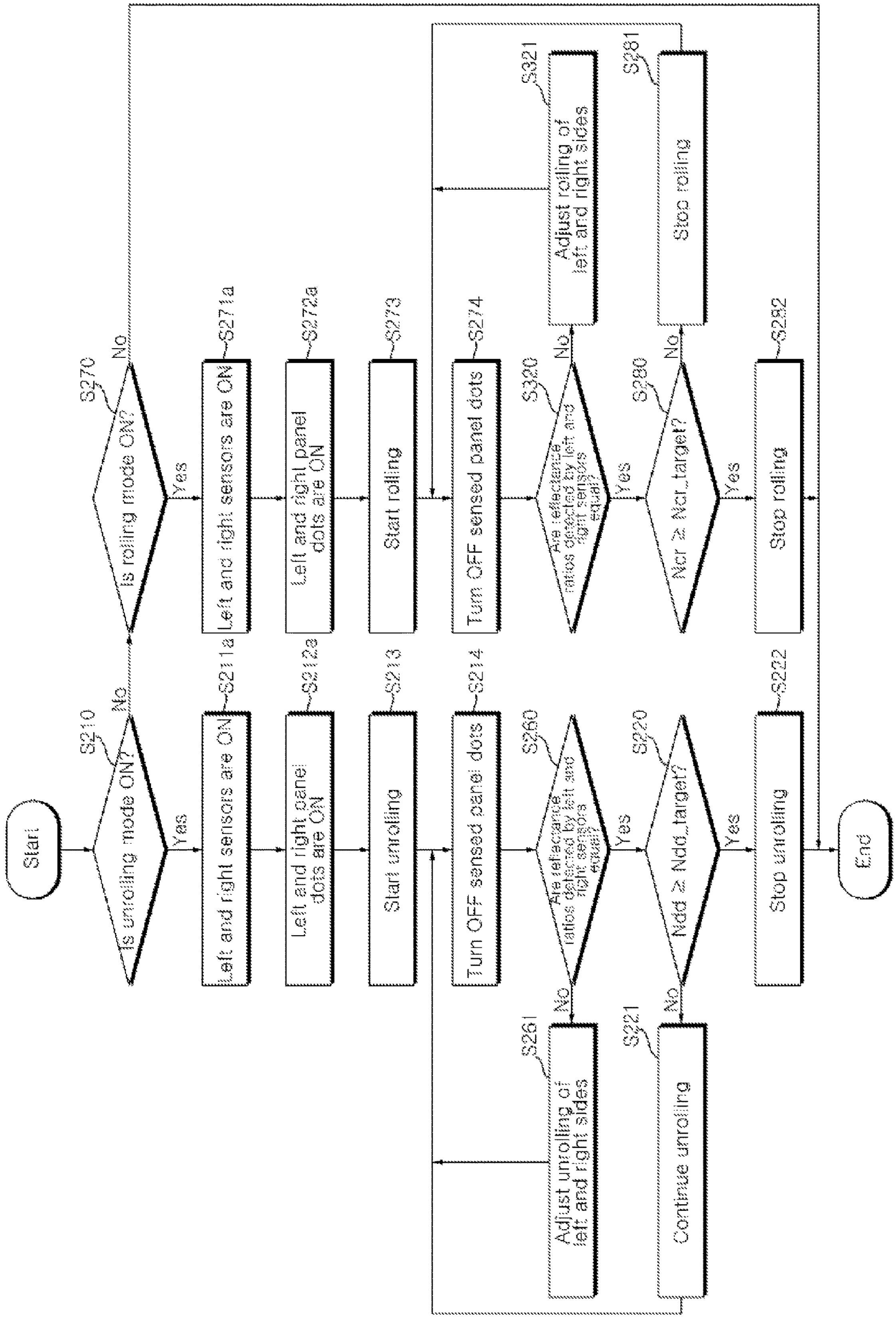

DISPLAY DEVICE WITH FLEXIBLE DISPLAY PANEL

CROSS-REFERENCE TO RELATED APPLICATION(S)

This application is the National Stage filing under 35 U.S.C. 371 of International Application No. PCT/KR2019/018793, filed on Dec. 31, 2019, the contents of which are all incorporated by reference herein in its entirety.

TECHNICAL FIELD

The present disclosure relates to a display device.

BACKGROUND ART

As the information society has developed, the demand for display device is increasing in various forms, and accordingly, in recent years, various display devices such as a liquid crystal display (LCD), plasma display panel (PDP), electroluminescent display (ELD), vacuum fluorescent display (VFD), and the like have been studied and used.

Among them, a display device using an organic light emitting diode (OLED) has excellent luminance and viewing angle characteristics in comparison with a liquid crystal display device and does not require a backlight unit, thereby being implemented in an ultrathin type.

In addition, a flexible display panel can be bent or wound around a roller. The flexible display panel may be used to implement a display device that unfolds on a roller or winds around the roller. Many studies have been made on a structure for winding a flexible display panel around a roller or unwinding the flexible display panel from the roller.

DISCLOSURE

Technical Problem

An object of the present disclosure is to solve the above and other problems.

Another object of the present disclosure is to provide a display device capable of minimizing variations in the movement of a display panel which is repeatedly wound around or unwound from a roller.

Another object of the present disclosure is to provide a display device capable of continuously detecting and adjusting the movement of a display panel when it is wound around or unwound from a roller.

Another object of the present disclosure is to provide a display device capable of detecting and adjusting tilting of a display panel to the left or right when it is wound around or unwound from a roller.

Technical Solution

According to an aspect of the present disclosure for achieving the above objects, provided is a display device including: a flexible display panel; a module cover which is disposed at a rear of the display panel; a roller on or from which the display panel and the module cover are wound or unwound; a sensor which is disposed adjacent to the display panel and the module cover so as to sense movements of the display panel and the module cover; and a controller which controls a degree of winding or unwinding of the display panel and the module cover on or from the roller based on information on the movements acquired by the sensor.

Advantageous Effects

A display device according to the present disclosure has the following effects.

According to at least one of the embodiments of the present disclosure, it is possible to provide a display device capable of minimizing variations in the movement of a display panel which is repeatedly wound around or unwound from a roller.

According to at least one of the embodiments of the present disclosure, it is possible to provide a display device capable of continuously detecting and adjusting the movement of a display panel when it is wound around or unwound from a roller.

According to at least one of the embodiments of the present disclosure, it is possible to provide a display device capable of detecting and adjusting tilting of a display panel to the left or right when it is wound around or unwound from a roller.

Additional scope of applicability of the present disclosure will become apparent from the following detailed description. However, various changes and modifications within the spirit and scope of the present disclosure may be clearly understood by those skilled in the art, and thus, it should be understood that specific embodiments, such as the detailed description and preferred embodiments of the present disclosure, are given only by way of illustration.

DESCRIPTION OF DRAWINGS

FIGS. 1 to 92 are diagrams illustrating examples of a display device according to embodiments of the present disclosure.

MODE FOR DISCLOSURE

Hereinafter, embodiments of the present disclosure will be described in detail with reference to the accompanying drawings, however, the same or similar elements are denoted by the same reference numerals regardless of the reference numerals, and redundant description thereof will be omitted.

The suffixes "module" and "part" for components used in the following description are given or mixed in consideration of ease of specification, and do not have their own meaning or role.

Further, in describing the embodiments disclosed in this specification, when it is determined that the detailed description of the related art is likely to blur the gist of the embodiment disclosed in this specification, a detailed description thereof will be omitted. Also, the accompanying drawings are only for the purpose of easily understanding the embodiments disclosed in the present disclosure, and the technical idea disclosed in the present disclosure is not limited by the accompanying drawings, it should be understood that the present disclosure include all modifications, equivalents and substitutes included within the spirit and technical scope of the present disclosure.

The terms first, second, etc. may be used to describe various components, but the components are not limited by such terms. The terms are used only for the purpose of distinguishing one component from other components.

When an arbitrary component is described as "being connected to" or "being linked to" another component, this should be understood to mean that still another component (s) may exist between them, although the arbitrary component may be directly connected to, or linked to, the second component. In contrast, when an arbitrary component is described as "being directly connected to" or "being directly linked to" another component, this should be understood to mean that no component exists between them.

A singular expression can include a plural expression as long as it does not have an apparently different meaning in context.

In the following description, even if an embodiment is described with reference to a specific figure, if necessary, a reference numeral not shown in the specific figure may be referred to, and a reference numeral not shown in the specific figure is used when the reference numeral is shown in the other figures.

Referring to FIG. 1, a display device 100 may include a display unit 20 and a housing 30. The housing 30 may have an internal space. At least a portion of the display unit 20 may be located inside the housing 30. At least a portion of the display unit 20 may be located outside the housing 30. The display unit 20 may display a screen.

The direction parallel to the longitudinal direction of the housing 30 may be referred to as a first direction DR1, a +x axis direction, ?x axis direction, a leftward direction, or a rightward direction. The direction in which the display unit 20 displays a screen may be referred to as a +z axis, a forward direction, or the front. The direction opposite the direction in which the display unit 20 displays an image may be referred to as a ?z axis, a rearward direction, or the rear. A third direction DR3 may be parallel to the +z axis direction or the −z axis direction. The direction parallel to the height direction of the display device 100 may be referred to as a second direction DR2, a +y axis direction, a −y axis direction, an upward direction, or a downward direction.

The third direction DR3 may be a direction perpendicular to the first direction DR1 and/or the second direction DR2. The first direction DR1 and the second direction DR2 may be collectively referred to as a horizontal direction. In addition, the third direction DR3 may be referred to as a vertical direction. A leftward-rightward direction LR may be parallel to the first direction DR1, and an upward-downward direction UD may be parallel to the second direction DR2.

Referring to FIG. 2, the display unit 20 may be entirely located inside the housing 30. At least a portion of the display unit 20 may be located outside the housing 30. The degree to which the display unit 20 is exposed to the outside of the housing 30 may be adjusted as necessary.

Referring to FIG. 3, the display unit 20 may include a display panel 10 and a plate 15. The display panel 10 may be flexible. For example, the display panel 10 may be an organic light emitting display (OLED).

The display panel 10 may have a front surface for displaying an image. The display panel 10 may have a rear surface facing the front surface. The front surface of the display panel 10 may be covered with a light transmissive material. For example, the light transmissive material may be a synthetic resin or film.

The plate 15 may be coupled, fastened, or attached to the rear surface of the display panel 10. The plate 15 may include a metal material. The plate 15 may be referred to as a module cover 15, a cover 15, a display panel cover 15, a panel cover 15, or an apron 15.

Referring to FIG. 4, the plate 15 may include a plurality of segments 15*c*. A magnet 64 may be located inside a recess 118 of the segment 15*c*. The recess 118 may be located on a surface of the segment facing the display panel 10. The recess 118 may be located in the front surface of each segment 15*c*. Since the magnet 64 is received inside the recess 118, the magnet 64 may not protrude from the segment 15*c*. The display panel 10 may be flat without being wrinkled even when it is in contact with the segment 15*c*.

Referring to FIG. 5, a plurality of magnets 64 may be positioned on a link 73. For example, at least one magnet 64 may be positioned on a first arm 73*a*, and at least one magnet 64 may be positioned on a second arm 73*b*. The plurality of magnets 64 may be spaced apart from each other.

Referring to FIG. 6, one magnet 64 may be positioned on each of the first arm 73*a* and the second arm 73*b*. The magnet 64 may have a shape extending in a long side direction of the first arm 73*a* and the second arm 73*b*. Because the magnet 64 has the shape extending in the long side direction of the first arm 73*a* and the second arm 73*b*, an area of a portion where the link 73 is in close contact with the display panel and the module cover can be increased. Hence, adhesion between the link 73 and the display panel and the module cover can be increased.

Referring to FIG. 7, the magnet 64 may be positioned in a recess 321 formed on the link 73. The recess 321 may have a shape recessed to the inside of the link 73. The magnet 64 may be coupled to the link 73 through at least one screw 187.

A width LHW of the recess 321 recessed to the inside of the link 73 may be equal to or greater than a thickness MGW of the magnet 64. If the thickness MGW of the magnet 64 is greater than the width LHW of the recess 321, the display panel 10 and the module cover 15 may not be in close contact with the link 73. In this case, the display panel 10 may be wrinkled or may not be flat.

A panel protection portion 97 may be disposed on the rear surface of the display panel 10. The panel protection portion 97 can prevent an impact that the display panel 10 receives due to a friction with the module cover 15. The panel protection portion 97 may include a metal material. The panel protection portion 97 may have a very thin thickness. For example, the panel protection portion 97 may be about 0.1 mm thick.

Because the panel protection portion 97 includes a metal material, a mutual attraction may act between the panel protection portion 97 and the magnet 64. Even if the module cover 15 between the panel protection portion 97 and the link 73 does not include a metal material, the module cover 15 may be in close contact with the magnet 64.

Referring to FIG. 8, the module cover 15 may be in close contact with the link 73 by an upper bar 75 on the upper side and a guide bar 234 (see FIG. 15) on the lower side. A portion of the link 73 between the upper bar 75 and the guide bar 234 may not be in close contact with the module cover 15. Alternatively, a central portion of the link 73 may not be in close contact with the module cover 15. The central portion of the link 73 may be around an arm joint 152. In this case, distances APRD1 and APLD2 between the module cover 15 and the link 73 may not be constant. In this case, the display panel 10 may flex or bend.

Referring to FIG. 9, when the magnet 64 is positioned on the recess 321 of the link 73, the magnet 64 may be in close contact with both the module cover 15 and the panel protection portion 97 at the same time because the magnet 64 pulls the panel protection portion 97. That is, the central portion of the link 73 may be in close contact with the module cover 15.

Referring to FIG. 10, a bead 136 may be formed on an upper surface of a segment 15*b*. The bead 136 may have a shape recessed to the inside of the segment 15*b*. The bead 136 may have a shape recessed in the ?y axis direction. For example, the bead 136 may be formed by pressing the segment 15*b*. A plurality of beads 136 may be formed on the segment 15*b*. The plurality of beads 136 may be spaced apart from each other. The beads 136 can improve the rigidity of the segment 15*b*. For example, the bead 136 can prevent the shape of the segment 15*b* from being deformed by an external impact.

Referring to FIG. 11, a source PCB 120 may be positioned on the upper side of the module cover 15. In the case of roll-down or roll-up, the position of the source PCB 120 may change depending on the movement of the module cover 15. An FFC cable 231 may be positioned in the center of the module cover 15 with respect to the first direction. The FFC cable 231 may be positioned on opposite ends of the module cover 15 with respect to the first direction.

Referring to FIG. 12, a segment 15*d* may include a recess 425 that is recessed in the −z axis direction. The recess 425 may form a space between the display panel 10 and the module cover 15. The FFC cable 231 may be received in the space formed by the recess 425. The recess 425 can improve the rigidity of the segment 15*d*.

The bead 136 may be positioned on the segment 15*d* except the part where the recess 425 is positioned. The bead 136 may not be positioned in the part where the recess 425 is formed, because the thickness of the segment 15*d* in the third direction is decreased.

Referring to FIG. 13, a segment 15*e* may have a through portion 437 positioned in the center with respect to the first direction. The through portion 437 may pass through a central portion of the segment 15*e* in the second direction. Namely, the through portion 437 may be a hole positioned in the segment 15*e*. The through portion 437 may be a portion in which the FFC cable 231 is positioned. Because the through portion 437 is formed inside the segment 15*e*, the thickness of the segment 15*e* may be reduced compared to when the FFC cable 231 is positioned in the recess 425.

The bead 136 may be positioned on the segment 15*e* except the part where the through portion 437 is positioned. The bead 136 may not be positioned in the part where the through portion 437 is formed, because the thickness of the segment 15*e* in the third direction decreases.

Referring to FIG. 14, a top case 167 may cover the source PCB 120 and the upper bar 75 as well as the display panel 10 and the module cover 15. One surface of the upper bar 75 may be coupled to the rear surface of the module cover 15, and the other surface of the upper bar 75 may be coupled to the source PCB 120. The upper bar 75 may be fixed to the module cover 15 and may support the source PCB 120.

A lower end of the FFC cable 231 may be connected to a timing controller board 105 (see FIG. 15) inside a panel roller 143 (see FIG. 15). The FFC cable 231, together with the display unit 20, may be wound around or unwound from the panel roller 143.

A portion of the FFC cable 231 may be positioned between the display panel 10 and the module cover 15. The portion of the FFC cable 231 that is positioned between the display panel 10 and the module cover 15 may be referred to as a first portion 231*a*. The first portion 231*a* may be positioned in the recess 425 in which the plurality of segments 15*d* is formed. Alternatively, the first portion 231*a* may be received in the recess 425 in which the plurality of segments 15*d* is formed.

A portion of the FFC cable 231 may pass through a segment 15*f*. The portion of the FFC cable 231 that passes through the segment 15*f* may be referred to as a second portion 231*b*. The segment 15*f* may include a first hole 521*a* formed at a front surface and a second hole 521*b* formed at a rear surface. The first hole 521*a* and the second hole 521*b* may be connected to each other to form one hole 521. The hole 521 may pass through the segment 15*f* in the third direction. The second portion 231*b* may pass through the hole 521. The hole 521 may be referred to as a connection hole 521.

An upper end of the FFC cable 231 may be electrically connected to the source PCB 120. A portion of the FFC cable 231 may be positioned on the rear surface of the module cover 15. The portion of the FFC cable 231 that is positioned on the rear surface of the module cover 15 may be referred to as a third portion 231*c*. The third portion 231*c* may be electrically connected to the source PCB 120.

The third portion 231*c* may be covered by the top case 167. Hence, the third portion 231*c* may not be exposed to the outside.

Referring to FIG. 15, the FFC cable 231 may be connected to the timing controller board 105 mounted on the panel roller 143. A through hole 615 may be formed on the panel roller 143, and the FFC cable 231 maybe connected to one side of the timing controller board 105 through the through hole 615.

The through hole 615 may be positioned on one side of the panel roller 143 and may pass through an outer circumferential portion of the panel roller 143. The FFC cable 231 may be connected to one side of the timing controller board 105 through the through hole 615.

Even if the FFC cable 231 is positioned on the outer circumference of the panel roller 143, the connection between the FFC cable 231 and the timing controller board 105 can be maintained by the through hole 615. Hence, the FFC cable 231 rotates together with the panel roller 143 and may not be twisted.

A portion of the FFC cable 231 may be wound around the panel roller 143. The portion of the FFC cable 231 wound around the panel roller 143 may be referred to as a fourth portion 231*d*. The fourth portion 231*d* may come into contact with an outer circumferential surface of the panel roller 143.

A portion of the FFC cable 231 may pass through the through hole 615. The portion of the FFC cable 231 that passes through the through hole 615 may be referred to as a fifth portion 231*e*.

The lower end of the FFC cable 231 may be electrically connected to the timing controller board 105. A portion of the FFC cable 231 may be positioned inside the panel roller 143. The portion of the FFC cable 231 that is positioned inside the panel roller 143 may be referred to as a sixth portion 231*f*. The sixth portion 231*f* may be electrically connected to the timing controller board 105.

Referring to FIG. 16, the lower end of the display panel 10 may be connected to the roller 143. The display panel 10 may be wound around or unwound from the roller 143. The front surface of the display panel 10 may be coupled to a plurality of source PCBs 120. The plurality of source PCBs 120 may be spaced apart from each other.

A source chip on film (COF) 123 may connect the display panel 10 and the source PCBs 120. The source COF 123 may be located at the front surface of the display panel 10. The roller 143 may include a first part 331 and a second part 337. The first part 331 and the second part 337 may be fastened by a screw. A timing controller board 105 may be mounted in the roller 143.

The source PCBs 120 may be electrically connected to the timing controller board 105. The timing controller board 105 may send digital video data and timing control signals to the source PCBs 120.

A cable 117 may electrically connect the source PCBs 120 and the timing controller board 105. For example, the cable 117 may be a flexible flat cable (FFC). The cable 117 may pass through a hole 331*a*. The hole 331*a* may be formed in a seating portion 379 or the first part 331. The cable 117 may be located between the display panel 10 and the second part 337.

The seating portion 379 may be formed in an outer circumference of the first part 331. The seating portion 379 may be formed by stepping a portion of the outer circumference of the first part 331. The seating portion 379 may form a space B. When the display unit 20 is wound around the roller 143, the source PCBs 120 may be received in the seating portion 379. Since the source PCBs 120 are received in the seating portion 379, they may not be warped or bent, and their durability may be improved.

The cable 117 may electrically connect the timing controller board 105 and the source PCBs 120.

Referring to FIG. 17, the roller 143 with the display unit 20 wound around it may be installed on a first base 31. The first base 31 may be the bottom of the housing 30. The roller 143 may extend longitudinally in a lengthwise direction of the housing 30. The first base 31 may be connected to a side 30*a* of the housing 30.

Referring to FIGS. 18 and 19, the beam 31*a* may be formed on the first base 31. The beam 31*a* may improve the bending or torsional rigidity of the first base 31. A number of parts may be installed on the first base 31, and the first base 31 may be subjected to a high load. With the improvement in rigidity, the first base 31 may be prevented from sagging under the load. For example, the beam 31*a* may be formed by a press process.

A second base 32 may be spaced upward apart from the first base 31. A space S1 may be formed in the first base 31 and the second base 32. The roller 143 with the display unit 20 wound around it may be received in the space S1. The roller 143 may be positioned between the first base 31 and the second base 32.

The second base 32 may be connected to the side 30*a* of the housing 30. A bracket 33 may be fastened to an upper side of the first base 31. The bracket 33 may be fastened to the side 30*a* of the housing 30.

A beam 32*a* may be formed at the second base 32. The beam 32*a* may improve the bending or torsional rigidity of the second base 32. For example, the beam 32*a* may be formed by a press process.

A third part 32*d* may be connected to a first part 32*b* and a second part 32*c*. A fourth part 32*e* may be connected to the first part 32*b* and the second part 3. A space S2 may be formed between the third part 32*d* and the fourth part 32*e*. Accordingly, the bending or torsional rigidity of the second base 32 may be improved. The third part 32*d* may be a reinforcing rib 32*d* or a rib 32*d*. The fourth part 32*e* may be a reinforcing rib 32*e* or a rib 32*e*.

A number of parts may be installed on the second base 32, and the second base 32 may be subjected to a high load. With the improvement in rigidity, the second base 32 may be prevented from sagging under the load.

A first reinforcing plate 34 may be positioned between the first base 31 and the second base 32. The first reinforcing plate 34 and the second base 32 may be fastened with a screw. The first reinforcing plate 34 may support the second base 32. The first reinforcing plate may prevent the second base 32 from sagging. The first reinforcing plate 34 may be positioned in a central portion of the first base 31 or in a central portion of the second base 32. The first reinforcing plate 34 may include a curved portion 34*a*. The curved portion 34*a* may be formed along the roller 143. The curved portion 34*a* may not be in contact with the roller 143 or the display unit 20 wound around the roller 143. The curved portion 34*a* may keep a certain distance from the roller 143 so as not to disturb the rotation of the roller 143.

The second reinforcing plate 35 may be fastened to the first base 31 and the first reinforcing plate 34. The second reinforcing plate 35 may support the first reinforcing plate 34. The second reinforcing plate 35 may be positioned at the rear of the first reinforcing plate 34. The second reinforcing plate 35 may be positioned at the rear of the first base 31. The second reinforcing plate 35 may be positioned perpendicular to the first base 31. The second reinforcing plate 35 may be fastened to the beam 31*a* of the first base 31. The second base 32 may face the front or rear of the housing 30.

Referring to FIG. 20, the second base 32*f* may not form a space. If the load the second base 32*f* is subjected to is not high, the second base 32*f* may have enough rigidity by including a beam 32*g*. The first base 31' may include a beam 31*a'*.

Referring to FIGS. 21 and 22, a motor assembly 810 may be installed on the second base 32. Drive shafts may be formed on opposite sides of the motor assembly 810. A right drive shaft and a left drive shaft of the motor assembly 810 may rotate in the same direction. Alternatively, the right drive shaft and the left drive shaft of the motor assembly 810 may rotate in opposite directions.

The motor assembly 810 may include a plurality of motors. The plurality of motors may be connected in series with each other. The motor assembly 810 may output a high torque by connecting the plurality of motors in series.

Lead screws 840 may be positioned on the left and right sides of the motor assembly 810. The motor assembly 810 may be connected to the lead screws 840. Couplings 811 may connect the lead screws 840 and the drive shafts of the motor assembly 810.

Each of the lead screws 840 may be formed with a screw thread in the longitudinal direction. A direction of the screw thread of the right lead screw 840 and a direction of the screw thread of the left lead screw 840 may be opposite to each other. Alternatively, the direction of the screw thread of the right lead screw 840 and the direction of the screw thread of the left lead screw 840 may be the same. The left lead screw 840 and the right lead screw 840 may have the same pitch.

Bearings 830*a* and 830*b* may be installed on the second base 32. The bearings 830*a* and 830*b* may support opposite sides of the lead screws 840. The bearings 830*a* and 830*b* may include inner bearings 830*b* positioned closed to the motor assembly 810 and outer bearings 830*a* positioned far away from the motor assembly 810. The lead screws 840 may rotate stably by the bearings 830*a* and 830*b*.

Slides 820 may engage the lead screws 840. The slides 820 may move back and forth in the longitudinal direction of the lead screws 840 according to the rotation of the lead screws 840. The slides 820 may move between the outer bearing 830*a* and the inner bearing 830*b*. The slides 820 may be positioned on the left lead screw 840 and the right lead screw 840. The left slide 820 may engage the left lead screw 840. The right slide 820 may engage the right lead screw 840.

The left slide 820 and the right slide 820 may be symmetrical with respect to the motor assembly 810. By operation of the motor assembly 810, the left slide 820 and the right slide may be moved the same distance away from or close to each other.

Referring to FIG. 23, the motor assembly 810 may include a plate 813. The plate 813 may be referred to as a mount plate 813 or a motor mount plate 813. Coupling portions **32*h* may be formed on an upper surface of the second base 32. The plate 813 may be fastened to the coupling portions 32*h* through screws S. The motor assembly 810 may be spaced apart from the upper surface of the second base 32. Washers 813 may be positioned between an upper surface of the plate 813 and the screws S. The washers 813 may include a rubber material. The washers 813 may reduce vibration generated from the motor assembly 810. The washers 813 may improve the operation stability of the display device 100**.

Referring to FIG. 24, a guide rail 860 may be installed on the second base 32. The guide rail 860 may be positioned alongside the lead screws 840. The slides 820 may engage the guide rail 860. A first stopper **861*b* may be positioned on one side of the guide rail 860, and a second stopper 861*a* may be positioned on the other side of the guide rail 860. The range of movement of the slides 820 may be limited to the space between the first stopper 861*b* and the second stopper 861*a***.

A spring 850 may cover the lead screws 840. The lead screws 840 may be threaded through the spring 850. The spring 850 may be positioned between the inner bearing **830*b* and the slide 820. One side of the spring 850 may make contact with the inner bearing 830*b*, and the other side of the spring 850 may make contact with the slide 820. The spring 850 may provide elasticity to the slide 820**.

When the slide 820 gets stuck on the first stopper **861*b*, the spring 850 may be compressed to the maximum. When the slide 820 gets stuck on the first stopper 861*b*, the length of the spring 850 may be minimum. When the slide 820 gets stuck on the first stopper 861*b*, the distance between the slide 820 and the inner bearing 830*b*** may be minimum.

Referring to FIG. 25, when the slide 820 gets stuck on the second stopper **861*a*, the spring 850 may be stretched to the maximum. When the slide 820 gets stuck on the second stopper 861*b*, the length of the spring 850 may be maximum. When the slide 820 gets stuck on the second stopper 861*a*, the distance between the slide 820 and the inner bearing 830*b*** may be maximum.

Referring to FIG. 26, a first part **820*a* may engage with the guide rail 860. The first part 820*a* may move along the guide rail 860. The movement of the first part 820*a* may be restricted to the longitudinal direction of the guide rail 860. A second part 820*b* may be positioned over the first part 820*a*. The first part 820*a* and the second part 820*b* may be fastened through a screw. The second part 820*b* may be spaced apart from the guide rail 860. The lead screw 840 may penetrate the second part 820*b*. For example, the second part 820*b* may include a male thread that engages a female thread of the lead screw 840. Thus, even if the lead screw 840 rotates, the slide 820 does not rotate but may stably move back and forth along the guide rail 860**.

A third part **820*c* may be coupled to one side of the second part 820*b*. The third part 820*c* may make contact with the spring 850. The third part 820*c* may receive elasticity from the spring 850**.

Referring to FIGS. 27 and 28, a link mount 920 may be installed on the second base 32. One side of a second arm 912 may be pivotally connected to the link mount 920. The other side of the second arm 912 may be pivotally connected to a second shaft **913*b*. One side of a rod 870 may be pivotally connected to the slide 820. The other side of the rod 870 may be pivotally connected to the second arm 912 or a third arm 915. One side of the third arm 915 may be pivotally connected to the link mount 920. The other side of the rod 870 may be pivotally connected to the other side of the rod 870. The link mount 920 may include a shaft 921. The second arm 912 or the third arm 911 may be pivotally connected to the shaft 921**.

A link bracket 951 may be referred to as a link cap 951. The link bracket 951 may be coupled to a top case 950. The top case 950 may be referred to as a case top 950, an upper bar 950, a top 950, or a bar 950. The top case 950 may be positioned on an upper end of the display unit 20. The display unit 20 may be fixed to the top case 950.

One side of the first arm 911 may be pivotally connected to a joint 913. One side of the first arm 911 may be pivotally connected to a first shaft **913*a*. The other side of the first arm 911 may be pivotally connected to the link bracket 951 or the top case 950**.

A gear g1 may be formed on one side of the first arm 911. A gear g2 may be formed on the other side of the second arm 912. The gear g1 for the first arm 911 and the gear g2 for the second arm 912 may engage each other.

When the slide 820 moves close to the outer bearing **830*a*, the second arm 912 or the third arm 915 may be lifted. In this instance, the direction in which the second arm 912 or the third arm 915** is lifted may be referred to as a lifting direction DRS.

The second arm 912 may include a protrusion 914 which protrudes in the lifting direction DRS. The protrusion 914 may be referred to as a connecting portion 914. The third arm 915 may include a protrusion 916 which protrudes in the lifting direction DRS. The protrusion 916 may be referred to as a connecting portion 916. The protrusion 914 of the second arm 912 and the protrusion 916 of the third arm 915 may face or be in contact with each other. The other side of the rod 870 may be fastened to the protrusion 914 of the second arm 912 or the protrusion 916 of the third arm 915.

A link 910 may include the first arm 911, the second arm 912, the third arm 915, and/or the joint 913.

Referring to FIGS. 29 and 30, the angle between the second arm 912 or the third arm 915 and the second base 32 may be denoted by theta S. When the rod 870 is connected to an upper portion of the second part **820*b*, the angle between the rod 870 and the second base 32 may be denoted by theta A, and the minimum force required to lift the second arm 912 or the third arm 915 may be denoted by Fa. When the rod 870 is connected to a middle portion of the second part 820*b*, the angle between the rod 870 and the second base 32 may be denoted by theta B, and the minimum force required to lift the second arm 912 or the third arm 915 may be denoted by Fb. When the rod 870 is connected to a lower portion of the second part 820*b*, the angle between the rod 870 and the second base 32 may be denoted by theta C, and the minimum force required to lift the second arm 912 or the third arm 915** may be denoted by Fc.

If theta S is the same, the relationship of theta A<theta B<theta C may be established. Also, if theta S is the same, the relationship of Fc<Fb<Fa may be established. As long as the angle between the second arm 912 or the third arm 915 and the second base 32 is the same, the larger the angle between the rod 870 and the second base 32, the smaller the force required to lift the second arm 912 or the third arm 915. The rod 870 may reduce the load on the motor assembly 810 by being connected to the lower portion of the second part **820*b***.

Referring to FIG. 31, the rod 870' may not be connected to the protrusion of the second arm 912' or the protrusion of the third arm 915'. Given that the angle between the second arm 912' or the third arm 915' and the second base 32 is theta S, the angle between the rod 870' and the second base 32 may be denoted by theta 1, and the minimum force required for the rod 870' to lift the second arm 912' or the third arm 915' may be denoted by F1.

Referring to FIG. 32, the rod 870 may be connected to the protrusion 914 of the second arm 912 or the protrusion 916 of the third arm 915. Given that the angle between the second arm 912 or the third arm 915 and the second base 32 is theta S, the angle between the rod 870 and the second base 32 may be denoted by theta 2, and the minimum force required for the rod 870 to lift the second arm 912 or the third arm 915 may be denoted by F2.

Referring to FIG. 33, if theta S is the same, then theta 2 may be greater than theta 1. If theta S is the same, F1 may be greater than F2. As long as the angle between the second arm 912 and 912' and the second base 32 is the same, the greater the angle between the rod 870 and 870' and the second base 32, the smaller the force required to lift the second arm 912 and 912'. The rod 870, when connected to the protrusion 914 or 916, may cause the second arm 912 to be lifted by a smaller force than when it is not connected to the protrusion. The rod 870 may reduce the load on the motor assembly 810 by being connected to the protrusion 914 or 916.

Referring to FIG. 34, the second arm 912 or the third arm 915 may have a central axis CR. If the rod 870 is spaced apart from the central axis CR by a distance r and fastened to the second arm 912, then the angle between the rod 870 and the second base 32 may be denoted by theta 2, and the minimum force required for the rod 870 to lift the second arm 912 or the third arm 915 may be denoted by F3. If the rod 870 is spaced apart from the central axis CR by a distance r' and fastened to the second arm 912, then the angle between the rod 870 and the second base 32 may be denoted by theta 2', and the minimum force required for the rod 870 to lift the second arm 912 or the third arm 915 may be denoted by F4. If the rod 870 is spaced apart from the central axis CR by a distance r'' and fastened to the second arm 912, then the angle between the rod 870 and the second base 32 may be denoted by theta 2'', and the minimum force required for the rod 870 to lift the second arm 912 or the third arm 915 may be denoted by F5.

Referring to FIG. 35, if theta S is the same, then theta 2'' may be greater than theta 2', and theta 2' may be greater than theta 2. If theta S is the same, F3 may be greater than F4, and F4 may be greater than F5. The farther the rod 870 is fastened away from the central axis CR, the smaller the force required to lift the second arm 912. Since the rod 870 is fastened away from the central axis CR, the load on the motor assembly 810 can be reduced.

Referring to FIG. 36, the first arm 911 and the second arm 912 may be positioned in contact with or close to a rear surface of the display unit 20. Since the first arm 911 and the second arm 912 are in contact with or close to the rear surface of the display unit 20, the display unit 20 may be stably wound around or unwound from the roller. The link mount 920 may include a first part 922 and a second part 923. The first part 922 and the second part 923 may face each other. A space S4 may be formed between the first part 922 and the second part 923. The first part 922 may face the display part 20. The first part 922 may be positioned closer to the display unit 20 than the second part 923 is. The second arm 912 may be pivotally connected to a front surface of the first part 922. A portion of the third arm 915 may be received in the space S4, and be pivotally connected to the first part 922 and or the second part 923.

Referring to FIG. 37, the rod 870 may include a first part 871 and a second part 872. The first part 871 may include a connecting portion 871*a* on one side. The second part 872 of the slide 820 may form a space S5 therewithin. The connecting portion 871*a* may be inserted into the space S5. The connecting portion 871*a* may be pivotally connected to the second part 820*b* (see FIG. 36) of the slide 820. The other side of the first part 871 may be connected to one side of the second part 872. The other side of the second part 872 may be pivotally connected to the second arm 912 or the third arm 915. The first part 871 may form a space S3 therewithin. The first part 871 may include a hole 871*b*. The lead screw 840 may be received in the hole 871*b* or in the space S3.

The distance between the second part 872 and the display unit 20 may be D1. The second arm 912 may have a width W1. A portion of the third arm 915 that is received in the space S4 may have a thickness W3. The thickness W3 may be equal to the distance between the first part 922 and the second part 923. A portion of the third arm 914 that is not received in the space S4 may have a thickness W2. The first part 922 may have a thickness W4. The thickness W2 may be larger than the thickness W3. The thickness W2 may be equal to the sum of the thickness W3 and the thickness W4. D1 may be the sum of the thickness W1 and the thickness W2.

The second arm 912 may be positioned in contact with or closer to the rear surface of the display unit 20. The third arm 915 may be positioned between the second arm 912 and the second part 872. Because of the third arm 915, the second part 872 may stably transfer power to lift the second arm 912. The second part 872 may be moved forward with respect to the axis of rotation of the lead screw 840 and connected to the first part 871, in order to stably lift the second arm 912 or the third arm 915. Due to this, the clearance between the second arm 912 and the second part 872 may be minimized.

Referring to FIG. 38, a pusher 930 may be mounted to the link mount 920. The pusher 930 may be referred to as a lifter 930. The second part 930 may be fastened to the first part 931. A second part 932 may come into contact with or be separated from the link bracket 951. The second part 932 may be a material of high elasticity. The first part 931 may be a material of lower elasticity than the second part 932. The first part 931 may be a material of higher rigidity than the second part 932. The first part 931 and the second part 932 may be collectively referred to as a head 936. The head 936 may be positioned on an upper side of the link mount 920.

The third part 933 may be connected to the first part 931. Alternatively, the third part 933 may extend downward from the first part 931. The third part 933 may be referred to as a tail 933. The fourth part 934 may protrude from the third part 933. The link mount 920 may form a space S6, and the third part 933 may be received in the space S6. The space S6 may be open upward. The space S6 where the third part 933 is received may neighbor the space S4 (see FIG. 37) where the third arm 915 is received. The second part 932 of the link mount 920 may include a hole 924. The hole 924 may be a vertical long hole. The length of the hole 924 may be denoted by H1. A fourth part 934 may be inserted into the hole 924. A spring 935 may be received in the space S6. The spring 935 may be positioned under the third part 933. The spring 935 may provide elasticity to the third part 933 in the vertical direction.

The head 936 may be larger than the diameter of the space S6. When the head 936 gets stuck on an upper end of the space S6, the height to which the head 936 is elevated from the second base 32 may be minimum. The minimum height to which the head 936 is elevated may be denoted by H2. When the height to which the head 936 is elevated is minimum, the fourth part 934 may be stuck on a lower end of the space S6. When the height to which the head 936 is elevated is minimum, the spring 935 may be compressed to the maximum. When the height to which the head 936 is elevated is minimum, the elasticity provided by the spring 935 may be maximum. When the height to which the head 936 is elevated is minimum, the height to which the top case 950 is elevated may be minimum.

While the pusher 930 is in contact with the link bracket 951, it may provide elasticity to the link bracket 951. Due to this, the load applied to the motor assembly 810 to lift the link 910 may be lifted.

Referring to FIG. 39, when the link 910 is lifted sufficiently, the pusher 930 may be separated from the link bracket 951. Once the pusher 930 is separated from the link bracket 951, the height to which the head 936 is elevated from the second base 32 may be maximum. The maximum height to which the head 936 is elevated may be denoted by H3. When the height to which the head 936 is elevated is maximum, the fourth part 934 may be stuck on an upper end of the hole 924 (see FIG. 38). When the height to which the head 936 is elevated is maximum, the spring 935 may be stretched to the maximum. When the height to which the head 936 is elevated is maximum, the elasticity provided by the spring 935 may be minimum. The maximum height H3 to which the head 936 is elevated may be substantially equal to the sum of the minimum height H2 to which the head 936 is elevated and the length H1 of the hole.

Referring to FIG. 40, the display unit 20 may be in a state in which it is wound around the roller 143 to the maximum. The display device 100 may be symmetrical with respect to the motor assembly 810. The height to which the top case 950 is elevated may be minimum. The slide 820 may be in a position as close to the inner bearing 830*b* as possible. The slide 820 may be in a state in which it is stuck on the first stopper 861*b*. The spring 850 may be in a state in which it is compressed to the maximum. The pusher 930 may come in contact with the link bracket 951. The height to which the pusher 930 is elevated may be minimum.

Referring to FIG. 41, the display unit 20 may be in a state in which about half of it is wound around the roller 143. The display device 100 may be symmetrical with respect to the motor assembly 810. The display unit 20 may be in a state in which about half of it is unwound from the roller 143. The slide 820 may be positioned between the first stopper 861*b* and the second stopper 861*a*. The pusher 930 may be separated from the link bracket 951. The height to which the pusher 930 is elevated may be maximum.

Referring to FIG. 42, the display unit 20 may be in a state in which it is unwound from the roller 143 to the maximum. The display device 100 may be symmetrical with respect to the motor assembly 810. The height to which the top case 950 is elevated may be maximum. The slide 820 may be in a position as close to the outer bearing 830*a* as possible. The slide 820 may be in a state in which it is stuck on the second stopper 861*a*. The spring 850 may be in a state in which it is stretched to the maximum. The pusher 930 may be separated from the link bracket 951. The height to which the pusher 930 is elevated may be maximum.

Referring to FIGS. 43 to 46, link mounts 920*a* and 920*b* may be installed on the base 31. The link mounts 920*a* and 920*b* may include a right link mount 920*a* spaced rightward from the first right bearing 830*a* and a left link mount 920*b* spaced leftward from the second left bearing 830*d*.

Links 910*a* and 910*b* may be connected to the link mounts 920*a* and 920*b*. The links 910*a* and 910*b* may include a right link 910*a* connected to the right link mount 920*a* and a left link 910*b* connected to the left link mount 920*b*.

The right link 910*a* also may be referred to as a first link. The left link 910*b* also may be referred to as a second link. The right link mount 920*a* also may be referred to as a first link mount 920*a*. The left link mount 920*b* also may be referred to as a second link mount 920*b*.

The links 910*a* and 910*b* may include first arms 911*a* and 911*b*, second arms 912*a* and 912*b*, and arm joints 913*a* and 913*b*. One side of the second arms 912*a* and 912*b* may be rotatably connected to the link mounts 920*a* and 920*b*. The other side of the second arms 912*a* and 912*b* may be rotatably connected to the arm joints 913*a* and 913*b*. One side of the first arms 911*a* and 911*b* may be rotatably connected to the arm joints 913*a* and 913*b*. The other side of the first arms 911*a* and 911*b* may be rotatably connected to link brackets 951*a* and 951*b*.

The link brackets 951*a* and 951*b* may include a right link bracket 951*a* connected to the first arm 911*a* of the right link 910*a* and a left link bracket 951*b* connected to the first arm 911*b* of the left link 910*b*. The link brackets 951*a* and 951*b* may be connected to the upper bar 950.

The upper bar 950 may connect the right link bracket 951*a* and the left link bracket 951*b*.

The rods 870*a* and 870*b* may connect sliders 860*a* and 860*b* and the links 910*a* and 910*b*. One side of the rods 870*a* and 870*b* may be rotatably connected to the sliders 860*a* and 860*b*. The other side of the rods 870*a* and 870*b* may be rotatably connected to the second arms 912*a* and 912*b*. The rods 870*a* and 870*b* may include a right rod 870*a* connecting the right slider 860*a* and the second arm 912*a* of the right link 910*a* and a left rod 870*b* connecting the left slider 860*b* and the second arm 912*b* of the left link 910*b*. The right rod 870*a* may be referred to as a first rod 870*a*. The left rod 870*b* may be referred to as a second rod 870*b*.

More specifically, a structure formed by the right lead screw 840*a*, the right slider 860*a*, the right rod 870*a*, and the right link 910*a* is described. The right slider 860*a* may include a body 861*a* and a load mount 862*a*. A screw thread SS may be formed on an inner perimeter surface of the body 861*a*. The screw thread SS formed on the body 861*a* may engage a screw thread RS of the right lead screw 840*a*. The right lead screw 840*a* may pass through the body 861*a*.

The load mount 862*a* may be formed on the right side of the body 861*a*. The rod mount 862*a* may be rotatably connected to one side of the right rod 870*a*. The rod mount 862*a* may include a first rod mount 862*a*1 and a second rod mount 862*a*2. The first rod mount 862*a*1 may be disposed in front of the right lead screw 840*a*, and the second rod mount 862*a*2 may be disposed behind the right lead screw 840*a*. The first rod mount 862*a*1 and the second rod mount 862*a*2 may be spaced apart from each other. The second rod mount 862*a*2 may be spaced apart from the first rod mount 862*a*1 in the −z axis direction. The right lead screw 840*a* may be positioned between the first rod mount 862*a*1 and the second rod mount 862*a*2.

The rod mount 862*a* may be rotatably connected to one side of the right rod 870*a* through a connection member C1. The connection member C1 may pass through the rod mount 862*a* and the right rod 870*a*.

The right rod 870*a* may be rotatably connected to the second arm 912*a* through a connection member C2. The connection member C2 may pass through the second arm 912*a* and the right rod 870*a*.

The right rod 870*a* may include a transfer portion 871*a* connected to the second arm 912*a* of the right link 910*a* and a cover 872*a* connected to the rod mount 862*a* of the right slider 860*a*. The transfer portion 871*a* may transfer, to the right link 910*a*, a force generated when the right slider 860*a* moves back and forth along the right lead screw 840*a*.

The cover 872*a* may include a first plate 873*a* disposed in front of the right lead screw 840*a*. The first plate 873*a* may be disposed perpendicular to the base 31. Alternatively, the first plate 873*a* may face the right lead screw 840*a*.

The cover 872*a* may include a second plate 874*a* disposed behind the right lead screw 840*a*. The second plate 874*a* may be disposed perpendicular to the base 31. Alternatively, the second plate 874*a* may face the right lead screw 840*a*. Alternatively, the second plate 874*a* may be spaced apart from the first plate 873 *a*. The right lead screw 840*a* may be positioned between the first plate 873*a* and the second plate 874*a*.

The cover 872*a* may include a third plate 875*a* connecting the first plate 873*a* and the second plate 874*a*. The third plate 875*a* may be connected to the transfer portion. The third plate 875*a* may be positioned on an upper side of the right lead screw 840*a*.

The cover 872*a* may include a fourth plate 876*a* connecting the first plate 873*a* and the second plate 874*a*. The fourth plate 876*a* may be connected to the third plate 875*a*. The fourth plate 876*a* may be positioned on the upper side of the right lead screw 840*a*.

One side of the first plate 873*a* may be connected to the first rod mount 862*a*1. The first plate 873*a* and the first rod mount 862*a*1 may be connected through a connection member C1'. The other side of the first plate 873*a* may be connected to the third plate 875*a*.

One side of the second plate 874*a* may be connected to the second rod mount 862*a*2. The second plate 874*a* and the second rod mount 862*a*2 may be connected through a connection member C1. The other side of the second plate 874*a* may be connected to the third plate 875*a*.

When the right slider 860*a* moves close to the motor assembly 810, the right lead screw 840*a* and the right rod 870*a* may come into contact with each other. When the right lead screw 840*a* and the right rod 870*a* come into contact each other, a mutual interference may occur, and the movement of the right slider 860*a* may be restricted.

The cover 872*a* may provide a space S1 therein. The first plate 873*a*, the second plate 874*a*, the third plate 875*a*, and the fourth plate 876*a* may form the space S1. When the right slider 860*a* moves close to the motor assembly 810, the right lead screw 840*a* may be received in or escape into the space S1 provided by the cover 872*a*. The right slider 860*a* may move closer to the motor assembly 810 than when there is no cover 872*a*, due to the space S1 provided by the cover 872*a*. That is, the cover 872*a* can increase the range of movement of the right slider 860*a* by providing the space S1 therein. In addition, there is an advantage in that the size of the housing 30 (see FIG. 2) can be reduced by receiving the right lead screw 840*a* in the cover 872*a*.

The cover 872*a* may limit the minimum value of an angle theta S formed by the second arm 912*a* and the base 31. When the angle theta S is sufficiently small, the third plate 875*a* of the cover 872*a* may come into contact with the second arm 912*a* and support the second arm 912*a*. The third plate 875*a* can limit the minimum value of the angle theta S and prevent the sagging of the second arm 912*a* by supporting the second arm 912*a*. That is, the cover 872*a* may serve as a stopper preventing the sagging of the second arm 912*a*. Further, the third plate 875*a* can reduce an initial load for lifting the second arm 912*a*, by limiting the minimum value of the angle theta S.

The lead screws 840*a* and 840*b* may be driven by one motor assembly 810. The second arms 912*a* and 912*b* may be lifted while being symmetrical to each other, by driving the lead screws 840*a* and 840*b* by one motor assembly 810. However, when the lead screws 840*a* and 840*b* are driven by one motor assembly 810, the load applied to the motor assembly 810 to lift the second arms 912*a* and 912*b* may be excessively increased. In this instance, the third plate 875*a* can reduce the load applied to the motor assembly 810 to lift the second arms 912*a* and 912*b* by limiting the minimum value of the angle theta S.

A structure formed by the left lead screw 840*b*, the left slider 860*b*, the left rod 870*b*, and the left link 910*b* may be symmetrical to the above-described structure formed by the right lead screw 840*a*, the right slider 860*a*, the right rod 870*a*, and the right link 910*a*. In this instance, the axis of symmetry may be the symmetry axis ys of the motor assembly 810.

Referring to FIG. 47, guides 850*a*, 850*b*, 850*c* and 850*d* may be connected to bearings 830*a*, 830*b*, 830*c* and 830*d*. The guides 850*a*, 850*b*, 850*c* and 850*d* may include right guides 850*a* and 850*b* disposed on the right side of the motor assembly 810 and left guides 850*c* and 850*d* disposed on the left side of the motor assembly 810.

One side of the right guides 850*a* and 850*b* may be connected to the first right bearing 830*a*, and the other side of the right guides 850*a* and 850*b* may be connected to the second right bearing 830*b*. The right guides 850*a* and 850*b* may be positioned parallel to the right lead screw 840*a*. Alternatively, the right guides 850*a* and 850*b* may be spaced apart from the right lead screw 840*a*.

The right guides 850*a* and 850*b* may include a first right guide 850*a* and a second right guide 850*b*. The first right guide 850*a* and the second right guide 850*b* may be spaced apart from each other. The right lead screw 840*a* may be positioned between the first right guide 850*a* and the second right guide 850*b*.

The right slider 860*a* may include a protrusion. Alternatively, the display device may include a protrusion formed on the right slider 860*a*. The protrusion may be formed on the body of the slider. The protrusion may include a front protrusion (not shown) that protrudes from the body 861*a* of the right slider 860*a* in the +z axis direction, and a rear protrusion 865*a* that protrudes from the body of the slider in the ?z axis direction.

The first right guide 850*a* may pass through the rear protrusion 865*a*. Alternatively, a first hole 863*a* may be formed in the rear protrusion, and the first right guide 850*a* may pass through the first hole 863*a*. The first hole 863*a* may be formed in the x axis direction. The first hole 863*a* may be referred to as a hole 863*a*.

The second right guide (not shown) may pass through the front protrusion (not shown). Alternatively, a second hole (not shown) may be formed in the front protrusion (not shown), and the second right guide may pass through the second hole. The second hole may be formed in the x axis direction.

The right guides 850*a* and 850*b* may guide the right slider 860*a* to move more stably when the right slider 860*a* moves back and forth along the right lead screw 840*a*. Since the right guides 850*a* and 850*b* stably guide the right slider 860*a*, the right slider 860*a* does not rotate about the right lead screw 840*a* and may move back and forth along the right lead screw 840*a*.

A structure formed by the left guides 850*c* and 850*d*, the left bearings 830*a*, 830*b*, 830*c* and 830*d*, the left slider 860*b*, and the left lead screw 840*b* may be symmetrical to the above-described structure formed by the right guides 850*a* and 850*b*, the right bearings 830*a*, 830*b*, 830*c* and 830*d*, the right slider 860*a*, and the right lead screw 840*a*. In this instance, the axis of symmetry may be the symmetry axis ys of the motor assembly 810.

Referring to FIG. 48, first springs 841*a* and 841*b* may be inserted into the lead screws 840*a* and 840*b*. Alternatively, the lead screws 840*a* and 840*b* may pass through the first springs 841*a* and 841*b*. The first springs 841*a* and 841*b* may include a first right spring 841*a* disposed on the right side of the motor assembly 810 and a first left spring 841*b* disposed on the left side of the motor assembly 810.

The first right spring 841*a* may be disposed between the right slider 860*a* and the second right bearing 830*b*. One end of the first right spring 841*a* may come into contact with or be separated from the right slider 860*a*, and the other end of the first right spring 841*a* may come into contact with or be separated from the second right bearing 830*b*.

When the second arm 912*a* lies fully on the base 31, the distance between the right slider 860*a* and the second right bearing 830*b* may be denoted by distance RD3. The first right spring 841*a* may have a length greater than the distance RD3 in an uncompressed or unstretched state. Thus, when the second arm 912*a* lies fully on the base 31, the first right spring 841*a* may be compressed between the right slider 860*a* and the second right bearing 830*b*. Further, the first right spring 841*a* may provide a restoring force to the right slider 860*a* in the +x axis direction.

When the second arm 912*a* changes from a fully lying position to a standing position with respect to the base 31, the restoring force provided by the first right spring 841*a* may assist the second arm 912*a* to be lifted. The first right spring 841*a* assists the second arm 912*a* to be lifted, and thus the load of the motor assembly 810 can be reduced.

The lead screws 840*a* and 840*b* may be driven by one motor assembly 810. The second arms 912*a* and 912*b* may be lifted while being symmetrical to each other, by driving the lead screws 840*a* and 840*b* by one motor assembly 810. However, when the lead screws 840*a* and 840*b* are driven by one motor assembly 810, the load applied to the motor assembly 810 to lift the second arms 912*a* and 912*b* may be excessively increased. In this instance, the first right spring 841*a* may assist the second arm 912*a* to be lifted, thereby reducing the load of the motor assembly 810, and the load applied to the motor assembly 810 to lift the second arm 912*a* may be reduced.

Alternatively, when the second arm 912*a* changes from a standing position to a fully lying position with respect to the base 31, the restoring force provided by the first right spring 841*a* may alleviate an impact generated when the second arm 912*a* lies on the base 31. That is, the first right spring 841*a* may serve as a damper when the second arm 912*a* lies on the base 31. As the first right spring 841*a* serves as the damper, the load of the motor assembly 810 can be reduced.

A structure formed by the first left spring 841*b*, the left bearings 830*a*, 830*b*, 830*c* and 830*d*, the left slider 860*b*, the left lead screw 840*b*, and the second arm 912*a* may be symmetrical to the above-described structure formed by the first right spring 841*a*, the right bearings 830*a*, 830*b*, 830*c* and 830*d*, the right slider 860*a*, the right lead screw 840*a*, and the second arm 912*a*. In this instance, the axis of symmetry may be the symmetry axis ys of the motor assembly 810.

Referring to FIG. 49, second springs 851*a* and 851*b* may be inserted into the guides 850*a*, 850*b*, 850*c* and 850*d*. Alternatively, the guides 850*a*, 850*b*, 850*c* and 850*d* may pass through the second springs 851*a* and 851*b*. The second springs 851*a* and 851*b* may include a second right spring 851*a* disposed on the right side of the motor assembly 810 and a second left spring 851*b* disposed on the left side of the motor assembly 810.

The second right spring 851*a* may be provided as a plurality of springs. The second right spring 851*a* may include springs 940*a* and 940*b* inserted into the first right guide 850*a* and springs 940*a* and 940*b* inserted into the second right guide 850*b*. Alternatively, the second right spring 851*a* may include springs 940*a* and 940*b* through which the first right guide 850*a* passes, and springs 940*a* and 940*b* through which the second right guide 850*b* passes.

The guides 850*a*, 850*b*, 850*c* and 850*d* may include locking jaws 852*a* and 852*b*. The locking jaws 852*a* and 852*b* may include a right locking jaw 852*a* disposed on the right side of the motor assembly 810 and a left locking jaw 852*b* disposed on the left side of the motor assembly 810.

The right locking jaw 852*a* may be disposed between the right slider 860*a* and the second right bearing 830*b*. The second right spring 851*a* may be disposed between the right slider 860*a* and the second right bearing 830*b*. One end of the second right spring 851*a* may come into contact with or be separated from the right slider 860*a*, and the other end of the second right spring 851*a* may come into contact with or be separated from the right locking jaw 852*a*.

When the second arm 912*a* lies fully on the base 31, the distance between the right slider 860*a* and the right locking jaw 852*a* may be denoted by distance RD4. The second right spring 851*a* may have a length greater than the distance RD4 in an uncompressed or unstretched state. Thus, when the second arm 912*a* lies fully on the base 31, the second right spring 851*a* may be compressed between the right slider 860*a* and the right locking jaw 852*a*. Further, the second right spring 851*a* may provide a restoring force to the right slider 860*a* in the +x axis direction.

When the second arm 912*a* changes from a fully lying position to a standing position with respect to the base 31, the restoring force provided by the second right spring 851*a* may assist the second arm 912*a* to be lifted. The second right spring 851*a* assists the second arm 912*a* to be lifted, and thus the load of the motor assembly 810 can be reduced.

The lead screws 840*a* and 840*b* may be driven by one motor assembly 810. The second arms 912*a* and 912*b* may be lifted while being symmetrical to each other, by driving the lead screws 840*a* and 840*b* by one motor assembly 810. However, when the lead screws 840*a* and 840*b* are driven by one motor assembly 810, the load applied to the motor assembly 810 to lift the second arms 912*a* and 912*b* may be excessively increased. In this instance, the second right spring 851*a* assists the second arm 912*a* to be lifted, thereby reducing the load of the motor assembly 810, and the load applied to the motor assembly 810 to lift the second arm 912*a* may be lifted.

Alternatively, when the second arm 912*a* changes from a standing position to a fully lying position with respect to the base 31, the restoring force provided by the second right spring 851*a* may alleviate an impact generated when the second arm 912*a* lies on the base 31. That is, the second right spring 851*a* may serve as a damper when the second arm 912*a* lies on the base 31. As the second right spring 851*a* serves as the damper, the load of the motor assembly 810 can be reduced.

A structure formed by the second left spring 851*b*, the left locking jaw 852*b*, the left slider 860*b*, the left guides 850*c* and 850*d*, and the second arm 912*a* may be symmetrical to the above-described structure formed by the second right spring 851*a*, the right locking jaw 852*a*, the right slider 860*a*, the right guides 850*a* and 850*b*, and the second arm 912*a*. In this instance, the axis of symmetry may be the symmetry axis ys of the motor assembly 810.

Referring to FIGS. 50 to 52, the second arm 912*a* may be lifted by receiving a restoring force from the first right spring 841*a* and the second right spring 851*a*.

An angle formed by the second arm 912*a* and the base 31 may be denoted by angle theta S. An angle formed by the right rod 870*a* and the base 31 may be denoted by angle theta T. A force required for the motor assembly 810 to move the right slider 860*a* in the +x axis direction may be denoted by FA. A force that the first right spring 841*a* applies to the right slider 860*a* may be denoted by FB. A force that the second right spring 851*a* applies to the right slider 860*a* may be denoted by FC. A force that the right rod 870*a* transfers to the second arm 912*a* may be denoted by FT.

When the second arm 912*a* lies fully on the base 31, the angle theta S and the angle theta T may have a minimum value. When the second arm 912*a* changes from a fully lying position to a standing position with respect to the base 31, the angle theta S and the angle theta T may be gradually increased.

When the second arm 912*a* lies fully on the base 31, the first right spring 841*a* may be compressed. The compressed first right spring 841*a* may provide a restoring force FB to the right slider 860*a*. The restoring force FB may act in the +x axis direction. When the second arm 912*a* lies fully on the base 31, the amount of compression displacement of the first right spring 841*a* may have a maximum value, and the magnitude of the restoring force FB may have a maximum value. When the second arm 912*a* changes from a fully lying position to a standing position with respect to the base 31, the amount of compression displacement amount of the first right spring 841*a* may be gradually decreased, and the magnitude of the restoring force FB may be gradually decreased.

When the second arm 912*a* lies fully on the base 31, the second right spring 851*a* may be compressed. The compressed second right spring 851*a* may provide a restoring force FC to the right slider 860*a*. The restoring force FC may act in the +x axis direction. When the second arm 912*a* lies fully on the base 31, the amount of compression displacement of the second right spring 851*a* may have a maximum value, and the magnitude of the restoring force FC may have a maximum value. When the second arm 912*a* changes from a fully lying position to a standing position with respect to the base 31, the amount of compression displacement of the second right spring 851*a* may be gradually decreased, and the magnitude of the restoring force FC may be gradually decreased.

The force FT that the right rod 870*a* transfers to the second arm 912*a* may be the sum of the force FA required for the motor assembly 810 to move the right slider 860*a* in the +x axis direction, the restoring force FB of the first right spring 841*a*, and the restoring force FC of the second right spring 851*a*.

When the second arm 912*a* begins to be lifted from a fully lying position with respect to the base 31, the load of the motor assembly 810 may be maximum. In this instance, the magnitude of the restoring force FB provided by the first right spring 841*a* may be maximum, and the magnitude of the restoring force FC provided by the second springs 851*a* and 851*b* may be maximum.

When the second arm 912*a* changes from a fully lying position to a standing position with respect to the base 31, the restoring forces provided by the first right spring 841*a* and the second right spring 851*a* may assist the second arm 912*a* to be lifted. The first right spring 841*a* and the second right spring 851*a* may assist the second arm 912*a* to be lifted, thereby reducing the load of the motor assembly 810.

The first right spring 841*a* and the second right spring 851*a* may simultaneously provide a restoring force (the sum of the restoring force FB and the restoring force FC) to the right slider 860*a*. The restoring force (the sum of the restoring force FB and the restoring force FC) may be provided to the right slider 860*a* until the distance RD5 between the right slider 860*a* and the right locking jaw 852*a* is equal to the length of the second right spring 851*a*.

When the distance RD5 between the right slider 860*a* and the right locking jaw 852*a* is equal to the length of the second right spring 851*a*, the amount of compression displacement of the second right spring 851*a* may be zero. When the amount of compression displacement of the second right spring 851*a* is zero, the restoring force FC that the second right spring 851*a* provides to the right slider 860*a* may be zero.

When the distance RD5 between the right slider 860*a* and the right locking jaw 852*a* is greater than the length of the second right spring 851*a*, only the first right spring 841*a* may provide the restoring force FB to the right slider 860*a*. The restoring force FB may be provided to the right slider 860*a* until the distance RD6 between the right slider 860*a* and the second right bearing 830*b* is equal to the length of the first right spring 841*a*.

When the distance RD6 between the right slider 860*a* and the second right bearing 830*b* is equal to the length of the first right spring 841*a*, the amount of compression displacement of the first right spring 841*a* may be zero. When the amount of compression displacement of the first right spring 841*a* is zero, the restoring force FB that the first right spring 841*a* provides to the right slider 860*a* may be zero.

When the distance RD6 between the right slider 860*a* and the second right bearing 830*b* is greater than the length of the first right spring 841*a*, the motor assembly 810 does not receive the restoring force from the first right spring 841*a* or the second right spring 851*a* and can lift the second arm 912*a*.

A structure formed by the first left spring 841*b*, the second left spring 851*b*, the left locking jaw 852*b*, the left slider 860*b*, the left guides 850*c* and 850*d*, the left lead screw 840*b*, the left rod 870*b*, and the second arm 912*a* may be symmetrical to the above-described structure formed by the first right spring 841 *a*, the second right spring 851 *a*, the right locking jaw 852*a*, the right slider 860*a*, the right guides 850*a* and 850*b*, the right lead screw 840*a*, the right rod 870*a*, and the second arm 912*a*. In this instance, the axis of symmetry may be the symmetry axis ys of the motor assembly 810.

Referring to FIG. 53, pushers 930*a* and 930*b* may be connected to the link mounts 920*a* and 920*b*. The pushers 930*a* and 930*b* may include a right pusher 930*a* disposed on the right side of the motor assembly 810 and a left pusher 930*b* disposed on the left side of the motor assembly 810.

The link mounts 920*a* and 920*b* may form an accommodation space A. The accommodation space A may accommodate the springs 940*a* and 940*b* and the pushers 930*a* and 930*b*. The springs 940*a* and 940*b* may include a right spring

940*a* disposed on the right side of the motor assembly 810 and a left spring 940*b* disposed on the left side of the motor assembly 810. The accommodation space A may be referred to an inner space A.

The link mounts 920*a* and 920*b* may include a first hole 922*a* connecting the accommodation space A and an outer space (first hole corresponding to the link mount 920*b* is not shown). The first hole 922*a* may be formed in the upper surfaces of the link mounts 920*a* and 920*b*. The first hole 922*a* may be referred to as a hole 922*a*.

The pushers 930*a* and 930*b* may be positioned perpendicular to the base 31. Alternatively, the pushers 930*a* and 930*b* may be disposed parallel to the y axis. The springs 940*a* and 940*b* may be positioned perpendicular to the base 31. Alternatively, the springs 940*a* and 940*b* may be disposed parallel to the y axis.

The pushers 930*a* and 930*b* may include first parts 931*a* and 931*b* and second parts 932*a* and 932*b*. The second parts 932*a* and 932*b* may be connected to lower sides of the first parts 931*a* and 931*b*. Lower ends of the second parts 932*a* and 932*b* may be connected to the springs 940*a* and 940*b*. The second parts 932*a* and 932*b* may be entirely or partially accommodated in the accommodation space A formed by the link mounts 920*a* and 920*b*. The second parts 932*a* and 932*b* may have a diameter equal to the diameter of the first hole 922*a* or a diameter smaller than the diameter of the first hole 922*a*. The second parts 932*a* and 932*b* may pass through the first hole 922*a*.

The first parts 931*a* and 931*b* may be positioned outside the link mounts 920*a* and 920*b*. Alternatively, the first parts 931*a* and 931*b* may be positioned outside the accommodation space A of the link mounts 920*a* and 920*b*. The first parts 931*a* and 931*b* may have a diameter greater than the diameter of the first hole 922*a*.

The first parts 931*a* and 931*b* may come into contact with or be separated from the link brackets 951*a* and 951*b*. For example, when the second arms 912*a* and 912*b* lie fully on the base 31, the first parts 931*a* and 931*b* may come into contact with the link brackets 951*a* and 951*b*. Alternatively, when the second arms 912*a* and 912*b* are fully lifted from the base 31, the first parts 931*a* and 931*b* may be spaced apart from the link brackets 951*a* and 951*b*.

When the first parts 931*a* and 931*b* come into contact with the link brackets 951*a* and 951*b*, the pushers 930*a* and 930*b* may receive a force from the link brackets 951*a* and 951*b*. The force received by the pushers 930*a* and 930*b* may be in a downward direction. Alternatively, the force received by the pushers 930*a* and 930*b* may be in the ?y axis direction. Alternatively, the link brackets 951*a* and 951*b* may pressurize the pushers 930*a* and 930*b*. A direction in which the link brackets 951*a* and 951*b* pressurize the pushers 930*a* and 930*b* may be a downward direction. Alternatively, a direction in which the link brackets 951*a* and 951*b* pressurize the pushers 930*a* and 930*b* may be the ?y axis direction.

When the first parts 931*a* and 931*b* receive a force, the springs 940*a* and 940*b* may be compressed. The compressed springs 940*a* and 940*b* may provide a restoring force to the pushers 930*a* and 930*b*. The restoring force may be in a direction opposite to the direction of the force applied to the first parts 931*a* and 931*b*. Alternatively, the restoring force may act in the +y axis direction.

The link mounts 920*a* and 920*b* may include a second hole 921*a* (second hole corresponding to the link mount 920*b* is not shown). The second hole 921*a* may connect the accommodation space A and an outer space. The springs 940*a* and 940*b* may be entirely or partially exposed to the outside through the second hole 921*a*. The pushers 930*a* and 930*b* may be entirely or partially exposed to the outside through the second hole 921*a*. During maintenance or repair of the display device, a service provider may check operation states of the pushers 930*a* and 930*b* through the second hole 921*a*. The second hole 921*a* may provide the convenience of maintenance or repair to the service provider.

Referring to FIGS. 54 to 56, the right link 910*a* may be lifted by receiving a restoring force from the right pusher 930*a*. The following description is given based on the right link 910*a*.

An angle formed by the second arm 912*a* and the base 31 may be denoted by theta S. A force that the right rod 870*a* transfers to the second arm 912*a* may be denoted by FT. A force that the right pusher 930*a* transfers to the right link bracket 951*a* may be denoted by FP.

Referring to FIG. 54, when the second arm 912*a* lies fully on the base 31, the angle theta S may have a minimum value. The right spring 940*a* connected to the right pusher 930*a* may be compressed to the maximum, and the magnitude of the restoring force FP may have a maximum value. The compressed right spring 940*a* may provide the restoring force FP to the right pusher 930*a*. The right pusher 930*a* may transfer the restoring force FP to the right link bracket 951*a*. The restoring force FP may act in the +y axis direction.

When the second arm 912*a* lies fully on the base 31, a distance HL from the base 31 to an upper end of the right pusher 930*a* may have a minimum value. The first part 931*a* of the right pusher 930*a* may protrude to the outside of the right link mount 920*a*, and the second part 932*a* of the right pusher 930*a* may be entirely accommodated in an accommodation space 923*a* of the right link mount 920*a*.

Referring to FIG. 55, when the second arm 912*a* changes from a fully lying position to a standing position with respect to the base 31, the angle theta S may gradually increase. In addition, the amount of compression displacement of the right spring 940*a* may be gradually decreased, and the magnitude of the restoring force FP may be gradually decreased.

As the angle theta S gradually increases, at least a portion of the second part 932*a* of the right pusher 930*a* may protrude to the outside of the right link mount 920*a*. The length of the second part 932*a* of the right pusher 930*a* protruding to the outside of the right link mount 920*a* may be denoted by HP. The distance HL from the base 31 to the upper end of the right pusher 930*a* may be increased by HP, compared to when the second arm 912*a* lies fully on the base 31.

Referring to FIG. 56, once the second arm 912*a* is lifted from the base 31, the right pusher 930*a* and the right link bracket 951*a* may be separated from each other. The amount of compression displacement of the right spring 940*a* may be zero. When the amount of compression displacement of the right spring 940*a* is zero, the restoring force FP that the right pusher 930*a* provides to the right link bracket 951*a* may be zero.

Further, the length HP of the second part 932*a* of the right pusher 930*a* protruding to the outside of the right link mount 920*a* may have a maximum value. The distance HL from the base 31 to the upper end of the right pusher 930*a* may have a maximum value.

That is, the right pusher 930*a* applies the restoring force to the right link bracket 951*a* while contacting the right link bracket 951*a*, and thus can assist the second arm 912*a* to be lifted and reduce the load of the motor assembly 810.

The lead screws 840*a* and 840*b* may be driven by one motor assembly 810. The second aims 912*a* and 912*b* may be lifted while being symmetrical to each other, by driving the lead screws 840*a* and 840*b* by one motor assembly 810. However, when the lead screws 840*a* and 840*b* are driven by one motor assembly 810, the load applied to the motor assembly 810 to lift the second arms 912*a* and 912*b* may be excessively increased. In this instance, the right pusher 930*a* applies the restoring force to the right link bracket 951*a* and thus can assist the second arm 912*a* to be lifted and reduce the load of the motor assembly 810.

Alternatively, when the second arm 912*a* changes from a standing position to a fully lying position with respect to the base 31, the restoring force that the right pusher 930*a* provides to the right link bracket 951*a* can alleviate an impact generated when the link 910*a* lies on the base 31. That is, the restoring force that the right pusher 930*a* provides to the right link bracket 951*a* may serve as a damper when the link 910*a* lies on the base 31. The right pusher 930*a* serves as the damper, and thus the load of the motor assembly 810 can be reduced.

A structure formed by the left pusher 930*b*, the left spring 940*b*, the left link bracket 951*b*, the left link mount 920*b*, and the left rod 870*b* may be symmetrical to the above-described structure formed by the right pusher 930*a*, the right spring 940*a*, the right link bracket 951*a*, the right link mount 920*a*, and the right rod 870*a*. In this instance, the axis of symmetry may be the symmetry axis ys of the motor assembly 810.

Referring to FIGS. 57 to 59, the panel roller 143 may be installed on the base 31. The panel roller 143 may be installed in front of the lead screws 840*a* and 840*b*. Alternatively, the panel roller 143 may be disposed parallel to the longitudinal direction of the lead screws 840*a* and 840*b*. Alternatively, the panel roller 143 may be spaced apart from the lead screws 840*a* and 840*b*.

The display unit 20 may include the display panel 10 and the module cover 15. The lower side of the display unit 20 may be connected to the panel roller 143, and the upper side of the display unit 20 may be connected to the upper bar 75. The display unit 20 may be wound around or unwound from the panel roller 143.

The distance from the symmetry axis ys of the motor assembly 810 to the right slider 860*a* may be denoted by distance RD. The distance from the symmetry axis ys of the motor assembly 810 to the left slider 860*b* may be denoted as distance LD. The distance between the right slider 860*a* and the left slider 860*b* may be denoted by distance SD. The distance SD may be the sum of the distance RD and the distance LD. The distance from the base 31 to the upper end of the display unit 20 may be denoted by distance HD.

Referring to FIG. 57, when the second arms 912*a* and 912*b* lie fully on the base 31, the distance SD between the right slider 860*a* and the left slider 860*b* may have a minimum value. The distance RD from the symmetry axis ys of the motor assembly 810 to the right slider 860*a* and the distance LD from the symmetry axis ys of the motor assembly 810 to the left slider 860*b* may be equal to each other.

When the second arms 912*a* and 912*b* lie fully on the base 31, the distance HD from the base 31 to the upper end of the display unit 20 may have a minimum value.

When the second arms 912*a* and 912*b* lie fully on the base 31, the first springs 841*a* and 841*b* may come into contact with the sliders 860*a* and 860*b*. Further, the second springs 851*a* and 851*b* may come into contact with the sliders 860*a* and 860*b*, and the pushers 930*a* and 930*b* may come into contact with the link brackets 951*a* and 951*b*.

When the second arms 912*a* and 912*b* lie fully on the base 31, the amount of compression of the first springs 841*a* and 841*b* may have a maximum value, and the magnitude of a restoring force that the first springs 841*a* and 841*b* provide to the sliders 860*a* and 860*b* may have a maximum value.

When the second arms 912*a* and 912*b* lie fully on the base 31, the amount of compression of the second springs 851*a* and 851*b* may have a maximum value, and the magnitude of a restoring force that the second springs 851*a* and 851*b* provide to the sliders 860*a* and 860*b* may have a maximum value.

When the second arms 912*a* and 912*b* lie fully on the base 31, the amount of compression of the springs 940*a* and 940*b* may have a maximum value, and the magnitude of a restoring force that the springs 940*a* and 940*b* provide to the pushers 930*a* and 930*b* may have a maximum value.

When the second arms 912*a* and 912*b* begin to be lifted from the base 31, the second arms 912*a* and 912*b* may be lifted by receiving the restoring force from the first springs 841*a* and 841*b*, the second springs 851*a* and 851*b*, and the springs 940*a* and 940*b*. Hence, the load on the motor assembly 810 can be reduced.

Referring to FIG. 58, as the second arms 912*a* and 912*b* are lifted from the base 31, the distance SD between the right slider 860*a* and the left slider 860*b* may gradually increase. Even if the distance SD increases, the distance RD and the distance LD may be equal to each other. That is, the right slider 860*a* and the left slider 860*b* may be positioned to be symmetrical with respect to the symmetry axis ys of the motor assembly 810. Further, the degree to which the second arms 912*a* and 912*b* of the right link 910*a* are lifted from the base 31 and the degree to which the second arms 912*a* and 912*b* of the left link 910*b* are lifted from the base 31 may be equal.

As the second arms 912*a* and 912*b* are lifted from the base 31, the distance HD from the base 31 to the upper end of the display unit 20 may gradually increase. The display unit 20 may be unwound from the panel roller 143. Alternatively, the display unit 20 may be unrolled from the panel roller 143.

When the second arms 912*a* and 912*b* are lifted sufficiently from the base 31, the first springs 841*a* and 841*b* may be separated from the sliders 860*a* and 860*b*. Further, when the second arms 912*a* and 912*b* are lifted sufficiently from the base 31, the second springs 851*a* and 851*b* may be separated from the sliders 860*a* and 860*b*. Further, when the second arms 912*a* and 912*b* are lifted sufficiently from the base 31, the pushers 930*a* and 930*b* may be separated from the link brackets 951*a* and 951*b*.

The separation of the first springs 841*a* and 841*b* from the sliders 860*a* and 860*b*, the separation of the second springs 851*a* and 851*b* from the sliders 860*a* and 860*b*, and the separation of the pushers 930*a* and 930*b* from the link brackets 951*a* and 951*b* may be performed independently of each other. That is, the separation of the first springs 841*a* and 841*b* from the sliders 860*a* and 860*b*, the separation of the second springs 851*a* and 851*b* from the sliders 860*a* and 860*b*, and the separation of the pushers 930*a* and 930*b* from the link brackets 951*a* and 951*b* may be performed in variable orders.

An angle formed by an axis xs1 parallel to the base 31 and the second arm 912*a* may be denoted by theta R, and an angle formed by the axis xs1 parallel to the base 31 and the first arm 911*a* may be denoted as theta R'. The axis xs1 may be parallel to the x axis.

When the second arm 912*a* lies fully on the base 31, or while the second arm 912*a* is lifted from the base 31, or once the second arm 912*a* has been lifted from the base 31, the angle theta R and the angle theta R' may be maintained to be the same.

An angle formed by an axis xs2 parallel to the base 31 and the second arm 912*b* may be denoted by theta L, and an angle formed by the axis xs2 parallel to the base 31 and the first arm 911*b* may be denoted by theta L'. The axis xs2 may be parallel to the x axis.

When the second arm 912*b* lies completely on the base 31, or while the second arm 912*b* is lifted from the base 31, or once the second arm 912*b* has been lifted from the base 31, the angle theta L and the angle theta L' may be maintained to be the same.

The axis xs1 and the axis xs2 may be the same axis.

Referring to FIG. 59, when the second arms 912*a* and 912*b* is lifted fully from the base 31, the distance SD between the right slider 860*a* and the left slider 860*b* may have a maximum value. Even if the distance SD has the maximum value, the distance RD and the distance LD may be equal to each other.

When the second arms 912*a* and 912*b* is lifted fully from the base 31, the distance HD from the base 31 to the upper end of the display unit 20 may have a maximum value.

Referring to FIG. 60, the link bracket 951 may be pivotally connected to the first arm 911. The link bracket 951 may include a supporter 951F and a coupling plate 951R.

The supporter 951F may have a horizontal body 9511, a joint 9512 and 9512*a*, and cups 9513*a*, 9513*b*, and 9513*c*. The horizontal body 9511 may have the shape of a bar that longitudinally extends leftwards and rightwards. The joint 9512 and 9512*a* may be formed on a lower side of the horizontal body 9511. The joint 9512 and 9512*a* may include a fixing plate 9512 and a pivot shaft 9512*a*.

A bearing 960 may be fastened to the pivot shaft 9512*a*. A plurality of bearings 960 may be provided. The plurality of bearings 960 may include a first bearing 960*a* and a second bearing 960*b*. The second bearing 960*b* may be stacked on the first bearing 960*a*. The first bearing 960*a* and the second bearing 960*b* may be fitted on the pivot shaft 9512*a*. A lubricating oil may be applied to the bearings 960. Assembly of the bearings 960 and application of lubricating oil to the bearings 960 may be performed simultaneously with coupling between the first arm 230*a* and the link bracket 951, but may be performed independently of fastening of other structures, whereby leakage of the lubricating oil may be prevented.

The fixing plate 9512 may be located on the lower side of the horizontal body 9511, off-centered leftwards or rightwards. The fixing plate 9512 may extend longitudinally to the lower side of the horizontal body 9511. The pivot shaft 9512*a* may be formed so as to protrude from one surface of the fixing plate 9512.

The cups 9513*a*, 9513*b*, and 9513*c* may be formed as the upper surface of the horizontal body 9511 is recessed. The cups 9513*a*, 9513*b*, and 9513*c* may be formed as the upper surface of the horizontal body 9511 is recessed simultaneously with opening of the front surface and the rear surface of the horizontal body 9511. For example, each of the cups 9513*a*, 9513*b*, and 9513*c* may generally have a U shape. The cups 9513*a*, 9513*b*, and 9513*c* may be sequentially disposed in the longitudinal direction of the horizontal body 9511. Consequently, it is possible to reduce concentration of stress and to eliminate fatigue fracture of the link bracket 951.

The coupling plate 951R may include a supporter cover 9515 and a joint cover 9516. The supporter cover 9515 may be a plate that is formed with a length corresponding to the length of the supporter 951F. The joint cover 9516 may have the shape of a disc connected to the supporter cover 9515 on the lower side of the supporter cover 9515, off-centered leftwards or rightwards. The coupling plate 951R may have a plurality of holes H and h.

The plurality of holes H and h may include first coupling holes h and second coupling holes H. The first coupling holes h may be provided for coupling between the supporter 951F, the coupling plate 951R, and first arms 911. The second coupling holes H may be provided for coupling between the top case 950 (see FIG. 61) and the link bracket 951.

Referring to FIG. 61, the cup 9513*a* may include a support portion 9513*a*1 and a guide portion 9513*a*2. The support portion 9513*a*1 may form the lower side of the cup 9513*a*, and the guide portion 9513*a*2 may form the upper side of the cup 9513*a*. For example, the support portion 9513*a*1 may have a semicircular shape or a fan shape, and the guide portion 9513*a*2 may extend from the support portion 9513*a*1 and may have the shape of left and right sides of an inverted trapezoid.

The top case 950 may include an inner bar 950I and a top cover 950T. The inner bar 950I may be located at the upper side or upper end of the module cover 15, and may be coupled to the module cover 14. Coupling protrusions 950P1 and 950P2 may be mounted on the outer surface of the inner bar 950I. A plurality of coupling protrusions 950P1 and 950P2 may be provided. The number of coupling protrusions 950P1 and 950P2 may correspond to the number of cups 9513*a*, 9513*b*, and 9513*c*. For example, the coupling protrusions 950P1 and 950P2 may be PEM nuts. The radii of the coupling protrusions 950P1 and 950P2 may correspond to the radii of support portions 9513*a*1, 9513*b*1, and 9513*c*1 of the cups 9513*a*, 9513*b*, and 9513*c*.

Referring to FIGS. 62 and 63, the link bracket 951 may be assembled to the top case 950 while the link bracket 951 is coupled to the first arm 230*a*. At this time, the link bracket 951 may move to the top case 950 along with the movement of the links 910 (see FIG. 28) and 910*a* and 910*b* (see FIG. 58) in an upward-downward direction (e.g., y axis direction). As the supporter 951F of the link bracket 951 approaches the top case 950, the coupling protrusions 950P1, 950P2, and 950P3 may be inserted into the cups 9513*a*, 9513*b*, and 9513*c* (see FIG. 60) of the supporter 951F. The coupling protrusions 950P1, 950P2, and 950P3 may be inserted into the cups 9513*a*, 9513*b*, and 9513*c* of the supporter 951F, and the link bracket 951 and the top case 950 may be fastened to each other with screws S2 (see FIG. 60).

Consequently, the link bracket 951 may be naturally coupled to the top case 950 within the range of movement of the links 910, 910*a*, and 910*b* without straining the joints of the links 910, 910*a*, and 910*b*.

Referring to FIGS. 60 to 64, a supporting groove 9514 may be formed by recessing a bottom of the horizontal body 9511 of the supporter 951F. The supporting groove 9514 may be off-centered to a bottom left or right portion of the horizontal body 9511. For example, if the fixing plate 9512 is positioned on the right side of the bottom of the horizontal body 9511, the supporting groove 9514 may be positioned on the left side of the bottom of the horizontal body 9511.

When the module cover 15 is rolled and the links 910, 910*a*, and 910*b* go into a fully lying position with respect to the base 31, the supporting groove 9514 of the supporter 951F may be placed on the pusher 930. As described previously, in a process in which the links 910, 910*a*, and 910*b* are lifted, the pusher 930 may provide force to the link bracket 951 in the lifting direction, and in a process in which the links 910, 910*a*, and 910*b* are folded, the pusher 930 may provide buffer power to the link bracket 951.

Referring to FIGS. 38 and 65, when the link 910 is in a fully lying position with respect to the base 31, it may mean that the display panel 10 is positioned at a bottom dead center. When the display panel 10 is positioned at the bottom dead center, the fourth part 934 of the pusher 930 may be stuck on the lower end of the space S6.

A sensor 991 may be coupled to a link mount 920 via a sensor mount 927. The sensor 991 may be placed contiguous to the lower end of the space S6 and sense whether the fourth part 934 is positioned on the lower end of the space S6. For example, the sensor 991 may be a photosensor. However, depending on the sensing range of the sensor 991, the sensor 991 may sense that the fourth part 934 is stuck on the lower end of the space S6 even before the fourth part 934 is stuck on the lower end of the space S6. In this case, even though the link 910 is not in a fully lying position with respect to the base 31, the sensor 991 may detect that the display panel 10 is positioned at the bottom dead center. Particularly, such an erroneous detection may be worsened as the display panel 10 is repeatedly wound around or unwound from the roller 143. In this regard, the sensor 991 having such a structure may require a mechanism for reducing variations in the sensing range of the sensor 991.

Referring to FIGS. 42 and 66, when the link 910 is in a fully standing position with respect to the base 31, it may mean that the display panel 10 is positioned at a top dead center. When the display panel 10 is positioned at the top dead center, the slider 820 may be located closest to the outer bearing 830*a*. In this case, the slider 820 may be stuck on the second stopper 861*a*.

A protrusion 992 may be coupled to the slider 820 via a sensor mount 928, and may move along with the slider 820. A sensor 324 may be installed on the base 32, and may be placed contiguous to the protrusion 992 when the display panel 10 is positioned at the top dead center. The sensor 324 may sense the protrusion 992 to sense whether the display panel 10 is positioned at the top dead center. For example, the sensor 324 may be a photosensor. However, depending on the sensing range of the sensor 324, the sensor 324 may sense the protrusion 992 even before the slider 820 is stuck on the second stopper 861*a*. In this case, even though the link 910 is not in a fully standing position with respect to the base 31, the sensor 324 may detect that the display panel 10 is positioned at the top dead center. Particularly, such an erroneous detection may be worsened as the display panel 10 is repeatedly wound around or unwound from the roller 143. In this regard, the sensor 324 having such a structure may require a mechanism for reducing variations in the sensing range of the sensor 324.

Referring to FIGS. 67 and 68, the module cover 15 may be coupled to a rear of a flexible display panel 10. The module cover 15 may be wound around or unwound from the roller 143 which extends longitudinally, along with the display panel 10 (see FIG. 16).

A sensor 210 may be placed contiguous to the display panel 10 and the module cover 15, and sense the movement of the display panel 10 and the module cover 15. The sensor 210 may be placed contiguous to the rear surface of the module cover 15. The sensor 210 may be fixed in place. The sensor 210 may include a light emitting portion 212 and a light receiving portion 213. The light emitting portion 212 and the light receiving portion 213 may be placed contiguous to the rear surface of the module cover 15. The light emitting portion 212 and the light receiving portion 213 may be installed on the housing 211. The housing 211 may be inserted into the sensor mount 929. The sensor mount 929 may be coupled to the link mount 920. The sensor 210 and a controller 1000 may be electrically connected. Information sensed by the sensor 210 may be transmitted to the controller 1000 through a connector 214.

The light emitting portion 212 may emit light toward the display panel 10 and the module cover 15. For example, the light emitting portion 212 may emit light of an infrared (IR) wavelength toward the display panel 10 and the module cover 15. The light receiving portion 213 receives light emitted from the light emitting portion 212 and reflected from at least one of the display panel 10 and the module cover 15. In this case, the proportion of light received by the light receiving portion 213 to light emitted from the light emitting portion 212 may be defined as reflectance ratio RR. For example, the reflectance ratio RR may be calculated based on a difference between an electrical signal value and a reference signal value, the electrical signal value being detected when the light emitted from the light emitting portion 212 is reflected from the display panel 10 or the module cover 15 and then received by the light receiving portion 213. For example, the reference signal value may be the highest of all electrical signal values detected when the light emitted from the light emitting portion 212 is reflected from the display panel 10 or the module cover 15 and then received by the light receiving portion 213.

The sensor 210 may detect the movement of the display panel 10 and the module cover 15 based on the reflectance ratio RR. For example, the module cover 15 may include a plurality of segments 15*a* (which are the same as those indicated by reference numeral 15*c* in FIG. 4) that extend longitudinally in the lengthwise direction of the roller 143 and are sequentially arranged in an upward-downward direction of the display panel 10. In this case, once the module cover 15 is wound around the roller 143, the gaps between the plurality of segments 15*a* may be further widened. That is, the reflectance ratio RR may be calculated differently depending on the movement of the module cover 15. Specifically, the reflectance ratio RR calculated when the light emitting portion 212 emits light to the plurality of segments 15*a* may be different from the reflectance ratio RR calculated when the light emitting portion 212 emits light between the plurality of segments 15*a*. Accordingly, the sensor 210 or the controller 1000 may calculate the number of segments 15*a* sensed by the sensor 210, based on the reflectance ratio RR detected when the module cover 15 is wound around or unwound from the roller 143.

The controller 1000 may be electrically connected to the sensor 210 to turn the sensor 210 ON or OFF. The controller 1000 may control the degree of winding or unwinding of the display panel 10 and the module cover 15 on or from the roller 143, based on information on the movement of the display panel 10 and module cover 15 obtained from the sensor 210. The controller 1000 may control the degree of winding or unwinding of the display panel 10 and the module cover 15 on or from the roller 143 based on the reflectance ratio RR. The controller 1000 may adjust the movement of the module cover 15 corresponding to the number of segments 15*a* sensed by the sensor 210 based on the reflectance ratio (PR). The controller 1000 electrically connected to the motor assembly 810 may control the degree of winding or unwinding of the display panel 10 and the module cover 15 on or from the roller 143, by adjusting the movement of the slide 820 and the degree to which the link 910 is lifted from the base 31 (see FIGS. 57 to 59 and descriptions thereof).

Referring to FIGS. 69 and 70, the sensor 210 may be spaced apart from the roller 143 in the radial direction of the roller 143, and may be placed contiguous to the rear surface of the module cover 15 on an outer side of the roller 143. For example, the sensor 210 is a portion of the module cover 15 that is not wound around the roller 143, contiguous to where the gaps between the plurality of segments 15*a* are relatively large. In this case, the difference between the reflectance ratio RR calculated when the light emitting portion 212 emits light to the plurality of segments 15*a* and the reflectance ratio RR calculated when the light emitting portion 212 emits light between the plurality of segments 15*a* may be relatively large.

Accordingly, it becomes easier to detect the movement of the module cover 15 by the sensor 210. Alternatively, it is possible to easily calculate the number of segments 15*a* sensed by the sensor 210.

Referring to FIG. 71, when an unrolling mode ON signal is received to unwind the display panel 10 and the module cover 15 from the roller 143 (Yes in S10), the controller 1000 may power ON the sensor 210 (S11) to bring the sensor 210 into a state where it is able to detect the movement of the module cover 15. After S11 (or before or simultaneously with S11), the controller 1000 may control the display panel 10 and the module cover 15 to start unrolling from the roller 143 by the rotating movement of the motor assembly 810 (S12).

After S12, the controller 1000 may determine whether the number Ncd of segments 15*a* sensed by the sensor 210 in relation to the movement of the module cover 15 is equal to or greater than a target number Ncd_target for unrolling, based on the reflectance ratio RR (S20).

Specifically, the target number Ncd_target for unrolling may be the number of segments 15*a* that are sensed by the sensor 210 while the display panel 10 and the module cover 15 are unrolled from the roller 143 to go from a fully wound state to a fully unwound state. That is, when the number Ncd of segments 15*a* sensed by the sensor 210 equals the target number Ncd_target for unrolling, it may be determined that the display panel 10 and the module cover 15 have been fully unwound from the roller 143.

Here, the state in which the display panel 10 and the module cover 15 are fully wound around the roller 143 is a state in which the entire display unit 20 is positioned within the housing 30 after the user has finished viewing, which may be understood that the display panel 10 is positioned at the bottom dead center, and be arbitrarily adjusted through device settings. Also, the state in which the display panel 10 and the module cover 15 are fully unwound from the roller 143 is a state in which part of the display unit 20 is exposed out of the housing 30 for the user's viewing, which may be understood that the display panel 20 is positioned at the top dead center, and be arbitrarily adjusted through device settings.

If it is determined that the number Ncd of segments 15*a* sensed by the sensor 210 in relation to the movement of the module cover 15 is less than the target number Ncd_target for unrolling (No in S20), it means that the sensor 210 has not yet sensed a target point up to which the module cover 15 is unrolled, and the controller 1000 may continue the unrolling (S21).

If it is determined that the number Ncd of segments 15*a* sensed by the sensor 210 in relation to the movement of the module cover 15 is equal to or greater than the target number Ncd_target for unrolling (Yes in S20), it means that the sensor 210 has sensed a target point up to which the module cover 15 is unrolled, and the controller 1000 may stop the unrolling (S22).

In S20, S21, and S22, the controller 1000 may adjust the movement of the module cover 15 so as to unwind the module cover 15 from the roller 143, and when the sensor 210 senses a target point up to which the module over 15 is unrolled based on the reflectance ratio RR, may stop the movement of the module cover 15.

Accordingly, in response to the unrolling mode ON signal, the display panel 10 may be accurately moved from the bottom dead center to the top dead center. Also, since the degree of unwinding of the display panel 10 from the roller 143 is controlled based on the reflectance ratio RR, variations in the movement of the display panel 10 may be minimized even if the display panel 10 is repeatedly wound around or unwound from the roller 143.

Referring to FIG. 71, when a rolling mode ON signal is received to wind the display panel 10 and the module cover 15 around the roller 143 (Yes in S70), the controller 1000 may power ON the sensor 210 (S71). After S71 (or before or simultaneously with S71), the controller 1000 may control the display panel 10 and the module cover 15 to start rolling around the roller 143 by the rotating movement of the motor assembly 810 (S72).

After S72, the controller 1000 may determine whether the number Ncr of segments 15*a* sensed by the sensor 210 in relation to the movement of the module cover 15 is equal to or greater than a target number Ncr_target for rolling, based on the reflectance ratio RR (S80).

Specifically, the target number Ncr_target for rolling may be the number of segments 15*a* that are sensed by the sensor 210 while the display panel 10 and the module cover 15 are rolled around the roller 143 to go from a fully unwound state to a fully wound state. That is, when the number Ncr of segments 15*a* sensed by the sensor 210 equals the target number Ncr_target for rolling, it may be determined that the display panel 10 and the module cover 15 have been fully wound around the roller 143.

If it is determined that the number Ncr of segments 15*a* sensed by the sensor 210 in relation to the movement of the module cover 15 is less than the target number Ncr_target for rolling (No in S80), it means that the sensor 210 has not yet sensed a target point up to which the module cover 15 is rolled, and the controller 1000 may continue the rolling (S81).

If it is determined that the number Ncr of segments 15*a* sensed by the sensor 210 in relation to the movement of the module cover 15 is equal to or greater than the target number Ncr_target for rolling (Yes in S80), it means that the sensor 210 has sensed a target point up to which the module cover 15 is rolled, and the controller 1000 may stop the rolling (S82).

In S80, S81, and S82, the controller 1000 may adjust the movement of the module cover 15 so as to wind the module cover 15 around the roller 143, and when the sensor 210 senses a target point up to which the module over 15 is rolled based on the reflectance ratio RR, may stop the movement of the module cover 15.

Accordingly, in response to the rolling mode ON signal, the display panel 10 may be accurately moved from the top dead center to the bottom dead center. Also, since the degree of winding the display panel 10 on the roller 143 is controlled based on the reflectance ratio RR, variations in the movement of the display panel 10 may be minimized even if the display panel 10 is repeatedly wound around or unwound from the roller 143.

Referring to FIGS. 72 to 74, a rolling mode ON signal may be received while the display panel 10 and the module cover 15 are unwound from the roller 143 in response to an unrolling mode ON signal. Also, an unrolling mode ON signal may be received while the display panel 10 and the module cover 15 are wound around the roller 143 in response to a rolling mode ON signal.

Referring to FIG. 72, after the start S12 of unrolling, upon determining that the number Ncd of segments 15*a* sensed by the sensor 210 in relation to the movement of the module cover 15 is less than a target number Ncd_target for unrolling (No in S20), the controller 1000 may determine whether a rolling mode ON signal has been received (S30).

In S30, once it is determined that no rolling mode ON signal has been received (No in S30), the unrolling mode is maintained. Since the sensor 210 has not yet sensed a target point up to which the module cover 15 is unrolled, the controller 1000 may continue the unrolling (S31). In S30, once it is determined that a rolling mode ON signal has been received (Yes in S30), the operation mode switches to the rolling mode, and rolling may be started and then stopped (S32). S32 may be divided into S32*a*, S32*b*, S32*c*, and S32*d* to be described later.

Referring to FIG. 73, after Yes in S30, the controller 1000 may control the display panel 10 and the module cover 15 to start rolling around the roller 143 by the rotating movement of the motor assembly 810 (S32*a*). After S32*a*, the controller 1000 may determine whether the number Ncr of segments 15*a* sensed by the sensor 210 in relation to the movement of the module cover 15 is equal to or greater than the number Ncd of segments 15*a* sensed by the sensor 210 in relation to the movement of the module cover 15 in response to the previous unrolling mode ON signal, based on the reflectance ratio RR (S32*b*).

Specifically, when a rolling mode ON signal is received while the movement of the module cover 15 is adjusted in response to an unrolling mode ON signal, the movement of the module cover 15 may be adjusted so that the module cover 15 is wound around the roller 143 as much as the module cover 15 is moved in response to the unrolling mode ON signal.

No in S32*b* means that the module cover 15 has not yet been wound around the roller 143 as much as the module cover 15 is moved in response to the previous unrolling mode ON signal, and the controller 1000 may continue the rolling (S32*c*). Yes in S32*b* means that the module cover 15 is wound around the roller 143 as much as the module cover 15 is moved in response to the previous unrolling mode ON signal, and the controller 1000 may stop the rolling (S32*d*).

Referring to FIG. 72, after the start S72 of rolling, upon determining that the number Ncr of segments 15*a* sensed by the sensor 210 in relation to the movement of the module cover 15 is less than a target number Ncr_target for rolling (No in S80), the controller 1000 may determine whether an unrolling mode ON signal has been received (S90).

In S90, once it is determined that no unrolling mode ON signal has been received (No in S90), the rolling mode is maintained. Since the sensor 210 has not yet sensed a target point up to which the module cover 15 is rolled, the controller 1000 may continue the rolling (S91). In S90, once it is determined that an unrolling mode ON signal has been received (Yes in S90), the operation mode switches to the unrolling mode, and unrolling may be started and then stopped (S92). S92 may be divided into S92*a*, S92*b*, S92*c*, and S92*d* to be described later.

Referring to FIG. 74, after Yes in S90, the controller 1000 may control the display panel 10 and the module cover 15 to start unrolling from the roller 143 by the rotating movement of the motor assembly 810 (S92*a*). After S92*a*, the controller 1000 may determine whether the number Ncd of segments 15*a* sensed by the sensor 210 in relation to the movement of the module cover 15 is equal to or greater than the number Ncr of segments 15*a* sensed by the sensor 210 in relation to the movement of the module cover 15 in response to the previous rolling mode ON signal, based on the reflectance ratio RR (S92*b*).

Specifically, when an unrolling mode ON signal is received while the movement of the module cover 15 is adjusted in response to a rolling mode ON signal, the movement of the module cover 15 may be adjusted so that the module cover 15 is unwound from the roller 143 as much as the module cover 15 is moved in response to the rolling mode ON signal.

No in S92*b* means that the module cover 15 has not yet been unwound from the roller 143 as much as the module cover 15 is moved in response to the previous rolling mode ON signal, and the controller 1000 may continue the unrolling (S92*c*). Yes in S92*b* means that the module cover 15 is unwound from the roller 143 as much as the module cover 15 is moved in response to the previous rolling mode ON signal, and the controller 1000 may stop the unrolling (S92*d*).

Accordingly, even if the mode is switched to the rolling mode during the unrolling mode, the display panel 10 may be accurately moved to the bottom dead center. Also, even if the mode is switched to the unrolling mode during the rolling mode, the display panel 10 may be accurately moved to the top dead center. Also, since the degree of winding of the display panel 10 on the roller 143 is controlled based on the reflectance ratio RR, variations in the movement of the display panel 10 may be minimized even if the display panel 10 is repeatedly wound around or unwound from the roller 143.

Referring to FIG. 75, the plurality of segments 15*a* may include n segments 15*a*1, 15*a*2, 15*a*3, 15*a*(*n*-2), 15*a*(*n*-1), and 15*an*. For example, the lower segment 15*a*1 is a segment corresponding to a target unrolling point, and sensing of the lower segment 15*a*1 by the sensor 210 based on the reflectance ratio RR may be referred to as sensing of a lower module cover. Also, the upper segment 15*an* is a segment corresponding to a target rolling point, and sensing of the upper segment 15*an* by the sensor 210 based on the reflectance ratio RR may be referred to as sensing of an upper module cover. Here, when the lower segment 15*a*1 is sensed by the sensor 210, the display panel 10 may be fully unrolled from the roller 143 and positioned at the top dead center. Also, when the upper segment 15*an* is sensed by the sensor 210, the display panel 10 may be fully rolled around the roller 143 and positioned at the bottom dead center.

The reflectance ratio RR in the lower segment 15*a*1 and the reflectance ratio RR in the upper segment 15*a*2 may be calculated to be different from the reflectance ratios RR in the other segments. For example, the shape of the lower segment 15*a*1 and the shape of the upper segment 15*an* may be different from the shape of the other segments. For example, grooves 15*g*1 and 15*g*2 may be formed on upper surfaces of the lower segment 15*a*1 and upper segment 15*an*, whereas upper surfaces of the other segments may be formed flat. Accordingly, the reflectance ratio RR calculated when the light emitting portion 212 of the sensor 210 emits light to the lower segment 15*a*1 or the upper segment 15*an* may be different from the reflectance ratio RR calculated when the light emitting portion 212 of the sensor 210 emits light to the other segments.

Accordingly, the sensor 210 is able to easily sense target points for rolling and unrolling the module cover 15 or the plurality of segments 15*a*. Also, if the other segments have different shapes from each other and therefore all of the segments have different reflectance ratios RR, this makes it easy to continuously detect the movement of the module cover 15.

Referring to FIG. 76, after the start S12 of unrolling, upon determining that the number Ncd of segments 15*a* sensed by the sensor 210 in relation to the movement of the module cover 15 is less than a target number Ncd_target for unrolling (No in S20), the controller 1000 may determine whether a lower module cover has been sensed (S40). Here, sensing of a lower module cover by the sensor 210 may be deemed as sensing of the lower segment 15*a*1, which may mean that a target unrolling point has been sensed by the sensor 210. Also, since the shape of the lower segment 15*a*1 is different from the shapes of the other segments, the lower segment 15*a*1 may be sensed based on the reflectance ratio RR.

If it is determined in S40 that the lower module cover has not been sensed (No in S40), this means that the sensor 210 has not yet sensed a target unrolling point for the module cover 15, and the controller 1000 may continue the unrolling (S41). If it is determined in S40 that the lower module cover has been sensed (Yes in S40), this means that the sensor 210 has sensed a target unrolling point, and the unrolling may be stopped (S22).

Referring to FIG. 76, after the start S72 of rolling, upon determining that the number Ncr of segments 15*a* sensed by the sensor 210 in relation to the movement of the module cover 15 is less than a target number Ncr_target for rolling (No in S80), the controller 1000 may determine whether an upper module cover has been sensed (S100). Here, sensing of an upper module cover by the sensor 210 may be deemed as sensing of the upper segment 15*an*, which may mean that a target rolling point has been sensed by the sensor 210. Also, since the shape of the upper segment 15*an* is different from the shapes of the other segments, the upper segment 15*an* may be sensed based on the reflectance ratio RR.

If it is determined in S100 that the upper module cover has not been sensed (No in S100), this means that the sensor 210 has not yet sensed a target rolling point for the module cover 15, and the controller 1000 may continue the rolling (S101). If it is determined in S100 that the upper module cover has been sensed (Yes in S100), this means that the sensor 210 has sensed a target rolling point, and the rolling may be stopped (S82).

Accordingly, even if, due to an unexpected event, the display panel 10 is positioned below the top dead center before a rolling mode ON signal is received, or the display panel 10 is positioned above the bottom dead center before an unrolling mode ON signal is received, rolling or unrolling may be accurately performed. That is, in the rolling mode or the unrolling mode, the controller 1000 may control the degree of winding or unwinding of the module cover 15 on or from the roller 143, based on the number Ncr and Ncd of segments 15*a* sensed by the sensor 210 in relation to the movement of the module cover 15, in such a way that, upon sensing the upper module cover or the lower module cover, the rolling or unrolling is stopped. In this way, the rolling or the unrolling may be performed more accurately.

Referring to FIG. 77, after the start S12 of unrolling, the controller 1000 may determine whether the lower module cover has been sensed (S50). If it is determined in S50 that the lower module cover has not been sensed (No in S50), this means that the sensor 210 has not yet sensed a target point up to which the module cover 15 is unrolled, and the controller 1000 may continue the unrolling (S51). If it is determined that in S50 that the lower module cover has been sensed (Yes in S50), this means that the sensor 210 has sensed a target point up to which the module cover 15 is unrolled, and the unrolling may be stopped (S52).

Referring to FIG. 77, after the start S72 of rolling, the controller 1000 may determine whether the upper module cover has been sensed (S110). If it is determined in S110 that the upper module cover has not been sensed (No in S110), this means that the sensor 210 has not yet sensed a target point up to which the module cover 15 is rolled, and the controller 1000 may continue the rolling (S111). If it is determined that in S110 that the upper module cover has been sensed (Yes in S110), this means that the sensor 210 has sensed a target point up to which the module cover 15 is rolled, and the rolling may be stopped (S112).

Accordingly, in the rolling mode or the unrolling mode, the controller 1000 may stop the rolling or the unrolling based on whether the upper module cover or the lower module cover has been sensed by the sensor 210 in relation to the movement of the module cover 15. In this way, the rolling or the unrolling may be performed more accurately.

Referring to FIG. 78, the sensor 210 may include a pair of sensors 210*a* and 210*b* contiguous to each other on opposite ends of the module cover 15, in the lengthwise direction of the roller 143. The controller 1000 may control the degree of winding or unwinding of the module cover 15 on or from the roller 143, based on information on the movement of the module cover 15 obtained from the pair of sensors 210*a* and 210*b*.

Meanwhile, unlike in the previous embodiments, the right link 910*a* and the left link 910*b* may move independently of each other. That is, although it is desirable that the degree to which the right link 910*a* is lifted from the base 31 and the degree to which the left link 910*b* is lifted from the base 31 are equal, they may be adjusted differently.

For example, during a rolling operation RL in which the module cover 15 is wound around the roller 143, or during an unrolling operation DP in which the module cover 15 is unwound from the roller 143, the module cover 15 may be tilted to a right side Rc or a left side Lc. In this case, a change in reflectance ratio RR in the right sensor 210*a* in relation to the movement of the module cover 15 may be different from a change in reflectance ratio RR in the left sensor 210*b* in relation to the movement of the module cover 15. In this instance, the degrees to which the right link 910*a* and the left link 910*b* are lifted from the base 31 may be controlled, so that the module cover 15 is aligned in the center without tilting rightwards or leftwards. In this case, a change in reflectance ratio RR in the right sensor 210*a* in relation to the movement of the module cover 15 may be equal to a change in reflectance ratio RR in the left sensor 210*b* in relation to the movement of the module cover 15.

Referring to FIG. 79, when the controller 1000 enters into the unrolling mode (Yes in S10), it may power ON the left and right sensors 210*b* and 210*a* which are electrically connected (S11*a*) to bring the left and right sensors 210*b* and 210*a* into a state where they are able to detect the movement of two opposite ends of the module cover 15. After S11*a* (or before or simultaneously with S11*a*), the controller 1000 may control the display panel 10 and the module cover 15 to start unrolling from the roller 143 by the rotating movement of the motor assembly 810 (S12).

After S12, the controller 1000 may determine whether the reflectance ratios RR detected by the left and right sensors 210*b* and 210*a* in relation to the movement of the module cover 15 are equal (S60). If it is determined in S60 that the reflectance ratios RR detected by the left and right sensors 210*b* and 210*a* are not equal (No in S60), the degrees to which the left and right links 910*b* and 910*a* are lifted from the base 31 may be controlled (S61) so that the reflectance ratios RR detected by the left and right sensors 210*b* and 210*a* become equal. If it is determined in S60 that the reflectance ratios RR detected by the left and right sensors 210*b* and 210*a* are equal (Yes in S60), the above-described S20, S21, and S22 may be performed.

Referring to FIG. 79, when the controller 1000 enters into the rolling mode (Yes in S70), it may power ON the left and right sensors 210*b* and 210*a* which are electrically connected (S71*a*). After S71*a* (or before or simultaneously with S71*a*), the controller 1000 may control the display panel 10 and the module cover 15 to start rolling around the roller 143 by the rotating movement of the motor assembly 810 (S72).

After S72, the controller 1000 may determine whether the reflectance ratios RR detected by the left and right sensors 210*b* and 210*a* in relation to the movement of the module cover 15 are equal (S120). If it is determined in S120 that the reflectance ratios RR detected by the left and right sensors 210*b* and 210*a* are not equal (No in S120), the degrees to which the left and right links 910*b* and 910*a* lie on the base 31 may be controlled (S121) so that the reflectance ratios RR detected by the left and right sensors 210*b* and 210*a* become equal. If it is determined in S120 that the reflectance ratios RR detected by the left and right sensors 210*b* and 210*a* are equal (Yes in S120), the above-described S80, S81, and S82 may be performed.

Accordingly, even if the module cover 15 is tilted to the left or right of the roller 143 in a process of repeatedly winding or unwinding the module cover 15 on or from the roller 143, this may be detected and the module cover 15 may be correctly aligned so as not to tilt leftwards or rightwards.

Referring to FIGS. 80 and 81, the sensor 210 may be placed contiguous to the front surface of the display panel 10 and detect the movement of the display panel 10 and the module cover 15. The sensor 210 may be spaced apart from the roller 143 in the radial direction of the roller 143, and may be placed contiguous to the front surface of the display panel 10 on an outer side of the roller 143. The sensor 210 may be fixed in place. The housing 211 of the sensor 210 may be inserted into the sensor mount 929 coupled to the link mount 920. The light emitting portion 212 and light receiving portion 213 of the sensor 210 may be placed contiguous to the front surface of the display panel 10. The sensor 210 may be electrically connected to the controller 1000, and information sensed by the sensor 210 may be transmitted to the controller 1000 through the connector 214.

Referring to FIGS. 82 and 83, the display panel 10 may include a plurality of panel dots 101*a*1, 101*a*2, 101*a*3, . . . (hereinafter, simply referred to as 101*a*) that are sequentially arranged in the upward-downward direction of the display panel 10 and emit light. For example, the plurality of panel dots 101*a* may be sensed by the sensor 210 in relation to the movement of the display panel 10.

The reflectance ratio RR may be calculated differently depending on the movement of the display panel 10. Specifically, the reflectance ratio RR calculated when the light emitting portion 212 emits light to the plurality of panel dots 101*a* may be different from the reflectance ratio RR calculated when the light emitting portion 212 emits light between the plurality of panel dots 101*a*. That is, when the light emitting portion 212 emits light to any of the plurality of panel dots 101*a*, the light receiving portion 213 receives light emitted from the panel dot 101*a*, as well as light emitted from the light emitting portion 212 and reflected from the panel dot 101*a*, making the reflectance ratio RR relatively high. On the contrary, when the light emitting portion 212 emits light between the plurality of panel dots 101*a*, the light receiving portion 212 only receives light emitted from the light emitting portion 213 and reflected from between the plurality of panel dots 101*a*, making the reflectance ratio RR relatively low. Accordingly, the sensor 210 or the controller 1000 may calculate the number of dots 101*a* sensed by the sensor 210, based on the reflectance ratio RR sensed in relation to an operation in which the display panel 10 is wound around or unwound form the roller 143.

Referring to FIG. 82, it is illustrated that the display panel 10 fully wound around the roller 143 and placed at the bottom dead center is positioned higher than the display panel 10 fully unwound from the roller 143 and placed at the top dead center.

When the display panel 10 is placed at the bottom dead center, the entire display panel 10 may be positioned within the housing 30. When the display panel 10 is placed at the top dead center, part of the display panel 10 may be positioned outside of the housing 30.

For example, when the unrolling operation DP is started while the display panel 10 is placed at the bottom dead center, the panel dots 101*a* are turned ON, from the first panel dot 101*a*1 corresponding to a target unrolling point to the second panel dot 101*a*6 facing the sensor 210 at the start of the unrolling operation DP, so that they emit no light and then the display panel 10 is unwound from the roller 143. In this instance, the panel dots 101*a* may be sensed by the sensor 210, sequentially from the sixth panel dot 101*a*6 to the first panel dot 101*a*1. That is, once the six panel dots 101*a* are sensed by the sensor 210 according to the unrolling operation DP, it may be determined that the display panel 10 is placed at the top dead center, and the unrolling may be stopped.

Also, the panel dots 101*a* sensed by the sensor 210 may be turned OFF and emit no light. Moreover, when the unrolling operation DP is started while the display panel 10 is placed at the bottom dead center, the seventh and eighth panel dots 101*a*7 and 101*a*8 positioned above the sixth dot 101*a*6 facing the sensor 210 at the start of the unrolling operation DP may be turned OFF and emit no light. As such, the light from the panel dots 101*a* is not emitted outside the housing 30 during the unrolling operation DP, thereby preventing the user from getting disturbed while watching video.

Referring to FIG. 83, it is illustrated that the display panel 10 fully unwound from the roller 143 and placed at the top dead center is positioned higher than the display panel 10 fully wound around the roller 143 and placed at the bottom dead center.

For example, when the rolling operation RL is started while the display panel 10 is placed at the top dead center, the panel dots 101*a* are turned ON, from the first panel dot 101*a*1 facing the sensor 210 at the start of the rolling operation RL to the third panel dot 101*a*3 contiguous and below an upper side 30*a* of the housing 30, so that they emit no light and then the display panel 10 is wound around the roller 143. In this instance, the fourth to eighth panel dots 101*a*4, 101*a*5, 101*a*6, 101*a*7, and 101*a*8 positioned above the upper side 30*a* of the housing 30 emit no light since they are turned OFF so as not to disturb the user from watching video. On the other hand, when the display panel 10 is moved below the upper side 30*a* of the housing as it is wound around the roller 143, those panel dots may be turned ON and emit light. Also, the panel dots 101*a* sensed by the sensor 210 may be turned OFF and emit no light.

In this instance, the panel dots 101*a* may be sensed by the sensor 210, sequentially from the first panel dot 101*a*1 to the sixth panel dot 101*a*6. That is, once the six panel dots 101*a* are sensed by the sensor 210 according to the rolling operation RL, it may be determined that the display panel 10 is placed at the bottom dead center, and the rolling may be stopped.

Referring to FIG. 84, when an unrolling mode ON signal is received to unwind the display panel 10 and the module cover 15 from the roller 143 (Yes in S210), the controller 1000 may power ON the sensor 210 which is electrically connected (S211) to bring the sensor 210 into a state where it is able to detect the movement of the display panel 10. After S211 (or before or simultaneously with S211), the controller 1000 may turn ON electrically connected panel dots 101*a* to emit light (S212). After S212 (or before or simultaneously with S212), the controller 1000 may control the display panel 10 and the module cover 15 to start unrolling from the roller 143 by the rotating movement of the electrically connected motor assembly 810 (S213). After S213, the panel dots 101*a* sensed by the sensor 210 may be turned OFF so that no light is emitted (S214).

After S214, the controller 1000 may determine whether the number Ndd of panel dots 101*a* sensed by the sensor 210 in relation to the movement of the display panel 10 is equal to or greater than a target number Ndd_target for unrolling, based on the reflection ratio RR (S220).

Specifically, the target number Ndd_target for unrolling may be the number of panel dots 101*a* that are sensed by the sensor 210 while the display panel 10 and the module cover 15 are unrolled from the roller 143 to go from a fully wound state to a fully unwound state. That is, when the number Ndd of panel dots 101*a* sensed by the sensor 210 equals the target number Ndd_target for unrolling, it may be determined that the display panel 10 and the module cover 15 have been fully unwound from the roller 143.

Here, the state in which the display panel 10 and the module cover 15 are fully wound around the roller 143 is a state in which the entire display unit 20 is positioned within the housing 30 after the user has finished viewing, which may be understood that the display panel 10 is positioned at the bottom dead center, and be arbitrarily adjusted through device settings. Also, the state in which the display panel 10 and the module cover 15 are fully unwound from the roller 143 is a state in which part of the display unit 20 is exposed out of the housing 30 for the user's viewing, which may be understood that the display panel 20 is positioned at the top dead center, and be arbitrarily adjusted through device settings.

If it is determined that the number Ndd of panel dots 101*a* sensed by the sensor 210 in relation to the movement of the display panel 10 is less than the target number Ndd_target for unrolling (No in S220), it means that the sensor 210 has not yet sensed a target point up to which the display panel 10 is unrolled, and the controller 1000 may continue the unrolling (S221).

If it is determined that the number Ndd of panel dots 101*a* sensed by the sensor 210 in relation to the movement of the display panel 10 is equal to or greater than the target number Ndd_target for unrolling (Yes in S220), it means that the sensor 210 has sensed a target point up to which the display panel 10 is unrolled, and the controller 1000 may stop the unrolling (S222).

In S220, S221, and S222, the controller 1000 may adjust the movement of the display panel 10 so as to unwind the display panel 10 from the roller 143, and when the sensor 210 senses a target point up to which the display panel 10 is unrolled based on the reflectance ratio RR, may stop the movement of the display panel 10.

Accordingly, in response to the unrolling mode ON signal, the display panel 10 may be accurately moved from the bottom dead center to the top dead center. Also, since the degree of unwinding of the display panel 10 from the roller 143 is adjusted based on the reflectance ratio RR, variations in the movement of the display panel 10 may be minimized even if the display panel 10 is repeatedly wound around or unwound from the roller 143.

Referring to FIG. 84, when a rolling mode ON signal is received to wind the display panel 10 and the module cover 15 around the roller 143 (Yes in S270), the controller 1000 may power ON the sensor 210 which is electrically connected (S271). After S271 (or before or simultaneously with S271), the controller 1000 may turn ON electrically connected panel dots 101*a* to emit light (S272). After S272 (or before or simultaneously with S272), the controller 1000 may control the display panel 10 and the module cover 15 to start rolling around the roller 143 by the rotating movement of the motor assembly 810 which is electrically connected (S273). After S273, the panel dots 101*a* sensed by the sensor 210 may be turned OFF so that no light is emitted (S274).

After S274, the controller 1000 may determine whether the number Ndr of panel dots 101*a* sensed by the sensor 210 in relation to the movement of the display panel 10 is equal to or greater than a target number Ndr_target for rolling, based on the reflection ratio RR (S280).

Specifically, the target number Ndr_target for rolling may be the number of panel dots 101*a* that are sensed by the sensor 210 while the display panel 10 and the module cover 15 are rolled around the roller 143 to go from a fully unwound state to a fully wound state. That is, when the number Ndr of panel dots 101*a* sensed by the sensor 210 equals the target number Ndr_target for rolling, it may be determined that the display panel 10 and the module cover 15 have been fully wound around the roller 143.

If it is determined that the number Ndr of panel dots 101*a* sensed by the sensor 210 in relation to the movement of the display panel 10 is less than the target number Ndr_target for rolling (No in S280), it means that the sensor 210 has not yet sensed a target point up to which the display panel 10 is rolled, and the controller 1000 may continue the rolling (S281).

If it is determined that the number Ndr of panel dots 101*a* sensed by the sensor 210 in relation to the movement of the display panel 10 is equal to or greater than the target number Ndr_target for rolling (Yes in S280), it means that the sensor 210 has sensed a target point up to which the display panel 10 is rolled, and the controller 1000 may stop the rolling (S282).

In S280, S281, and S282, the controller 1000 may adjust the movement of the display panel 10 so as to wind the display panel 10 around the roller 143, and when the sensor 210 senses a target point up to which the display panel 10 is rolled based on the reflectance ratio RR, may stop the movement of the display panel 10.

Accordingly, in response to the rolling mode ON signal, the display panel 10 may be accurately moved from the top dead center to the bottom dead center. Also, since the degree of winding of the display panel 10 on the roller 143 is controlled based on the reflectance ratio RR, variations in the movement of the display panel 10 may be minimized even if the display panel 10 is repeatedly wound around or unwound from the roller 143.

Referring to FIGS. 85 to 87, a rolling mode ON signal may be received while the display panel 10 and the module cover 15 are unwound from the roller 143 in response to an unrolling mode ON signal. Also, an unrolling mode ON signal may be received while the display panel 10 and the module cover 15 are wound around the roller 143 in response to a rolling mode ON signal.

Referring to FIG. 85, after S214, upon determining that the number Ndd of panel dots 101*a* sensed by the sensor 210 in relation to the movement of the display panel 10 is less than a target number Ndd_target for unrolling (Yes in S220), the controller 1000 may determine whether a rolling mode ON signal has been received (S230).

In S230, once it is determined that no rolling mode ON signal has been received (No in S230), the unrolling mode is maintained. Since the sensor 210 has not yet sensed a target point up to which the display panel 10 is unrolled, the controller 1000 may continue the unrolling (S231). In S230, once it is determined that a rolling mode ON signal has been received (Yes in S230), the operation mode switches to the rolling mode, and rolling may be started and then stopped (S232). S232 may be divided into S232*a*, S232*b*, S232*c*, and S232*d* to be described later.

Referring to FIG. 86, after Yes in S230, the controller 1000 may control the display panel 10 and the module cover 15 to start rolling around the roller 143 by the rotating movement of the motor assembly 810 (S232*a*). After S232*a*, the controller 1000 may determine whether the number Ndr of panel dots 101*a* sensed by the sensor 210 in relation to the movement of the display panel 10 is equal to or greater than the number Ndd of panel dots 101*a* sensed by the sensor 210 in relation to the movement of the display panel 10 in response to the previous unrolling mode ON signal, based on the reflectance ratio RR (S232*b*).

Specifically, when a rolling mode ON signal is received while the movement of the display panel 10 is adjusted in response to an unrolling mode ON signal, the movement of the display panel 10 may be adjusted so that the display panel 10 is wound around the roller 143 as much as the display panel 10 is moved in response to the unrolling mode ON signal.

No in S232*b* means that the display panel 10 has not yet been wound around the roller 143 as much as the display panel 10 is moved in response to the previous unrolling mode ON signal, and the controller 1000 may continue the rolling (S232*c*). Yes in S232*b* means that the display panel 10 is wound around the roller 143 as much as the display panel 10 is moved in response to the previous unrolling mode ON signal, and the controller 1000 may stop the rolling (S232*d*).

Referring to FIG. 85, after S274, upon determining that the number Ndr of panel dots 101*a* sensed by the sensor 210 in relation to the movement of the display panel 10 is less than a target number Ndr_target for rolling (No in S280), the controller 1000 may determine whether an unrolling mode ON signal has been received (S290).

In S290, once it is determined that no unrolling mode ON signal has been received (No in S290), the rolling mode is maintained. Since the sensor 210 has not yet sensed a target point up to which the display panel 10 is rolled, the controller 1000 may continue the rolling (S291). In S290, once it is determined that an unrolling mode ON signal has been received (Yes in S290), the operation mode switches to the unrolling mode, and unrolling may be started and then stopped (S292). S292 may be divided into S292*a*, S292*b*, S292*c*, and S292*d* to be described later.

Referring to FIG. 87, after Yes in S290, the controller 1000 may control the display panel 10 and the module cover 15 to start unrolling from the roller 143 by the rotating movement of the motor assembly 810 (S292*a*). After S292*a*, the controller 1000 may determine whether the number Ndd of panel dots 101*a* sensed by the sensor 210 in relation to the movement of the display panel 10 is equal to or greater than the number Ndr of panel dots 101*a* sensed by the sensor 210 in relation to the movement of the display panel 10 in response to the previous rolling mode ON signal, based on the reflectance ratio RR (S292*b*).

Specifically, when an unrolling mode ON signal is received while the movement of the display panel 10 is adjusted in response to a rolling mode ON signal, the movement of the display panel 10 may be adjusted so that the display panel 10 is unwound from the roller 143 as much as the display panel 10 is moved in response to the rolling mode ON signal.

No in S292*b* means that the display panel 10 has not yet been unwound from the roller 143 as much as the display panel 10 is moved in response to the previous rolling mode ON signal, and the controller 1000 may continue the unrolling (S292*c*). Yes in S292*b* means that the display panel 10 is unwound from the roller 143 as much as the display panel 10 is moved in response to the previous rolling mode ON signal, and the controller 1000 may stop the unrolling (S292*d*).

Accordingly, even if the mode is switched to the rolling mode during the unrolling mode, the display panel 10 may be accurately moved to the bottom dead center. Also, even if the mode is switched to the unrolling mode during the rolling mode, the display panel 10 may be accurately moved to the top dead center. Also, since the degree of winding of the display panel 10 on the roller 143 is controlled based on the reflectance ratio RR, variations in the movement of the display panel 10 may be minimized even if the display panel 10 is repeatedly wound around or unwound from the roller 143.

Referring to FIG. 88, the plurality of panel dots 101*a* may include first to eighth dots 101*a*1, 101*a*2, 101*a*3, . . . , 101*a*8. For example, the lower panel dot 101*a*1 is a panel dot corresponding to a target unrolling point, and may be sensed by the sensor 210 based on the reflectance ratio RR. Also, the upper panel dot 101*a*6 is a segment corresponding to a target rolling point, and may be sensed by the sensor 210 based on the reflectance ratio RR. Here, when the lower panel dot 101*a*1 is sensed by the sensor 210, the display panel 10 may be fully unrolled from the roller 143 and positioned at the top dead center. Also, when the upper panel dot 101*a*6 is sensed by the sensor 210, the display panel 10 may be fully rolled around the roller 143 and positioned at the bottom dead center.

The reflectance ratio RR in the lower panel dot 101*a*1 and the reflectance ratio RR in the upper panel dot 101*a*6 may be calculated to be different from the reflectance ratios (RR) in the other panel dots. For example, the brightness of the lower panel dot 101*a*1 and the brightness of the upper panel dot 101*a*6 may be different from the brightness of the other panel dots. For example, the brightness of the lower panel dot 101*a*1 and the brightness of the upper panel dot 101*a*6 may be higher than the brightness of the other panel dots. Accordingly, the reflectance ratio RR calculated when the light emitting portion 212 of the sensor 210 emits light to the lower panel dot 101*a*1 or the upper panel dot 101*a*6 may be different from the reflectance ratio RR calculated when the light emitting portion 212 of the sensor 210 emits light to the other panel dots.

Accordingly, the sensor 210 is able to easily sense target points for rolling and unrolling the display panel 10. Also, if the other panel dots have different brightness from each other and therefore all of the panel dots have different reflectance ratios RR, this makes it easy to continuously detect the movement of the display panel 10. The brightness of the lower panel dot 101*a*1 and the brightness of the upper panel dot 101*a*6 are the highest, and the other panel dots become brighter or darker toward the upper panel dot 101*a*6.

Referring to FIG. 89, after S214, upon determining that the number Ndd of panel dots 101*a* sensed by the sensor 210 in relation to the movement of the display panel 10 is less than a target number Ndd_target for unrolling (No in S220), the controller 1000 may determine whether a lower panel dot has been sensed (S240).

If it is determined in S240 that the lower panel dot has not been sensed (No in S240), this means that the sensor 210 has not yet sensed a target unrolling point for the display panel 10, and the controller 1000 may continue the unrolling (S241). If it is determined in S240 that the lower panel dot has been sensed (Yes in S240), this means that the sensor 210 has sensed a target unrolling point, and the unrolling may be stopped (S222).

Referring to FIG. 89, after S274, upon determining that the number Ndr of panel dots 101*a* sensed by the sensor 210 in relation to the movement of the display panel 10 is less than a target number Ndr_target for rolling (No in S280), the controller 1000 may determine whether an upper panel dot has been sensed (S300).

If it is determined in S300 that the upper panel dot has not been sensed (No in S300), this means that the sensor 210 has not yet sensed a target rolling point for the display panel 10, and the controller 1000 may continue the rolling (S301). If it is determined in S300 that the upper panel dot has been sensed (Yes in S300), this means that the sensor 210 has sensed a target rolling point, and the rolling may be stopped (S282).

Accordingly, even if, due to an unexpected event, the display panel 10 is positioned below the top dead center before a rolling mode ON signal is received, or the display panel 10 is positioned above the bottom dead center before an unrolling mode ON signal is received, rolling or unrolling may be accurately performed. That is, in the rolling mode or the unrolling mode, the controller 1000 may control the degree of winding or unwinding of the display panel 10 on or from the roller 143, based on the number Ndr and Ndd of panel dots 101*a* sensed by the sensor 210 in relation to the movement of the display panel 10, in such a way that, upon sensing the upper panel dot or the lower panel dot, the rolling or unrolling is stopped. In this way, the rolling or the unrolling may be performed more accurately.

Referring to FIG. 90, after S214, the controller 1000 may determine whether the lower panel dot has been sensed (S250). If it is determined in S250 that the lower panel dot has not been sensed (No in S250), this means that the sensor 210 has not yet sensed a target point up to which the display panel 10 is unrolled, and the controller 1000 may continue the unrolling (S251). If it is determined that in S250 that the lower panel dot has been sensed (Yes in S250), this means that the sensor 210 has sensed a target point up to which the display panel 10 is unrolled, and the unrolling may be stopped (S252).

Referring to FIG. 90, after S274, the controller 1000 may determine whether the upper panel dot has been sensed (S310). If it is determined in S310 that the upper panel dot has not been sensed (No in S310), this means that the sensor 210 has not yet sensed a target point up to which the display panel 10 is rolled, and the controller 1000 may continue the rolling (S311). If it is determined that in S310 that the upper panel dot has been sensed (Yes in S310), this means that the sensor 210 has sensed a target point up to which the display panel 10 is rolled, and the rolling may be stopped (S312).

Accordingly, in the rolling mode or the unrolling mode, the controller 1000 may stop the rolling or the unrolling based on whether the upper panel dot or the lower panel dot has been sensed by the sensor 210 in relation to the movement of the display panel 10. In this way, the rolling or the unrolling may be performed more accurately.

Referring to FIG. 91, the sensor 210 may include a pair of sensors 210*a* and 210*b* contiguous to each other on opposite ends of the display panel 10, in the lengthwise direction of the roller 143. Also, the plurality of panel dots may include panel dots 101*a* sensed by the right sensor 210*a*, contiguous to a right edge of the display panel 10, and panel dots 101*b* sensed by the right sensor 210*b*, contiguous to a left edge of the display panel 10. The controller 1000 may control the degree of winding or unwinding of the display panel 10 on or from the roller 143, based on information on the movement of the module cover 15 obtained from the pair of sensors 210*a* and 210*b*.

Meanwhile, unlike in the previous embodiments, the right link 910*a* and the left link 910*b* may move independently of each other. That is, although it is desirable that the degree to which the right link 910*a* is lifted from the base 31 and the degree to which the left link 910*b* is lifted from the base 31 are equal, they may be adjusted differently.

For example, during a rolling operation RL in which the display panel 10 is wound around the roller 143, or during an unrolling operation DP in which the display panel 10 is unwound from the roller 143, the display panel 10 may be tilted to a right side Rc or a left side Lc. In this case, a change in reflectance ratio RR in the right sensor 210*a* in relation to the movement of the display panel 10 may be different from a change in reflectance ratio RR in the left sensor 210*b* in relation to the movement of the display panel 10. In this instance, the degrees to which the right link 910*a* and the left link 910*b* are lifted from the base 31 may be controlled, so that the module cover 15 is aligned in the center without tilting rightwards or leftwards. In this case, a change in reflectance ratio RR in the right sensor 210*a* in relation to the movement of the display panel 10 may be equal to a change in reflectance ratio RR in the left sensor 210*b* in relation to the movement of the display panel 10.

Referring to FIG. 92, when the controller 1000 enters into the unrolling mode (Yes in S210), it may power ON the left and right sensors 210*b* and 210*a* which are electrically connected (S211*a*) to bring the left and right sensors 210*b* and 210*a* into a state where they are able to detect the movement of two opposite ends of the display panel 10. After S211*a* (or before or simultaneously with S211*a*), the controller 1000 may turn ON electrically connected left and right panel dots 101*b* and 101*a* to emit light (S212*a*). After S212*a* (or before or simultaneously with S212*a*), the controller 1000 may control the display panel 10 and the module cover 15 to start unrolling from the roller 143 by the rotating movement of the motor assembly 810 (S213). Also, after S213, the left and right panel dots 101*b* and 101*a* sensed by the sensor 210 may be turned OFF so that no light is emitted (S214).

After S214, the controller 1000 may determine whether the reflectance ratios RR detected by the left and right sensors 210*b* and 210*a* in relation to the movement of the display panel 10 are equal (S260). If it is determined in S260 that the reflectance ratios RR detected by the left and right sensors 210*b* and 210*a* are not equal (No in S260), the degrees to which the left and right links 910*b* and 910*a* are lifted from the base 31 may be controlled (S261) so that the reflectance ratios RR detected by the left and right sensors 210*b* and 210*a* become equal. If it is determined in S260 that the reflectance ratios RR detected by the left and right sensors 210*b* and 210*a* are equal (Yes in S260), the above-described S220, S221, and S222 may be performed.

Referring to FIG. 92, when the controller 1000 enters into the rolling mode (Yes in S270), it may power ON the left and right sensors 210*b* and 210*a* which are electrically connected (S271*a*). After S271*a* (or before or simultaneously with S271*a*), the controller 1000 may turn ON electrically connected left and right panel dots 101*b* and 101*a* to emit light (S272*a*). After S272*a* (or before or simultaneously with S272*a*), the controller 1000 may control the display panel 10 and the module cover 15 to start rolling around the roller 143 by the rotating movement of the motor assembly 810 (S273). Also, after S273, the left and right panel dots 101*b* and 101*a* sensed by the sensor 210 may be turned OFF so that no light is emitted (S274).

After S274, the controller 1000 may determine whether the reflectance ratios RR detected by the left and right sensors 210*b* and 210*a* in relation to the movement of the module cover 15 are equal (S320). If it is determined in S320 that the reflectance ratios RR detected by the left and right sensors 210*b* and 210*a* are not equal (No in S320), the degrees to which the left and right links 910*b* and 910*a* lie on the base 31 may be adjusted (S321) so that the reflectance ratios RR detected by the left and right sensors 210*b* and 210*a* become equal. If it is determined in S320 that the reflectance ratios RR detected by the left and right sensors 210*b* and 210*a* are equal (Yes in S320), the above-described S280, S281, and S282 may be performed.

Accordingly, even if the module cover 15 is tilted to the left or right of the roller 143 in a process of repeatedly winding or unwinding the module cover 15 on or from the roller 143, this may be detected and the module cover 15 may be correctly aligned so as not to tilt leftwards or rightwards.

According to an aspect of the present disclosure, there is provided a display device including: a flexible display panel; a module cover which is disposed at a rear of the display panel; a roller on or from which the display panel and the module cover are wound or unwound; a sensor which is disposed adjacent to the display panel and the module cover so as to sense movements of the display panel and the module cover; and a controller which controls a degree of winding or unwinding of the display panel and the module cover on or from the roller based on information on the movements acquired by the sensor.

According to another aspect of the present disclosure, the sensor includes: a light emitting portion which emits light toward the display panel and the module cover; and a light receiving portion which receives light emitted from the light emitting portion and reflected from at least one of the display panel and the module cover, and the controller controls the degree of winding or unwinding of the display panel and the module cover on or from the roller, based on reflectance ratio which is the proportion of light received by the light receiving portion to light emitted from the light emitting portion.

According to another aspect of the present disclosure, upon receiving an unrolling mode signal to unwind the display panel and the module cover from the roller, the controller adjusts the movement of the module cover so that the module cover is unwound from the roller, and stops the movement of the module cover when a target unrolling point for the module cover is sensed by the sensor based on the reflectance ratio.

According to another aspect of the present disclosure, upon receiving a rolling mode signal to wind the display panel and the module cover around the roller, the controller adjusts the movement of the module cover so that the module cover is wound around the roller, and stops the movement of the module cover when a target rolling point for the module cover is sensed by the sensor based on the reflectance ratio.

According to another aspect of the present disclosure, upon receiving the rolling mode signal while the movement of the module cover is adjusted in response to the unrolling mode signal, the controller adjusts the movement of the module cover so that the module cover is wound around the roller as much as the module cover is moved in response to the unrolling mode signal, and upon receiving the unrolling mode signal while the movement of the module cover is adjusted in response to the rolling mode signal, the controller adjusts the movement of the module cover so that the module cover is unwound from the roller as much as the module cover is moved in response to the rolling mode signal.

According to another aspect of the present disclosure, the reflectance ratio of the target unrolling point of the module cover and the reflectance ratio of the target rolling point thereof are calculated to be different from the reflectance ratio of other points of the module cover.

According to another aspect of the present disclosure, the sensor includes a pair of sensors adjacent to both ends of the display panel and the module cover, respectively, in a lengthwise direction of the roller, and the controller adjusts the movement of the both ends of the module cover so that each of the pair of sensors detects the same change in reflectance ratio in relation to the movement of the module cover.

According to another aspect of the present disclosure, the roller extends longitudinally, the sensor is spaced apart from the roller in a radial direction of the roller and disposed adjacent to a rear surface of the module cover on an outer side of the roller, and the reflectance ratio is calculated to be different depending on the movement of the module cover.

According to another aspect of the present disclosure, the module cover includes a plurality of segments that extend longitudinally in the lengthwise direction of the roller and are sequentially arranged in an upward-downward direction of the display panel, the reflectance ratio calculated when the light emitting portion emits light to the plurality of segments is different from the reflectance ratio calculated when the light emitting portion emits light between the plurality of segments, and the controller adjusts the movement of the module cover corresponding to the number of segments sensed by the sensor based on the reflectance ratio.

According to another aspect of the present disclosure, the shape of the target unrolling point of the module cover and the shape of the target rolling point thereof are different from the shape of other points of the module cover.

According to another aspect of the present disclosure, the roller extends longitudinally, the sensor is spaced apart from the roller in the radial direction of the roller and disposed adjacent to a front surface of the display panel, and the reflectance ratio is calculated to be different depending on the movement of the display panel.

According to another aspect of the present disclosure, the display panel includes a plurality of panel dots that are sequentially arranged in the upward-downward direction of the display panel and emit light, the reflectance ratio calculated when the light emitting portion emits light to the plurality of panel dots is different from the reflectance ratio calculated when the light emitting portion emits light between the plurality of panel dots, and the controller adjusts the movement of the module cover corresponding to the number of panel dots sensed by the sensor based on the reflectance ratio.

According to another aspect of the present disclosure, the brightness of the panel dots at the target unrolling point of the display panel and the brightness of the panel dots at the target rolling point thereof are different from the brightness of the panel dots at other points of the display panel.

According to another aspect of the present disclosure, the controller stops the panel dots sensed by the sensor from emitting light based on the reflectance ratio Certain embodiments or other embodiments of the disclosure described above are not mutually exclusive or distinct from each other. Configurations or functions of embodiments of the disclosure described above may be used together or combined with each other.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

The above detailed description should not be construed as restrictive in all respects and should be considered as illustrative. The scope of the present invention should be determined by reasonable interpretation of the appended claims, and all modifications within the equivalent scope of the present invention are included in the scope of the present invention.

The invention claimed is:

1. A display device comprising:
- a display panel that is flexible;
- a module cover which is disposed at a rear of the display panel;
- a roller on or from which the display panel and the module cover are configured to be wound or unwound;
- a sensor which is disposed adjacent to the display panel and the module cover to sense movements of the display panel and the module cover; and
- a controller configured to control a degree of winding or unwinding of the display panel and the module cover on or from the roller based on information regarding the movements sensed by the sensor.

2. The display device of claim 1, wherein the sensor comprises:
- a light emitting portion configured to emit light toward the display panel and the module cover; and
- a light receiving portion configured to receive light emitted by the light emitting portion and reflected by at least one of the display panel or the module cover, and
- wherein the controller is further configured to control the degree of winding or unwinding of the display panel and the module cover on or from the roller, based on a reflectance ratio which is a proportion of the light received by the light receiving portion to the light emitted by the light emitting portion.

3. The display device of claim 2, wherein, upon receiving an unrolling mode signal to unwind the display panel and the module cover from the roller, the controller is further configured to adjust the movement of the module cover so that the module cover is unwound from the roller, and stop the movement of the module cover when a target unrolling point of the module cover is sensed by the sensor based on a first reflectance ratio corresponding to the target unrolling point.

4. The display device of claim 3, wherein, upon receiving a rolling mode signal to wind the display panel and the module cover around the roller, the controller is further configured to adjust the movement of the module cover so that the module cover is wound around the roller, and stop the movement of the module cover when a target rolling point of the module cover is sensed by the sensor based on a second reflectance ratio corresponding to the target rolling point.

5. The display device of claim 4,
- wherein, upon receiving the rolling mode signal while the movement of the module cover is adjusted in response to the unrolling mode signal, the controller is further configured to adjust the movement of the module cover so that the module cover is wound around the roller as much as the module cover was moved in response to the unrolling mode signal, and
- wherein, upon receiving the unrolling mode signal while the movement of the module cover is adjusted in response to the rolling mode signal, the controller is further configured to adjust the movement of the module cover so that the module cover is unwound from the roller as much as the module cover was moved in response to the rolling mode signal.

6. The display device of claim 4, wherein the first reflectance ratio corresponding to the target unrolling point of the module cover and the second reflectance ratio corresponding to the target rolling point of the module cover are different from a reflectance ratio corresponding to other points of the module cover.

7. The display device of claim 4,
- wherein the sensor comprises a first sensor adjacent to respective first ends of the display panel and the module cover with respect to a lengthwise direction of the roller, and a second sensor adjacent to respective second ends of the display panel and the module cover with respect to the lengthwise direction of the roller, and
- wherein the controller is further configured to adjust movement of the first end and the second end of the module cover so that the first sensor and the second sensor each detects a same change in reflectance ratio in relation to the movement of the module cover.

8. The display device of claim 4,
- wherein the roller extends longitudinally,
- wherein the sensor is spaced apart from the roller with respect to a radial direction of the roller and disposed adjacent to a rear surface of the module cover on an outer side of the roller, and
- wherein the reflectance ratio varies depending on the movement of the module cover.

9. The display device of claim 8,
- wherein the module cover comprises a plurality of segments that extend longitudinally along a lengthwise direction of the roller and are arranged along a height direction of the display panel, wherein a reflectance ratio calculated when the light emitting portion emits light to the plurality of segments is different from a reflectance ratio calculated when the light emitting portion emits light to between the plurality of segments, and wherein the controller is further configured to adjust the movement of the module cover corresponding to a number of the segments sensed by the sensor based on the reflectance ratio.

10. The display device of claim 9, wherein a shape of the target unrolling point of the module cover and a shape of the target rolling point of the module cover are different from a shape of other points of the module cover.

11. The display device of claim 4, wherein the roller extends longitudinally, wherein the sensor is spaced apart from the roller with respect to a radial direction of the roller and disposed adjacent to a front surface of the display panel, and wherein the reflectance ratio varies depending on the movement of the display panel.

12. The display device of claim 11, wherein the display panel comprises a plurality of panel dots that are arranged along a height direction of the display panel and configured to emit light, wherein a reflectance ratio calculated when the light emitting portion emits light to the plurality of panel dots is different from a reflectance ratio calculated when the light emitting portion emits light to between the plurality of panel dots, and wherein the controller is further configured to adjust the movement of the module cover corresponding to a number of the panel dots sensed by the sensor based on the reflectance ratio.

13. The display device of claim 12, wherein a brightness of the panel dots at a target unrolling point of the display panel and a brightness of the panel dots at a target rolling point of the display panel are different from a brightness of the panel dots at other points of the display panel.

14. The display device of claim 12, wherein the controller is further configured to stop the panel dots sensed by the sensor from emitting light based on the reflectance ratio.

* * * * *